United States Patent
Checa Rojas et al.

(10) Patent No.: US 12,433,933 B2
(45) Date of Patent: Oct. 7, 2025

(54) METHODS OF DIAGNOSING CERVICAL CANCER BASED ON ALTERED POLYPEPTIDE EXPRESSION AND TREATMENT THEREOF

(71) Applicant: TIMSER, S.A.P.I. DE C.V., Mexico City (MX)

(72) Inventors: Alberto Checa Rojas, Morelos (MX); Orlando Santillan Godinez, Morelos (MX); Raul Dominguez Palestino, Mexico City (MX)

(73) Assignee: TIMSER, S.A.P.I. DE C.V., Mexico City (MX)

( * ) Notice: Subject to any disclaimer, the term of this patent is extended or adjusted under 35 U.S.C. 154(b) by 26 days.

(21) Appl. No.: 18/454,391

(22) Filed: Aug. 23, 2023

(65) Prior Publication Data
US 2024/0091305 A1   Mar. 21, 2024

Related U.S. Application Data

(62) Division of application No. 16/879,748, filed on May 20, 2020, now Pat. No. 11,771,740.

(30) Foreign Application Priority Data

May 21, 2019   (MX) .................. MX/A/2019/005940

(51) Int. Cl.
| | |
|---|---|
| A61K 38/16 | (2006.01) |
| G01N 33/52 | (2006.01) |
| G01N 33/53 | (2006.01) |
| G01N 33/574 | (2006.01) |

(52) U.S. Cl.
CPC ............. *A61K 38/16* (2013.01); *G01N 33/52* (2013.01); *G01N 33/53* (2013.01); *G01N 33/57411* (2013.01)

(58) Field of Classification Search
CPC ........ A61K 38/16; G01N 33/52; G01N 33/53; G01N 33/57411; G01N 33/54388; G01N 2800/52; G01N 2800/56
See application file for complete search history.

(56) References Cited

U.S. PATENT DOCUMENTS

| | | | |
|---|---|---|---|
| 9,850,311 B2 * | 12/2017 | Gurney | ............ C07K 16/468 |
| 2007/0224201 A1 | 9/2007 | Wu et al. | |
| 2009/0269731 A1 | 10/2009 | Reed | |
| 2014/0343860 A1 | 11/2014 | Egan et al. | |
| 2017/0182186 A1 | 6/2017 | Markovic et al. | |

FOREIGN PATENT DOCUMENTS

| | | |
|---|---|---|
| WO | 2007007205 A2 | 1/2007 |
| WO | 2019033866 A1 | 2/2019 |

OTHER PUBLICATIONS

Li H, et al. (Jul. 2016) J Gynecol Oncol. 27(4): e43. 20 pages. (http://doi.org/10.3802/jgo.2016.27.e43).*
Bizzarri N, et al. (2016) Expert Opinion on Biological Therapy. 16(3):407-419. (http://dx.doi.org/10.1517/14712598.2016.1145208).*
Checa-Rojas A, et al (Apr. 24, 2018) Oncotarget. 9(31):21696-21714. (doi: 10.18632/oncotarget.24796) (cited in parent).
Checa-Rojas et al., "GSTM3 and GSTP1: novel players driving tumor progression in cervical cancer", Oncotarget, 2018, 9(31):21696-21714. (cited in parent).
Garbett et al., "Detection of Cervical Cancer Biomarker Patterns in Blood Plasma and Urine by Differential Scanning Calorimetry and Mass Spectrometry", PLoS One, 9(1):1-12, Jan. 8, 2014. (cited in parent).
Kim JW, et al. (Nov. 1998) Gynecol Oncol. 71(2):266-9. (doi: 10.1006/gyno.1998.5195). (cited in parent).
Kim Y-K, et al. (Feb. 2017) Int J Gynecol Cancer. 27(2):326-331. (doi:10.1097/IGC.0000000000000868). (cited in parent).
Kontostathi et al., "Cervical Cancer Cell Line Secretome Highlights the Roles of Transforming Growth Factor-Beta-Induced Protein ig-h3, Peroxiredoxin-2, and NRF2 on Cervical Carcinogenesis", BioMed Research International, 2017, 16 pages. (cited in parent).
Kweh F, et al. (Nov. 2009) Mol Carcinog. 48(11):1005-1017. (doi: 10.1002/mc.20552). (cited in parent).
MX Office Action in Mexican Application No. MX/a/2019/005940, dated Feb. 6, 2020, 6 pages. (cited in parent).
PCT International Search Report and Written Opinion in International Application No. PCT/IB2020/000395, dated Jan. 28, 2021, 16 pages. (cited in parent).
Peralta-Zaragoza O, et al. (2012) Onco Targets Ther. 5:315-328. (Published online Nov. 2, 2012. doi: 10.2147/OTT. S25123). (cited in parent).
Raza F, et al. (2015) Biochem Soc Trans. 43(6):1227-1233. (https://doi.org/10.1042/BST20150163). (cited in parent).
Karlin, S. and Altschul, S. F. "Methods for assessing the statistical significance of molecular sequence features by using general scoring schemes" (1990) Proc. Natl. Acad. Sci. USA 87: 2264-2268.
Altschul, S. F. et al. "Basic local alignment search tool" (1990) J. Mol. Biol. 215: 403-410.
Karlin, S. and Altschul, S. F. "Applications and statistics for multiple high-scoring segments in molecular sequences" (1993) Proc. Natl. Acad. Sci. USA 90: 5873-5877.
Altschul, S. F. et al. "Gapped BLAST and PSI-BLAST: a new generation of protein database search program" (1997) Nucleic Acids Res. 25(17): 3389-3402.
Wootton, J. C. and Federhen, S. "Statistics of local complexity in amino acid sequences and sequence databases" (1993) Computers and Chemistry 17(2): 149-163.

* cited by examiner

*Primary Examiner* — Robert S Landsman
(74) *Attorney, Agent, or Firm* — Volpe Koenig

(57) ABSTRACT

The present invention is related to diagnostic tests or rapid detections of different types of cancer, especially cervical cancer and precancerous lesions. Especially, the invention relates to specific and useful protein biomarkers for the detection of said diseases, and to the methods for determination and detection of said biomarkers.

20 Claims, 10 Drawing Sheets
Specification includes a Sequence Listing.

Total protein per cell line:
- HeLa: 432
- SiHa: 447
- C-33A: 343
- HaCat: 440

Unique proteins:
- HeLa: 115
- SiHa: 100
- C-33A: 67
- HaCat: 107

Proteins shared between cell lines:
- C-33 vs HeLa vs SiHa:
- SiHa vs C-33: 13
- HeLa vs C-33: 11
- SiHa vs HeLa: 45

Pre-cancerous lesions L1

Pre-cancerous lesions L2

Controls

METHODS OF DIAGNOSING CERVICAL CANCER BASED ON ALTERED POLYPEPTIDE EXPRESSION AND TREATMENT THEREOF

CROSS-REFERENCE TO RELATED APPLICATIONS

This application is a divisional application from U.S. application Ser. No. 16/879,748, which was filed May 20, 2020, is titled METHODS OF DIAGNOSING AND TREATING CERVICAL CANCER, granted as U.S. Pat. No. 11,771,740 B2 on Oct. 3, 2023, and claimed priority under 35 USC § 119 (a) to Mexican Patent Application No. MX/a/2019/005940, which was filed May 21, 2019, both of which are incorporated herein by reference as if fully set forth.

INCORPORATION OF SEQUENCE LISTING

The Sequence Listing filed herewith, titled TMI2-PT004.1—Sequence Listing, created on Aug. 22, 2023, and having of file size of 277.5 KB is incorporated herein as if fully set forth.

BACKGROUND OF THE INVENTION

Field of the Invention

The present invention relates generally to methods of diagnosing and treating cervical cancer in a subject and more specifically to biomarkers used to diagnose cervical cancer.

Background Information

Cervical cancer (CC) is one of the most common cancers among women worldwide. Among the risk factors related to this disease are infection with the human papilloma virus (HPV), the microbiome, risky sexual behavior, multiparity, smoking, prolonged use of hormonal contraceptives and environmental factors. Cervical cancer is a disease of slow and progressive evolution. It is preceded by cervical intra-epithelial neoplasms, which are the lesions considered to be the prelude to this condition. These malignancies or injuries can occur even 10 years before cervical cancer develops.

Human papillomavirus infection (HPV) causes more than 90% of cases. Other risk factors include smoking, a weak immune system, birth control pills, starting sex at a young age, and having many sexual partners, but these are less important. Cervical cancer typically develops from precancerous changes over 10 to 20 years. About 90% of cervical cancer cases are squamous cell carcinomas, 10% are adenocarcinoma, and a small number are other types. Diagnosis is typically by cervical screening followed by a biopsy. Medical imaging is then done to determine whether or not the cancer has spread.

Current methods of diagnosing cervical cancer are invasive. The most common method of diagnosing cervical cancer is by a smear screening with Papanicolaou staining, i.e. Pap smear. There is a need for non-invasive methods of detecting cervical cancer.

SUMMARY OF THE INVENTION

The present invention is based on the seminal discovery that a collection of biomarkers can be used for the diagnosis of cervical cancer.

In one embodiment, the present invention is directed to methods of detecting at least one polypeptide in a sample from a subject; wherein the at least one polypeptide is selected from Farnesyl pyrophosphate synthase, neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, Heat Shock Protein Cognate 71 kDa, Ankyrin-3, Rho 23 GTPase-activating protein, Cytoskeletal Keratin 78 type II, Alpha-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof; or a polypeptide with at least about 70% sequence identity to a polypeptide having the amino acid sequence selected from SEQ ID NOs: 1-20 or a fragment thereof; and diagnosing cervical cancer based on the detection of the at least one polypeptide.

In one aspect, the sample is selected from the group consisting of blood, plasma, urine, saliva, sweat, organ biopsy, cerebrospinal fluid (CSF), tear, vaginal fluid, feces, skin, and hair. In certain aspects the sample is a blood sample and the subject is human.

In another aspect, the at least one polypeptide is Farnesyl pyrophosphate synthase or a fragment thereof and at least one polypeptide selected from neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, Heat shock protein cognate 71 kDa, Ankyrin-3, Rho 23 GTPase-activating protein, Cytoskeletal Keratin 78 type II, Alpha-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof. In an additional aspect, the at least one polypeptide is a polypeptide having at least about 70% sequence identity to a polypeptide having the amino acid sequence of SEQ ID NO:1 or a fragment thereof and at least one polypeptide with at least about 70% sequence identity to a polypeptide having the amino acid sequence selected from SEQ ID NOs:2-20 and a fragment thereof.

In a further aspect, the detecting is by protein microarray, fluorescence detection, flow cytometry, microfluidic device, lateral flow assay, vertical flow assay or immunoassay. In a specific aspect, the detecting is by lateral flow assay. In one aspect, the method also includes administering a treatment to the subject. In an additional aspect, the treatment is surgery, radiation, chemotherapy, targeted therapy and/or immunotherapy.

In another embodiment, the present invention provides a method of diagnosing cervical cancer in a subject by detecting at least one polypeptide in a sample from a subject; wherein the at least one polypeptide is selected from Farnesyl pyrophosphate synthase, neurofibromin 1, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, Heat shock protein cognate protein 71 kDa, Ankyrin-3, Rho 23 GTPase-activating protein, Cytoskeletal Keratin 78 type II, Alpha-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof; or a polypeptide with at least about 70% sequence identity to a polypeptide having the amino acid sequence selected from SEQ ID NOs: 1-20 or a fragment thereof; and diagnosing cervical cancer based on the detection of at least one polypeptide.

In one aspect, the sample is blood, plasma, urine, saliva, sweat, organ biopsy, cerebrospinal fluid (CSF), tear, vaginal fluid, feces, skin, and hair. In certain aspects, the sample is a blood sample and the subject is human.

In an additional aspect, the at least one polypeptide is Farnesyl pyrophosphate synthase or a fragment thereof and at least one polypeptide selected from neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, Cognate thermal shock protein 71 kDa, Ankyrin-3, Rho 23 GTPase-activating protein, Cytoskeletal Keratin 78 type II, Alpha-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof. In a further aspect, the at least one polypeptide is a polypeptide with at least about 70% sequence identity to a polypeptide having the amino acid sequence of SEQ ID NO:1 or a fragment thereof and at least one polypeptide with at least about 70% sequence identity to a polypeptide having an amino acid sequence selected from SEQ ID NOs:2-20 or a fragment thereof.

In another aspect, the detecting is by protein microarray, fluorescence detection, flow cytometry, microfluidic device, lateral flow assay, vertical flow assay or immunoassay. In a specific aspect, the detecting is by lateral flow assay. In one aspect, the method also includes administering a treatment to the subject. In certain aspects, the treatment is surgery, radiation, chemotherapy, targeted therapy and/or immunotherapy.

In an additional embodiment, the present invention provides a method of treating cervical cancer in a subject in need thereof, the method is detecting at least one polypeptide in a sample from a subject; wherein the at least one polypeptide is selected from Farnesyl pyrophosphate synthase, neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, Heat shock protein cognate 71 kDa, Ankyrin-3, Rho 23 GTPase-activating protein, Cytoskeletal Keratin 78 type II, Alpha-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof; or a polypeptide with at least about 70% sequence identity to a polypeptide having the amino acid sequence selected from SEQ ID NOs: 1-20 or a fragment thereof; diagnosing cervical cancer based on the detection of the at least one polypeptide; and administering a treatment to the subject. In one aspect, the sample is a blood sample.

In an additional aspect, the at least one polypeptide is Farnesyl pyrophosphate synthase or a fragment thereof and at least one polypeptide selected from neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, Heat shock protein cognate 71 kDa, Ankyrin-3, Rho 23 GTPase-activating protein, Cytoskeletal Keratin 78 type II, Alpha-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof. In a further embodiment, the at least one polypeptides is a polypeptide with at least about 70% sequence identity to a polypeptide having the amino acid sequence of SEQ ID NO:1 or a fragment thereof and at least one polypeptide with at least about 70% sequence identity to a polypeptide with an amino acid sequence selected from SEQ ID NOs:2-20 or a fragment thereof.

In another aspect, the detecting is by protein microarray, fluorescence detection, flow cytometry, microfluidic device, lateral flow assay, vertical flow or immunoassay. In a specific aspect, the detecting is by lateral flow assay. In an additional aspect, the treatment is selected from the group consisting of surgery, radiation, chemotherapy, targeted therapy and immunotherapy.

In a further aspect, the chemotherapy is Cisplatin, Carboplatin, Paclitaxel, Topotecan, docetaxel, ifosfamide, 5-fluorouracil, irinotecan, gemcitabine or mitomycin. In certain aspects, the targeted therapy is bevacizumab and the immunotherapy is pembrolizumab.

In a further embodiment, the present invention provides methods of predicting a response to treatment for a subject having cervical cancer by detecting at least one polypeptide in a sample from a subject; wherein the at least one polypeptide is selected from Farnesyl pyrophosphate synthase, neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, heat shock protein cognate 71 kDa, Ankyrin-3, Rho 23 GTPase-activating protein, Cytoskeletal Keratin 78 type II, Alpha-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof; or a polypeptide with at least about 70% sequence identity to a polypeptide having amino acid sequence selected from SEQ ID NOs: 1-20 or a fragment thereof; and predicting a response to treatment based on the detection of the at least one polypeptide.

In one aspect, the at least one polypeptide is Farnesyl pyrophosphate synthase or a fragment thereof and at least one polypeptide selected from neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, Heat shock protein cognate 71 kDa, Ankyrin-3, Rho 23 GTPase-activating protein, Cytoskeletal Keratin 78 type II, Alpha-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof. In another aspect, the at least one polypeptide is a polypeptide with at least about 70% sequence identity to a polypeptide having the amino acid sequence of SEQ ID NO:1 or a fragment thereof and at least one polypeptide with at least about 70% sequence identity to a polypeptide having the amino acid sequence selected from SEQ ID NOs:2-20 or a fragment thereof.

In an additional aspect, the detecting is by protein microarray, fluorescence detection, flow cytometry, microfluidic device, lateral flow assay, vertical flow or immunoassay. In a further aspect, the detecting is by lateral flow assay. In certain aspects, the treatment is surgery, radiation, chemotherapy, targeted therapy and immunotherapy.

In another embodiment, the present invention provides methods for determining the stage of cervical cancer in a subject in need thereof by detecting at least one polypeptide in a sample from the subject; wherein the at least one polypeptide is selected from Farnesyl pyrophosphate synthase, neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, heat shock protein cognate 71 kDa, Ankyrin-3, Rho 23 GTPase-activating protein, Cytoskeletal Keratin 78 type II, Alpha-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof; or a polypeptide with at least about 70% sequence identity to a polypeptide having the amino acid sequence selected from SEQ ID NOs: 1-20 or a fragment thereof; and determining the stage of cervical cancer in the subject based on the detection of the at least one polypeptide.

In one aspect, the at least one polypeptide is Farnesyl pyrophosphate synthase or a fragment thereof and at least one polypeptide selected from neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, Heat shock protein cognate 71 kDa, Ankyrin-3, Rho 23 GTPase-activating protein, Cytoskeletal Keratin 78 type II, Alpha-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof. In another aspect, the at least one polypeptide is a polypeptide with at least about 70% sequence identity to a polypeptide having the amino acid sequence of SEQ ID NO:1 or a fragment thereof and at least one polypeptide with at least about 70% sequence identity to a polypeptide having the amino acid sequence selected from SEQ ID NOs:2-20 or a fragment thereof.

In an additional aspect, the detecting is by protein microarray, fluorescence detection, flow cytometry, microfluidic device, lateral flow assay, vertical assay or immunoassay. In a specific aspect, the detecting is by lateral flow assay. In a further aspect, the method also includes administering a treatment to the subject. In certain aspects, the treatment is surgery, radiation, chemotherapy, targeted therapy or immunotherapy. In one aspect, the cervical cancer is stage I, stage II, stage III or stage IV.

In one embodiment, the present invention provides a kit with a sample collection unit; a lateral flow device; and instructions for using the lateral flow device.

In one aspect, the lateral flow device detects at least one polypeptide selected from Farnesyl pyrophosphate synthase, neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, heat shock protein cognate 71 kDa, Ankyrin-3, Rho 23 GTPase-activating protein, Cytoskeletal Keratin 78 type II, Alpha-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof; or a polypeptide with at least about 70% sequence identity to a polypeptide having the amino acid sequence selected from SEQ ID NOs: 1-20 or a fragment thereof.

In an additional aspect, the at least one polypeptide is Farnesyl pyrophosphate synthase or a fragment thereof and at least one polypeptide selected from neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, heat shock protein cognate 71 kDa, Ankyrin-3, Rho 23 GTPase-activating protein, Cytoskeletal Keratin 78 type II, Alph-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof. In a further aspect, the at least one polypeptide is a polypeptide with at least about 70% sequence identity to a polypeptide having the amino acid sequence of SEQ ID NO:1 or a fragment thereof and at least one polypeptide with at least about 70% sequence identity to a polypeptide having the amino acid sequence selected from SEQ ID NOs:2-20 or a fragment thereof.

In another aspect, the lateral flow device detects the at least one polypeptide by an immunoassay. In one aspect, the sample collection unit collects a blood sample.

In an additional aspect, the present invention provides a use of the detection of at least one polypeptide for the diagnosis of cervical cancer in a subject in need thereof, wherein the at least one polypeptide is selected from Farnesyl pyrophosphate synthase, neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, heat shock protein cognate 71 kDa, Ankyrin-3, Rho 23 GTPase-activating protein, Cytoskeletal Keratin 78 type II, Alpha-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof; or a polypeptide with at least about 70% sequence identity to a polypeptide having the amino acid sequence selected from SEQ ID NOs: 1-20 or a fragment thereof.

In a further aspect, the at least one polypeptide is detected in a sample from the subject and the sample is a blood sample. In another aspect, the at least one polypeptide is Farnesyl pyrophosphate synthase or a fragment thereof and at least one polypeptide selected from neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, heat shock protein cognate 71 kDa, Ankyrin-3, Rho 23 GTPase-activating protein, Cytoskeletal Keratin 78 type II, Alph-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof. In one aspect, the at least one polypeptide is a polypeptide with at least about 70% sequence identity to a polypeptide having the amino acid sequence of SEQ ID NO:1 or a fragment thereof and at least one polypeptide with at least about 70% sequence identity to a polypeptide having the amino acid sequence selected from SEQ ID NOs:2-20 or a fragment thereof.

In another aspect, the detecting is by protein microarray, fluorescence detection, flow cytometry, microfluidic device, lateral flow assay, vertical flow or immunoassay. In certain aspects, the detecting is by lateral flow assay.

DETAILED DESCRIPTION OF THE INVENTION

Figure 1:
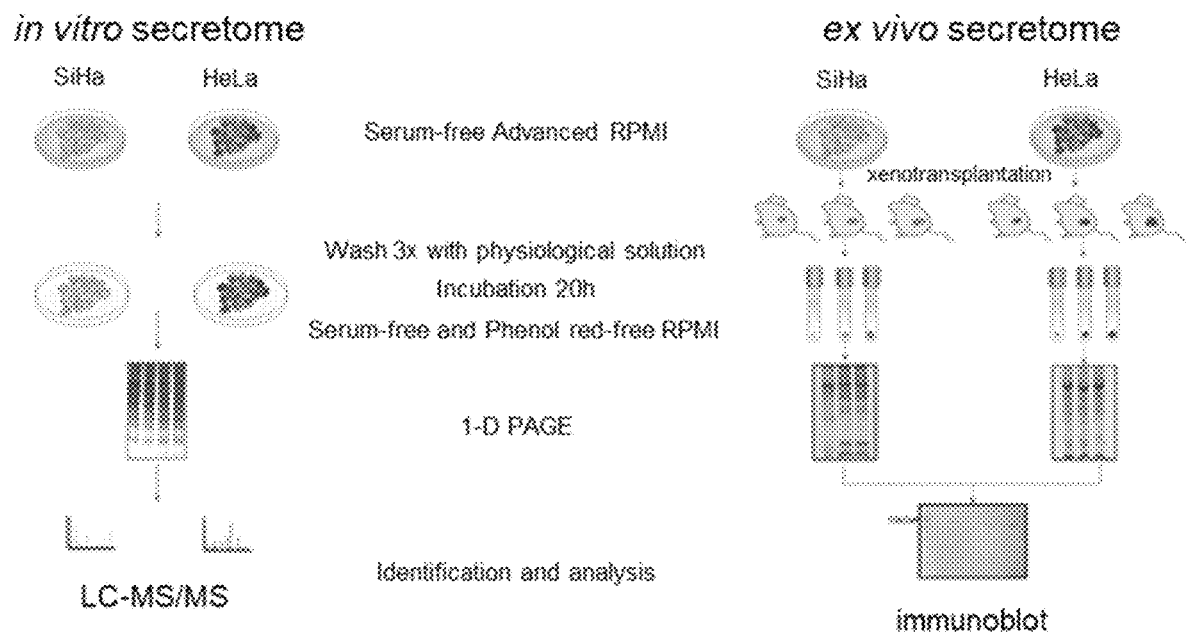
FIG. 1 shows the workflows to obtain secreted proteins in vivo or ex vivo.

The present invention is based on the seminal discovery that a collection of biomarkers can be used for the diagnosis of cervical cancer.

Before the present compositions and methods are described, it is to be understood that this invention is not limited to particular compositions, methods, and experimental conditions described, as such compositions, methods, and conditions may vary. It is also to be understood that the terminology used herein is for purposes of describing particular embodiments only, and is not intended to be limiting, since the scope of the present invention will be limited only in the appended claims.

As used in this specification and the appended claims, the singular forms "a", "an", and "the" include plural references unless the context clearly dictates otherwise. Thus, for example, references to "the method" includes one or more methods, and/or steps of the type described herein which will become apparent to those persons skilled in the art upon reading this disclosure and so forth.

All publications, patents, and patent applications mentioned in this specification are herein incorporated by reference to the same extent as if each individual publication, patent, or patent application was specifically and individually indicated to be incorporated by reference.

Unless defined otherwise, all technical and scientific terms used herein have the same meaning as commonly understood by one of ordinary skill in the art to which this invention belongs. Although any methods and materials similar or equivalent to those described herein can be used in the practice or testing of the invention, it will be understood that modifications and variations are encompassed within the spirit and scope of the instant disclosure. The preferred methods and materials are now described.

Cervical cancer (CC) is one of the most common cancers among women worldwide. Among the risk factors related to this disease are infection with the human papilloma virus (HPV), the microbiome, risky sexual behavior, multiparity, smoking, prolonged use of hormonal contraceptives and environmental factors. Cervical cancer is a disease of slow and progressive evolution. It is preceded by cervical intraepithelial neoplasms, which are the lesions considered to be the prelude to this condition.

These lesions are generally asymptomatic, making it difficult to detect the disease in a timely manner, so if they are not detected by any of the conventional methods, there is a risk that they will develop to the state of CC. Due to this, the diagnosis of neoplastic lesions or cancer in early stages, from HPV infection, is extremely important to be able to channel and treat these cases in a timely and adequate manner.

Currently the gold standard for the diagnosis of CC is the Pap test, while for the detection of HPV the most widely used method is detection by PCR and sequencing of the viral genome. Although both methods are an international benchmark, these tests have technical limitations, since highly trained personnel, facilities and specialized equipment are required; Furthermore, it is not easily accessible to the entire female population and the existence of socio-cultural beliefs prevent women from making diagnoses.

Molecular biomarkers would help in the detection of cervical cancer using non-invasive methods. These biomarkers will serve as detection, prognosis, or follow-up of treatment of preneoplastic lesions and cancers in early stages based on patient serum samples. Thus being able to decrease the incidence of the disease that continues to be a public health problem in many low and high income countries.

Due to all of the above, there is an urgent need to develop new and simpler disease detection methods that are applicable in early detection, specific, highly sensitive, inexpensive, and easily accessible to the population.

The methods, compositions, and kits disclosed herein may be used for the diagnosis, prognosis, and/or monitoring the status or outcome of a cancer in a subject. In some embodiments, the diagnosing, predicting, and/or monitoring the status or outcome of a cancer comprises determining the malignancy or malignant potential of the cancer or tumor. Alternatively, the diagnosing, predicting, and/or monitoring the status or outcome of a cancer comprises determining the stage of the cancer. The diagnosing, predicting, and/or monitoring the status or outcome of a cancer can comprise determining the tumor grade. Alternatively, the diagnosing, predicting, and/or monitoring the status or outcome of a cancer comprises assessing the risk of developing a cancer. In some embodiments, the diagnosing, predicting, and/or monitoring the status or outcome of a cancer includes assessing the risk of cancer recurrence. In some embodiments, diagnosing, predicting, and/or monitoring the status or outcome of a cancer may comprise determining the efficacy of treatment.

In one embodiment, the present invention is directed to methods of detecting at least one polypeptide in a sample from a subject; wherein the at least one polypeptide is selected from Farnesyl pyrophosphate synthase, neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, Heat Shock Protein Cognate 71 kDa, Ankyrin-3, Rho 23 GTPase-activating protein, Cytoskeletal Keratin 78 type II, Alpha-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof; or a polypeptide with at least about 70% sequence identity to a polypeptide having the amino acid sequence selected from SEQ ID NOs: 1-147 or a fragment thereof; and diagnosing cervical cancer based on the detection of the at least one polypeptide. In one aspect, the at least one polypeptide is a polypeptide with at least about 70% sequence identity to a polypeptide having the amino acid sequence selected from SEQ ID NOs:1-20 or a fragment thereof.

As used herein, the terms "detect", "detecting" or "detection" may describe either the general act of discovering or discerning or the specific observation of a polypeptide. Detecting may comprise determining the presence or absence of a polypeptide. Detecting may comprise quantifying a polypeptide. For example, detecting comprises determining the expression level of a polypeptide. For example, the polypeptide may comprise at least a portion of the polypeptides disclosed herein.

The polypeptides or biomarkers of the present invention can be detected by any method that can be used for the specific detection and/or identification of a protein, peptide, fragment thereof, variant thereof, or mutant thereof. Examples of method of detecting protein include, but are not limited to: spectrometry methods, such as high-performance liquid chromatography (H PLC), partition chromatography, normal-phase chromatography, displacement chromatography, reversed-phase chromatography (RPC), size-exclusion chromatography, ion-exchange chromatography, bioaffinity chromatography, aqueous normal-phase chromatography, liquid chromatography-mass spectrometry (LC/MS); and antibody dependent or immunoassay based methods, such as enzyme-linked immunosorbent assay (ELISA), direct ELISA, sandwich ELISA, competitive ELISA, reverse ELISA, protein immunoprecipitation (direct or indirect), individual protein immunoprecipitation (IP), protein complex immunoprecipitation (Co-IP), chromatin immunoprecipitation (ChIP), RNP Immunoprecipitation (RIP), immunoelectrophoresis, western blot, and protein immunostaining. The polypeptides or biomarkers of the present invention can also be detected using protein microarrays, lateral flow assays or vertical flow assays. In certain aspects, the polypeptides or biomarkers are detected using a lateral flow assay. A lateral flow assay is typically an immunoassay either a sandwich assay or competitive assay. Typically these assays use a conjugated gold, carbon or colored latex nanoparticles. Multiplexed assays may also be performed using these methods.

As used herein, the term "subject" refers to any organisms that are screened using the diagnostic methods and treated using the treatment methods described herein. Such organisms preferably include, but are not limited to, mammals (e.g., murines, simians, equines, bovines, porcines, canines, felines, and the like), and most preferably includes humans.

The term "diagnosed," as used herein, refers to the recognition of a disease by its signs and symptoms, or genetic analysis, pathological analysis, histological analysis, and the like. Specifically, the term refers to the diagnosis or detection of cervical cancer.

The biomarkers of the present invention serve various functions within cells.

Farnesylpyrophosphate synthase (FPPS), also known as Dimethylallyltranstransferase (DMATT) or as farnesyl-diphosphate synthase (FDPS), is an enzyme that in humans is encoded by the FDPS gene and catalyzes the transformation of dimethylallylpyrophosphate (DMAPP) and isopentenyl pyrophosphate (IPP) into farnesylpyrophosphate (FPP).

Neurofibromin 1 (NF1) is a gene in humans that is located on chromosome 17. NF1 codes for neurofibromin, a GTPase-activating protein that negatively regulates RAS/MAPK pathway activity by accelerating the hydrolysis of Ras-bound GTP. NF1 has a high mutation rate and mutations in NF1 can alter cellular growth control, and neural development, resulting in neurofibromatosis type 1 (NF1, also known as von Recklinghausen syndrome).

Glyceraldehyde 3-phosphate dehydrogenase (abbreviated as GAPDH or less commonly as G3PDH) (EC 1.2.1.12) is an enzyme of −37 kDa that catalyzes the sixth step of glycolysis and thus serves to break down glucose for energy and carbon molecules. In addition to this long established metabolic function, GAPDH has recently been implicated in several non-metabolic processes, including transcription activation, initiation of apoptosis, ER to Golgi vesicle shuttling, and fast axonal, or axoplasmic transport.

Protein 1 containing fibronectin domain type III also known as Fibronectin type III domain containing protein-1 may be an activator of G protein signaling. Protein 1 containing fibronectin domain type III is encoded by the FNDC1 gene.

Eukaryotic initiation factor 4A-I is an ATP-dependent RNA helicase which is a subunit of the eIF4F complex involved in cap recognition and is required for mRNA binding to ribosome. In the current model of translation initiation, eIF4A unwinds RNA secondary structures in the 5'-UTR of mRNAs which is necessary to allow efficient binding of the small ribosomal subunit, and subsequent scanning for the initiator codon. The protein is encoded by the EIF4A1 gene.

L-lactate dehydrogenase chain B is involved in step 1 of the subpathway that synthesizes (S)-lactate from pyruvate. The protein is encoded by the LDHB gene.

Nuclear heterogeneous Ribonucleoprotein A1, also known as heterogeneous nuclear ribonucleoprteon AI, is involved in the packaging of pre-mRNA into hnRNP particles, transport of poly(A) mRNA from the nucleus to the cytoplasm and may modulate splice site selection. May bind to specific mlRNA hairpins. Binds to the IRES and thereby inhibits the translation of the apoptosis protease activating factor APAF1. Nuclear heterogeneous Ribonucleoprotein A1 is encoded by the HNRNPA1 gene.

1-like protein 1 polycystic kidney disease, also known as polycystic kidney disease protein 1-like 1, is a component of a ciliary calcium channel that controls calcium concentration within primary cilia without affecting cytoplasmic calcium concentration. Forms a heterodimer with PKD2L1 in primary cilia and forms a calcium-permeant ciliary channel that regulates sonic hedgehog/SHH signaling and GLI2 transcription. Does not constitute the pore-forming subunit. Also involved in left/right axis specification downstream of nodal flow: forms a complex with PKD2 in cilia to facilitate flow detection in left/right patterning. Encoded by the PKD1L1 gene.

Heat Shock Protein Cognate 71 kDa is a molecular chaperone implicated in a wide variety of cellular processes, including protection of the proteome from stress, folding and transport of newly synthesized polypeptides, activation of proteolysis of misfolded proteins and the formation and dissociation of protein complexes. Plays a pivotal role in the protein quality control system, ensuring the correct folding of proteins, the re-folding of misfolded proteins and controlling the targeting of proteins for subsequent degradation. This is achieved through cycles of ATP binding, ATP hydrolysis and ADP release, mediated by co-chaperones. The co-chaperones have been shown to not only regulate different steps of the ATPase cycle of HSP70, but they also have an individual specificity such that one co-chaperone may promote folding of a substrate while another may promote degradation. The affinity of HSP70 for polypeptides is regulated by its nucleotide bound state. In the ATP-bound form, it has a low affinity for substrate proteins. However, upon hydrolysis of the ATP to ADP, it undergoes a conformational change that increases its affinity for substrate proteins. HSP70 goes through repeated cycles of ATP hydrolysis and nucleotide exchange, which permits cycles of substrate binding and release. The HSP70-associated co-chaperones are of three types: J-domain co-chaperones HSP4Os (stimulate ATPase hydrolysis by HSP70), the nucleotide exchange factors (NEF) such as BAG1/2/3 (facilitate conversion of HSP70 from the ADP-bound to the ATP-bound state thereby promoting substrate release), and the TPR domain chaperones such as HOPX and STUB 1. Acts as a repressor of transcriptional activation. Inhibits the transcriptional coactivator activity of CITED1 on Smad-mediated transcription. Component of the PRP19-CDC5L complex that forms an integral part of the spliceosome and is required for activating pre-mRNA splicing. May have a scaffolding role in the spliceosome assembly as it contacts all other components of the core complex. Binds bacterial lipopolysaccharide (LPS) and mediates LPS-induced inflammatory response, including TNF secretion by monocytes. Participates in the ER-associated degradation (ERAD) quality control pathway in conjunction with J domain-containing co-chaperones and the E3 ligase STUB 1. Interacts with VGF-derived peptide TLQP-21. This protein is encoded by the HSPA8 gene.

Ankyrin 3 is found in skeletal muscle and is required for costamere localization of DMD and betaDAG1 (By similarity). Membrane-cytoskeleton linker. The protein may participate in the maintenance/targeting of ion channels and cell adhesion molecules at the nodes of Ranvier and axonal initial segments. Regulates KCNA1 channel activity in function of dietary $Mg^{2}+$ levels, and thereby contributes to the regulation of renal $Mg^{2}+$ reabsorption. Ankyrin-3 is encoded by the ANK3 gene.

Rho 23 GTPase-activating protein, also known as Rho GTPase activating protein 23, is part of the RHO family of small GTPases which are involved in signal transduction through transmembrane receptors, and they are inactive in the GDP-bound form and active in the GTP-bound form. GTPase-activating proteins, such as ARHGAP23, inactivate RHO family proteins by stimulating their hydrolysis of GTP. Rho GTPase-activating protein 23 is encoded by the ARHGAP23 gene.

Keratins are the major structural proteins in epithelial cells, forming a cytoplasmic network of 10 to 12 nm wide intermediate filaments and creating a scaffold that gives cells the ability to withstand mechanical and non-mechanical stresses. There are two types of cytoskeletal and microfibrillar keratin, I (acidic) and II (neutral to basic), i.e. Cytoskeletal Keratin 78 type II, also known as keratin, type II cytoskeletal 78. Cytoskeletal keratin 78 type II is encoded by the KRT78 gene.

Alpha 3 collagen chain (VI), also known as collagen alpha-3 (VI) chain, acts as a cell-binding protein. Collagen alpha-3(VI) chain is encoded by the COL6A3 gene.

Beta subunit of proteasome type-5, also known as Proteasome subunit beta type-5 and 20S proteasome subunit beta-5 is a protein that in humans is encoded by the PSMB5 gene. This protein is one of the 17 essential subunits (alpha subunits 1-7, constitutive beta subunits 1-7, and inducible subunits including betali, beta2i, beta5i) that contributes to the complete assembly of 20S proteasome complex. In particular, proteasome subunit beta type-5, along with other beta subunits, assemble into two heptameric rings and subsequently a proteolytic chamber for substrate degradation. This protein contains "chymotrypsin-like" activity and is capable of cleaving after large hydrophobic residues of peptide. The eukaryotic proteasome recognized degradable proteins, including damaged proteins for protein quality control purpose or key regulatory protein components for dynamic biological processes. An essential function of a modified proteasome, the immunoproteasome, is the processing of class I MHC peptides. Beta subunit of proteasome type 5 is encoded by the PSMB5 gene.

Heterogeneous nuclear ribonucleoprotein (hnRNP) that associates with nascent pre-mRNAs, packaging them into hnRNP particles. The hnRNP particle arrangement on nascent hnRNA is non-random and sequence-dependent and serves to condense and stabilize the transcripts and minimize tangling and knotting. Packaging plays a role in various processes such as transcription, pre-mRNA processing, RNA nuclear export, subcellular location, mRNA translation and stability of mature mRNAs. Forms hnRNP particles with at least 20 other different hnRNP and heterogeneous nuclear RNA in the nucleus. Involved in transport of specific mRNAs to the cytoplasm in oligodendrocytes and neurons: acts by specifically recognizing and binding the A2RE (21 nucleotide hnRNP A2 response element) or the A2RE 11 (derivative 11 nucleotide oligonucleotide) sequence motifs present on some mRNAs, and promotes their transport to the cytoplasm. Specifically binds single-stranded telomeric DNA sequences, protecting telomeric DNA repeat against endonuclease digestion (By similarity). Also binds other RNA molecules, such as primary miRNA (pri-miRNAs): acts as a nuclear 'reader' of the N6-methyladenosine (m6A) mark by specifically recognizing and binding a subset of nuclear m6A-containing pri-miRNAs. Binding to m6A-containing pri-miRNAs promotes pri-miRNA processing by enhancing binding of DGCR8 to pri-miRNA transcripts. Involved in miRNA sorting into exosomes following sumoylation, possibly by binding (m6A)-containing pre-miRNAs. Acts as a regulator of efficiency of mRNA splicing, possibly by binding to m6A-containing pre-mRNAs. Plays also a role in the activation of the innate immune response. Mechanistically, senses the presence of viral DNA in the nucleus, homodimerizes and is demethylated by JMJD6. In turn, translocates to the cytoplasm where it activates the TBK1-IRF3 pathway, leading to interferon alpha/beta production. Heterogeneous nuclear ribonucleoproteins A2/B1 is a protein that in humans is encoded by the HNRNPA2B1 gene.

Histone H2B type 1-B is a core component of nucleosome. Nucleosomes wrap and compact DNA into chromatin, limiting DNA accessibility to the cellular machineries which require DNA as a template. Histones thereby play a central role in transcription regulation, DNA repair, DNA replication and chromosomal stability. DNA accessibility is regulated via a complex set of post-translational modifications of histones, also called histone code, and nucleosome remodeling. Histone H2B type 1-B is encoded by the H2BC3 gene.

Homolog of DnaJ subfamily C member 13, also known as DnaJ homolog subfamily C member 13, is involved in membrane trafficking through early endosomes, such as the early endosome to recycling endosome transport implicated in the recycling of transferrin and the early endosome to late endosome transport implicated in degradation of EGF and EGFR. Involved in the regulation of endosomal membrane tubulation and regulates the dynamics of SNX1 on the endosomal membrane; via association with WASHC2 may link the WASH complex to the retromer SNX-BAR subcomplex. DnaJ homolog subfamily member 13 is encoded by the DNAJC13 gene.

Enolase 3 (ENO3), more commonly known as beta-enolase (ENO-(3), is an enzyme that in humans is encoded by the ENO3 gene. This gene encodes one of the three enolase isoenzymes found in mammals. This isoenzyme is found in skeletal muscle cells in the adult where it may play a role in muscle development and regeneration. A switch from alpha enolase to beta enolase occurs in muscle tissue during development in rodents. Mutations in this gene have been associated with glycogen storage disease. Alternatively spliced transcript variants encoding different isoforms have been described.

Glutathione S-transferases (GSTs) are a family of enzymes that play an important role in detoxification by catalyzing the conjugation of many hydrophobic and electrophilic compounds with reduced glutathione. Based on their biochemical, immunologic, and structural properties, the soluble GSTs are categorized into four main classes: alpha, mu, pi, and theta. The glutathione S-transferase pi gene (GSTP1) is a polymorphic gene encoding active, functionally different GSTP1 variant proteins that are thought to function in xenobiotic metabolism and play a role in susceptibility to cancer, and other diseases. Glutathione S-transferase P is an enzyme that in humans is encoded by the GSTP1 gene.

Glutathione S-transferase Mu 3 may govern uptake and detoxification of both endogenous compounds and xenobiotics at the testis and brain blood barriers. Glutathione S-transferase Mu 3 is encoded by the GSTM3 gene.

The amino acid sequences for the biomarkers of the present invention and variants thereof are shown in Table 1.

TABLE 1

| Protein name/SEQ ID NO. | Amino acid sequence |
|---|---|
| Farnesyl pyrophosphate synthase (FDPS) SEQ ID NO: 1 | MPLSRWLRSVGVFLLPAPYWAPRERWLGSLRRPSLVHGYPVLAW HSARCWCQAWTEEPRALCSSLRMNGDQNSDVYAQEKQDFVQHFS QIVRVLTEDEMGHPEIGDAIARLKEVLEYNAIGGKYNRGLTVVVA FRELVEPRKQDADSLQRAWTVGWCVELLQAFFLVADDIMDSSLTR RGQICWYQKPGVGLDAINDANLLEACIYRLLKLYCREQPYYLNLIE LFLQSSYQTEIGQTLDLLTAPQGNVDLVRFTEKRYKSIVKYKTAFY SFYLPIAAAMYMAGIDGEKEHANAKKILLEMGEFFQIQDDYLDLF GDPSVTGKIGTDIQDNKCSWLVVQCLQRATPEQYQILKENYGQKE AEKVARVKALYEELDLPAVFLQYEEDSYSHIMALIEQYAAPLPPAV FLGLARKIYKRRK |
| Neurofibromin 1 (NF1) SEQ ID NO: 2 | MAAHRPVEWVQAVVSRFDEQLPIKTGQQNTHTKVSTEHNKECLIN ISKYKFSLVISGLTTILKNVNNMRIFGEAAEKNLYLSQLIILDTLEKC LAGQPKDTMRLDETMLVKQLLPEICHFLHTCREGNQHAAELRNSA SGVLFSLSCNNFNAVFSRISTRLQELTVCSEDNVDVHDIELLQYINV DCAKLKRLLKETAFKFKALKKVAQLAVINSLEKAFWNWVENYPD EFTKLYQIPQTDMAECAEKLFDLVDGFAESTKRKAAVWPLQIILLI LCPEIIQDISKDVVDENNMNKKLFLDSLRKALAGHGGSRQLTESAA IACVKLCKASTYINWEDNSVIFLLVQSMVVDLKNLLFNPSKPFSRG SQPADVDLMIDCLVSCFRISPHNNQHFKICLAQNSPSTFHYVLVNS LHRIITNSALDWWPKIDAVYCHSVELRNMFGETLHKAVQGCGAHP AIRMAPSLTFKEKVTSLKFKEKPTDLETRSYKYLLLSMVKLIHADP KLLLCNPRKQGPETQGSTAELITGLVQLVPQSHMPEIAQEAMEALL VLHQLDSIDLWNPDAPVETFWEISSQMLFYICKKLTSHQMLSSTEIL KWLREILICRNKFLLKNKQADRSSCHFLLFYGVGCDIPSSGNTSQM |

TABLE 1-continued

| Protein name/SEQ ID NO. | Amino acid sequence |
| --- | --- |
| | SMDHEELLRTPGASLRKGKGNSSMDSAAGCSGTPPICRQAQTKLE
VALYMILWNPDTEAVLVAMSCFRHLCEEADIRCGVDEVSVHNLL
PNYNTFMEFASVSNMMSTGRAALQKRVMALLRRIEHPTAGNTEA
WEDTHAKWEQATKLILNYPKAKMEDGQAAESLHKTIVKRRMSHV
SGGGSIDLSDTDSLQEWINMTGFLCALGGVCLQQRSNSGLATYSPP
MGPVSERKGSMISVMSSEGNADTPVSKFMDRLLSLMVCNHEKVG
LQIRTNVKDLVGLELSPALYPMLFNKLKNTISKFFDSQGQVLLTDT
NTQFVEQTIAIMKNLLDNHTEGSSEHLGQASIETMMLNLVRYVRV
LGNMVHAIQIKTKLCQLVEVMMARRDDLSFCQEMKFRNKMVEYL
TDWVMGTSNQAADDDVKCLTRDLDQASMEAVVSLLAGLPLQPEE
GDGVELMEAKSQLFLKYFTLFMNLLNDCSEVEDESAQTGGRKRG
MSRRLASLRHCTVLAMSNLLNANVDSGLMHSIGLGYHKDLQTRA
TFMEVLTKILQQGTEFDTLAETVLADRFERLVELVTMMGDQGELPI
AMALANVVPCSQWDELARVLVTLFDSRHLLYQLLWNMFSKEVEL
ADSMQTLFRGNSLASKIMTFCFKVYGATYLQKLLDPLLRIVITSSD
WQHVSFEVDPTRLEPSESLEENQRNLLQMTEKFFHAIISSSSEFPPQ
LRSVCHCLYQATCHSLLNKATVKEKKENKKSVVSQRFPQNSIGAV
GSAMFLRFINPAIVSPYEAGILDKKPPPRIERGLKLMSKILQSIANHV
LFTKEEHMRPFNDFVKSNFDAARRFFLDIASDCPTSDAVNHSLSFIS
DGNVLALHRLLWNNQEKIGQYLSSNRDHKAVGRRPFDKMATLLA
YLGPPEHKPVADTHWSSLNLTSSKFEEFMTRHQVHEKEEFKALKT
LSIFYQAGTSKAGNPIFYYVARRFKTGQINGDLLIYHVLLTLKPYY
AKPYEIVVDLTHTGPSNRFKTDFLSKWFVVFPGFAYDNVSAVYIY
NCNSWVREYTKYHERLLTGLKGSKRLVFIDCPGKLAEHTEHEQQK
LPAATLALEEDLKVFHNALKLAHKDTKVSIKVGSTAVQVTSAERT
KVLGQSVFLNDIYYASEIEEICLVDENQFTLTIANQGTPLTFMHQEC
EAIVQSIIHIRTRWELSQPDSIPQHTKIRPKDVPGTLLNIALLNLGSSD
PSLRSAAYNLLCALTCTFNLKIEGQLLETSGLCIPANNTLFIVSISKT
LAANEPHLTEFLEECISGFSKSSIELKHLCLEYMTPWLSNLVRFCK
HNDDAKRQRVTAILDKLITMTINEKQMYPSIQAKIWGSLGQITDLL
DVVLDSFIKTSATGGLGSIKAEVMADTAVALASGNVKLVSSKVIG
RMCKIIDKTCLSPTPTLEQHLMWDDIAILARYMLMLSFNNSLDVA
AHLPYLFHVVTFLVATGPLSLRASTHGLVINIIHSLCTCSQLHFSEET
KQVLRLSLTEFSLPKFYLLFGISKVKSAAVIAFRSSYRDRSFSPGSYE
RETFALTSLETVTEALLEIMEACMRDIPTCKWLDQWTELAQRFAF
QYNPSLQPRALVVFGCISKRVSHGQIKQIIRILSKALESCLKGPDTY
NSQVLIEATVIALTKLQPLLNKDSPLHKALFWVAVAVLQLDEVNL
YSAGTALLEQNLHTLDSLRIFNDKSPEEVFMAIRNPLEWHCKQMD
HFVGLNFNSNFNFALVGHLLKGYRHPSPAIVARTVRILHTLLTLVN
KHRNCDKFEVNTQSVAYLAALLTVSEEVRSRCSLKHRKSLLLTDIS
MENVPMDTYPIHHGDPSYRTLKETQPWSSPKGSEGYLAATYPTVG
QTSPRARKSMSLDMGQPSQANTKKLLGTRKSFDHLISDTKAPKRQ
EMESGITTPPKMRRVAETDYEMETQRISSSQQHPHLRKVSVSESNV
LLDEEVLTDPKIQALLLTVLATLVKYTTDEFDQRILYEYLAEASVV
FPKVFPVVHNLLDSKINTLLSLCQDPNLLNPIHGIVQSVVYHEESPP
QYQTSYLQSFGFNGLWRFAGPFSKQTQIPDYAELIVKFLDALIDTY
LPGIDEETSEESLLTPTSPYPPALQSQLSITANLNLSNSMTSLATSQH
SPGIDKENVELSPTTGHCNSGRTRHGSASQVQKQRSAGSFKRNSIK
KIV |
| Glyceraldehyde-3 phosphate
dehydrogenase
(GAPDH)
SEQ ID NO: 3 | MGKVKVGVNGFGRIGRLVTRAAFNSGKVDIVAINDPFIDLNYMVY
MFQYDSTHGKFHGTVKAENGKLVINGNPITIFQERDPSKIKWGDA
GAEYVVESTGVFTTMEKAGAHLQGGAKRVIISAPSADAPMFVMG
VNHEKYDNSLKIISNASCTTNCLAPLAKVIHDNFGIVEGLMTTVHA
ITATQKTVDGPSGKLWRDGRGALQNIIPASTGAAKAVGKVIPELNG
KLTGMAFRVPTANVSVVDLTCRLEKPAKYDDIKKVVKQASEGPL
KGILGYTEHQVVSSDFNSDTHSSTFDAGAGIALNDHFVKLISWYDN
EFGYSNRVVDLMAHMASKE |
| Protein 1 containing fibronectin
domain type III
or Fibronectin Type III Domain
Containing protein 1
(FNDC1)
SEQ ID NO: 4 | MAPEAGATLRAPRRLSWAALLLLAALLPVASSAAASVDHPLKPRH
VKLLSTKMGLKVTWDPPKDATSRPVEHYNIAYGKSLKSLKYIKVN
AETYSFLIEDVEPGVVYFVLLTAENHSGVSRPVYRAESPPGGEWIEI
DGFPIKGPGPFNETVTEKEVPNKPLRVRVRSSDDRLSVAWKAPRLS
GAKSPRRSRGFLLGYGESGRKMNYVPLTRDERTHEIKKLASESVY
VVSLQSMNSQGRSQPVYRAALTKRKISEEDELDVPDDISVRVMSS
QSVLVSWVDPVLEKQKKVVASRQYTVRYREKGELARWDYKQIA
NRRVLIENLIPDTVYEFAVRISQGERDGKWSTSVFQRTPESAPTTAP
ENLNWPVNGKPTVVAASWDALPETEGKVKEYILSYAPALKPFG
AKSLTYPGDTTSALVDGLQPGERYLFKIRATNRRGLGPHSKAFIVA
MPTTSKADVEQNTEDNGKPEKPEPSSPSPRAPASSQIIPSVPASPQG
RNAKDLLLDLKNKILANGGAPRKPQLRAKKAEELDLQSTEITGEEE
LGSREDSPMSPSDTQDQKRTLRPPSRHGHSVVAPGRTAVRARMPA
LPRREGVDKPGFSLATQPRPGAPPSASASPAHHASTQGTSHRPSLP
ASLNDNDLVDSDEDERAVGSLHPKGAFAQPRPALSPSRQSPSSVLR
DRSSVIIPGAKPASPARRTPHSGAAEEDSSASAPPSRLSPPHGGSSRL
LPTQPHLSSPLSKGGKDGEDAPATNSNAPSRSTMSSSVSSHLSSRTQ
VSEGAEASDGESHGDGDREDGGRQAEATAQTLRARPASGHFHLL
RHKPFAANGRSPSRFSIGRGPRLQPSSSPQSTVPSRAHPRVPSHSDS |

TABLE 1-continued

| Protein name/SEQ ID NO. | Amino acid sequence |
|---|---|
| | HPKLSSGIHGDEEDEKPLPATVVNDHVPSSSRQPISRGWEDLRRSP<br>QRGASLHRKEPIPENPKSTGADTHPQGKYSSLASKAQDVQQSTDA<br>DTEGHSPKAQPGSTDRHASPARPPAARSQQIIPSVPRRMTPGRAPQ<br>QQPPPPVATSQHHPGPQSRDAGRSPSQPRLSLTQAGRPRPTSQGRS<br>HSSSDPYTASSRGMLPTALQNQDEDAQGSYDDDSTEVEAQDVRAP<br>AHAARAKEAAASLPKHQQVESPTGAGAGGDHRSQRGHAASPARP<br>SRPGGPQSRARVPSRAAPGKSEPPSKRPLSSKSQQSVSAEDDEEED<br>AGFFKGGKEDLLSSSVPKWPSSSTPRGGKDADGSLAKEEREPAIAL<br>APRGGSLAPVKRPLPPPPGSSPRASHVPSRLPPRSAATVSPVAGTHP<br>WPQYTTRAPPGHFSTTPMLSLRQRMMHARFRNPLSRQPARPSYRQ<br>GYNGRPNVEGKVLPGSNGKPNGQRIINGPQGTKWVVDLDRGLVL<br>NAEGRYLQDSHGNPLRIKLGGDGRTIVDLEGTPVVSPDGLPLFGQG<br>RHGTPLANAQDKPILSLGGKPLVGLEVIKKTTHIPPTTTMQPTTITTP<br>LPTTTTPRPTTATTRRTTTTRRTTTTRRPTTTVRTTTRTTTTTFTPTT<br>PIPTCPPGTLERHDDDGNLIMSSNGIPECYAEEDEFSGLETDTAVPT<br>EEAYVIYDEDYEFETSRPPTTTEPSTTATTPRVIPEEGAISSFPEEEFD<br>LAGRKRFVAPYVTYLNKDPSAPCSLTDADLHFQVDSLDEIIPNDLK<br>KSDLPPQHAPRNITVVAVEGCHSFVIVDWDKATPGDVVTGYLVYS<br>ASYEDFIRNKWSTQASSVTHLPIENLKPNTRYYFKVQAQNPHGYG<br>PISPSVSFVTESDNPLLVVRPPGGEPIWIPFAFKHDPSYTDCHGRQY<br>VKRTWYRKFVGVVLCNSLRYKIYLSDNLKDTFYSIGDSWGRGED<br>HCQFVDSHLDRTGPQSYVEALPTIQGYYRQYRQEPVRFGNIGFGT<br>PYYYVGWYECGVSIPGKW |
| Eukaryotic initiation factor 4A-I<br>(EIF4A1)<br>SEQ ID NO: 5 | MSASQDSRSRDNGPDGMEPEGVIESNWNEIVDSFDDMNLSESLLR<br>GIYAYGFEKPSAIQQRAILPCIKGYDVIAQAQSGTGKTATFAISILQQ<br>IELDLKATQALVLAPTRELAQQIQKVVMALGDYMGASCHACIGGT<br>NVRAEVQKLQMEAPHIIVGTPGRVFDMLNRRYLSPKYIKMFVLDE<br>ADEMLSRGFKDQIYDIFQKLNSNTQVVLLSATMPSDVLEVTKKFM<br>RDPIRILVKKEELTLEGIRQFYINVEREEWKLDTLCDLYETLTITQA<br>VIFINTRRKVDWLTEKMHARDFTVSAMHGDMDQKERDVIMREFR<br>SGSSRVLITTDLLARGIDVQQVSLVINYDLPTNRENYIHRIGRGGRF<br>GRKGVAINMVTEEDKRTLRDIETFYNTSIEEMPLNVADLI |
| L-lactate dehydrogenase chain B<br>(LDHB)<br>SEQ ID NO: 6 | MATLKEKLIAPVAEEEATVPNNKITVVGVGQVGMACAISILGKSLA<br>DELALVDVLEDKLKGEMMDLQHGSLFLQTPKIVADKDYSVTANS<br>KIVVVTAGVRQQEGESRLNLVQRNVNVFKFIIPQIVKYSPDCIIIVVS<br>NPVDILTYVTWKLSGLPKHRVIGSGCNLDSARFRYLMAEKLGIHPS<br>SCHGWILGEHGDSSVAVWSGVNVAGVSLQELNPEMGTDNDSEN<br>WKEVHKMVVESAYEVIKLKGYTNWAIGLSVADLIESMLKNLSRIH<br>PVSTMVKGMYGIENEVFLSLPCILNARGLTSVINQKLKDDEVAQLK<br>KSADTLWDIQKDLKDL |
| Nuclear heterogeneous<br>Ribonucleoprotein A1<br>(BNRNPA1)<br>SEQ ID NO: 7 | MSKSESPKEPEQLRKLFIGGLSFETTDESLRSHFEQWGTLTDCVVM<br>RDPNTKRSRGFGFVTYATVEEVDAAMNARPHKVDGRVVEPKRAV<br>SREDSQRPGAHLTVKKIFVGGIKEDTEEHHLRDYFEQYGKIEVIEIM<br>TDRGSGKKRGFAFVTFDDHDSVDKIVIQKYHTVNGHNCEVRKALS<br>KQEMASASSSQRGRSGSGNFGGGRGGGFGGNDNFGRGGNFSGRG<br>GFGGSRGGGGYGGSGDGYNGFGNDGGYGGGGPGYSGGSRGYGS<br>GGQGYGNQGSGYGGSGSYDSYNNGGGGGFGGGSGSNFGGGGSY<br>NDFGNYNNQSSNFGPMKGGNFGGRSSGPYGGGGQYFAKPRNQGG<br>YGGSSSSSSYGSGRRF |
| Polycystic kidney disease protein 1-<br>like 1<br>(PKD1L1)<br>SEQ ID NO: 8 | MAEEAAQNISDDQERCLQAACCLSFGGELSVSTDKSWGLHLCSCS<br>PPGGGLWVEVYANHVLLMSDGKCGCPWCALNGKAEDRESQSPSS<br>SASRQKNIWKTTSEAALSVVNEKTQAVVNEKTQAPLDCDNSADRI<br>PHKPFIIIARAWSSGGPRFHHRRLCATGTADSTFSALLQLQGTTSAA<br>APCSLKMEASCCVLRLLCCAEDVATGLLPGTVTMETFTKVARPTQ<br>TSSQRVPLWPISHFPTSPRSSHGLPPGIPRTPSFTASQSGSEILYPPTQ<br>HPPVAILARNSDNFMNPVLNCSLEVEARAPPNLGFRVHMASGEAL<br>CLMMDFGDSSGVEMRLHNMSEAMAVTAYHQYSKGIFFHLLHFQL<br>DMSTYKEAETQNTTLNVYLCQSENSCLEDSDPSNLGYELISAFVTK<br>GVYMLKAVIYNEFHGTEVELGPYYVEIGHEAVSAFMNSSSVHEDE<br>VLVFADSQVNQKSTVVIHHFPSIPSYNVSFISQTQVGDSQAWHSMT<br>VWYKMQSVSVYTNGTVFATDTDITFTAVTKETIPLEFEWYFGEDP<br>PVRTTSRSIKKRLSIPQWYRVMVKASNRMSSVVSEPHVIRVQKKIV<br>ANRLTSPSSALVNASVAFECWINFGTDVAYLWDFGDGTVSLGSSS<br>SSHVYSREGEFTVEVLAFNNVSASTLRQQLFIVCEPCQPPLVKNMG<br>PGKVQIWRSQPVRLGVTFEAAVFCDISQGLSYTWNLMDSEGLPVS<br>LPAAVDTHRQTLILPSHTLEYGNYTALAKVQIEGSVVYSNYCVGLE<br>VRAQAPVSVISEGTHLFFSRTTSSPIVLRGTQSFDPDDPGATLRYHW<br>ECATAGSPAHPCFDSSTAHQLDAAAPTVSFEAQWLSDSYDQFLVM<br>LRVSSGGRNSSETRVFLSPYPDSAFRFVHISWVSFKDTFVNWNDEL<br>SLQAMCEDCSEIPNLSYSWDLFLVNATEKNRIEVPFCRVVGLLGSL<br>GLGAISESSQLNLLPTEPGTADPDATTTPFSREPSPVTLGQPATSAPR<br>GTPTEPMTGVYWIPPAGDSAVLGEAPEEGSLDLEPGPQSKGSLMT<br>GRSERSQPTHSPDPHLSDFEAYYSDIQEAIPSGGRQPAKDTSFPGSG<br>PSLSAEESPGDGDNLVDPSLSAGRAEPVLMIDWPKALLGRAVFQG |

TABLE 1-continued

| Protein name/SEQ ID NO. | Amino acid sequence |
|---|---|
| | YSSSGITEQTVTIKPYSLSSGETYVLQVSVASKHGLLGKAQLYLTV NPAPRDMACQVQPHHGLEAHTVFSVFCMSGKPDFHYEFSYQIGNT SKHTLYHGRDTQYYFVLPAGEHLDNYKVMVSTEITDGKGSKVQP CTVVVTVLPRYHGNDCLGEDLYNSSLKNLSTLQLMGSYTEIRNYIT VITRILSRLSKEDKTASCNQWSRIQDALISSVCRLAFVDQEEMIGSV LMLRDLVSFSNKLGFMSAVLILKYTRALLAQGQFSGPFVIDKGVRL ELIGLISRVWEVSEQENSKEEVYRHEEGITVISDLLLGCLSLNHVST GQMEFRTLLHYNLQSSVQSLGSVQVHLPGDLAGHSPAGAETQSPC YISQLILFKKNPYPGSQAPGQIGGVVGLNLYTCSSRRPINRQWLRKP VMVEFGEEDGLDNRRNKTTFVLLRDKVNLHQFTELSENPQESLQIE IEFSKPVTRAFPVMLLVRFSEKPTPSDFLVKQIYFWDESIVQIYIPAA SQKDASVGYLSLLDADYDRKPPNRYLAKAVNYTVHFQWIRCLFW DKREWKSERFSPQPGTSPEKVNCSYHRLAAFALLRRKLKASFEVS DISKLQSHPENLLPSIFTMGSVILYGFLVAKSRQVDHHEKKKAGYIF LQEASLPGHQLYAVVIDTGFRAPARLTSKVYIVLCGDNGLSETKEL SCPEKPLFERNSRHTFILSAPAQLGLLRKIRLWHDSRGPSPGWFISH VMVKELHTGQGWFFPAQCWLSAGRHDGRVERELTCLQGGLGFR KLFYCKFTEYLEDFHVWLSVYSRPSSSRYLHTPRLTVSFSLLCVYA CLTALVAAGGQEQPHLDVSPTLGSFRVGLLCTLLASPGAQLLSLLF RLSKEAPGSARVEPHSPLRGGAQTEAPHGPNSWGRIPDAQEPRKQP ASAILSGSGRAQRKAASDNGTACPAPKLQVHGADHSRTSLMGKSH CCPPHTQAPSSGLEGLMPQWSRALQPWWSSAVWAICGTASLACSL GTGFLAYRFGQEQCVQWLHLLSLSVVCCIFITQPLMVCLMALGFA WKRRADNHFFTESLCEATRDLDSELAERSWTRLPFSSSCSIPDCAG EVEKVLAARQQARHLRWAIIPPSKAQLRGTRQRMRRESRTRAALR DISMDILMLLLLLCVIYGRFSQDEYSLNQAIRKEFTRNARNCLGGL RNIADWWDWSLTTLLDGLYPGGTPSARVPGAQPGALGGKCYLIGS SVIRQLKVFPRHLCKPPRPFSALIEDSIPTCSPEVGGPENPYLIDPEN QNVTLNGPGGCGTREDCVLSLGRTRTEAHTALSRLRASMWIDRST RAVSVHFTLYNPPTQLFTSVSLRVEILPTGSLVPSSLVESFSIFRSDS ALQYHLMLPQLVFLALSLIHLCVQLYRMMDKGVLSYWRKPRNWL ELSVVGVSLTYYAVSGHLVTLAGDVTNQFHRGLCRAFMDLTLMA SWNQRARWLRGILLFLFTLKCVYLPGIQNTMASCSSMMRHSLPSIF VAGLVGALMLAALSHLHRFLLSMWVLPPGTFTDAFPGLLFHFPRR SQKDCLLGLSKSDQRAMACYFGILLIVSATLCFGMLRGFLMTLPQ KRKSFQSKSFVRLKDVTAYMWEKVLTFLRLETPKLEEAEMVENH NYYLDEFANLLDELLMKINGLSDSLQLPLLEKTSNNTGEARTEESP LVDISSYQAAEPADIKDF |
| Cognate thermal shock protein 71 kDa or heat shock protein cognate 71 kDa (HSPA8) SEQ ID NO: 9 | MSKGPAVGIDLGTTYSCVGVFQHGKVEIIANDQGNRTTPSYVAFT DTERLIGDAAKNQVAMNPTNTVFDAKRLIGRRFDDAVVQSDMKH WPFMVVNDAGRPKVQVEYKGETKSFYPEEVSSMVLTKMKEIAEA YLGKTVTNAVVTVPAYFNDSQRQATKDAGTIAGLNVLRIINEPTA AAIAYGLDKKVGAERNVLIFDLGGGTFDVSILTIEDGIFEVKSTAGD THLGGEDFDNRMVNHFIAEFKRKHKKDISENKRAVRRLRTACERA KRTLSSSTQASIEIDSLYEGIDFYTSITRARFEELNADLFRGTLDPVE KALRDAKLDKSQIHDIVLVGGSTRIPKIQKLLQDFFNGKELNKSINP DEAAVAYGAAVQAAILSGDKSENVQDLLLLDVTPLSLGIETAGGVM TVLIKRNTTIPTKQTQTFTTYSDNQPGVLIQVYEGERAMTKDNNLL GKFELTGIPPAPRGVPQIEVTFDIDANGILNVSAVDKSTGKENKITIT NDKGRLSKEDIERMVQEAEKYKAEDEKQRDKVSSKNSLESYAFN MKATVEDEKLQGKINDEDKQKILDKCNEIINWLDKNQTAEKEEFE HQQKELEKVCNPITTKLYQSAGGMPGGMPGGFPGGGAPPSGGASS GPTIEEVD |
| Anikirina-3 or Ankyrin-3 (ANK3) SEQ ID NO: 10 | MAHAASQLKKNRDLEINAEEEPEKKRKHRKRSRDRKKKSDANAS YLRAARAGHLEKALDYIKNGVDINICNQNGLNALHLASKEGHVEV VSELLQREANVDAATKKGNTALHEASLAGQAEVVKVLVTNGANV NAQSQNGFTPLYMAAQENHLEVVKFLLDNGASQSLATEDGFTPLA VALQQGHDQVVSLLLENDTKGKVRLPALHIAARKDDTKAAALLL QNDNNADVESKSGFTPLHIAAHYGNINVATLLLNRAAAVDFTARN DITPLHVASKRGNANMVKLLLDRGAKIDAKTRDGLTPLHCGARSG HEQVVEMLLDRAAPILSKTKNGLSPLHMATQGDHLNCVQLLLQH NVPVDDVTNDYLTALHVAAHCGHYKVAKVLLDKKANPNAKALN GFTPLHIACKKNRIKVMELLLKHGASIQAVTESGLTPIHVAAFMGH VNIVSQLMHHGASPNTTNVRGETALHMAARSGQAEVVRYLVQDG AQVEAKAKDDQTPLHISARLGKADIVQQLLQQGASPNAATTSGYT PLHLSAREGHEDVAAFLLDHGASLSITTKKGFTPLHVAAKYGKLE VANLLLQKSASPDAAGKSGLTPLHVAAHYDNQKVALLLLDQGAS PHAAAKNGYTPLHMAKKNQMDIATTLLEYGADANAVTRQGIASV HLAAQEGHVDMVSLLLGRNANVNLSNKSGLTPLHLAAQEDRVNV AEVLVNQGAHVDAQTKMGYTPLHVGCHYGNIKIVNFLLQHSAKV NAKTKNGYTPLHQAAQQGHTHIINVLLQNNASPNELTVNGNTALG IARRLGYISVVDTLKIVTEETMITTTVTEKHKMNVPETMNEVLDM SDDEVRKANAPEMLSDGEYISDVEEGEDAMTGDTDKYLGPQDLK ELGDDSLPAEGYMGFSLGARSASLRSFSSDRSYTLNRSSYARDSM MIEELLVPSKEQHLTFTREFDSDSLRHYSWAADTLDNVNLVSSPIH SGFLVSFMVDARGGSMRGSRHHGMRDIPPRKCTAPTRITCRLVKR |

TABLE 1-continued

| Protein name/SEQ ID NO. | Amino acid sequence |
|---|---|
| | HKLANPPPMVEGEGLASRLVEMGPAGAQFLGPVIVEIPHFGSMRG
KERELIVLRSENGETWKEHQFDSKNEDLTELLNGMDEELDSPEELG
KKRICRIITKDFPQYFAVVSRIKQESNQIGPEGGILSSTTVPLVQASFP
EGALTKRIRVGLQAQPVPDEIVKKILGNKATFSPIVTVEPRRRKFHK
PITMTIPVPPPSGEGVSNGYKGDTTPNLRLLCSITGGTSPAQWEDIT
GTTPLTFIKDCVSFTTNVSARFWLADCHQVLETVGLATQLYRELIC
VPYMAKFVVFAKMNDPVESSLRCFCMTDDKVDKTLEQQENFEEV
ARSKDIEVLEGKPIYVDCYGNLAPLTKGGQQLVFNFYSFKENRLPF
SIKIRDTSQEPCGRLSFLKEPKTTKGLPQTAVCNLNITLPAHKKETE
SDQDDEIEKTDRRQSFASLALRKRYSYLTEPGMIERSTGATRSLPTT
YSYKPFFSTRPYQSWTTAPITVPGPAKSGFTSLSSSSSNTPSASPLKS
IWSVSTPSPIKSTLGASTTSSVKSISDVASPIRSFRTMSSPIKTVVSQS
PYNIQVSSGTLARAPAVTEATPLKGLASNSTFSSRTSPVTTAGSLLE
RSSITMTPPASPKSNINMYSSSLPFKSITTSAAPLISSPLKSVVSPVKS
AVDVISSAKTTMASSLSSPVKQMPGHAEVALVNGSISPLKYPSSSTL
INGCKATATLQEKISSATNSVSSVVSAATDTVEKVFSTTTAMPFSPL
RSYVSAAPSAFQSLRTPSASALYTSLGSSISATTSSVTSSITTVPVYSV
VNVLPEPALKKLPDSNSFTKSAAALLSPIKTLTTETHPQPHFSRTSSP
VKSSLFLAPSALKLSTPSSLSSSQEILKDVAEMKEDLMRMTAILQTD
VPEEKPFQPELPKEGRIDDEEPFKIVEKVKEDLVKVSEILKKDVCVD
NKGSPKSPKSDKGHSPEDDWIEFSSEEIREARQQAAASQSPSLPERV
QVKAKAASEKDYNLTKVIDYLTNDIGSSSLTNLKYKFEDAKKDGE
ERQKRVLKPAIALQEHKLKMPPASMRTSTSEKELCKMADSFFGTD
TILESPDDFSQHDQDKSPLSDSGFETRSEKTPSAPQSAESTGPKPLFH
EVPIPPVITETRTEVVHVIRSYDPSAGDVPQTQPEEPVSPKPSPTFME
LEPKPTTSSIKEKVKAFQMKASSEEDDHNRVLSKGMRVKEETHITT
TTRMVYHSPPGGEGASERIEETMSVHDIMKAFQSGRDPSKELAGLF
EHKSAVSPDVHKSAAETSAQHAEKDNQMKPKLERDEVHIEKGNQ
AEPTEVIIRETKKHPEKEMYVYQKDLSRGDINLKDFLPEKHDAPPC
SEEQGQQEEEELTAEESLPSYLESSRVNTPVSQEEDSRPSSAQLISD
DSYKTLKLLSQHSIEYHDDELSELRGESYRFAEKMLLSEKLDVSHS
DTEESVTDHAGPPSSELQGSDKRSREKIATAPKKEILSKIYKDVSEN
GVGKVSKDEHFDKVTVLHYSGNVSSPKHAMWMRFTEDRLDRGR
EKLIYEDRVDRTVKEAEEKLTEVSQFFRDKTEKLNDELQSPEKKAR
PKNGKEYSSQSPTSSSPEKVLLTELLASNDEWVKARQHGPDGQGF
PKAEEKAPSLPSSPEKMVLSQQTEDSKSTVEAKGSISQSKAPDGPQ
SGFQLKQSKLSSIRLKFEQGTHAKSKDMSQEDRKSDGQSRIPVKKI
QESKLPVYQVFAREKQQKAIDLPDESVSVQKDFMVLKTKDEHAQS
NEIVVNDSGSDNVKKQRTEMSSKAMPDSFSEQQAKDLACHITSDL
ATRGPWDKKVFRTWESSGATNNKSQKEKLSHVLVHDVRENIIGH
PESKSVDQKNEFMSVTERERKLLTNGSLSEIKEMTVKSPSKKVLYR
EYVVKEGDHPGGLLDQPSRRSESSAYSHIPVRVADERRMLSSNIPD
GFCEQSAFPKHELSQKLSQSSMSKETVETQHFNSIEDEKVTYSEISK
VSKHQSYVGLCPPLEETETSPTKSPDSLEFSPGKESPSSDVFDHSPID
GLEKLAPLAQTEGGKEIKTLPVYVSFVQVGKQYEKEIQQGGVKKII
SQECKTVQETRGTFYTTRQQKQPPSPQGSPEDDTLEQVSPLDSSGK
SPLTPETPSSEEVSYEFTSKTPDSLIAYIPGKPSPIPEVSEESEEEEQA
KSTSLKQTTVEETAVEREMPNDVSKDSNQRPKNNRVAYIEFPPPPP
LDADQIESDKKHHYLPEKEVDMIEVNLQDEHDKYQLAEPVIRVQP
PSPVPPGADVSDSSDDESIYQPVPVKKYTFKLKEVDDEQKEKPKAS
AEKASNQKELESNGSGKDNEFGLGLDSPQNEIAQNGNNDQSITECS
IATTAEFSHDTDATEIDSLDGYDLQDEDDGLTESDSKLPIQAMEIKK
DIWNTEGILKPADRSFSQSKLEVIEEEGKVGPDEDKPPSKSSSSEKT
PDKTDQKSGAQFFTLEGRHPDRSVFPDTYFSYKVDEEFATPFKTVA
TKGLDFDPWSNNRGDDEVFDSKSREDETKPFGLAVEDRSPATTPD
TTPARTPTDESTPTSEPNPFPFHEGKMFEMTRSGAIDMSKRDFVEE
RLQFFQIGEHTSEGKSGDQGEGDKSMVTATPQPQSGDTTVETNLE
RNVETPTVEPNPSIPTSGECQEGTSSSGSLEKSAAATNTSKVDPKLR
TPIKMGISASTMTMKKEGPGEITDKIEAVMTSCQGLENETITMISNT
ANSQMGVRPHEKHDFQKDNFNNNNNLDSSTIQTDNIMSNIVLTEH
SAPTCTTEKDNPVKVSSGKKTGVLQGHCVRDKQKVLGEQQKTE
LIGIRQKSKLPIKATSPKDTFPPNHMSNTKASKMKQVSQSEKTKAL
TTSSCVDVKSRIPVKNTHRDNIIAVRKACATQKQGQPEKGKAKQL
PSKLPVKVRSTCVTTITTTATTITTITTTITTSCTVKVRKSQLKEV
CKHSIEYFKGISGETLKLVDRLSEEEKKMQSELSDEEESTSRNTSLS
ETSRGGQPSVTTKSARDKKTEAAPLKSKSEKAGSEKRSSRRTGPQS
PCERTDIRMAIVADHLGLSWTELARELNFSVDEINQIRVENPNSLIS
QSFMLLKKWVTRDGKNATTDALTSVLTKINRIDIVTLLEGPIFDYG
NISGTRSFADENNVFHDPVDGWQNETSSGNLESCAQARRVTGGLL
DRLDDSPDQCRDSITSYLKGEAGKFEANGSHTEITPEAKTKSYFPES
QNDVGKQSTKETLKPKIHGSGHVEEPASPLAAYQKSLEETSKLIIEE
TKPCVPVSMKKMSRTSPADGKPRLSLHEEEGSSGSEQKQGEGFKV
KTKKEIRHVEKKSHS |
| Rho 23
or Rho GTPase-activating protein 23
(ARHGAP23)
SEQ ID NO: 11 | MNGVAFCLVGIPPRPEPRPPQLPLGPRDGCSPRRPFPWQGPRTLLL
YKSPQDGFGFTLRHFIVYPPESAVHCSLKEEENGGRGGGPSPRYRL
EPMDTIFVKNVKEDGPAHRAGLRTGDRLVKVNGESVIGKTYSQVI
ALIQNSDDTLELSIMPKDEDILQLAYSQDAYLKGNEPYSGEARSIPE |

TABLE 1-continued

| Protein name/SEQ ID NO. | Amino acid sequence |
|---|---|
| | PPPICYPRKTYAPPARASTRATMVPEPTSALPSDPRSPAAWSDPGLR
VPPAARAHLDNSSLGMSQPRPSPGAFPHLSSEPRTPRAFPEPGSRVP
PSRLECQQALSHWLSNQVPRRAGERRCPAMAPRARSASQDRLEEV
AAPRPWPCSTSQDALSQLGQEGWHRARSDDYLSRATRSAEALGPG
ALVSPRFERCGWASQRSSARTPACPTRDLPGPQAPPPSGLQGLDDL
GYIGYRSYSPSFQRRTGLLHALSFRDSPFGGLPTFNLAQSPASFPPE
ASEPPRVVRPEPSTRALEPPAEDRGDEVVLRQKPPTGRKVQLTPAR
QMNLGFGDESPEPEASGRGERLGRKVAPLATTEDSLASIPFIDEPTS
PSIDLQAKHVPASAVVSSAMNSAPVLGTSPSSPTFTFTLGRHYSQD
CSSIKAGRRSSYLLAITTERSKSCDDGLNTFRDEGRVLRRLPNRIPS
LRMLRSFFTDGSLDSWGTSEDADAPSKRHSTSDLSDATFSDIRREG
WLYYKQILTKKGKKAGSGLRQWKRVYAALRARSLSLSKERREPG
PAAAGAAAAGAGEDEAAPVCIGSCLVDISYSETKRRHVFRLTTAD
FCEYLFQAEDRDDMLGWIRAIRENSRAEGEDPGCANQALISKKLN
DYRKVSHSSGPKADSSPKGSRGLGGLKSEFLKQSAARGLRTQDLP
AGSKDDSAAAPKTPWGINIIKKNKKAAPRAFGVRLEECQPATENQ
RVPLIVAACCRIVEARGLESTGIYRVPGNNAVVSSLQEQLNRGPGD
INLQDERWQDLNVISSLLKSFFRKLPEPLFTDDKYNDFIEANRIEDA
RERMRTLRKLIRDLPGHYYETLKFLVGHLKTIADHSEKNKMEPRN
LALVFGPTLVRTSEDNMTDMVTHMPDRYKIVETLIQHSDWFFSDE
EDKGERTPVGDKEPQAVPNIEYLLPNIGRTVPPGDPGSDSTTCSSAK
SKGSWAPKKEPYAREMLAISFISAVNRKRKKRREARGLGSSTDDD
SEQEAHKPGAGATAPGTQERPQGPLPGAVAPEAPGRLSPPAAPEER
PAADTRSIVSGYSTLSTMDRSVCSGASGRRAGAGDEADDERSELS
HVETDTEGAAGAGPGGRLTRRPSFSSIAHLMPCDTLARRRLARGRP
DGEGAGRGGPRAPEPPGSASSSSQESLRPPAAALASRPSRMEALRL
RLRGTADDMLAVRLRRPLSPETRRRRSSWRRHTVVVQSPLTDLNF
NEWKELGGGGPPEPAGARAHSDNKDSGLSSLESTKARAPSSAASQ
PPAPGDTGSLQSQPPRRSAASRLHQCL |
| Cytoskeletal Keratin 78 type II
or Keratin, type II cytoskeletal 78
(KRT78)
SEQ ID NO: 12 | MSLSPCRAQRGFSARSACSARSRGRSRGGFSSRGGFSSRSLNSFGG
CLEGSRGSTWGSGGRLGVRFGEWSGGPGLSLCPPGGIQEVTINQNL
LTPLKIEIDPQFQVVRTQETQEIRTLNNQFASFIDKVRFLEQQNKVL
ETKWHLLQQQGLSGSQQGLEPVFEACLDQLRKQLEQLQGERGAL
DAELKACRDQEEEYKSKYEEEAHRRATLENDFVVLKKDVDGVFL
SKMELEGKLEALREYLYFLKHLNEEELGQLQTQASDTSVVLSMDN
NRYLDFSSITIEVRARYEEIARSSKAEAEALYQTKYQELQVSAQLH
GDRMQETKVQISQLHQEIQRLQSQTENLKKQNASLQAAITDAEQR
GELALKDAQAKVDELEAALRMAKQNLARLLCEYQELTSTKLSLD
VEIATYRRLLEGEECRMSGECTSQVTISSVGGSAVMSGGVGGGLG
STCGLGSGKGSPGSCCTSIVTGGSNIILGSGKDPVLDSCSVSGSSAG
SSCHTILKKTVESSLKTSITY |
| Alpha-3 collagen chain (VI)
or Collagen type VI, alpha 3
(COL6A3)
SEQ ID NO: 13 | MRKHRHLPLVAVFCLFLSGFPTTHAQQQQADVKNGAAADIIFLVD
SSWTIGEEHFQLVREFLYDVVKSLAVGENDFHFALVQFNGNPHTE
FLLNTYRTKQEVLSHISNMSYIGGTNQTGKGLEYIMQSHLTKAAGS
RAGDGVPQVIVVLTDGHSKDGLALPSAELKSADVNVFAIGVEDAD
EGALKEIASEPLNMHMFNLENFTSLHDIVGNLVSCVHSSVSPERAG
DTETLKDITAQDSADIIFLIDGSNNTGSVNFAVILDFLVNLLEKLPIG
TQQIRVGVVQFSDEPRTMFSLDTYSTKAQVLGAVKALGFAGGELA
NIGLALDFVVENHFTRAGGSRVEEGVPQVLVLISAGPSSDEIRYGV
VALKQASVFSFGLGAQAASRAELQHRTDDNLVFTVPEFRSFGDLQ
EKLLPYIVGVAQRHWLKPPTIVTQVIEVNKRDIVFLVDGSSALGLA
NFNAIRDFIAKVIQRLEIGQDLIQVAVAQYADTVRPEFYFNTHPTKR
EVITAVRKMKPLDGSALYTGSALDFVRNNLFTSSAGYRAAEGIPKL
LVLITGGKSLDEISQPAQELKRSSIMAFAIGNKGADQAELEEIAFDS
SLVFIPAEFRAAPLQGMLPGLLAPLRTLSGTPEVHSNKRDIIFLLDGS
ANVGKTNFPYVRDFVMNLVNSLDIGNDNIRVGLVQFSDTPVTEFS
LNTYQTKSDILGHLRQLQLQGGSGLNTGSALSYVYANHFTEAGGS
RIREHVPQLLLLLTAGQSEDSYLQAANALTRAGILTFCVGASQANK
AELEQIAFNPSLVYLMDDFSSLPALPQQLIQPLTTYVSGGVEEVPLA
QPESKRDILFLFDGSANLVGFPVVRDFLYKIIDELNVKPEGTRIAV
AQYSDDVKVESRFDEHQSKPEILNLVKRMKIKTGKALNLGYALDY
AQRYIFVKSAGSRIEDGVLQFLVLLVAGRSSDRVDGPASNLKQSGV
VPFIFQAKNADPAELEQIVLSPAFILAAESLPKIGDLIVQIVNLLKSV
HNGAPAPVSGEKDVVFLLDGSEGVRSGFPLLKEFVQRVVESLDVG
QDRVRVAVVQYSDRTRPEFYLNSYMNKQDVVNAVRQLTLLGGPT
PNTGAALEFVLRNILVSSAGSRITEGVPQLLIVLTADRSGDDVRNPS
VVVKRGGAVPIGIGIGNADITEMQTISFIPDFAVAIPTFRQLGTVQQ
VISERVTQLTREELSRLQPVLQPLPSPGVGGKRDVVFLIDGSQSAGP
EFQYVRTLIERLVDYLDVGFDTTRVAIQFSDDPKVEFLLNAHSSK
DEVQNAVQRLRPKGGRQINVGNALEYVSRNIFKRPLGSRIEEGVPQ
FLVLISSGKSDDEVDDPAVELKQFGVAPFTIARNADQEELVKISLSP
EYVFSVSTFRELPSLEQKLLTPITTLTSEQIQKLLASTRYPPPAVESD
AADIVFLIDSSEGVRPDGFAHIRDFVSRIVRRLNIGPSKVRVGVVQF
SNDVFPEFYLKTYRSQAPVLDAIRRLRLRGGSPLNTGKALEFVARN
LFVKSAGSRIEDGVPQHLVLVLGGKSQDDVSRFAQVIRSSGIVSLG
VGDRNIDRTELQTITNDPRLVFTVREFRELPNIEERIMNSFGPSAATP |

TABLE 1-continued

| Protein name/SEQ ID NO. | Amino acid sequence |
|---|---|
| | APPGVDTPPPSRPEKKKADIVFLLDGSINFRRDSFQEVLRFVSEIVD TVYEDGDSIQVGLVQYNSDPTDEFFLKDFSTKRQIIDAINKVVYKG GRHANTKVGLEHLRVNHFVPEAGSRLDQRVPQIAFVITGGKSVED AQDVSLALTQRGVKVFAVGVRNIDSEEVGKIASNSATAFRVGNVQ ELSELSEQVLETLHDAMHETLCPGVTDAAKACNLDVILGFDGSRD QNVFVAQKGFESKVDAILNRISQMHRVSCSGGRSPTVRVSVVANT PSGPVEAFDFDEYQPEMLEKFRNMRSQHPYVLTEDTLKVYLNKFR QSSPDSVKVVIHFTDGADGDLADLHRASENLRQEGVRALILVGLE RVVNLERLMHLEFGRGFMYDRPLRLNLLDLDYELAEQLDNIAEKA CCGVPCKCSGQRGDRGPIGSIGPKGIPGEDGYRGYPGDEGGPGERG PPGVNGTQGFQGCPGQRGVKGSRGFPGEKGEVGEIGLDGLDGEDG DKGLPGSSGEKGNPGRRGDKGPRGEKGERGDVGIRGDPGNPGQDS QERGPKGETGDLGPMGVPGRDGVPGGPGETGKNGGFGRRGPPGA KGNKGGPGQPGFEGEQGTRGAQGPAGPAGPPGLIGEQGISGPRGS GGAAGAPGERGRTGPLGRKGEPGEPGPKGGIGNRGPRGETGDDGR DGVGSEGRRGKKGERGFPGYPGPKGNPGEPGLNGTTGPKGIRGRR GNSGPPGIVGQKGDPGYPGPAGPKGNRGDSIDQCALIQSIKDKCPC CYGPLECPVFPTELAFALDTSEGVNQDTFGRMRDVVLSIVNDLTIA ESNCPRGARVAVVTYNNEVTTEIRFADSKRKSVLLDKIKNLQVAL TSKQQSLETAMSFVARNTFKRVRNGFLMRKVAVFFSNTPTRASPQ LREAVLKLSDAGITPLFLTRQEDRQLINALQINNTAVGHALVLPAG RDLTDFLENVLTCHVCLDICNIDPSCGFGSWRPSFRDRRAAGSDVD IDMAFILDSAETTTLFQFNEMKKYIAYLVRQLDMSPDPKASQHFAR VAVVQHAPSESVDNASMPPVKVEFSLTDYGSKEKLVDFLSRGMTQ LQGTRALGSAIEYTIENVFESAPNPRDLKIVVLMLTGEVPEQQLEEA QRVILQAKCKGYFFVVLGIGRKVNIKEVYTFASEPNDVFFKLVDKS TELNEEPLMRFGRLLPSFVSSENAFYLSPDIRKQCDWFQGDQPTKN LVKFGHKQVNVPNNVTSSPTSNPVTTTKPVTTTKPVTTTTKPVTTT TKPVTIINQPSVKPAAAKPAPAKPVAAKPVATKMATVRPPVAVKP ATAAKPVAAKPAAVRPPAAAAAKPVATKPEVPRPQAAKPAATKP ATTKPMVKMSREVQVFEITENSAKLHWERAEPPGPYFYDLTVTSA HDQSLVLKQNLTVTDRVIGGLLAGQTYHVAVVCYLRSQVRATYH GSFSTKKSQPPPPQPARSASSSTINLMVSTEPLALTETDICKLPKDEG TCRDFILKWYYDPNTKSCARFWYGGCGGNENKFGSQKECEKVCA PVLAKPGVISVMGT |
| Beta subunit of proteasome type-5 or Proteasome subunit beta type-5 (PSMB5) SEQ ID NO: 14 | MALASVLERPLPVNQRGFFGLGGRADLLDLGPGSLSDGLSLAAPG WGVPEEPGIEMLHGTTTLAFKFRHGVIVAADSRATAGAYIASQTV KKVIEINPYLLGTMAGGAADCSFWERLLARQCRIYELRNKERISVA AASKLLANMVYQYKGMGLSMGTMICGWDKRGPGLYYVDSEGNR ISGATFSVGSGSVYAYGVMDRGYSYDLEVEQAYDLARRAIYQATY RDAYSGGAVNLYHVREDGWIRVSSDNVADLHEKYSGSTP |
| Heterogeneous nuclear ribonucleoproteins A2/B1 (HNRNPA2B1) SEQ ID NO: 15 | MEKTLETVPLERKKREKEQFRKLFIGGLSFETTEESLRNYYEQWGK LTDCVVMRDPASKRSRGFGFVTFSSMAEVDAAMAARPHSIDGRV VEPKRAVAREESGKPGAHVTVKKLFVGGIKEDTEEHHLRDYFEEY GKIDTIEITIDRQSGKKRGFGFVTFDDHDPVDKIVLQKYHTINGHNA EVRKALSRQEMQEVQSSRSGRGGNFGFGDSRGGGGNFGPGPGSNF RGGSDGYGSGRGFGDGYNGYGGGPGGGNFGGSPGYGGGRGGYG GGGPGYGNQGGGYGGGYDNYGGGNYGSGNYNDFGNYNQQPSN YGPMKSGNFGGSRNMGGPYGGGNYGPGGSGGSGGYGGRSRY |
| Histone H2B type 1-B (HIST1H2BB) SEQ ID NO: 16 | MPEPSKSAPAPKKGSKKATTKAQKKDGKKRKRSRKESYSIYVYKV LKQVIIPDTGISSKAMGIMNSFVNDIFERIAGEASRLAHYNKRSTITS REIQTAVRLLLPGELAKHAVSEGTKAVTKYTSSK |
| homolog of DnaJ subfamily C member 13 or DnaJ homolog subfamily C member 13 (DNAJC13) SEQ ID NO: 17 | MNIIRENKDLACFYTTKHSWRGKYKRVFSVGTHATITYNPNTLEV TNQWPYGDICSISPVGKGQGTEFNLTFRKGSGKKSETLKFSTEHRT ELLTEALRFRTDFSEGKITGRRYNCYKHHWSDSRKPVILEVTPGGF DQINPATNRVLCSYDYRNIEGFVDLSDYQGGFCILYGGFSRLHLFA SEQREEIIKSAIDHAGNYIGISLRIRKEPLEFEQYLNLRFGKYSTDESI TSLAEFVVQKISPRHSEPVKRVLALTETCLVERDPATYNIATLKPLG EVFALVCDSENPQLFTIEFIKGQVRKYSSTERDSLLASLLDGVRASG NRDVCVKMTPTHKGQRWGLLSMPVDEEVESLHLRFLATPPNGNF ADAVFRFNANISYSGVLHAVTQDGLFSENKEKLINNAITALLSQEG DVVASNAELESQFQAVRRLVASKAGFLAFTQLPKFRERLGVKVVK ALKRSNNGIIHAAVDMLCALMCPMHDDYDLRQEQLNKASLLSSK KFLENLLEKFNSHVDHGTGALVISSLLDFLTFALCAPYSETTEGQQF DMLLEMVASNGRTLFKLFQIIPSMAIIKGAGLVMKAIIEEGDKEIAT KMQELALSEGALPRHLHTAMFTISSDQRMLTNRQLSRHLVGLWTA DNATATNLLKRILPPGLLAYLESSDLVPEKDADRMHVRDNVKIAM DQYGKFNKVPEWQRLAGKAAKEVEKFAKEKVDLVLMHWRDRM GIAQKENINQKPVVLRKRRQRIKIEANWDLFYYRFGQDHARSNLI WNFKTREELKDTLESEMRAFNIDRELGSANVISWNHHEFEVKYEC LAEEIKIGDYYLRLLLEEDENEESSGSIKRSYEFFNELYHRFLLTPKV NMKCLCLQALAIVYGRCHEEIGPFTDTRYIIGMLERCTDKLERDRLI LFLNKLILNKKNVKDLMDSNGIRILVDLLTLAHLHVSRATVPLQSN VIEAAPDMKRESEKEWYFGNADKERSGPYGFHEMQELWTKGML |

TABLE 1-continued

| Protein name/SEQ ID NO. | Amino acid sequence |
| --- | --- |
| | NAKTRCWAQGMDGWRPLQSIPQLKWCLLASGQAVLNETDLATLI<br>LNMLITMCGYFPSRDQDNAIIRPLPKVKRLLSDSTCLPHIIQLLLTFD<br>PILVEKVAILLYHEMQDNPQLPRLYLSGVFFFIMMYTGSNVLPVAR<br>FLKYTHTKQAFKSEETKGQDIFQRSILGHILPEAMVCYLENYEPEKF<br>SEIFLGEFDTPEAIWSSEMRRLMIEKIAAHLADFTPRLQSNTRALYQ<br>YCPIPIINYPQLENELFCNIYYLKQLCDTLRFPDWPIKDPVKLLKDTL<br>DAWKKEVEKKPPMMSIDDAYEVLNLPQGQGPHDESKIRKAYFRL<br>AQKYHPDKNPEGRDMFEKVNKAYEFLCTKSAKIVDGPDPENIILIL<br>KTQSILFNRHKEDLQPYKYAGYPMLIRTITMETSDDLLFSKESPLLP<br>AATELAFHTVNCSALNAEELRRENGLEVLQEAFSRCVAVLTRASK<br>PSDMSVQVCGYISKCYSVAAQFEECREKTIEMPSIIKDLCRVLYFG<br>KSIPRVAALGVECVSSFAVDFWLQTHLFQAGILWYLLGFLFNYDY<br>TLEESGIQKSEETNQQEVANSLAKLSVHALSRLGGYLAEEQATPEN<br>PTIRKSLAGMLTPYVARKLAVASVTEILKMLNSNTESPYLIWNNST<br>RAELLEFLESQQENMIKKGDCDKTYGSEFVYSDHAKELIVGEIFVR<br>VYNEVPTFQLEVPKAFAASLLDYIGSQAQYLHTFMAITHAAKVESE<br>QHGDRLPRVEMALEALRNVIKYNPGSESECIGHFKLIFSLLRVHGA<br>GQVQQLALEVVNIVTSNQDCVNNIAESMVLSSLLALLHSLPSSRQL<br>VLETLYALTSSTKIIKEAMAKGALIYLLDMFCNSTHPQVRAQTAEL<br>FAKMTADKLIGPKVRITLMKFLPSVFMDAMRDNPEAAVHIFEGTH<br>ENPELIWNDNSRDKVSTTVREMMLEHFKNQQDNPEANWKLPEDF<br>AVVFGEAEGELAVGGVFLRIFIAQPAWVLRKPREFLIALLEKLTELL<br>EKNNPHGETLETLTMATVCLFSAQPQLADQVPPLGHLPKVIQAMN<br>HRNNAIPKSAIRVIHALSENELCVRAMASLETIGPLMNGMKKRADT<br>VGLACEAINRMFQKEQSELVAQLKADLVPYLLKLLEGIGLENLD<br>SPAATKAQIVKALKAMTRSLQYGEQVNEILCRSSVWSAFKDQKHD<br>LFISESQTAGYLTGPGVAGYLTAGTSTSVMSNLPPPVDHEAGDLGY<br>QT |
| Beta enolase<br>(ENO3)<br>SEQ ID NO: 18 | MAMQKIFAREILDSRGNPTVEVDLHTAKGRFAAVPSGASTGIYE<br>ALELRDGDKGRYLGKGVLKAVENINNTLGPALLQKKLSVVDQEK<br>VDKFMIELDGTENKSKFGANAILGVSLAVCKAGAAEKGVPLYRHI<br>ADLAGNPDLILPVPAPNVINGGSHAGNKLAMQEFAMILPVGASSFKE<br>AMRIGAEVYHHLKGVIKAKYGKDATNVGDEGGFAPNILENNEAL<br>ELLKTAIQAAGYPDKVVIGMDVAASEFYRNGKYDLDFKSPDDPAR<br>HITGEKLGELYKSFIKNYPVVSIEDPFDQDDWATWTSFLSGVNIQIV<br>GDDLTVTNPKRIAQAVEKKACNCLLLKVNQIGSVTESIQACKLAQS<br>NGWGVMVSHRSGETEDTFIADLVVGLCTGQIKTGAPCRSERLAKY<br>NQLMRIEEALGDKAIFAGRKFRNPKAK |
| Glutathione S-transferase P<br>(GSTP1)<br>SEQ ID NO: 19 | MPPYTVVYFPVRGRCAALRMLLADQGQSWKEEVVTVETWQEGS<br>LKASCLYGQLPKFQDGDLTLYQSNTILRHLGRTLGLYGKDQQEAA<br>LVDMVNDGVEDLRCKYISLIYTNYEAGKDDYVKALPGQLKPFETL<br>LSQNQGGKTFIVGDQISFADYNLLDLLLIHEVLAPGCLDAFPLLSAY<br>VGRLSARPKLKAFLASPEYVNLPINGNGKQ |
| Glutathione 5-transferase Mu 3<br>(GSTM3)<br>SEQ ID NO: 20 | MSCESSMVLGYWDIRGLAHAIRLLLEFTDTSYEEKRYTCGEAPDY<br>DRSQWLDVKFKLDLDFPNLPYLLDGKNKITQSNAILRYIARKHNM<br>CGETEEEKIRVDIIENQVMDFRTQLIRLCYSSDHEKLKPQYLEELPG<br>QLKQFSMFLGKFSWFAGEKLTFVDFLTYDILDQNRIFDPKCLDEFP<br>NLKAFMCRFEALEKIAAYLQSDQFCKMPINNKMAQWGNKPVC |
| Farnesyl pyrophosphate synthase<br>Variant 2<br>SEQ ID NO: 21 | MPLSRWLRSVGVFLLPAPYWAPRERWLGSLRRPSLVHGYPVLAW<br>HSARCWCQAWTEEPRALCSSLRMNGDQNSDVYAQEKQDFVQHFS<br>QIVRVLTEDEMGHPEIGDAIARLKEVLEYNAIGGKYNRGLTVVVA<br>FRELVEPRKQDADSLQRAWTVGWCVELLQAFFLVADDIMDSSLTR<br>RGQICWYQKPGVGLDAINDANLLEACIYRLLKLYCREQPYYLNLIE<br>LFLQSSYQTEIGQTLDLLTAPQGNVDLVRFTEKRYKSIVKYKTAFY<br>SFYLPIAAAMYMAGIDGEKEHANAKKILLEMGEFFQIQDDYLDLF<br>GDPSVTGKIGTDIQDNKCSWLVVQCLQRATPEQYQILKENYGQKE<br>AEKVARVKALYEELDLPAVFLQYEEDSYSHIMALIEQYAAPLPPAV<br>FLGLARKIYKRRK |
| Farnesyl pyrophosphate synthase<br>Variant 3<br>SEQ ID NO: 22 | MNGDQNSDVYAQEKQDFVQHFSQIVRVLTEDEMGHPEIGDAIARL<br>KEVLEYNAIGGKYNRGLTVVVAFRELVEPRKQDADSLQRAWTVG<br>WCVELLQAFFLVADDIMDSSLTRRGQICWYQKPGVGLDAINDANL<br>LEACIYRLLKLYCREQPYYLNLIELFLQSSYQTEIGQTLDLLTAPQG<br>NVDLVRFTEKRYKSIVKYKTAFYSFYLPIAAAMYMAGIDGEKEHA<br>NAKKILLEMGEFFQIQDDYLDLFGDPSVTGKIGTDIQDNKCSWLVV<br>QCLQRATPEQYQILKENYGQKEAEKVARVKALYEELDLPAVFLQY<br>EEDSYSHIMALIEQYAAPLPPAVFLGLARKIYKRRK |
| Farnesyl pyrophosphate synthase<br>Variant 4<br>SEQ ID NO: 23 | MNGDQNSDVYAQEKQDFVQHFSQIVRVLTEDEMGHPEIGDAIARL<br>KEVLEYNAIGGKYNRGLTVVVAFRELVEPRKQDADSLQRAWTVG<br>WCVELLQAFFLVADDIMDSSLTRRGQICWYQKPGVGLDAINDANL<br>LEACIYRLLKLYCREQPYYLNLIELFLQSSYQTEIGQTLDLLTAPQG<br>NVDLVRFTEKRYKSIVKYKTAFYSFYLPIAAAMYMAGIDGEKEHA<br>NAKKILLEMGEFFQIQDDYLDLFGDPSVTGKIGTDIQDNKCSWLVV |

TABLE 1-continued

| Protein name/SEQ ID NO. | Amino acid sequence |
|---|---|
| | QCLQRATPEQYQILKENYGQKEAEKVARVKALYEELDLPAVFLQY<br>EEDSYSHIMALIEQYAAPLPPAVFLGLARKIYKRRK |
| Farnesyl pyrophosphate synthase<br>Variant 5<br>SEQ ID NO: 24 | MDSSLTRRGQICWYQKPGVGLDAINDANLLEACIYRLLKLYCREQ<br>PYYLNLIELFLQSSYQTEIGQTLDLLTAPQGNVDLVRFTEKRYKSIV<br>KYKTAFYSFYLPIAAAMYMAGIDGEKEHANAKKILLEMGEFFQIQ<br>DDYLDLFGDPSVTGKIGTDIQDNKCSWLVVQCLQRATPEQYQILK<br>ENYGQKEAEKVARVKALYEELDLPAVFLQYEEDSYSHIMALIEQY<br>AAPLPPAVFLGLARKIYKRRK |
| Farnesyl pyrophosphate synthase<br>Variant 6<br>SEQ ID NO: 25 | MNGDQNSDVYAQEKQDFVQHFSQIVRVLTEDEMGHPEIGDAIARL<br>KEVLEYNAIGGKYNRGLTVVVAFRELVEPRKQDADSLQRAWTVG<br>WCVELLQAFFLVADDIMDSSLTRRGQICWYQKPGVGLDAINDANL<br>LEACIYRLLKLYCREQPYYLNLIELFLQSSYQTEIGQTLDLLTAPQG<br>NVDLVRFTEKRYKSIVKYKTAFYSFYLPIAAAMYMAGIDGEKEHA<br>NAKKILLEMGEFFQIQDDYLDLFGDPSVTGKIGTDIQDNKCSWLVV<br>QCLQRATPEQYQILKENYGQKEAEKVARVKALYEELDLPAVFLQY<br>EEDSYSHIMALIEQYAAPLPPAVFLGLARKIYKRRK |
| Farnesyl pyrophosphate synthase<br>Variant 7<br>SEQ ID NO: 26 | MPLSRWLRSVGVFLLPAPYWAPRERWLGSLRRPSLVHGYPVLAW<br>HSARCWCQAWTEEPRALCSSLRMNGDQNSDVYAQEKQDFVQHFS<br>QIVRVLTEDEMGHPEIGDAIARLKEVLEYNAIGGKYNRGLTVVVA<br>FRELVEPRKQDADSLQRAWTVGWCVELLQAFFLVADDIMDSSLTR<br>RGQICWYQKPGVGLDAINDANLLEACIYRLLKLYCREQPYYLNLIE<br>LFLQSSYQTEIGQTLDLLTAPQGNVDLVRFTEKRYKSIVKYKTAFY<br>SFYL |
| Farnesyl pyrophosphate synthase<br>Variant 8<br>SEQ ID NO: 27 | MPLSRWLRSVGVFLLPAPYWAPRERWLGSLRRPSLVHGYPVLAW<br>HSARCWCQAWTEEPRALCSSLRMNGDQNSDVYAQEKQDFVQHFS<br>QIVRVLTEDEMGHPEIGDAIARLKEVLEYNAIGGKYNRGLTVVVA<br>FRELVEPRKQDADSLQRAWTVGWCVELLQAFFLVADDIMDS |
| Neurofibromin 1<br>Variant 2<br>SEQ ID NO: 28 | MAAHRPVEWVQAVVSRFDEQLPIKTGQQNTHTKVSTEHNKECLIN<br>ISKYKFSLVISGLTTILKNVNNMRIFGEAAEKNLYLSQLIILDTLEKC<br>LAGQPKDTMRLDETMLVKQLLPEICHFLHTCREGNQHAAELRNSA<br>SGVLFSLSCNNFNAVFSRISTRLQELTVCSEDNVDVHDIELLQYINV<br>DCAKLKRLLKETAFKFKALKKVAQLAVINSLEKAFWNWVENYPD<br>EFTKLYQIPQTDMAECAEKLFDLVDGFAESTKRKAAVWPLQIILLI<br>LCPEIIQDISKDVVDENNMNKKLFLDSLRKALAGHGGSRQLTESAA<br>IACVKLCKASTYINWEDNSVIFLLVQSMVVDLKNLLFNPSKPFSRG<br>SQPADVDLMIDCLVSCFRISPHNINQHFKICLAQNSPSTFHYVLVNS<br>LHRIITNSALDWWPKIDAVYCHSVELRNMFGETLHKAVQGCGAHP<br>AIRMAPSLTFKEKVTSLKFKEKPTDLETRSYKYLLLSMVKLIHADP<br>KLLLCNPRKQGPETQGSTAELITGLVQLVPQSHMPEIAQEAMEALL<br>VLHQLDSIDLWNPDAPVETFWEISSQMLFYICKKLTSHQMLSSTEIL<br>KWLREILICRNKFLLNKQADRSSCHFLLFYGVGCDIPSSGNTSQM<br>SMDHEELLRTPGASLRKGKGNSSMDSAAGCSGTPPICRQAQTKLE<br>VALYMFLWNPDTEAVLVAMSCFRHLCEEADIRCGVDEVSVHNLL<br>PNYNTFMEFASVSNMMSTGRAALQKRVMALLRRIEHPTAGNTEA<br>WEDTHAKWEQATKLILNYPKAKMEDGQAAESLHKTIVKRRMSHV<br>SGGGSIDLSDTDSLQEWINMTGFLCALGGVCLQQRSNSGLATYSPP<br>MGPVSERKGSMISVMSSEGNADTPVSKFMDRLLSLMVCNHEKVG<br>LQIRTNVKDLVGLELSPALYPMLFNKLKNTISKFFDSQGQVLLTDT<br>NTQFVEQTIAIMKNLLDNHTEGSSEHLGQASIETNIMLNLVRYVRV<br>LGNMVHAIQIKTKLCQLVEVMMARRDDLSFCQEMKFRNKMVEYL<br>TDWVMGTSNQAADDDVKCLTRDLDQASMEAVVSLLAGLPLQPEE<br>GDGVELMEAKSQLFLKYFTLFMNLLNDCSEVEDESAQTGGRKRG<br>MSRRLASLRHCTVLAMSNLLNANVDSGLMHSIGLGYHKDLQTRA<br>TFMEVLTKILQQGTEFDTLAETVLADRFERLVELVTMMGDQGELPI<br>AMALANVVPCSQWDELARVLVTLFDSRHLLYQLLWNMFSKEVEL<br>ADSMQTLFRGNSLASKIMTFCFKVYGATYLQKLLDPLLRIVITSSD<br>WQHVSFEVDPTRLEPSESLEENQRNLLQMTEKFFHAIISSSSEFPPQ<br>LRSVCHCLYQVVSQRFPQNSIGAVGSAMFLRFINPAIVSPYEAGILD<br>KKPPPRIERGLKLMSKILQSIANHVLFTKEEHMRPFNDFVKSNFDA<br>ARRFFLDIASDCPTSDAVNHSLSFISDGNVLALHRLLWNNQEKIGQ<br>YLSSNRDHKAVGRRPFDKMATLLAYLGPPEHKPVADTHWSSLNL<br>TSSKFEEFMTRHQVHEKEEFKALKTLSIFYQAGTSKAGNPIFYVA<br>RRFKTGQINGDLLIYHVLLTLKPYYAKPYEIVVDLTHTGPSNRFKT<br>DFLSKWFVVFPGFAYDNVSAVYIYNCNSWVREYTKYHERLLTGL<br>KGSKRLVFIDCPGKLAEHLEHEQQKLPAATLALEEDLKVFHNALKL<br>AHKDTKVSIKVGSTAVQVTSAERTKVLGQSVFLNDIYYASEIEEICL<br>VDENQFTLTIANQGTPLTFMHQECEAIVQSIIHIRTRWELSQPDSIPQ<br>HTKIRPKDVPGTLLNIALLNLGSSDPSLRSAAYNLLCALTCTFNLKI<br>EGQLLETSGLCIPANNTLFIVSISKTLAANEPHLTLEFLEECISGFSKS<br>SIELKHLCLEYMTPWLSNLVRFCKIINDDAKRQRVTAILDKLITMTI<br>NEKQMYPSIQAKIWGSLGQITDLLDVVLDSFIKTSATGGLGSIKAE<br>VMADTAVALASGNVKLVSSKVIGRMCKIIDKTCLSPTPTLEQHLM<br>WDDIAILARYMLMLSFNNSLDVAAHLPYLFHVVTFLVATGPLSLR |

TABLE 1-continued

| Protein name/SEQ ID NO. | Amino acid sequence |
|---|---|
| | ASTHGLVINIIHSLCTCSQLHFSEETKQVLRLSLTEFSLPKFYLLFGIS KVKSAAVIAFRSSYRDRSFSPGSYERETFALTSLETVTEALLEIMEA CMRDIPTCKWLDQWTELAQRFAFQYNPSLQPRALVVFGCISKRVS HGQIKQIIRILSKALESCLKGPDTYNSQVLIEATVIALTKLQPLLNKD SPLHKALFWVAVAVLQLDEVNLYSAGTALLEQNLHTLDSLRIFND KSPEEVFMAIRNPLEWHCKQMDHFVGLNFNSNFNFALVGHLLKG YRHPSPAIVARTVRILHTLLTLVNKHRNCDKFEVNTQSVAYLAALL TVSEEVRSRCSLKHRKSLLLTDISMENVPMDTYPIHHGDPSYRTLK ETQPWSSPKGSEGYLAATYPTVGQTSPRARKSMSLDMGQPSQANT KKLLGTRKSFDHLISDTKAPKRQEMESGITTPPKMRRVAETDYEM ETQRISSSQQHPHLRKVSVSESNVLLDDEEVLTDPKIQALLLTVLATL VKYTTDEFDQRILYEYLAEASVVFPKVFPVVIINLLDSKINTLLSLC QDPNLLNPIHGIVQSVVYHEESPPQYQTSYLQSFGFNGLWRFAGPF SKQTQIPDYAELIVKFLDALIDTYLPGIDEETSEESLLTPTSPYPPAL QSQLSITANLNLSNSMTSLATSQHSPGIDKENVELSPTTGHCNSGRT RHGSASQVQKQRSAGSFKRNSIKKIV |
| Neurofibromin 1 Variant 3 SEQ ID NO: 29 | MAAHRPVEWVQAVVSRFDEQLPIKTGQQNTHTKVSTEHNKECLIN ISKYKFSLVISGLTTILKNVNNMRIFGEAAEKNLYLSQLIILDTLEKC LAGQPKDTMRLDETMLVKQLLPEICHFLHTCREGNQHAAELRNSA SGVLFSLSCNNFNAVFSRISTRLQELTVCSEDNVDVHDIELLQYINV DCAKLKRLLKETAFKFKALKKVAQLAVINSLEKAFWNWVENYPD EFTKLYQIPQTDMAECAEKLFDLVDGFAESTKRKAAVWPLQIILLI LCPEIIQDISKDVVDENNMNKKLFLDSLRKALAGHGGSRQLTESAA IACVKLCKASTYINWEDNSVIFLLVQSMVVDLKNLLFNPSKPFSRG SQPADVDLMIDCLVSCFRISPHNNQHFKICLAQNSPSTFHYVLVNS LHRIITNSALDWWPKIDAVYCHSVELRNMFGETLHKAVQGCGAHP AIRMAPSLTFKEKVTSLKFKEKPTDLETRSYKYLLLSMVKLIHADP KLLLCNPRKQGPETQGSTAELITGLVQLVPQSHMPEIAQEAMEALL VLHQLDSIDLWNPDAPVETFWEIRYMYFYFLNSTFKFYFVFLS |
| Neurofibromin 1 Variant 4 SEQ ID NO: 30 | NWEDNSVIFLLVQSMVVDLKNLLFNPSKPFSRGSQPADVDLMIDC LVSCFRISPHNINQHFKICLAQNSPSTFHYVLVNSLHRIITNSALDWW PKIDAVYCHSVELRNMFGETLHKAVQGCGAHPAIRMAPSLTFKEK VTSLKFKEKPTDLETRSYKYLLLSMVKLIHADPKLLLCNPRKQGPE TQGSTAELITGLVQLVPQSHMPEIAQEAMEALLVLHQLDSIDLWNP DAPVETFWEISSQMLFYICKKLTSHQMLSSTEILKWLREILICRNKF LLKNKQADRSSCHFLLFYGVGCDIPSSGNTSQMSMDHEELLRTPG ASLRKGKGNSSMDSAAGCSGTPPICRQAQTKLEVALYMFLWNPDT EAVLVAMSCFRHLCEEEADIRCGVDEVSVIINLLPNYNTFMEFASVS NMMSTGRAALQKRVMALLRRIEHPTAGNTEAWEDTHAKWEQAT KLILNYPKAKMEDGQAAESLHKTIVKRRMSHVSGGGSIDLSDTDS LQEWINMTGFLCALGGVCLQQRSNSGLATYSPPMGPVSERKGSMI SVMSSEGNADTPVSKFMDRLLSLMVCNHEKVGLQIRTNVKDLVG LELSPALYPMLFNKLKNTISKFFDSQGQVLLTDTNTQFVEQTIAIIVIK NLLDNHTEGSSEHLGQASIETNIMLNLVRYVRVLGNMVHAIQIKTK LCQLVEVMMARRDDLSFCQEMKFRNKMVEYLTDWVMGTSNQA ADDDVKCLTRDLDQASMEAVVSLLAGLPLQPEEGDGVELMEAKS QLFLKYFTLFMNLLNDCSEVEDESAQTGGRKRGMSRRLASLRHCT VLAMSNLLNANVDSGLMHSIGLGYHKDLQTRATFMEVLTKILQQ GTEFDTLAETVLADRFERLVELVTMMGDQGELPIAMALANVVPCS QWDELARVLVTLFDSRHLLYQLLWNMFSKEVELADSMQTLFRGN SLASKIMTFCFKVYGATYLQKLLDPLLRIVITSSDWQHVSFEVDPT RLEPSESLEENQRNLLQMTEKFFHAIISSSSEFPPQLRSVCHCLYQV VSQRFPQNSIGAVGSAMFLRFINPAIVSPYEAGILDKKPPPRIERGLK MSKILQSIANHVLFTKEEHMRPFNDFVKSNFDAARRFFLDIASDC PTSDAVNHSLSFISDGNVLALHRLLWNNQEKIGQYLSSNRDHKAV GRRPFDKMATLLAYLGPPEHKPVADTHWSSLNLTSSKFEEFMTRH QVHEKEEFKALKTLSIFYQAGTSKAGNPIFYYVARRFKTGQINGDL LIYHVLLTLKPYYAKPYEIVVDLTHTGPSNRFKTDFLSKWFVVFPG FAYDNVSAVYIYNCNSWVREYTKYHERLLTGLKGSKRLVFIDCPG KLAEHIEHEQQKLPAATLALEEDLKVFIINALKLAHKDTKVSIKVG STAVQVTSAERTKVLGQSVFLNDIYYASEIEEICLVDENQFTLTIAN QGTPLTFMHQECEAIVQSIIHIRTRWELSQPDSIPQHTKIRPKDVPGT LLNIALLNLGSSDPSLRSAAYNLLCALTCTFNLKIEGQLLETSGLCIP ANNTLFIVSISKTLAANEPHLTLEFLEECISGFSKSSIELKHLCLEYM TPWLSNLVRFCKHNIDDAKRQRVTAILDKLITMTINEKQMYPSIQA KIWGSLGQITDLLDVVLDSFIKTSATGGLGSIKAEVMADTAVALAS GNVKLVSSKVIGRMCKIIDKTCLSPTPTLEQHLMWDDIAILARYML MLSFNNSLDVAAHLPYLFHVVTFLVATGPLSLRASTHGLVINHEISL CTCSQLHFSEETKQVLRLSLTEFSLPKFYLLFGISKVKSAAVIAFRSS YRDRSFSPGSYERETFALTSLETVTEALLEIMEACMRDIPTCKWLD QWTELAQRFAFQYNPSLQPRALVVFGCISKRVSHGQIKQIIRILSKA LESCLKGPDTYNSQVLIEATVIALTKLQPLLNKDSPLHKALFWVAV AVLQLDEVNLYSAGTALLEQNLHTLDSLRIFNDKSPEEVFMAIRNP LEWHCKQMDHFVGLNFNSNFNFALVGHLLKGYRHPSPAIVARTV RILHTLLTLVNKHRNCDKFEVNTQSVAYLAALLTVSEEVRSRCSLK HRKSLLLTDISMENVPMDTYPIHHGDPSYRTLKETQPWSSPKGSEG |

| Protein name/SEQ ID NO. | Amino acid sequence |
|---|---|
| | YLAATYPTVGQTSPRARKSMSLDMGQPSQANTKKLLGTRKSFDHL ISDTKAPKRQEMESGITTPPKMRRVAETDYEMETQRISSSQQIIPHL RKVSVSESNVLLDEEVLTDPKIQALLLTVLATLVKYTTDEFDQRIL YEYLAEASVVFPKVFPVVIINILLDSKINTLLSLCQDPNLLNPIHGIVQ SVVYHEESPPQYQTSYLQSFGFNGLWRFAGPFSKQTQIPDYAELIV KFLDALIDTYLPGIDEETSEESLLTPTSPYPPALQSQLSITANLNLSNS MTSLATSQHSPASLPCSKSAVFMQLFPHQGIDKENVELSPTTGHCN SGRTRHGSASQVQKQRSAGSFKRNSIKKIV |
| Neurofibromin 1 Variant 5 SEQ ID NO: 31 | MAAHRPVEWVQAVVSRFDEQLPIKTGQQNTHTKVSTEHNKECLIN ISKYKFSLVISGLTTILKNVNNMRIFGEAAEKNLYLSQLBLDTLEKC LAGQPKDTMRLDETMLVKQLLPEICHFLHTCREGNQHAAELRNSA SGVLFSLSCNNFNAVFSRISTRLQELTVCSEDNVDVHDIELLQYINV DCAKLKRLLKETAFKFKALKKVAQLAVINSLEKAFWNWVENYPD EFTKLYQIPQTDMAECAEKLFDLVDGFAESTKRKAAVWPLQIILLI LCPEIIQDISKDVVDENNMNKKLFLDSLRKALAGHGGSRQLTESAA IACVKLCKASTYINWEDNSVIFLLVQSMVVDLKNLLFNPSKPFSRG SQPADVDLMIDCLVSCFRISPHNNQHFKICLAQNSPSTFHYVLVNS LHRIITNSALDWWPKIDAVYCHSVELRNMFGETLHKAVQGCGAHP AIRMAPSLTFKEKVTSLKFKEKPTDLETRSYKYLLLSMVKLIHADP KLLLCNPRKQGPETQGSTAELITGLVQLVPQSHMPEIAQEAMEVRG K |
| Neurofibromin 1 Variant 6 SEQ ID NO: 32 | MHQECEAIVQSIIHIRTRWELSQPDSIPQHTKIRPKDVPGTLLNIALL NLGSSDPSLRSAAYNLLCALTCTFNLKIEGQLLETSGLCIPANNTLFI VSISKTLAANEPHLTLEFLEECISGFSKSSIELKHLCLEYMTPWLSNL VRFCKIINDDAKRQRVTAILDKLITMTINEKQMYPSIQAKIWGSLG QITDLLDVVLDSFIKTSATGGLGSIKAEVMADTAVALASGNVKLVS SK |
| Neurofibromin 1 Variant 7 SEQ ID NO: 33 | MKRCWSNSCCQKSAIFFTPVVKETSMQLNFGILPLGFYFLSAATTS MQSLVAFLPETAFKFKALKKVAQLAVINSLEKAFWNWVENYPDE FTKLYQIPQTDMAECAEKLFDLVDGFAESTKRKAAVWPLQIILLIL CPEIIQDISKDVVDENNMNKVRRAKLFPLYLDVKQFILLKVCITLGL LFKQSISGNHLNDHFRFLCLMDLEETYSYIILFGRGKIIPGNEQRFKII P |
| Neurofibromin 1 Variant 8 SEQ ID NO: 34 | XIHGIVQSVVYHEESPPQYQTSYLQSFGFNGLWRFAGPFSKQTQIP DYAELIVKFLDALIDTYLPGIDEETSEESLLTPTSPYPPALQSQLSITA NLNLSNSMTSLATSQHSPGQ |
| Glyceraldehyde-3 phosphate dehydrogenase Variant 2 SEQ ID NO: 35 | MVYMFQYDSTHGKFHGTVKAENGKLVINGNPITIFQERDPSKIKW GDAGAEYVVESTGVFTTMEKAGAHLQGGAKRVIISAPSADAPMFV MGVNHEKYDNSLKIISNASCTTNCLAPLAKVIHDNFGIVEGLMTTV HAITATQKTVDGPSGKLWRDGRGALQNIIPASTGAAKAVGKVIPEL NGKLTGMAFRVPTANVSVVDLTCRLEKPAKYDDIKKVVKQASEG PLKGILGYTEHQVVSSDFNSDTHSSTFDAGAGIALNDHFVKLISWY DNEFGYSNRVVDLMAHMASKE |
| Glyceraldehyde-3 phosphate dehydrogenase Variant 3 SEQ ID NO: 36 | MGKVKVGVNGFGRIGRLVTRAAFNSGKVDIVAINDPFIDLNYMVY MFQYDSTHGKFHGTVKAENGKLVINGNPITIFQERDPSKIKWGDA GAEYVVESTGVFTTMEKAGAHLQGGAKRVIISAPSADAPMFVMG VNHEKYDNSLKIISNASCTTNCLAPLAKVIHDNFGIVEGLMTTVHA ITATQKTVDGPSGKLWRDGRGALQNIIPASTGAAKAVGKVIPELNG KLTGMAFRVPTANVSVVDLTCRLEKPAKYDDIKKVVKQASEGPL KGILGYTEHQVVSSDFNSDTHSSTFDAGAGIALNDHFVKLISWYDN EFGYSNRVVDLMAHMASKE |
| Glyceraldehyde-3 phosphate dehydrogenase Variant 4 SEQ ID NO: 37 | MGKVKVGVNGFGRIGRLVTRAAFNSGKVDIVAINDPFIDLNYMVY MFQYDSTHGKFHGTVKAENGKLVINGNPITIFQERDPSKIKWGDA GAEYVVESTGVFTTMEKAGAHLQGGAKRVIISAPSADAPMFVMG VNHEKYDNSLKIISNASCTTNCLAPLAKVIHDNFGIVEGLMTTVHA ITATQKTVDGPSGKLWRDGRGALQNIIPASTGAAKAVGKVIPELNG KLTGMAFRVPTANVSVVDLTCRLEKPAKYDDIKKVVKQASEGPL KGILGYTEHQVVSSDFNSDTHSSTFDAGAGIALNDHFVKLISWYDN EFGYSNRVVDLMAHMASKE |
| Glyceraldehyde-3 phosphate dehydrogenase Variant 5 SEQ ID NO: 38 | MEEMRDPSKIKWGDAGAEYVVESTGVFTTMEKAGAHLQGGAKR VIISAPSADAPMFVMGVNHEKYDNSLKIISNASCTTNCLAPLAKVIH DNFGIVEGLMTTVHAITATQKTVDGPSGKLWRDGRGALQNIIPAST GAAKAVGKVIPELNGKLTGMAFRVPTANVSVVDLTCRLEKPAKY DDIKKVVKQASEGPLKGILGYTEHQVVSSDFNSDTHSSTFDAGAGI ALNDHFVKLISWYDNEFGYSNRVVDLMAHMASKE |
| Glyceraldehyde-3 phosphate dehydrogenase Variant 6 SEQ ID NO: 39 | MVYMFQYDSTHGKFHGTVKAENGKLVINGNPITIFQERDPSKIKW GDAGAEYVVESTGVFTTMEKAGAHLQGGAKRVIISAPSADAPMFV MGVNHEKYDNSLKIISNASCTTNCLAPLAKVIHDNFGIVEGLMTTV HAITATQKTVDGPSGKLWRDGRGALQNIIPASTGAAKAVGKVIPEL |

TABLE 1-continued

| Protein name/SEQ ID NO. | Amino acid sequence |
|---|---|
| | NGKLTGMAFRVPTANVSVVDLTCRLEKPAKYDDIKKVVKQASEG PLKGILGYTEHQVVSSDFNSDTHSSTFDAGAGIALNDHFVKLISWY DNEFGYSNRVVDLMAHMASKE |
| Fibronectin Type BI Domain Containing protein 1 Variant 2 SEQ ID NO: 40 | XPRHVKLLSTKMGLKVTWDPPKDATSRPVEHYNIAYGKSLKSLKY IKVNAETYSFLIEDVEPGVVYFVLLTAENHSGVSRPVYRAESPPGG EWIEIDGFPIKGPGPFNETVTEKEVPNKPLRVRVRSSDDRLSVAWK APRLSGAKSPRRSRGFLLGYGESGRKMNYVPLTRDERTHEIKKLAS ESVYVVSLQSMNSQGRSQPVYRAALTKRKISEEDELDVPDDISVRV MSSQSVLVSWVDPVLEKQKKVVASRQYTVRYREKGELARWDYK QIANRRVLIENLIPDTVYEFAVRISQGERDGKWSTSVFQRTPESAPT TAPENLNVWPVNGKPTVVAASWDALPETEGKVKASKADVEQNTE DNGKPEKPEPSSPSPRAPASSQIIPSVPASPQGRNAKDLLLDLKNKIL ANGGAPRKPQLRAKKAEELDLQSTEITGEEELGSREDSPMSPSDTQ DQKRTLRPPSRHGHSVVAPGRTAVRARMPALPRREGVDKPGFSLA TQPRPGAPPSASASPAHHASTQGTSHRPSLPASLNDNDLVDSDEDE RAVGSLIIPKGAFAQPRPALSPSRQSPSSVLRDRSSVIIPGAKPASPA RRTPHSGAAEEDSSASAPPSRLSPPHGGSSRLLPTQPHLSSPLSKGG KDGEDAPATNSNAPSRSTMSSSVSSHLSSRTQVSEGAEASDGESHG DGDREDGGRQAEATAQTLRARPASGHFHLLRHKPFAANGRSPSRF SIGRGPRLQPSSSPQSTVPSRAHPRVPSHSDSHIPKLSSGIHGDEEDEK PLPATVVNDHVPSSSRQPISRGWEDLRRSPQRGASLHRKEPIPENPK STGADTHPQGKYSSLASKAQDVQQSTDADTEGHSPKAQPGSTDRH ASPARPPAARSQQHPSVPRRMTPGRAPQQQPPPPVATSQHHPGPQS RDAGRSPSQPRLSLTQAGRPRPTSQGRSHSSSDPYTASSRGMLPTA LQNQDEDAQGSYDDDSTEVEAQDVRAPAHAARAKEAAASLPKHQ QVESPTGAGAGGDHRSQRGHAASPARPSRPGGPQSRARVPSRAAP GKSEPPSKRPLSSKSQQSVSAEDDEEEDAGFFKGGKEDLLSSSVPK WPSSSTPRGGKDADGSLAKEEREPAIALAPRGGSLAPVKRPLPPPP GSSPRASHVPSRLPPRSAATVSPVAGTHPWPQYTTRAPPGHFSTTP MLSLRQRMMHARFRNPLSRQPARPSYRQGYNGRPNVEGKVLPGS NGKPNGQRIINGPQGTKWVVDLDRGLVLNAEGRYLQDSHGNPLRI KLGGDGRTIVDLEGTPVVSPDGLPLFGQGRHGTPLANAQDKPILSL GGKPLVGLEVIKKTTHIPPTTTMQPTITTTPLPTITTPRPTTATTRRT TTTRRTTTRRPTTTVRTTTRITITTTPTFTTPIPTCPPGTLERHDDDG NLIMSSNGIPECYAEEDEFSGLETDTAVPTEEAYVIYDEDYEFETSR PPTTTEPSTTATTPRVIPEEGAISSFPEEEFDLAGRKRFVAPYVTYLN KDPSAPCSLTDALDHFQVDSLDEIIPNDLKKSDLPPQHAPRNITVVA VEGCHSFVIVDWDKATPGDVVTGYLVYSASYEDFIRNKWSTQASS VTHLPIENLKPNTRYYFKVQAQNPHGYGPISPSVSFVTESDNPLLV VRPPGGEPIWIPFAFKHDPSYTDCHGRQYVKRTWYRKFVGVVLCN SLRYKIYLSDNLKDTFYSIGDSWGRGEDHCQFVDSHLDGRTGPQS YVEALPTIQGYYRQYRQEPVRFGNIGFGTPYYYVGWYECGVSIPG KW |
| Eukaryotic initiation factor 4A-I Variant 2 SEQ ID NO: 41 | MSASQDSRSRDNGPDGMEPEGVIESNWNEIVDSFDDMNLSESLLR GIYAYGFEKPSAIQQRAILPCIKGYDVIAQAQSGTGKTATFAISILQQ IELDLKATQALVLAPTRELAQQIQKVVMALGDYMGASCHACIGGT NVRAEVQKLQMEAPHIIVGTPGRVFDMLNRRYLSPKYIKMFVLDE ADEMLSRGFKDQIYDIFQKLNSNTQVVLLSATMPSDVLEVTKKFM RDPIRILVKKEELTLEGIRQFYINVEREEWKLDTLCDLYETLTITQA VIFINTRRKVDWLTEKMHARDFTVSAMHGDMDQKERDVIMREFR SGSSRVLITTDLLGKLYPQNRSRWTVWP |
| Eukaryotic initiation factor 4A-I Variant 3 SEQ ID NO: 42 | MSASQDSRSRDNGPDGMEPEGVIESNWNEIVDSFDDMNLSESLLR GIYAYGFEKPSAIQQRAILPCIKGYDVIAQAQSGTGKTATFAISILQQ IELDLKATQALVLAPTRELAQQIQKVVMALGDYMGASCHACIGGT NVRAEVQKLQMEAPHIIVGTPGRVFDMLNRRYLSPKYIKMFVLDE ADEMLSRGFKDQIYDIFQKLNSNTQVVLLSATMPSDVLEVTKKFM RDPIRILVKKEELTLEGIRQFYINVEREEWKLDTLCDLYETLTITQA VIFINTRRKVDWLTEKMHARDFTVSAMHGDMDQKERDVIMREFR SGSSRVLITTDLLNRSRWTVWP |
| Eukaryotic initiation factor 4A-I Variant 4 SEQ ID NO: 43 | MEPEGVIESNWNEIVDSFDDMNLSESLLRGIYAYGFEKPSAIQQRAI LPCIKGYDVIAQAQSGTGKTATFAISILQQIELDLKATQALVLAPTR ELAQQIQKVVMALGDYMGASCHACIGGTNVRAEVQKLQMEAPHI IVGTPGRVFDMLNRRYLSPKYIKMFVLDEADEMLSRGFKDQIYDIF QKLNSNTQVVLLSATMPSDVLEVTKKFMRDPIRILVKKEELTLEGI RQFYINVEREEWKLDTLCDLYETLTIT |
| Eukaryotic initiation factor 4A-I Variant 5 SEQ ID NO: 44 | XVVMALGDYMGASCHACIGGTNVRAEVQKLQMEAPHIIVGTPGR VFDMLNRRYLSPKYIKMFVLDEADEMLSRGFKDQIYDIFQKLNSN TQVVLLSATMPSDVLEVTKKFMRDPIRILVKKEELTLEGIRQFYINV EREEWKLDTLCDLYETLTITQAVIFINTRRKVDWLTEKMHARDFT VSAMHGDMDQKERDVIMREFRSGSSRVLITTDLLGKLYPQNRSRW TVWP |

TABLE 1-continued

| Protein name/SEQ ID NO. | Amino acid sequence |
|---|---|
| Eukaryotic initiation factor 4A-I Variant 6 SEQ ID NO: 45 | MSASQDSRSRDNGPDGMEPEGVIESNWNEIVDSFDDMNLSESLLR GIYAYGFEKPSAIQQRAILPCIKGYDVIAQAQSGTGKTATFAISILQQ IELDLKATQALVLAPTRELAQQKVVMALGDYMGASCHACIGGTN VRAEVQKLQMEAPHIIVGTPGRVFDMLNRRYLSPKYIKMFVLDEA DEMLSRGFKDQIYDIFQKLNSNTQVVLLSATMPSDVLEVTKKFMR DPIRILVKKEELTLEGIRQFYINVEREEWKLDTLCDLYETLTITQAVI FINTRRKVDWLTEKMHARDFTVSAM |
| Eukaryotic initiation factor 4A-I Variant 7 SEQ ID NO: 46 | MSASQDSRSRDNGPDGMEPEGVIESNWNEIVDSFDDMNLSESLLR GIYAYGFEKPSAIQQRAILPCIKGYDVIAQAQSGTGKTATFAISILQQ IELDLKATQALVLAPTRELAQQIQKVVMALGDYMGASCHACIGGT NVRAEVQKLQMEAPHIIVGTPGRVFDMLNRRYLSPKYIKMFVLDE ADEMLSRGFKDQIYDIFQKLNSNTQEELTLEGIRQFYINVEREEWK LDTLCDLYETLTITQAVIFINTRRKVDWLTEKMHARDFTVSA |
| Eukaryotic initiation factor 4A-I Variant 8 SEQ ID NO: 47 | MEPEGVIESNWNEIVDSFDDMNLSESLLRGIYAYGFEKPSAIQQRAI LPCIKGYDVIAQAQSGTGKTATFAISILQQIELDLKAT |
| Eukaryotic initiation factor 4A-I Variant 9 SEQ ID NO: 48 | XAWAHCARGRHRPRPPTSGSRDNGPDGMEPEGVIESNWNEIVDSF DDMNLSESLLRGIYAYGFEKPSAIQQRAILPCIKGYDVIAQAQSGTG KTATFAISILQQIELDLKATQALVLAPTRELAQQIQKVVMALGDYM GASCHACIGGTNVRAEVQKLQMEAPHIIVGTPGRVFDMLNRRYLS PKYIKMFVLDEADEMLSRGFKDQIYDIFQKL |
| Eukaryotic initiation factor 4A-I Variant 10 SEQ ID NO: 49 | MSASQDSRDNGPDGMEPEGVIESNWNEIVDSFDDMNLSESLLRGI YAYGFEKPSAIQQRAILPCIKGYDVIAQAQSGTGKTATFAISILQQIE LDLKATQALVLAPTRELAQQIQKVVMALGDYMGASCHACIGGTN VRAEVQKLQMEAPHIIVGTPGRVFDMLNRRYLSPKYIKMFVLDEA DEMLS |
| Eukaryotic initiation factor 4A-I Variant 11 SEQ ID NO: 50 | MNLSESLLRGIYAYGFEKPSAIQQRAILPCIKGYDVIAQAQSGTGKT ATFAISILQQIELDLKATQALVLAPTRELAQQIQKVVMALGDYMG ASCHACIGGTNVRAEVQKLQMEAPHIIVGTPGRVFDMLNRRYLSP KYIKMFVLDEADEMLSRGFKDQIYDI |
| Eukaryotic initiation factor 4A-I Variant 12 SEQ ID NO: 51 | MNLSESLLRGIYAYGFEKPSAIQQRAILPCIKGYDVIAQAQSGTGKT ATFAISILQQIELDLKATQALVLAPTRELAQQIQKVVMALGDYMG ASCHACIGGTNVRAEVQKLQMEAPHIIVGTPGRVFDMLNRRY |
| Eukaryotic initiation factor 4A-I Variant 13 SEQ ID NO: 52 | MFVLDEADEMLSRGFKDQIYDIFQKLNSNTQVVLLSATMPSDVLE VTKKFMRDPIRILVKKEELTLEGIRQFYINVEREEWKLDTLCDLYE TLTITQAVIFINTRRKVDWLTEKMHA |
| Eukaryotic initiation factor 4A-I Variant 14 SEQ ID NO: 53 | MGRSTFLRGSRDNGPDGMEPEGVIESNWNEIVDSFDDMNLSESLL RGIYAYGFEKPSAIQQRAILPCIKGYDVIAQAQSGTGKTA |
| L-lactate dehydrogenase chain B Variant 2 SEQ ID NO: 54 | MATLKEKLIAPVAEEEATVPNNKITVVGVGQVGMACAISILGKSLA DELALVDVLEDKLKGEMMDLQHGSLFLQTPKIVADKDYSVTANS KIVVVTAGVRQQEGESRLNLVQRNVNVFKFIIPQIVKYSPDCIIIVVS NPVDILTYVTWKLSGLPKHRVIGSGCNLDSARFRYLMAEKLGIHPS SCHGWILGEHGDSSVAVWSGVNVAGVSLQELNPEMGTDNDSEN WKEVHKMVVESAYEVIKLKGYTNWAIGLSVADLIESMLKNLSRIH PVSTMVKGMYGIENEVFLSLPCILNARGLTSVINQKLKDDEVAQLK KSADTLWDIQKDLKDL |
| L-lactate dehydrogenase chain B Variant 3 SEQ ID NO: 55 | MATLKEKLIAPVAEEEATVPNNKITVVGVGQVGMACAISILGKSLA DELALVDVLEDKLKGEMMDLQHGSLFLQTPKIVADKDYSVTANS KIVVVTAGVRQQEGESRLNLVQRNVNVFKFIIPQIVKYSPDCIIIVVS NPVDILTYVTWKLSGLPKHRVIGSGCNLDSARFRYLMAEKLGIHPS SCHGWILGEHGDSSVAVWSGVNVAGVSLQELNPEMGTDNDSEN WKEVHKMVVESAYEVIKLKGYTNWAIGLSVADLIESMLKNLSRIH PVSTMVKGMYGIENEVFLSLPCILNARGLTSVINQKLKDDEVAQLK KSADTLWDIQKDLKDLXLVSSRL |
| L-lactate dehydrogenase chain B Variant 4 SEQ ID NO: 56 | MATLKEKLIAPVAEEEATVPNNKITVVGVGQVGMACAISILGKSLA DELALVDVLEDKLKGEMMDLQHGSLFLQTPKIVADKDYSVTANS KIVVVTAGVRQQEGESRLNLVQRNVNVFKFIIPQIVKYSPDCIIIVVS NPVDILTYVTWKLSGLPKHRVIGSGCNLDSARFRYLMAEKLGIHPS SCHGWILGEHGDSSVAVWSGVNVAGVSLQELNPEMGTDNDSEN WKEVH |

TABLE 1-continued

| Protein name/SEQ ID NO. | Amino acid sequence |
|---|---|
| L-lactate dehydrogenase chain B Variant 5 SEQ ID NO: 57 | MATLKEKLIAPVAEEEATVPNNKITVVGVGQVGMACAISILGKSLA DELALVDVLEDKLKGEMMDLQHGSLFLQTPKIVADKDYSVTANS KIVVVTAGVRQQEGESRLNLVQRNVNVFKFIIPQIVKYSPDCIIIV |
| L-lactate dehydrogenase chain B Variant 6 SEQ ID NO: 58 | MATLKEKLIAPVAEEEATVPNNKITVVGVGQVGMACAISILGKSLA DELALVDVLEDKLKGEMMDLQHGSLFLQTPKIVADKDYSVTANS KIVVVTAGVRQQ |
| Nuclear heterogeneous Ribonucleoprotein A1 Variant 2 SEQ ID NO: 59 | MSKSESPKEPEQLRKLFIGGLSFETTDESLRSHFEQWGTLTDCVVM RDPNTKRSRGFGFVTYATVEEVDAAMNARPHKVDGRVVEPKRAV SREDSQRPGAHLTVKKIFVGGIKEDTEEHHLRDYFEQYGKIEVIEIM TDRGSGKKRGFAFVTFDDHDSVDKIVIQKYHTVNGIINCEVRKALS KQEMASASSSQRGRSGSGNFGGSRGGGFGGNDNFGRGGNFSGRG GFGGSRGGGGYGGSGDYNGFGNDGSNFGGGGSYNDFGNYNNQ SSNFGPMKGGNFGGRSSGPYGGGGQYFAKPRNQGGYGGSSSSSSY GSGRRF |
| Nuclear heterogeneous Ribonucleoprotein A1 Variant 3 SEQ ID NO: 60 | MSKSESPKEPEQLRKLFIGGLSFETTDESLRSHFEQWGTLTDCVVM RDPNTKRSRGFGFVTYATVEEVDAAMNARPHKVDGRVVEPKRAV SREDSQRPGAHLTVKKIFVGGIKEDTEEHHLRDYFEQYGKIEVIEIM TDRGSGKKRGFAFVTFDDHDSVDKIVIQKYHTVNGIINCEVRKALS KQEMASASSSQRGRSGSGNFGGGSYNDFGNYNNQSSNFGPMKGG NFGGRSSGPYGGGGQYFAKPRNQGGYGGSSSSSSYGSGRRF |
| Nuclear heterogeneous Ribonucleoprotein A1 Variant 4 SEQ ID NO: 61 | MSKSESPKEPEQLRKLFIGGLSFETTDESLRSHFEQWGTLTDCVVM RDPNTKRSRGFGFVTYATVEEVDAAMNARPHKVDGRVVEPKRAV SREDSQRPGAHLTVKKIFVGGIKEDTEEHHLRDYFEQYGKIEVIEIM TDRGSGKKRGFAFVTFDDHDSVDKIVIQKYHTVNGIINCEVRKALS KQEMASASSSQRGRSGSGNFGGSRGGGFGGNDNFGRGGNFSGRG IGDGYNGFGNDGSNFGGGGSYNDFGNYNNQSSNFGPMKGGNFGG RSSGPYGGGGQYFAKPRNQGGYGGSSSSSSYGSGRRF |
| Nuclear heterogeneous Ribonucleoprotein A1 Variant 5 SEQ ID NO: 62 | KIEVIEIMTDRGSGKKRGFAFVTFDDHDSVDKIVIQKYHTVNGHNIC EVRKALSKQEMASASSSQRGRSGSGNFGGGRGGGFGGNDNFGRG GNFSGRGGFGGSRGGGGYGGSGDYNGFGNDGSNFGGGGSYNDF GNYNNQSSNFGPMKGGNFGGRSSGPYGGGGQYFAKPRNQGGYG GSSSSSSYGSGRRF |
| Nuclear heterogeneous Ribonucleoprotein A1 Variant 6 SEQ ID NO: 63 | MRDSLLVAKFLGTQDLCLFLNLALSPKEPEQLRKLFIGGLSFETTDE SLRSHFEQWGTLTDCVVMRDPNTKRSRGFGFVTYATVEEVDAAM NARPHKVDGRVVEPKRAVSREDSQRPGAHLTVKKIFVGGIKEDTE EHHLRDYFEQYGKIEVIEIMTDRGSGKKRGFAFVTFDDHDSVDKIV IQKYHTVNGIINCEVRKALSKQEMASASSSQRGRSGSGNFGGGRG GGFGG |
| Nuclear heterogeneous Ribonucleoprotein A1 Variant 7 SEQ ID NO: 64 | MRDPNTKRSRGFGFVTYATVEEVDAAMNARPHKVDGRVVEPKR AVSREDSQRPGAHLTVKKIFVGGIKEDTEEHHLRDYFEQYGKIEVI EIMTDRGSGKKRGFAFVTFDDHDS |
| Nuclear heterogeneous Ribonucleoprotein A1 Variant 8 SEQ ID NO: 65 | MSKSESPKEPEQLRKLFIGGLSFETTDESLRSHFEQWGTLTDCVVM RDPNTKRSRGFGFVTYATVEEVDAAMNARPHKVDGRVVEPKRAV SREDSQRPGAHLTVKKIFVGGFGGSRGGGGYGGSGDYNGFGND GSNFGGGGSYNDFGNYNNQSSN |
| Nuclear heterogeneous Ribonucleoprotein A1 Variant 9 SEQ ID NO: 66 | MSKSESPKEPEQLRKLFIGGLSFETTDESLRSHFEQWGTLTDCVDS QRPGAHLTVKKIFVGGIKEDTEEHHLRDYFEQYGKIEVIEIMTDRG SGKKRGFAFVTFDDHDSVDKIVIQKYHTVNGHNCEVRKALSKQE MASASSSQR |
| Polycystic kidney disease protein 1-like 1 Variant 2 SEQ ID NO: 67 | XSRLRASMWIDRSTRAVSVHFTLYNPPTQLFTSVSLRVEILPTGSLV PSSLVESFSIFRSDSALQYHLMLPQLVFLALSLIHLCVQLYRNIMDK GVLSYWRKPRNWLELSVVGVSLTYYAVSGHLVTLAGDVTNQFHR GLCRAFMDLTLMASWNQRARWLRGILLFLFTLKCVYLPGIQNTM ASCSSMIMRHSLPSIFVAGLVGALMLAALSHLHRFLLSMWVLPPGT FTDAFPGLLFHFPRRSQKDCLLGLSKSDQRAMACYFGILLIVSATL CFGMLRGFLMTLPQKRKSFQSKSFVRLKDVTAYMWEKVLTFLRL ETPKLEEAEMVENIANYYLDEFANLLDELLMKINGLSDSLQLPLLE KTSNNTGEARTEESPLVDISSYQAAESLTLVTQTEVQWHDLGSLQP PHPRFKQFSCLSLPSSWDYRRVPLCLANF |
| Polycystic kidney disease protein 1-like 1 Variant 3 SEQ ID NO: 68 | XVGGPENPYLIDPENQNVTLNGPGGCGTREDCVLSLGRTRTEAHT ALSRLRASMWIDRSTRAVSVHFTLYNPPTQLFTSVSLRVEILPTGSL VPSSLVESFSIFRSDSALQYHLMLPQLVFLALSLIHLCVQLYRMMD KGVLSYWRKPRNWLEVASLVSFSFEK |
| Heat shock protein cognate 71 kDa Variant 2 | MSKGPAVGIDLGTTYSCVGVFQHGKVEIIANDQGNRTTPSYVAFT DTERLIGDAAKNQVAMNPTNTVFDAKRLIGRRFDDAVVQSDMKH |

TABLE 1-continued

| Protein name/SEQ ID NO. | Amino acid sequence |
|---|---|
| SEQ ID NO: 69 | WPFMVVNDAGRPKVQVEYKGETKSFYPEEVSSMVLTKMKEIAEA YLGKTVTNAVVTVPAYFNDSQRQATKDAGTIAGLNVLRIINEPTA AAIAYGLDKKVGAERNVLIFDLGGGTFDVSILTIEDGIFEVKSTAGD THLGGEDFDNRMVNHFIAEFKRKHKKDISENKRAVRRLRTACERA KRTLSSSTQASIEIDSLYEGIDFYTSITRARFEELNADLFRGTLDPVE KALRDAKLDKSQIHDIVLVGGSTRIPKIQKLLQDFFNGKELNKSINP DEAVAYGAAVQAAILSGDKSENVQDLLLLDVTPLSLGIETAGGVM TVLIKRNTTIPTKQTQTFTTYSDNQPGVLIQVYEGERAMTKDNNLL GKFELTGIPPAPRGVPQIEVTFDIDANGILNVSAVDKSTGKENKITIT NDKGRLSKEDIERMVQEAEKYKAEDEKQRDKVSSKNSLESYAFN MKATVEDEKLQGKINDEDKQKILDKCNEIINWLDKNQTAEKEEFE HQQKELEKVCNPIITKLYQSAGGMPGGMPGGFPGGGAPPSGGASS GPTIEEVD |
| Heat shock protein cognate 71 kDa Variant 3 SEQ ID NO: 70 | MSKGPAVGIDLGTTYSCVGVFQHGKVEIIANDQGNRTTPSYVAFT DTERLIGDAAKNQVAMNPTNTVFDAKRLIGRRFDDAVVQSDMKH WPFMVVNDAGRPKVQVEYKGETKSFYPEEVSSMVLTKMKEIAEA YLGKTVTNAVVTVPAYFNDSQRQATKDAGTIAGLNVLRIINEPTA AAIAYGLDKKVGAERNVLIFDLGGGTFDVSILTIEDGIFEVKSTAGD THLGGEDFDNRMVNHFIAEFKRKHKKDISENKRAVRRLRTACERA KRTLSSSTQASIEIDSLYEGIDFYTSITRARFEELNADLFRGTLDPVE KALRDAKLDKSQIHDIVLVGGSTRIPKIQKLLQDFFNGKELNKSINP DEAVAYGAAVQAAILSGDKSENVQDLLLLDVTPLSLGIETAGGVM TVLIKRNTTIPTKQTQTFTTYSDNQPGVLIQVYEGERAMTKDNNLL GKFELTGIPPAPRGVPQIEVTFDIDANGILNVSAVDKSTGKENKITIT NDKGRLSKEDIERMVQEAEKYKAEDEKQRDKVSSKNSLESYAFN MKATVEDEKLQGKINDEDKQKILDKCNEIINWLDKNQTAEKEEFE HQQKELEKVCNPIITKLYQSAGGMPGGMPGGFPGGGAPPSGGASS GPTIEEVD |
| Heat shock protein cognate 71 kDa Variant 4 SEQ ID NO: 71 | MSKGPAVGIDLGTTYSCVGVFQHGKVEIIANDQGNRTTPSYVAFT DTERLIGDAAKNQVAMNPTNTVFDAKRLIGRRFDDAVVQSDMKH WPFMVVNDAGRPKVQVEYKGETKSFYPEEVSSMVLTKMKEIAEA YLGKTVTNAVVTVPAYFNDSQRQATKDAGTIAGLNVLRIINEPTA AAIAYGLDKKVGAERNVLIFDLGGGTFDVSILTIEDGIFEVKSTAGD THLGGEDFDNRMVNHFIAEFKRKHKKDISENKRAVRRLRTACERA KRTLSSSTQASIEIDSLYEGIDFYTSITRARFEELNADLFRGTLDPVE KALRDAKLDKSQIHDIVLVGGSTRIPKIQKLLQDFFNGKELNKSINP DEAVAYGAAVQAAILSGDKSENVQDLLLLDVTPLSLGIETAGGVM TVLIKRNTTIPTKQTQTFTTYSDNQPGVLIQVYEGERAMTKDNNLL GKFELTGMPGGMPGGFPGGGAPPSGGASSGPTIEEVD |
| Heat shock protein cognate 71 kDa Variant 5 SEQ ID NO: 72 | MSKGPAVGIDLGTTYSCVGVFQHGKVEIIANDQGNRTTPSYVAFT DTERLIGDAAKNQVAMNPTNTVFDAKRLIGRRFDDAVVQSDMKH WPFMVVNDAGRPKVQVEYKGETKSFYPEEVSSMVLTKMKEIAEA YLGKATKDAGTIAGLNVLRIINEPTAAAIAYGLDKKVGAERNVLIF DLGGGTFDVSILTIEDGIFEVKSTAGDTHLGGEDFDNRMVNHFIAE FKRKHKKDISENKRAVRRLRTACERAKRTLSSSTQASIEIDSLYEGI DFYTSITRARFEELNADLFRGTLDPVEKALRDAKLDKSQIHDIVLV GGSTRIPKIQKLLQDFFNGKELNKSINPDEAVAYGAAVQAAILSGD KSENVQDLLLLDVTPLSLGIETAGGVMTVLIKRNTTIPTKQTQTFTT YSDNQPGVLIQVYEGERAMTKDNNLLGKFELTGIPPAPRGVPQIEV TFDIDANGILNVSAVDKSTGKENKITITNDKGRLSKEDIERMVQEA EKYKAEDEKQRDKVSSKNSLESYAFNMKATVEDEKLQGKINDED KQKILDKCNEIINWLDKNQTAEKEEFEHQQKELEKVCNPITTKLYQ SAGGMPGGMPGGFPGGGAPPSGGASSGPTIEEVD |
| Heat shock protein cognate 71 kDa Variant 6 SEQ ID NO: 73 | MVNHFIAEFKRKHKKDISENKRAVRRLRTACERAKRTLSSSTQASI EIDSLYEGIDFYTSITRARFEELNADLFRGTLDPVEKALRDAKLDKS QIHDIVLVGGSTRIPKIQKLLQDFFNGKELNKSINPDEAVAYGAAV QAAILSGDKSENVQDLLLLDVTPLSLGIETAGGVMTVLIKRNTTIPT KQTQTFTTYSDNQPGVLIQVYEGERAMTKDNNLLGKFELTGIPPAP RGVPQIEVTFDIDANGILNVSAVDKSTGKENKITITNDKGRLSKEDI ERMVQEAEKYKAEDEKQRDKVSSKNSLESYAFNMKATVEDEKLQ GKINDEDKQKILDKCNEIINWLDKNQTAEKEEFEHQQKELEKVCN PITTKLYQSAGGMPGGMPGGFPGGGAPPSGGASSGPTIEEVD |
| Heat shock protein cognate 71 kDa Variant 7 SEQ ID NO: 74 | MSKGPAVGIDLGTTYSCVGVFQHGKVEIIANDQGNRTTPSYVAFT DTERLIGDAAKNQVAMNPTNTVFDAKRLIGRRFDDAVVQSDMKH WPFMVVNDAGRPKHKKDISENKRAVRRLRTACERAKRTLSSSTQ ASIEIDSLYEGIDFYTSITRARFEELNADLFRGTLDPVEKALRDAKL DKSQIHDIVLVGGSTRIPKIQKLLQDFFNGKELNKSINPDEAVAYGA AVQAAILSGDKSENVQDLLLLDVTPLSLGIETAGGVMTVLIKRNTT IPTKQTQTFTTYSDNQPGVLIQVYEGERAMTKDNNLLGKFELTGIP PAPRGVPQIEVTFDIDANGILNVSAVDKSTGKENKITITNDKGRLSK EDIERMVQEAEKYKAEDEKQRDKVSSKNSLESYAFNMKATVEDE KLQGKINDEDKQKILDKCNEIINWLDKNQTAEKEEFEHQQKELEK VCNPITTKLYQSAGGMPGGMPGGFPGGGAPPSGGASSGPTIEEVD |

TABLE 1-continued

| Protein name/SEQ ID NO. | Amino acid sequence |
|---|---|
| Heat shock protein cognate 71 kDa Variant 8 SEQ ID NO: 75 | MNPTNTVFDAKRLIGRRFDDAVVQSDMKHWPFMVVNDAGRPKV QVEYKGETKSFYPEEVSSMVLTKMKEIAEAYLGKTVTNAVVTVPA YFNDSQRQATKDAGTIAGLNVLIINEPTAAAIAYGLDKKVGAER NVLIFDLGGGTFDVSILTIEDGIFEVKSTAGDTHLGGEDFDNRMVN HFIAEFKRKHKKDISENKRAVRRLRTACERAKRTLSSSTQASIEIDS LYEGIDFYTSITRARFEELNADLFRGTLDPVEKALRDAKLDKSQIH DIVLVGGSTRIPKIQKLLQDFFNGKELNKSINPDEAVAYG |
| Heat shock protein cognate 71 kDa Variant 9 SEQ ID NO: 76 | MSKGPAVGIDLGTTYSCVGVFQHGKVEIIANDQGNRTTPSYVAFT DTERLIGDAAKNQVAMNPTNTVFDAKRLIGRRFDDAVVQSDMKH WPFMVVNDAGRPKVQVEYKGETKSFYPEEVSSMVLTKMKEIAEA YLGKTVTNAVVTVPAYFNDSQRQATKDAGTIAGLNVLRIINEPTA AAIAYGLDK |
| Heat shock protein cognate 71 kDa Variant 10 SEQ ID NO: 77 | MTVLIKRNTTIPTKQTQTFTTYSDNQPGVLIQVYEGERAMTKDNNL LGKFELTGIPPAPRGVPQIEVTFDIDANGILNVSAVDKSTGKENKITI TNDKGRLSKEDIERMVQEAEKYKAEDEKQRDKVSSKNSLESYAFN MKATVEDEKLQGKINDEDKQKILDKCNEIINWLDKNQTAEKEEFE HQQKELEKVCNPITTKLYQSAGGMPGGMPGGFPGGGAPP |
| Heat shock protein cognate 71 kDa Variant 11 SEQ ID NO: 78 | MTKDNNLLGKFELTGIPPAPRGVPQIEVTFDIDANGILNVSAVDKST GKENKITITNDKGRLSKEDIERMVQEAEKYKAEDEKQRDKVSSKN SLESYAFNMKATVEDEKLQGKINDEDKQKILDKCNEIINWLDKNQ TAEKEEFEHQQKE |
| Heat shock protein cognate 71 kDa Variant 12 SEQ ID NO: 79 | MSKGPAVGIDLGTTYSCVGVFQHGKVEIIANDQGNRTTPSYVAFT DTERLIGDAAKNQVAMNPTNTVFDAKRLIGRRFDDAVVQSDMKH WPFMVVNDAGRPKVQVEYKGETKSFYPEEVSSMVLTKMKEIAEA YLGKTVTNAVVTVPAYFNDSQRQATKDAGTIAGLNVLR |
| Heat shock protein cognate 71 kDa Variant 13 SEQ ID NO: 80 | MSKGPAVGIDLGTTYSCVGVFQHGKVEIIANDQGNRTTPSYVAFT DTERLIGDAAKNQVAMNPTNTVFDAKRLIGRRFDDAVVQSDMKH WPFMVVNDAGRPKVQVEYKGETKSFYPEEVSSMVLTKMKEIAE |
| Heat shock protein cognate 71 kDa Variant 14 SEQ ID NO: 81 | MSKGPAVGIDLGTTYSCVGVFQHGKVEIIANDQGNRTTPSYVAFT DTERLIGDAAKNQVAMNPTNTVFDAKRLIGRRFDDAVVQSDMKH WPFMVVNDAGRPKVQVEYKGETKSFYPEEVSSMVLTKMKEIAEA YLGKTVTNAVVTVPAYFNDSQRQATKDAGTIAGLNVLRIINEPTA AAIAY |
| Heat shock protein cognate 71 kDa Variant 15 SEQ ID NO: 82 | MSKGPAVGIDLGTTYSCVGVFQHGKVEIIANDQGNRTTPSYVAFT DTERLIGDAAKNQVAMNPTNTVFETKSFYPEEVSSMVLTKMKEIA EAYLGKTVTNAVVTVPAYFNDSQRQATKDAGTIAGLNVLRIINEPT AAAIAYGLDKKVGAERNVLIFDLGGGTFDVSI |
| Heat shock protein cognate 71 kDa Variant 16 SEQ ID NO: 83 | MSKGPAVGIDLGTTYSCVGVFQHGKVEIIANDQGNRTTPSYVAFT DTERLIGDAAKNQVAMNPTNTVFDAKRLIGRRFDDAVVQSDMKH WPFMVVNDAGRPKVQVEYKGETKSFYPEEVSSMVLTKMKEIAEA YLGKTVTNAVVTVPAYFNDSQRQATKDAGTIAGLNVLRIINEPTA |
| Heat shock protein cognate 71 kDa Variant 17 SEQ ID NO: 84 | MSKGPAVGIDLGTTYSCVGVFQHGKVEIIANDQGNRTTPSYVAFT DTERLIGDAAKNQVAMNPTNTVFDAKRLIGRRFDDAVVQSDMKH WPFMVVNDAGRPKVQVEYKGETKSFYPEEVSSMVLTKMKEIAEA YLGK |
| Ankyrin-3 Variant 2 SEQ ID NO: 85 | MASSASSSPAGTEDSAPAQGGFGSDYSRSSRKSDANASYLRAARA GHLEKALDYIKNGVDINICNQNGLNALHLASKEGHVEVVSELLQR EANVDAATKKGNTALHIASLAGQAEVVKVLVTNGANVNAQSQN GFTPLYMAAQENHLEVVKFLLDNGASQSLATEDGFTPLAVALQQG HDQVVSLLLENDTKGKVRLPALIIIAARKDDTKAAALLLQNDNNA DVESKSGFTPLIIIAAHYGNINVATLLLNRAAAVDFTARNDITPLHV ASKRGNANMVKLLLDRGAKIDAKTRDGLTPLHCGARSGHEQVVE MLLDRAAPILSKTKNGLSPLHMATQGDHLNCVQLLLQIINVPVDD VTNDYLTALHVAAHCGHYKVAKVLLDKKANPNAKALNGFTPLIII ACKKNRIKVMELLLKHGASIQAVTESGLTPIHVAAFMGHVNIVSQL MHHGASPNTTNVRGETALHMAARSGQAEVVRYLVQDGAQVEAK AKDDQTPLIIISARLGKADIVQQLLQQGASPNAATTSGYTPLHLSAR EGHEDVAAFLLDHGASLSITTKKGFTPLHVAAKYGKLEVANLLLQ KSASPDAAGKSGLTPLHVAAHYDNQKVALLLLDQGASPHAAAKN GYTPLIIIAAKKNQMDIATTLLEYGADANAVTRQGIASVHLAAQEG HVDMVSLLLGRNANVNLSNKSGLTPLHLAAQEDRVNVAEVLVNQ GAHVDAQTKMGYTPLHVGCHYGNIKIVNFLLQHSAKVNAKTKNG YTPLHQAAQQGHTHIINVLLQNNASPNELTVNGNTALGIARRLGYI SVVDDTLKIVTEETMITTTVTEKHKMNVPETMNEVLDMSDDEVRK ANAPAPEMLSDGEYISDVEEGEDAMTGDTDKYLGPQDLKELGDDSLP AEGYMGFSLGARSASLRSFSSDRSYTLNRSSYARDSMMIEELLVPS KEQHLTFTREFDSDSLRHYSWAADTLDNVNLVSSPIHSGFLVSFMV |

TABLE 1-continued

| Protein name/SEQ ID NO. | Amino acid sequence |
|---|---|
| | DARGGSMRGSRHHGMRICIPPRKCTAPTRITCRLVKRHKLANPPPM VEGEGLASRLVEMGPAGAQFLGPVIVEIPHFGSMRGKERELIVLRS ENGETWKEHQFDSKNEDLTELLNGMDEELDSPEELGKKRICRIITK DFPQYFAVVSRIKQESNQIGPEGGILSSTTVPLVQASFPEGALTKRIR VGLQAQPVPDEIVKKILGNKATFSPIVTVEPRRRKFHKPITMTIPVPP PSGEGVSNGYKGDTTPNLRLLCSITGGTSPAQWEDITGTTPLTFIKD CVSFTTNVSARFWLADCHQVLETVGLATQLYRELICVPYMAKFVV FAKMNDPVESSLRCFCMTDDKVDKTLEQQENFEEVARSKDIEVLE GKPIYVDCYGNLAPLTKGGQQLVFNFYSFKENRLPFSIKIRDTSQEP CGRLSFLKEPKTTKGLPQTAVCNLNITLPAHKKIEKTDRRQSFASL ALRKRYSYLTEPGMSPQSPCERTDIRMAIVADHLGLSWTELARELN FSVDEINQIRVENPNSLISQSFMLLKKWVTRDGKNATTDALTSVLT KINRIDIVTLLEGPIFDYGNISGTRSFADENNVFHDPVDGYPSLQVE LETPTGLHYTPPTPFQQDDYFSDISSIESPLRTPSRLSDGLVPSQGNIE HSADGPPVVTAEDASLEDSKLEDSVPLTEMPEAVDVDESQLENVC LSWQNETSSGNLESCAQARRVTGGLLDRLDDSPDQCRDSITSYLK GEAGKFEANGSHTEITPEAKTKSYFPESQNDVGKQSTKETLKPKIH GSGHVEEPASPLAAYQKSLEETSKLIIEETKPCVPVSMKKMSRTSPA DGKPRLSLHEEEGSSGSEQKQGEGFKVKTKKEIRHVEKKSHS |
| Ankyrin-3 Variant 3 SEQ ID NO: 86 | MSEEPKEKNAKPAHRKRKGKKSDANASYLRAARAGHLEKALDYI KNGVDINICNQNGLNALHLASKEGHVEVVSELLQREANVDAATK KGNTALHIASLAGQAEVVKVLVTNGANVNAQSQNGFTPLYMAAQ ENHLEVVKFLLDNGASQSLATEDGFTPLAVALQQGHDQVVSLLLE NDTKGKVRLPALHIAARKDDTKAAALLLQNDNNADVESKSGFTPL HIAAHYGNINVATLLLNRAAAVDFTARNDITPLHVASKRGNANMV KLLLLDRGAKIDAKTRDGLTPLHCGARSGHEQVVEMLLLDRAAPILS KTKNGLSPLHMATQGDHLNCVQLLLQIINVPDDVTNDYLTALHV AAHCGHYKVAKVLLDKKANPNAKALNGFTPLHIACKKNRIKVME LLLKHGASIQAVTESGLTPIHVAAFMGHVNIVSQLMHHGASPNTT NVRGETALHMAARSGQAEVVRYLVQDGAQVEAKAKDDQTPLHIS ARLGKADIVQQLLQQGASPNAATTSGYTPLHLSAREGHEDVAAFL LDHGASLSITTKKGFTPLHVAAKYGKLEVANLLLQKSASPDAAGK SGLTPLHVAAHYDNQKVALLLLDQGASPHAAAKNGYTPLHIAAK KNQMDIATTLLEYGADANAVTRQGIASVHLAAQEGHVDMVSLLL GRNANVNLSNKSGLTPLHLAAQEDRVNVAEVLVNQGAHVDAQT KMGYTPLHVGCHYGNIKIVNFLLQHSAKVNAKTKNGYTPLHQAA QQGHTHIINVLLQNNASPNELTVNGNTALGIARRLGYISVVDTLKI VTEETMTITTVTEKHKMNVPETMNEVLDMSDDEVRKANAPEMLS DGEYISDVEEGNRCTWYKIPKVQEFTVKSEDAMTGDTDKYLGPQD LKELGDDSLPAEGYMGFSLGARSASLRSFSSDRSYTLNRSSYARDS MMTEELLVPSKEQHLTFTREFDSDSLRHYSWAADTLDNVNLVSSPI HSGFLVSFMVDARGGSMRGSRHHGMRHIPPRKCTAPTRITCRLVK RHKLANPPPMVEGEGLASRLVEMGPAGAQFLGPVIVEIPHFGSMR GKERELIVLRSENGETWKEHQFDSKNEDLTELLNGMDEELDSPEEL GKKRICRITTKDFPQYFAVVSRIKQESNQIGPEGGILSSTTVPLVQAS FPEGALTKRIRVGLQAQPVPDEIVKKILGNKATFSPIVTVEPRRRKF HKPITMTIPVPPPSGEGVSNGYKGDTTPNLRLLCSITGGTSPAQWED ITGTTPLTFIKDCVSFTTNVSARFWLADCHQVLETVGLATQLYRELI CVPYMAKFVVFAKMNDPVESSLRCFCMTDDKVDKTLEQQENFEE VARSKDIEVLEGKPIYVDCYGNLAPLTKGGQQLVFNFYSFKENRLP FSIKIRDTSQEPCGRLSFLKEPKTTKGLPQTAVCNLNITLPAHKKIEK TDRRQSFASLALRKRYSYLTEPGMSPQSPCERTDIRMAIVADHLGL SWTELARELNFSVDEINQIRVENPNSLISQSFMLLKKWVTRDGKNA TTDALTSVLTKINRIDIVTLLEGPIFDYGNISGTRSFADENNVFHDPV DGYPSLQVELETPTGLHYTPPTPFQQDDYFSDISSIESPLRTPSRLSD GLVPSQGNIEHSADGPPVVTAEDASLEDSKLEDSVPLTEMPEAVDV DESQLENVCLSWQNETSSGNLESCAQARRVTGGLLDRLDDSPDQC RDSITSYLKGEAGKFEANGSHTEITPEAKTKSYFPESQNDVGKQST KETLKPKIHGSGHVEEPASPLAAYQKSLEETSKLIIEETKPCVPVSM KKMSRTSPADGKPRLSLHEEEGSSGSEQKQGEGFKVKTKKEIRHV EKKSHS |
| Ankyrin-3 Variant 4 SEQ ID NO: 87 | MALPQSEDAMTGDTDKYLGPQDLKELGDDSLPAEGYMGFSLGAR SASLRSFSSDRSYTLNRSSYARDSMMTEELLVPSKEQHLTFTREFDS DSLRHYSWAADTLDNVNLVSSPIHSGFLVSFMVDARGGSMRGSR HHGMRHIPPRKCTAPTRITCRLVKRHKLANPPPMVEGEGLASRLVE MGPAGAQFLGPVIVEIPHFGSMRGKERELIVLRSENGETWKEHQFD SKNEDLTELLNGMDEELDSPEELGKKRICRITTKDFPQYFAVVSRIK QESNQIGPEGGILSSTTVPLVQASFPEGALTKRIRVGLQAQPVPDEI VKKILGNKATFSPIVTVEPRRRKFHKPITMTIPVPPPSGEGVSNGYK GDTTPNLRLLCSITGGTSPAQWEDITGTTPLTFIKDCVSFTTNVSAR FWLADCHQVLETVGLATQLYRELICVPYMAKFVVFAKMNDPVES SLRCFCMTDDKVDKTLEQQENFEEVARSKDIEVLEGKPIYVDCYG NLAPLTKGGQQLVFNFYSFKENRLPFSIKIRDTSQEPCGRLSFLKEP KTTKGLPQTAVCNLNITLPAHKKIEKTDRRQSFASLALRKRYSYLT EPGMSPQSPCERTDIRMAIVADHLGLSWTELARELNFSVDEINQIR VENPNSLISQSFMLLKKWVTRDGKNATTDALTSVLTKINRIDIVTL |

TABLE 1-continued

| Protein name/SEQ ID NO. | Amino acid sequence |
| --- | --- |
| | LEGPIFDYGNISGTRSFADENNVFHDPVDGYPSLQVELETPTGLHY TPPTPFQQDDYFSDISSIESPLRTPSRLSDGLVPSQGNIEHSADGPPV VTAEDASLEDSKLEDSVPLTEMPEAVDVDESQLENVCLSWQNETS SGNLESCAQARRVTGGLLDRLDDSPDQCRDSITSYLKGEAGKFEA NGSHTEITPEAKTKSYFPESQNDVGKQSTKETLKPKIHGSGHVEEP ASPLAAYQKSLEETSKLIIEETKPCVPVSMKKMSRTSPADGKPRLSL HEEEGSSGSEQKQGEGFKVKTKKEIRHVEKKSHS |
| Ankyrin-3 Variant 5 SEQ ID NO: 88 | XFLVSFMVDARGGSMRGSRHHGMRHIPPRKCTAPTRITCRLVKRH KLANPPPMVEGEGLASRLVEMGPAGAQFLGPVIVEIPHFGSMRGK ERELIVLRSENGETWKEHQFDSKNEDLTELLNGMDEELDSPEELGK KRICRITTKDFPQYFAVVSRIKQESNQIGPEGGILSSTTVPLVQASFPE GALTKRIRVGLQAQPVPDEIVKKILGNKATFSPIVTVEPRRRKFHKP ITMTIPVPPPSGEGVSNGYKGDTTPNLRLLCSITGGTSPAQWEDITG TTPLTFIKDCVSFTINVSARFWLADCHQVLETVGLATQLYRELICV PYMAKFVVFAKMNDPVESSLRCFCMTDDKVDKTLEQQENFEEVA RSKDIEVLEGKPIYVDCYGNLAPLTKGGQQLVFNFYSFKENRLPFSI KIRDTSQEPCGRLSFLKEPKTTKGLPQTAVCNLNITLPAHKKIEKTD RRQSFASLALRKRYSYLTEPGMKTVERSTGATRSLPTTYSYKPFFS TRPYQSWTTAPITVPGPAKSGFTSLSSSSSNTPSASPLKSIWSVSTPS PIKSTLGASTTSSVKSISDVASPIRSFRTMSSPIKTVVSQSPYNIQVSS GTLARAPAVTEATPLKGLASNSTFSSRTSPVTTAGSLLERSSITMTP PASPKSNINMYSSSLPFKSIITSAAPLISSPLKSVVSPVKSAVDVISSA KITMASSLSSPVKQMPGHAEVALVNGSISPLKYPSSSTLINGCKATA TLQEKISSATNSVSSVVSAATDTVEKVFSTTTAMPFSPLRSYVSAAP SAFQSLRTPSASALYTSLGSSISATTSSVTSSITIVPVYSVVNVLPEPA LKKLPDSNSFTKSAAALLSPIKTLTTETHPQPHFSRTSSPVKSSLFLA PSALKLSTPSSLSSSQEILKDVAEMKEDLMRMTAILQTDVPEEKPFQ PELPKEGRIDDEEPFKIVEKVKEDLVKVSEILKKDVCVDNKGSPKSP KSDKGHSPEDDWIEFSSEEIREARQQAAASQSPSLPERVQVKAKAA SEKDYNLTKVIDYLTNDIGSSSLTNLKYKFEDAKKDGEERQKRVL KPAIALQEHKLKMPPASMRTSTSEKELCKMADSFFGTDTILESPDD FSQHDQDKSPLSDSGFETRSEKTPSAPQSAESTGPKPLFHEVPIPPVI TETRTEVVHVIRSYDPSAGDVPQTQPEEPVSPKPSPTFMELEPKPTT SSIKEKVKAFQMKASSEEDDIINTRVLSKGMRVKEETHITTTTRMVY HSPPGGEGASERIEETMSVHDIMKAFQSGRDPSKELAGLFEHKSAV SPDVHKSAAETSAQHAEKDNQMKPKLERIIEVIIIEKGPQSPCERTDI RMAIVADHLGLSWTELARELNFSVDEINQIRVENPNSLISQSFMLL KKKWVTRDGKNATTDALTSVLTKINRIDIVTLLEGPIFDYGNISGTRS FADENNVFHDPVDGWQNETSSGNLESCAQARRVTGGLLDRLDDS PDQCRDSITSYLKGEAGKFEANGSHTEITPEAKTKSYFPESQNDVG KQSTKETLKPKIEIGSGHVEEPASPLAAYQKSLEETSKLIIEETKPCV PVSMKKMSRTSPADGKPRLSLHEEEGSSGSEQKQGEGFKVKTKKE IRHVEKKSHS |
| Ankyrin-3 Variant 6 SEQ ID NO: 89 | XPVIVEIPHFGSMRGKERELIVLRSENGETWKEHQFDSKNEDLTEL LNGMDEELDSPEELGKKRICRIITKDFPQYFAVVSRIKQESNQIGPE GGILSSTTVPLVQASFPEGALTKRIRVGLQAQPVPDEIVKKILGNKA TFSPIVTVEPRRRKFHKPITMTIPVPPPSGEGVSNGYKGDTTPNLRL LCSITGGTSPAQWEDITGTTPLTFIKDCVSFTINVSARFWLADCHQ VLETVGLATQLYRELICVPYMAKFVVFAKMNDPVESSLRCFCMTD DKVDKTLEQQENFEEVARSKDIEVLEGKPIYVDCYGNLAPLTKGG QQLVFNFYSFKENRLPFSIKIRDTSQEPCGRLSFLKEPKTTKGLPQT AVCNLNITLPAHKKETESDQDDEIEKTDRRQSFASLALRPQSPCERT DIRMAIVADHLGLSWTELARELNFSVDEINQIRVENPNSLISQSFML LKKKWVTRDGKNATTDALTSVLTKINRIDIVTLLEGPIFDYGNISGTR SFADENNVFHDPVDGYPSLQVELETPTGLHYTPPTPFQQDDYFSDI SSIESPLRTPSRLSDGLVPSQGNIEHSADGPPVVTAEDASLEDSKLE DSVPLTEMPEAVDVDESQLENVCLSEYPQYLGNLAGSPKDVKPAE PRKLGVSSEQQEKGKSGPDEEMMEEKLKSLFEDIQLEEGVESEEMT EEKVQAILKRVQQAELEMSSITGWQNETSSGNLESCAQARRVTGG LLDRLDDSPDQCRDSITSYLKGEAGKFEANGSHTEITPEAKTKSYFP ESQNDVGKQSTKETLKPKIEIGSGHVEEPASPLAAYQKSLEETSKLII EETKPCVPVSMKKMSRTSPADGKPRLSLHEEEGSSGSEQKDLKDS ESDSSSEEERRVTTRVIRRRLIIKGEEEAKNIPGESVTEEQFTDEEGNLI TRKITRKVLRRIVIPQERKRDDVQGEGFKVKTKKEIRHVEKKSHS |
| Ankyrin-3 Variant 7 SEQ ID NO: 90 | PKTTKGLPQTAVCNLNITLPAHKKETESDQDDEIEKTDRRQSFASL ALRKRYSYLTEPGMSPQSPCERTDIRMAIVADHLGLSWTELARELN FSVDEINQIRVENPNSLISQSFMLLKKKWVTRDGKNATTDALTSVLT KINRIDIVTLLEGPIFDYGNISGTRSFADENNVFHDPVDGYPSLQVE LETPTGLHYTPPTPFQQDDYFSDISSIESPLRTPSRLSDGLVPSQGNIE HSADGPPVVTAEDASLEDSKLEDSVPLTEMPEAVDVDESQLENVC LSWQNETSSGNLESCAQARRVTGGLLDRLDDSPDQCRDSITSYLK GEAGKFEANGSHTEITPEAKTKSYFPESQNDVGKQSTKETLKPKIH GSGHVEEPASPLAAYQKSLEETSKLIIEETKPCVPVSMKKMSRTSPA DGKPRLSLHEEEGSSGSEQKQGEGFKVKTKKEIRHVEKKSHS |

TABLE 1-continued

| Protein name/SEQ ID NO. | Amino acid sequence |
| --- | --- |
| Ankyrin-3 Variant 8 SEQ ID NO: 91 | XLARELNFSVDEINQIRVENPNSLISQSFMLLKKWVTRDGKNATTD ALTSVLTKINRIDIVTLLEGPIFDYGNISGTRSFADENNVFHDPVDG NRI |
| Ankyrin-3 Variant 9 SEQ ID NO: 92 | XGPDEDKPPSKSSSSEKTPDKTDQKSGAQFFTLEGRHPDRSVFPDT YFSYKVDEEFATPFKTVATKGLDFDPWSNNRGDDEVFDSKSREDE TKPFGLAVEDRSPATTPDTTPARTPTDESTFTSEPNPFPFHEGKMFE MTRSGAIDMSKRDFVEERLQFFQIGPQSPCERTDIRMAIVADHLGL SWTELARELNFSVDEINQIRVENPNSLISQSFMLLKKWVTRDGKNA TTDALTSVLTKINRIDIVTLLEGPIFDYGNISGTRSFADENNVFHDPV DGWQNETSSGNLESCAQARRVTGGLLDRLDDSPDQCRDSITSYL |
| Ankyrin-3 Variant 10 SEQ ID NO: 93 | MAVEEGESFPEQSDANASYLRAARAGHLEKALDYIKNGVDINICN QNGLNALHLASKEGHVEVVSELLQREANVDAATKKGNTALIITAS LAGQAEVVKVLVTNGANVNAQSQNGFTPLYMAAQENHLEVVKF LLDNGASQSLATEDGFTPLAVALQQGHDQVVSLLLENDTKGKVRL PALIIIAARKDDTKAAALLLQNDNNADVESKSGFTPLHAAHYGNI NVATLLLNRAAAVDFTARNDITPLHVASKRGNANMVKLLLDRGA KIDAKTR |
| Ankyrin-3 Variant 11 SEQ ID NO: 94 | MAVEEGESFPEQSDANASYLRAARAGHLEKALDYIKNGVDINICN QNGLNALHLASKEGHVEVVSELLQREANVDAATKKGNTALIITAS LAGQAEVVKVLVTNGANVNAQSQNGFTPLYMAAQENHLEVVKF LLDNGASQSLATEDGFTPLAVALQQGHDQVVSLLLENDTKGKVRL PALIIIAARKDDTKAAALLLQNDNNADVESKSGFTPLHAAHYGNI NVATLLLNRAAAVDFTARNDITPLHVASKRGNANMVKLLLDRGA KIDAKTR |
| Ankyrin-3 Variant 12 SEQ ID NO: 95 | XTVATKGLDFDPWSNNRGDDEVFDSKSREDETKPFGLAVEDRSPA TTPDTTPARTPTDESTPTSEPNPFPFHEGKMFEMTRSGAIDMSKRDF VEERLQFFQIGPQSPCERTDIRMAIVADHLGLSWTELARELNFSVD EINQIRVENPNSLISQSFMLLKKWVTRDGKNATTDALTSVLTKINRI DIVTLLEGPIFDYGNISGTRSFADENNVFHDPVDGYPSLQVELETPT GLHYTPPTP |
| Ankyrin-3 Variant 13 SEQ ID NO: 96 | XWQNETSSGNLESCAQARRVTGGLLDRLDDSPDQCRDSITSYLKG EAGKFEANGSHTEITPEAKTKSYFPESQNDVGKQSTKETLKPKIHG SGHVEEPASPLAAYQKSLEETSKLIIEETKPCVPVSMKKMSRTSPAD GKPRLSLHEEEGSSGSEQKGEGFKVKTKKEIRHVEKKSHS |
| Ankyrin-3 Variant 14 SEQ ID NO: 97 | MNVPETMNEVLDMSDDEGNRCTWYKIPKVQEFTVKSEDAMTGD TDKYLGPQDLKELGDDSLPAEGYMGFSLGARSARYFVVAVFHS |
| Ankyrin-3 Variant 15 SEQ ID NO: 98 | MTGDTDKYLGPQDLKELGDDSLPAEGYMGFSLGARSASLRSFSSD RSYTLNRSSYARDSMMTEELLVPSKEQHLTFTREFDSDSLRHYSWA ADTLDNVNLVSSPIHSGFLVSFMVDARGGSMRGSRHHGMRIUPPR KCTAPTRITCRLVKRHKLANPPPMVEGEGLASRLVEMGPAGAQFL GPVIVEIPHFGSM |
| Ankyrin-3 Variant 16 SEQ ID NO: 99 | SPDQCRDSITSYLKGEAGKFEANGSHTEITPEAKTKSYFPESQNDV GKQSTKETLKPKIHGSGHVEEPASPLAAYQKSLEETSKLIIEETKPC VPVSMKKMSRTSPADGKPRLSLHEEEGSSGSEQKVKSPGAAPTRM TACCYKQGEGFKVKTKKEIRHVEKKSHS |
| Ankyrin-3 Variant 17 SEQ ID NO: 100 | XLARELNFSVDEINQIRVENPNSLISQSFMLLKKWVTRDGKNATTD ALTSVLTKINRIDIVTLLEGPIFDYGNISGTRSFADENNVFHDPVDVS PNVLSSIGYPSLQVELETPTGLHYTPPTPFQQDDYFSDISSIESPLRTP SRLSDGLVPSQGNIEHSADGPPVVTAEDASLEDSKLEDSVPLTEMP EAVDVDESQLENVCLSWQNETSSGNLES |
| Ankyrin-3 Variant 18 SEQ ID NO: 101 | XEDAMTGDTDKYLGPQDLKELGDDSLPAEGYMGFSLGARSASPKI SLRSFSSDRSYTLNRSSYARDSMMTEELLVPSKEQHLTFTREFDSDS LRHYSWAADTLDNVNLVSSPIHSGYSSPLPQYDSRFLVSFMVDAR GGSMRGSRHHGMRICIPPRKCTAPTRITCRLVKRHKLANPPPMVEG EGLASRLVEMGPAGAQFL |
| Ankyrin-3 Variant 19 SEQ ID NO: 102 | XSSPIHSGFLVSFMVDARGGSMRGSRHHGMRICIPPRKCTAPTRITC RLVKRHKLANPPPMVEGEGLASRLVEMGPAGAQFLGKLHLPTNPP PVNEGESLVSRILQLGPQGTKFIGPVIVEIPHFGSMRGKERELIVLRS ENGETWKEHQFDSKNEDLTELLNGMDEELDSPEELGKKRICRIITK DFPQYFAVVS |

TABLE 1-continued

| Protein name/SEQ ID NO. | Amino acid sequence |
|---|---|
| Ankyrin-3 Variant 20 SEQ ID NO: 103 | MTGDTDKYLGPQDLKELGDDSLPAEGYMGFSLGARSASLRSFSSD RSYTLNRSSYARDSMMTEELLVPSKEQ |
| Ankyrin-3 Variant 21 SEQ ID NO: 104 | XIEKTDRRQSFASLALRKRYSYLTEPGMSPQSPCERTDIRMAIVAD HLGLSWTELARELNFSVDEINQIRVENPNSLISQSFMLLKKWVTRD GKNATTDALTSVLTKINRIDIVTLLEGPIFDYGNISGTRSFADENNV FHDPVDDGPPVVTAEDASLEDSKLEDSVPLTEMPEAVDVDESQLE NVC |
| Ankyrin-3 Variant 22 SEQ ID NO: 105 | XSPLAAYQKSLEETSKLIIEETKPCVPVSMKKMSRTSPADGKPRLSL HEEEGSSGSEQKVKSPGAAPTRMTACCYKDLKDSESDSSSEEERR VTTRVIRRRLIIKGEEAKNIPGESVTEEQFTDEEGNLITRKITRKVLR RIVIPQERKRDDVQGEGFKVKTKKEIRHVEKKSHS |
| Ankyrin-3 Variant 23 SEQ ID NO: 106 | MTGDTDKYLGPQDLKELGDDSLPAEGYMGFSLGARSASLRSFSSD RSYTLNRSSYARDSMMTEELLVPSKEQHLTFTREFDSDSLRHYSWA ADTLDNVNLVSSPIHSGFLVSFMVDARGGSMRGSRHHGMRIUPPR KCTAPTRITCRLVKRHKLANPP |
| Ankyrin-3 Variant 24 SEQ ID NO: 107 | MTGDTDKYLGPQDLKELGDDSLPAEGYMGFSLGARSASHAASTV AKELTDKTGRTNLSHIFQN |
| Rho GTPase-activating protein 32 Variant 2 SEQ ID NO: 108 | MKSRPTKQKLKQRGILKERVFGCDLGEHLLNSGFEVPQVLQSCTA FIERYGIVDGIYRLSGVASNIQRLRHEFDSEHVPDLTKEPYVQDIHS VGSLCKLYFRELPNPLLTYQLYEKFSDAVSAATDEERLIKIHDVIQQ LPPPHYRTLEFLMRHLSLLADYCSITNMHAKNLAIVWAPNLLRSK QIESACFSGTAAFMEVRIQSVVVEFILNHVDVLFSGRISMAMQEGA ASLSRPKSLLVSSPSTKLLTLEEAQARTQAQVNSPIVTENKYIEVGE GPAALQGKFHTBEFPPLERKRPQNKMKKSPVGSWRSFFNLGKSSSV SKRKLQRNESEPSEMKAMALKGGRAEGTLRSAKSEESLTSLHAVD GDSKLFRPRRPRSSSDALSASFNGEMLGNRCNSYDNLPHDNESEEE GGLLHIPALMSPHSAEDVDLSPPDIGVASLDFDPMSFQCSPPKAESE CLESGASFLDSPGYSKDKPSANKKDAETGSSQCQTPGSTASSEPVS PLQEKLSPFFTLDLSPTEDKSSKPSSFTEKVVYAFSPKIGRKLSKSPS MSISEPISVTLPPRVSEVIGTVSNTTAQNASSSTWDKCVEERDATNR SPTQIVKMKTNETVAQEAYESEVQPLDQVAAEEVELPGKEDQSVS SSQSKAVASGQTQTGAVTHDPPQDSVPVSSVSLIPPPPPPKNVARM LALALAESAQQASTQSLKRPGTSQAGYTNYGDIAVATTEDNLSSS YSAVALDKAYFQTDRPAEQFHLQNNAPGNCDHPLPETTATGDPTH SNTTESGEQHHQVDLTGNQPHQAYLSGDPEKARITSVPLDSEKSDD HVSFPEDQSGKNSMPTVSFLDQDQSPPRFYSGDQPPSYLGASVDKL HHPLEFADKSPTPPNLPSDKIYPPSGSPEENTSTATMTYMTTTPATA QMSTKEASWDVAEQPTTADFAAATLQRTHRTNRPLPPPPSQRSAE QPPVVGQVQAATNIGLNNSHKVQGVVPVPERPPEPRAMDDPASAF ISDSGAAAAQCPMATAVQPGLPEKVRDGARVPLLHLRAESVPAHP CGFPAPLPPTRMMESKMIAAIHSSSADATSSSNYHSFVTASSTSVD DALPLPLPVPQPKHASQKTVYSSFARPDVTTEPFGPDNCLHFNMTP NCQYRPQSVPPHHNKLEQHQVYGARSEPPASMGLRYNTYVAPGR NASGHHSKPCSRVEYVSSLSSSVRNTCYPEDIPPYPTIRRVQSLHAP PSSMIRSVPISRTEVPPDDEPAYCPRPLYQYKPYQSSQARSDYHVTQ LQPYFENGRVHYRYSPYSSSSSSYYSPDGALCDVDAYGTVQLRPL HRLPNRDFAFYNPRLQGKSLYSYAGLAPRPRANVTGYFSPNDIINV VSMPPAADVKHTYTSWDLEDMEKYRMQSIRRESRARQKVKGPV MSQYDNMTPAVQDDLGGIYVIHLRSKSDPGKTGLLSVAEGKESRH AAKAISPEGEDRFYRRHPEAEMDRAHHHGGHGSTQPEKPSLPQKQ SSLRSRKLPDMGCSLPEHRAHQEASHRQFCESKNGPPYPQGAGQL DYGSKGIPDTSEPVSYHNSGVKYAASGQESLRLNHKEVRLSKEME RPWVRQPSAPEKHSRDCYKEEEHLTQSIVPPPKPERSHSLKLHHTQ NVERDPSVLYQYQPHGKRQSSVTVVSQYDNLEDYHSLPQHQRGV FGGGGMGTYVPPGFPHPQSRTYATALGQGAFLPAELSLQHPETQIH AE |
| Rho GTPase-activating protein 32 Variant 3 SEQ ID NO: 109 | MKSRPTKQKLKQRGILKERVFGCDLGEHLLNSGFEVPQVLQSCTA FIERYGIVDGIYRLSGVASNIQRLRHEFDSEHVPDLTKEPYVQDIHS VGSLCKLYFRELPNPLLTYQLYEKFSDAVSAATDEERLIKIHDVIQQ LPPPHYRTLEFLMRHLSLLADYCSITNMHAKNLAIVWAPNLLRSK QIESACFSGTAAFMEVRIQSVVVEFILNHVDVLFSGRISMAMQEGA ASLSRPKSLLVSSPSTKLLTLEEAQARTQAQVNSPIVTENKYIEVGE GPAALQGKFHTIIEFPLERKRPQNKMKKSPVGSWRSFFNLGKSSSV SKRKLQRNESEPSEMKAMALKGGRAEGTLRSAKSEESLTSLHAVD GDSKLFRPRRPRSSSDALSASFNGEMLGNRCNSYDNLPHDNESEEE GGLLHIPALMSPHSAEDVDLSPPDIGVASLDFDPMSFQCSPPKAESE CLESGASFLDSPGYSKDKPSANKKDAETGSSQCQTPGSTASSEPVS PLQEKLSPFFTLDLSPTEDKSSKPSSFTEKVVYAFSPKIGRKLSKSPS MSISEPISVTLPPRVSEVIGTVSNTTAQNASSSTWDKCVEERDATNR SPTQIVKMKTNETVAQEAYESEVQPLDQVAAEEVELPGKEDQSVS |

TABLE 1-continued

| Protein name/SEQ ID NO. | Amino acid sequence |
| --- | --- |
| | SSQSKAVASGQTQTGAVTHDPPQDSVPVSSVSLIPPPPPPKNVARM LALALAESAQQASTQSLKRPGTSQAGYTNYGDIAVATTEDNLSSS YSAVALDKAYFQTDRPAEQFHLQNNAPGNCDHPLPETTATGDPTH SNTTESGEQHHQVDLTGNQPHQAYLSGDPEKARITSVPLDSEKSDD HVSFPEDQSGKNSMPTVSFLDQDQSPPRFYSGDQPPSYLGASVDKL HHPLEFADKSPTPPNLPSDKIYPPSGSPEENTSTATMTYMTTTPATA QMSTKEASWDVAEQPTTADFAAATLQRTHRTNRPLPPPPSQRSAE QPPVVGQVQAATNIGLNNSHKVQGVVPVPERPPEPRAMDDPASAF ISDSGAAAAQCPMATAVQPGLPEKVRDGARVPLLHLRAESVPAHP CGFPAPLPPTRMMESKMIAAIHSSSADATSSSNYHSFVTASSTSVD DALPLPLPVPQPKHASQKTVYSSFARPDVTTEPFGPDNCLHFNMTP NCQYRPQSVPPHHNKLEQHQVYGARSEPPASMGLRYNTYVAPGR NASGHHSKPCSRVEYVSSLSSSVRNTCYPEDIPPYPTIRRVQSLHAP PSSMIRSVPISRTEVPPDDEPAYCPRPLYQYKPYQSSQARSDYHVTQ LQPYFENGRVHYRYSPYSSSSSSYYSPDGALCDVDAYGTVQLRPL HRLPNRDFAFYNPRLQGKSLYSYAGLAPRPRANVTGYFSPNDIINV VSMPPAADVKHTYTSWDLEDMEKYRMQSIRRESRARQKVKGPV MSQYDNMTPAVQDDLGGIYVIHLRSKSDPGKTGLLSVAEGKESRH AAKAISPEGEDRFYRRHPEAEMDRAHHHGGHGSTQPEKPSLPQKQ SSLRSRKLPDMGCSLPEHRAHQEASHRQFCESKNGPPYPQGAGQL DYGSKGIPDTSEPVSYHNSGVKYAASGQESLRLNHKEVRLSKEME RPWVRQPSAPEKHSRDCYKEEEHLTQSIVPPPKPERSHSLKLHHTQ NVERDPSVLYQYQPHGKRQSSVTVVSQYDNLEDYHSLPQHQRGV FGGGGMGTYVPPGFPHPQSRTYATALGQGAFLPAELSLQIIPETQM AE |
| Rho GTPase-activating protein 32 Variant 4 SEQ ID NO: 110 | MARGADVPEIPGDLTLKTCGSTASMKVKHVKKLPFTKGHFPKMA ECAHFHYENVEFGSIQLSLSEEQNEVMKNGCESKELVYLVQIACQ GKSWIVKRSYEDFRVLDKHLHLCIYDRRFSQLSELPRSDTLKDSPE SVTQMLMAYLSRLSAIAGNKINCGPALTWMEIDNKGNHLLVHEES SINTPAVGAAHVIKRYTARAPDELTLEVGDIVSVIDMPPKVLSTWW RGKHGFQVGLFPGHCVELINQKVPQSVTNSVPKPVSKKHGKLITFL RTFMKSRPTKQKLKQRGILKERVFGCDLGEHLLNSGFEVPQVLQS CTAHERYGIVDGIYRLSGVASNIQRLRHEFDSEHVPDLTKEPYVQD IHSVGSLCKLYFRELPNPLLTYQLYEKFSDAVSAATDEERLIKIHDV IQQLPPPHYRTLEFLMRHLSLLADYCSITNMITAKNLAIVWAPNLLR SKQIESACFSGTAAFMEVRIQSVVVEFILNHVDVLFSGRISMAMQE GAASLSRPKSLLVSSPSTKLLTLEEAQARTQAQVNSPIVTENKYIEV GEGPAALQGKFHTIIEFPLERKRPQNKMKKSPVGSWRSFFNLGKSS SVSKRKLQRNESEPSEMKAMALKGGRAEGTLRSAKSEESLTSLHA VDGDSKLFRPRRPRSSSDALSASFNGEMLGNRCNSYDNLPHDNES EEEGGLLHIPALMSPHSAEDVDLSPPDIGVASLDFDPMSFQCSPPKA ESECLESGASFLDSPGYSKDKPSANKKDAETGSSQCQTPGSTASSE PVSPLQEKLSPFFTLDLSPTEDKSSKPSSFTEKVVYAFSPKIGRKLSK SPSMSISEPISVTLPPRVSEVIGTVSNTTAQNASSSTWDKCVEERDA TNRSPTQIVKMKTNETVAQEAYESEVQPLDQVAAEEVELPGKEDQ SVSSSQSKAVASGQTQTGTVCFPPFFL |
| Rho GTPase-activating protein 32 Variant 5 SEQ ID NO: 111 | MKSSVHSEEDDFVPELHRNVIIPRERPDWEETLSAMARGADVPEIP GDLTLKTCGSTASMKVKHVKKSTTPGLMGCDNIHRLPFTKGHFPK MAECAHFHYENVEFGSIQLSLSEEQNEVMKNGCESKELVYLVQIA CQGKSWIVKRSYEDFRVLDKHLHLCIYDRRFSQLSELPRSDTL |
| Cytoskeletal Keratin 78 type II Variant 2 SEQ ID NO: 112 | MEGHEASPAQVGQGDRGKVRFLEQQNKVLETKWHLLQQQGLSG SQQGLEPVFEACLDQLRKQLEQLQGERGALDAELKACRDQEEEYK SKYEEEAHRRATLENDFVVLKKDVDGVFLSKMELEGKLEALREYL YFLKHLNEEELGQLQTQASDTSVVLSMDNNRYLDFSSITTEVRARY EEIARSSKAEAEALYQTKYQELQVSAQLHGDRMQETKVQISQLHQ EIQRLQSQTENLKKQNASLQAAITDAEQRGELALKDAQAKVDELE AALRMAKQNLARLLCEYQELTSTKLSLDVEIATYRRLLEGEECRM SGECTSQVTISSVGGSAVMSGGVGGGLGSTCGLGSGKGSPGSCCTS IVTGGSNIILGSGKDPVLDSCSVSGSSAGSSCHTILKKTVESSLKTSIT Y |
| Cytoskeletal Keratin 78 type II Variant 3 SEQ ID NO: 113 | XDVEIATYRRLLEGEECSLGGRQRCHVWRSWWRLGEHLWTR |
| Collagen type VI, alpha 3 Variant 2 SEQ ID NO: 114 | MRKHRHLPLVAVFCLFLSGFPTTHAQQQQAAQDSADIIFLIDGSNN TGSVNFAVILDFLVNLLEKLPIGTQQIRVGVVQFSDEPRTMFSLDTY STKAQVLGAVKALGFAGGELANIGLALDFVVENHFTRAGGSRVEE GVPQVLVLISAGPSSDEIRYGVVALKQASVFSFGLGAQAASRAELQ HRTDDNLVFTVPEFRSFGDLQEKLLPYIVGVAQRHWLKPPTIVTQ VIEVNKRDIVFLVDGSSALGLANFNAIRDFIAKVIQRLEIGQDLIQV AVAQYADTVRPEFYFNTHPTKREVITAVRKMKPLDGSALYTGSAL DFVRNNLFTSSAGYRAAEGIPKLLVLITGGKSLDEISQPAQELKRSSI MAFAIGNKGADQAELEEEIAFDSSLVFIPAEFRAAPLQGMLPGLLAP LRTLSGTPEVHSNKRDIIFLLDGSANVGKTNFPYVRDFVMNLVNSL |

TABLE 1-continued

| Protein name/SEQ ID NO. | Amino acid sequence |
|---|---|
| | DIGNDNIRVGLVQFSDTPVTEFSLNTYQTKSDILGHLRQLQLQGGS
GLNTGSALSYVYANHFTEAGGSRIREHVPQLLLLLTAGQSEDSYLQ
AANALTRAGILTFCVGASQANKAELEQIAFNPSLVYLMDDFSSLPA
LPQQLIQPLTTYVSGGVEEVPLAQPESKRDILFLFDGSANLVGQFPV
VRDFLYKIIDELNVKPEGTRIAVAQYSDDVKVESRFDEHQSKPEILN
LVKRMKIKTGKALNLGYALDYAQRYIFVKSAGSRIEDGVLQFLVL
LVAGRSSDRVDGPASNLKQSGVVPFIFQAKNADPAELEQIVLSPAFI
LAAESLPKIGDLHPQIVNLLKSVIINGAPAPVSGEKDVVFLLDGSEG
VRSGFPLLKEFVQRVVESLDVGQDRVRVAVVQYSDRTRPEFYLNS
YMNKQDVVNAVRQLTLLGGPTPNTGAALEFVLRNILVSSAGSRIT
EGVPQLLIVLTADRSGDDVRNPSVVVKRGGAVPIGIGIGNADITEM
QTISFIPDFAVAIPTFRQLGTVQQVISERVTQLTREELSRLQPVLQPL
PSPGVGGKRDVVFLIDGSQSAGPEFQYVRTLIERLVDYLDVGFDTT
RVAVIQFSDDPKVEFLLNAHSSKDEVQNAVQRLRPKGGRQINVGN
ALEYVSRNIFKRPLGSRIEEGVPQFLVLISSGKSDDEVDDPAVELKQ
FGVAPFTIARNADQEELVKISLSPEYVFSVSTFRELPSLEQKLLTPIT
TLTSEQIQKLLASTRYPPPAVESDAADIVFLIDSSEGVRPDGFAHIRD
FVSRIVRRLNIGPSKVRVGVVQFSNDVFPEFYLKTYRSQAPVLDAI
RRLRLRGGSPLNTGKALEFVARNLFVKSAGSRIEDGVPQHLVLVL
GGKSQDDVSRFAQVIRSSGIVSLGVGDRNIDRTELQTITNDPRLVFT
VREFRELPNIEERIMNSFGPSAATPAPPGVDTPPPSRPEKKKADIVFL
LDGSINFRRDSFQEVLRFVSEIVDTVYEDGDSIQVGLVQYNSDPTD
EFFLKDFSTKRQIIDAINKVVYKGGRHANTKVGLEHLRVNHFVPEA
GSRLDQRVPQIAFVITGGKSVEDAQDVSLALTQRGVKVFAVGVRN
IDSEEVGKIASNSATAFRVGNVQELSELSEQVLETLHDAMHETLCP
GVTDAAKACNLDVILGFDGSRDQNVFVAQKGFESKVDAILNRISQ
MHRVSCSGGRSPTVRVSVVANTPSGPVEAFDFDEYQPEMLEKFRN
MRSQUPYVLTEDTLKVYLNKFRQSSPDSVKVVIHFTDGADGDLAD
LHRASENLRQEGVRALILVGLERVVNLERLMHLEFGRGFMYDRPL
RLNLLDLDYELAEQLDNIAEKACCGVPCKCSGQRGDRGPIGSIGPK
GIPGEDGYRGYPGDEGGPGERGPPGVNGTQGFQGCPGQRGVKGSR
GFPGEKGEVGEIGLDGLDGEDGDKGLPGSSGEKGNPGRRGDKGPR
GEKGERGDVGIRGDPGNPGQDSQERGPKGETGDLGPMGVPGRDG
VPGGPGETGKNGGFGRRGPPGAKGNKGGPGQPGFEGEQGTRGAQ
GPAGPAGPPGLIGEQGISGPRGSGGAAGAPGERGRTGPLGRKGEPG
EPGPKGGIGNRGPRGETGDDGRDGVGSEGRRGKKGERGFPGYPGP
KGNPGEPGLNGTTGPKGIRGRRGNSGPPGIVGQKGDPGYPGPAGP
KGNRGDSIDQCALIQSIKDKCPCCYGPLECPVFFPTELAFALDTSEGV
NQDTFGRMRDVVLSIVNDLTIAESNCPRGARVAVVTYNNEVTTEI
RFADSKRKSVLLDKIKNLQVALTSKQQSLETAMSFVARNTFKRVR
NGFLMRKVAVFFSNTPTRASPQLREAVLKLSDAGITPLFLTRQEDR
QLINALQINNTAVGHALVLPAGRDLTDFLENVLTCHVCLDICNIDP
SCGFGSWRPSFRDRRAAGSDVDIDMAFILDSAETTTLFQFNEMKK
YIAYLVRQLDMSPDPKASQHFARVAVVQHAPSESVDNASMPPVK
VEFSLTDYGSKEKLVDFLSRGMTQLQGTRALGSAIEYTIENVFESA
PNPRDLKIVVLMLTGEVPEQQLEEAQRVILQAKCKGYFFVVLGIGR
KVNIKEVYTFASEPNDVFFKLVDKSTELNEEPLMRFGRLLPSFVSSE
NAFYLSPDIRKQCDWFQGDQPTKNLVKFGHKQVNVPNNVTSSPTS
NPVTTTKPVTITKPVTITTKPVTIINQPSVKPAAAKPAPA
KPVAAKPVATKMATVRPPVAVKPATAAKPVAAKPAAVRPPAAAA
AKPVATKPEVRPPQAAKPAATKPATTKPMVKMSREVQVFEITENS
AKLHWERAEPPGPYFYDLTVTSAHDQSLVLKQNLTVTDRVIGGLL
AGQTYHVAVVCYLRSQVRATYHGSFSTKKSQPPPPQPARSASSSTI
NLMVSTEPLALTETDICKLPKDEGTCRDFILKWYYDPNTKSCARF
WYGGCGGNENKFGSQKECEKVCAPVLAKPGVISMGT |
| Collagen type VI, alpha 3
Variant 3
SEQ ID NO: 115 | MRKHRHLPLVAVFCLFLSGFPTTHAQQQQAAQDSADIIFLIDGSNN
TGSVNFAVILDFLVNLLEKLPIGTQQIRVGVVQFSDEPRTMFSLDTY
STKAQVLGAVKALGFAGGELANIGLALDFVVENHFTRAGGSRVEE
GVPQVLVLISAGPSSDEIRYGVVALKQASVFSFGLGAQAASRAELQ
HRTDDNLVFTVPEFRSFGDLQEKLLPYIVGVAQRHWLKPPTIVTQ
VIEVNKRDIVFLVDGSSALGLANFNAIRDFIAKVIQRLEIGQDLIQV
AVAQYADTVRPEFYFNTHPTKREVITAVRKMKPLDGSALYTGSAL
DFVRNNLFTSSAGYRAAEGIPKLLVLITGGKSLDEISQPAQELKRSSI
MAFAIGNKGADQAELEEIAFDSSLVFIPAEFRAAPLQGMLPGLLAP
LRTLSGTPEVHSNKRDIIFLLDGSANVGKTNFPYVRDFVMNLVNSL
DIGNDNIRVGLVQFSDTPVTEFSLNTYQTKSDILGHLRQLQLQGGS
GLNTGSALSYVYANHFTEAGGSRIREHVPQLLLLLTAGQSEDSYLQ
AANALTRAGILTFCVGASQANKAELEQIAFNPSLVYLMDDFSSLPA
LPQQLIQPLTTYVSGGVEEVPLAQPESKRDILFLFDGSANLVGQFPV
VRDFLYKIIDELNVKPEGTRIAVAQYSDDVKVESRFDEHQSKPEILN
LVKRMKIKTGKALNLGYALDYAQRYIFVKSAGSRIEDGVLQFLVL
LVAGRSSDRVDGPASNLKQSGVVPFIFQAKNADPAELEQIVLSPAFI
LAAESLPKIGDLIVQIVNLLKSVIANGAPAPVSGEKDVVFLLDGSEG
VRSGFPLLKEFVQRVVESLDVGQDRVRVAVVQYSDRTRPEFYLNS
YMNKQDVVNAVRQLTLLGGPTPNTGAALEFVLRNILVSSAGSRIT
EGVPQLLIVLTADRSGDDVRNPSVVVKRGGAVPIGIGIGNADITEM
QTISFIPDFAVAIPTFRQLGTVQQVISERVTQLTREELSRLQPVLQPL |

TABLE 1-continued

| Protein name/SEQ ID NO. | Amino acid sequence |
|---|---|
| | PSPGVGGKRDVVFLIDGSQSAGPEFQYVRTLIERLVDYLDVGFDTT
RVAVIQFSDDPKVEFLLNAHSSKDEVQNAVQRLRPKGGRQINVGN
ALEYVSRNIFKRPLGSRIEEGVPQFLVLISSGKSDDEVDDPAVELKQ
FGVAPFTIARNADQEELVKISLSPEYVFSVSTFRELPSLEQKLLTPIT
TLTSEQIQKLLASTRYPPPAVESDAADIVFLIDSSEGVRPDGFAHIRD
FVSRIVRRLNIGPSKVRVGVVQFSNDVFPEFYLKTYRSQAPVLDAI
RRLRLRGGSPLNTGKALEFVARNLFVKSAGSRIEDGVPQHLVLVL
GGKSQDDVSRFAQVIRSSGIVSLGVGDRNIDRTELQTITNDPRLVFT
VREFRELPNIEERIMNSFGPSAATPAPPGVDTPPPSRPEKKKADIVFL
LDGSINFRRDSFQEVLRFVSEIVDTVYEDGDSIQVGLVQYNSDPTD
EPPLKDFSTKRQIIDAINKVVYKGGRHANTKVGLEHLRVNHFVPEA
GSRLDQRVPQIAFVITGGKSVEDAQDVSLALTQRGVKVFAVGVRN
IDSEEVGKIASNSATAFRVGNVQELSELSEQVLETLHDAMHETLCP
GVTDAAKACNLDVILGFDGSRDQNVFVAQKGFESKVDAILNRISQ
MHRVSCSGGRSPTVRVSVVANTPSGPVEAFDFDEYQPEMLEKFRN
MRSQHPYVLTEDTLKVYLNKFRQSSPDSVKVVIHFTDGADGDLAD
LHRASENLRQEGVRALILVGLERVVNLERLMHLEFGRGFMYDRPL
RLNLLDLDYELAEQLDNIAEKACCGVPCKCSGQRGDRGPIGSIGPK
GIPGEDGYRGYPGDEGGPGERGPPGVNGTQGFQGCPGQRGVKGSR
GFPGEKGEVGEIGLDGLDGEDGDKGLPGSSGEKGNPGRRGDKGPR
GEKGERGDVGIRGDPGNPGQDSQERGPKGETGDLGPMGVPGRDG
VPGGPGETGKNGGFGRRGPPGAKGNKGGPGQPGFEGEQGTRGAQ
GPAGPAGPPGLIGEQGISGPRGSGGAAGAPGERGRTGPLGRKGEPG
EPGPKGGIGNRGPRGETGDDRDGVGSEGRRGKKGERGFPGYPGP
KGNPGEPGLNGTTGPKGIRGRRGNSGPPGIVGQKGDPGYPGPAGP
KGNRGDSIDQCALIQSIKDKCPCCYGPLECPVFPTELAFALDTSEGV
NQDTFGRMRDVVLSIVNDLTIAESNCPRGARVAVVTYNNEVTTEI
RFADSKRKSVLLDKIKNLQVALTSKQQSLETAMSFVARNTFKRVR
NGFLMRKVAVFFSNTPTRASPQLREAVLKLSDAGITPLFLTRQEDR
QLINALQINNTAVGHALVLPAGRDLTDFLENVLTCHVCLDICNIDP
SCGFGSWRPSFRDRRAAGSDVDIDMAFILDSAETTTLFQFNEMKK
YIAYLVRQLDMSPDPKASQHFARVAVVQHAPSESVDNASMPPVK
VEFSLTDYGSKEKLVDFLSRGMTQLQGTRALGSAIEYTIENVFESA
PNPRDLKIVVLMLTGEVPEQQLEEAQRVILQAKCKGYFFVVLGIGR
KVNIKEVYTFASEPNDVFFKLVDKSTELNEEPLMRFGRLLPSFVSSE
NAFYLSPDIRKQCDWFQGDQPTKNLVKFGHKQVNVPNNVTSSPTS
NPVTTTKPVTITKPVTITTKPVTIINQPSVKPAAAKPAPA
KPVAAKPVATKMATVRPPVAVKPATAAKPVAAKPAAVRPPAAAA
AKPVATKPEVPRPQAAKPAATKPATTKPMVKMSREVQVFEITENS
AKLHWERAEPPGPYFYDLTVTSAHDQSLVLKQNLTVTDRVIGGLL
AGQTYHVAVVCYLRSQVRATYHGSFSTKKSQPPPPQPARSASSSTI
NLMVSTEPLALTETDICKLPKDEGTCRDFILKWYYDPNTKSCARF
WYGGCGGNENKFGSQKECEKVCAPVLAKPGVISVMGT |
| Collagen type VI, alpha 3
Variant 4
SEQ ID NO: 116 | MRKHRHLPLVAVFCLFLSGFPTTHAQQQQAVIEVNKRDIVFLVDG
SSALGLANFNAIRDFIAKVIQRLEIGQDLIQVAVAQYADTVRPEFYF
NTHPTKREVITAVRKMKPLDGSALYTGSALDFVRNNLFTSSAGYR
AAEGIPKLLVLITGGKSLDEISQPAQELKRSSIMAFAIGNKGADQAE
LEEIAFDSSLVFIPAEFRAAPLQGMLPGLLAPLRTLSGTPEESKRDIL
FLFDGSANLVGQFPVVRDFLYKDDELNVKPEGTRIAVAQYSDDVK
VESRFDEHQSKPEILNLVKRMKIKTGKALNLGYALDYAQRYIFVKS
AGSRIEDGVLQFLVLLVAGRSSDRVDGPASNLKQSGVVPPIFQAKN
ADPAELEQIVLSPAHLAAESLPKIGDLIVQIVNLLKSVIANGAPAPV
SGEKDVVFLLDGSEGVRSGFPLLKEFVQRVVESLDVGQDRVRVAV
VQYSDRTRPEFYLNSYMNKQDVVNAVRQLTLLGGPTPNTGAALE
FVLRNILVSSAGSRITEGVPQLLIVLTADRSGDDVRNPSVVVKRGG
AVPIGIGIGNADITEMQTISFIPDFAVAIPTFRQLGTVQQVISERVTQL
TREELSRLQPVLQPLSPSPGVGGKRDVVFLIDGSQSAGPEFQYVRTLI
ERLVDYLDVGFDTTRVAVIQFSDDPKVEFLLNAHSSKDEVQNAVQ
RLRPKGGRQINVGNALEYVSRNIFKRPLGSRIEEGVPQFLVLISSGK
SDDEVDDPAVELKQFGVAPFTIARNADQEELVKISLSPEYVFSVSTF
RELPSLEQKLLTPITTLTSEQIQKLLASTRYPPPAVESDAADIVFLIDS
SEGVRPDGFAHIRDFVSRIVRRLNIGPSKVRVGVVQFSNDVFPEFYL
KTYRSQAPVLDAIRRLRLRGGSPLNTGKALEFVARNLFVKSAGSRI
EDGVPQHLVLVLGGKSQDDVSRFAQVIRSSGIVSLGVGDRNIDRTE
LQTITNDPRLVFTVREFRELPNIEERIMNSFGPSAATPAPPGVDTPPP
SRPEKKKADIVFLLDGSINFRRDSFQEVLRFVSEIVDTVYEDGDSIQ
VGLVQYNSDPTDEFFLKDFSTKRQIIDAINKVVYKGGRHANTKVG
LEHLRVNHFVPEAGSRLDQRVPQIAFVITGGKSVEDAQDVSLALTQ
RGVKVFAVGVRNIDSEEVGKIASNSATAFRVGNVQELSELSEQVLE
TLHDAMHETLCPGVTDAAKACNLDVILGFDGSRDQNVFVAQKGF
ESKVDAILNRISQMHRVSCSGGRSPTVRVSVVANTPSGPVEAFDFD
EYQPEMLEKFRNMRSQHPYVLTEDTLKVYLNKFRQSSPDSVKVVI
HFTDGADGDLADLHRASENLRQEGVRALILVGLERVVNLERLMH
LEFGRGFMYDRPLRLNLLDLDYELAEQLDNIAEKACCGVPCKCSG
QRGDRGPIGSIGPKGIPGEDGYRGYPGDEGGPGERGPPGVNGTQGF
QGCPGQRGVKGSRGFPGEKGEVGEIGLDGLDGEDGDKGLPGSSGE
KGNPGRRGDKGPRGEKGERGDVGIRGDPGNPGQDSQERGPKGET |

TABLE 1-continued

| Protein name/SEQ ID NO. | Amino acid sequence |
|---|---|
| | GDLGPMGVPGRDGVPGGPGETGKNGGFGRRGPPGAKGNKGGPG<br>QPGFEGEQGTRGAQGPAGPAGPPGLIGEQGISGPRGSGGAAGAPGE<br>RGRTGPLGRKGEPGEPGPKGGIGNRGPRGETGDDGRDGVGSEGRR<br>GKKGERGFPGYPGPKGNPGEPGLNGTTGPKGIRGRRGNSGPPGIVG<br>QKGDPGYPGPAGPKGNRGDSIDQCALIQSIKDKCPCCYGPLECPVF<br>PTELAFALDTSEGVNQDTFGRMRDVVLSIVNDLTIAESNCPRGARV<br>AVVTYNNEVTTEIRFADSKRKSVLLDKIKNLQVALTSKQQSLETA<br>MSFVARNTFKRVRNGFLMRKVAVFFSNTPTRASPQLREAVLKLSD<br>AGITPLFLTRQEDRQLINALQINNTAVGHALVLPAGRDLTDFLENV<br>LTCHVCLDICNIDPSCGFGSWRPSFRDRRAAGSDVDIDMAFILDSA<br>ETTTLFQFNEMKKYIAYLVRQLDMSPDPKASQHFARVAVVQHAPS<br>ESVDNASMPPVKVEFSLTDYGSKEKLVDFLSRGMTQLQGTRALGS<br>AIEYTIENVFESAPNPRDLKIVVLMLTGEVPEQQLEEAQRVILQAKC<br>KGYFFVVLGIGRKVNIKEVYTFASEPNDVFFKLVDKSTELNEEPLM<br>RFGRLLPSFVSSENAFYLSPDIRKQCDWFQGDQPTKNLVKFGHKQ<br>VNVPNNVTSSPTSNPVTTTKPVITTKPVTITTKPVTITTKPVTIINQ<br>PSVKPAAAKPAPAKPVAAKPVATKMATVRPPVAVKPATAAKPVA<br>AKPAAVRPPAAAAAKPVATKPEVRPQAAKPAATKPATTKPMVK<br>MSREVQVFEITENSAKLHWERAEPPGPYFYDLTVTSAHDQSLVLK<br>QNLTVTDRVIGGLLAGQTYHVAVVCYLRSQVRATYHGSFSTKKSQ<br>PPPPQPARSASSSTINLMVSTEPLALTETDICKLPKDEGTCRDFILKW<br>YYDPNTKSCARFWYGGCGGNENKFGSQKECEKVCAPVLAKPGVI<br>SVMGT |
| Collagen type VI, alpha 3<br>Variant 5<br>SEQ ID NO: 117 | MRKHRHLPLVAVFCLFLSGFPTTHAQQQQAAQDSADIIFLIDGSNN<br>TGSVNFAVILDFLVNLLEKLPIGTQQIRVGVVQFSDEPRTMFSLDTY<br>STKAQVLGAVKALGFAGGELANIGLALDFVVENHFTRAGGSRVEE<br>GVPQVLVLISAGPSSDEIRYGVVALKQASVFSFGLGAQAASRAELQ<br>HRTDDNLVFTVPEFRSFGDLQEKLLPYIVGVAQRHWLKPPTIVTQ<br>VIEVNKRDIVFLVDGSSALGLANFNAIRDFIAKVIQRLEIGQDLIQV<br>AVAQYADTVRPEFYFNTHIPTKREVITAVRKMKPLDGSALYTGSAL<br>DFVRNNLFTSSAGYRAAEGIPKLLVLITGGKSLDEISQPAQELKRSSI<br>MAFAIGNKGADQAELEEIAFDSSLVFIPAEFRAAPLQGMLPGLLAP<br>LRTLSGTPEVHSNKRDIIFLLDGSANVGKTNFPYVRDFVMNLVNSL<br>DIGNDNIRVGLVQFSDTPVTEFSLNTYQTKSDILGHLRQLQLQGGS<br>GLNTGSALSYVYANHFTEAGGSRIREHVPQLLLLLLTAGQSEDSYLQ<br>AANALTRAGILTFCVGASQANKAELEQIAFNPSLVYLMDDFSSLPA<br>LPQQLIQPLTTYVSGGVEEVPLAQPESKRDILFLFDGSANLVGQFPV<br>VRDFLYKIIDELNVKPEGTRIAVAQYSDDVKVESRFDEHQSKPEILN<br>LVKRMKIKTGKALNLGYALDYAQRYIFVKSAGSRIEDGVLQFLVL<br>LVAGRSSDRVDGPASNLKQSGVVPFIFQAKNADPAELEQIVLSPAFI<br>LAAESLPKIGDLIVQIVNLLKSVIANGAPAPVSGEKDVVFLLDGSEG<br>VRSGFPLLKEFVQRVVESLDVGQDRVRVAVVQYSDRTRPEFYLNS<br>YMNKQDVVNAVRQLTLLGGPTPNTGAALEFVLRNILVSSAGSRIT<br>EGVPQLLIVLTADRSGDDVRNPSVVVKRGGAVPIGIGIGNADITEM<br>QTISFIPDFAVAIPTFRQLGTVQQVISERVTQLTREELSRLQPVLQPL<br>PSPGVGGKRDVVFLIDGSQSAGPEFQYVRTLIERLVDYLDVGFDTT<br>RVAVIQFSDDPKVEFLLNAHSSKDEVQNAVQRLRPKGGRQINVGN<br>ALEYVSRNIFKRPLGSRIEEGVPQFLVLISSGKSDDEVDDPAVELKQ<br>FGVAPFTIARNADQEELVKISLSPEYVFSVSTFRELPSLEQKLLTPIT<br>TLTSEQIQKLLASTRYPPPGEMGASEVLLGAFSI |
| Collagen type VI, alpha 3<br>Variant 6<br>SEQ ID NO: 118 | MRKHRHLPLVAVFCLFLSGFPTTHAQQQQAVIEVNKRDIVFLVDG<br>SSALGLANFNAIRDFIAKVIQRLEIGQDLIQVAVAQYADTVRPEFYF<br>NTHIPTKREVITAVRKMKPLDGSALYTGSALDFVRNNLFTSSAGYR<br>AAEGIPKLLVLITGGKSLDEISQPAQELKRSSIMAFAIGNKGADQAE<br>LEEIAFDSSLVFIPAEFRAAPLQGMLPGLLAPLRTLSGTPEVHSNKR<br>DIIFLLDGSANVGKTNFPYVRDFVMNLVNSLDIGNDNIRVGLVQFS<br>DTPVTEFSLNTYQTKSDILGHLRQLQLQGGSGLNTGSALSYVYAN<br>HFTEAGGSRIREHVPQLLLLLLTAGQSEDSYLQAANALTRAGILTFC<br>VGASQANKAELEQIAFNPSLVYLMDDFSSLPALPQQLIQPLTTYVS<br>GGVEEVPLAQPESKRDILFLFDGSANLVGQFPVVRDFLYKIIDELNV<br>KPEGTRIAVAQYSDDVKVESRFDEHQSKPEILNLVKRMKIKTGKAL<br>NLGYALDYAQRYIFVKSAGSRIEDGVLQFLVLLVAGRSSDRVDGP<br>ASNLKQSGVVPFIFQAKNADPAELEQIVLSPAHLAAESLPKIGDLH<br>PQIVNLLKSVIINGAPAPVSGEKDVVFLLDGSEGVRSGFPLLKEFVQ<br>RVVESLDVGQDRVRVAVVQYSDRTRPEFYLNSYMNKQDVVNAV<br>RQLTLLGGPTPNTGAALEFVLRNILVSSAGSRITEGVPQLLIVLTAD<br>RSGDDVRNPSVVVKRGGAVPIGIGIGNADITEMQTISFIPDFAVAIPT<br>FRQLGTVQQVISERVTQLTREELSRLQPVLQPLPSPGVGGKRDVVF<br>LIDGSQSAGPEFQYVRTLIERLVDYLDVGFDTTRVAVIQFSDDPKV<br>EFLLNAHSSKDEVQNAVQRLRPKGGRQINVGNALEYVSRNIFKRP<br>LGSRIEEGVPQFLVLISSGKSDDEVDDPAVELKQFGVAPFTIARNAD<br>QEELVKISLSPEYVFSVSTFRELPSLEQKLLTPITTLTSEQIQKLLAST<br>RYPPPGEMGASEVLLGAFSI |
| Collagen type VI, alpha 3<br>Variant 7 | MRKHRHLPLVAVFCLFLSGFPTTHAQQQQAVIEVNKRDIVFLVDG<br>SSALGLANFNAIRDFIAKVIQRLEIGQDLIQVAVAQYADTVRPEFYF |

TABLE 1-continued

| Protein name/SEQ ID NO. | Amino acid sequence |
|---|---|
| SEQ ID NO: 119 | NTHPTKREVITAVRKMKPLDGSALYTGSALDFVRNNLFTSSAGYR<br>AAEGIPKLLVLITGGKSLDEISQPAQELKRSSIMAFAIGNKGADQAE<br>LEEIAFDSSLVFIPAEFRAAPLQGMLPGLLAPLRTLSGTPEESKRDIL<br>FLFDGSANLVGQFPVVRDFLYKIIDELNVKPEGTRIAVAQYSDDVK<br>VESRFDEHQSKPEILNLVKRMKIKTGKALNLGYALDYAQRYIFVKS<br>AGSRIEDGVLQFLVLLVAGRSSDRVDGPASNLKQSGVVPFIFQAKN<br>ADPAELEQIVLSPAHLAAESLPKIGDLHPQIVNLLKSVIANGAPAPV<br>SGEKDVVFLLDGSEGVRSGFPLLKEFVQRVVESLDVGQDRVRVAV<br>VQYSDRTRPEFYLNSYMNKQDVVNAVRQLTLLGGPTPNTGAALE<br>FVLRNILVSSAGSRITEGVPQLLIVLTADRSGDDVRNPSVVVKRGG<br>AVPIGIGIGNADITEMQTISFIPDDFAVAIPTFRQLGTVQQVISERVTQL<br>TREELSRLQPVLQPLPSPGVGGKRDVVFLIDGSQSAGPEFQYVRTLI<br>ERLVDYLDVGFDTTRVAVIQFSDDPKVEFLLNAHSSKDEVQNAVQ<br>RLRPKGGRQINVGNALEYVSRNIFKRPLGSRIEEGVPQFLVLISSGK<br>SDDEVDDPAVELKQFGVAPFTIARNADQEELVKISLSPEYVFSVSTF<br>RELPSLEQKLLTPITTLTSEQIQKLLASTRYPPPAVESDAADIVFLIDS<br>SEGVRPDGFAHIRDFVSRIVRRLNIGPSKVRVGVVQFSNDVFPEFYL<br>KTYRSQAPVLDAIRRLRLRGGSPLNTGKALEFVARNLFVKSAGSRI<br>EDGVPQHLVLVLGGKSQDDVSRFAQVIRSSGIVSLGVGDRNIDRTE<br>LQTITNDPRLVFTVREFRELPNIEERIMNSFGPSAATPAPPGVDTPPP<br>SRPEKKKADIVFLLDGSINFRRDSPQEVLRFVSEIVDTVYEDGDSIQ<br>VGLVQYNSDPTDEFFLKDFSTKRQIIDAINKVVYKGGRHANTKVG<br>LEHLRVNHFVPEAGSRLDQRVPQIAFVITGGKSVEDAQDVSLALTQ<br>RGVKVFAVGVRNIDSEEVGKIASNSATAFRVGNVQELSELSEQVLE<br>TLHDAMHETLCPGVTDAAKACNLDVILGFDGSRDQNVFVAQKGF<br>ESKVDAILNRISQMHRVSCSGGRSPTVRVSVVANTPSGPVEAFDFD<br>EYQPEMLEKFRNMRSQHPYVLTEDTLKVYLNKFRQSSPDSVKVVI<br>HFTDGADGDLADLHRASENLRQEGVRALILVGLERVVNLERLMH<br>LEFGRGFMYDRPLRLNLLDLDYELAEQLDNIAEKACCGVPCKCSG<br>QRGDRGPIGSIGPKGIPGEDGYRGYPGDEGGPGERGPPGVNGTQGF<br>QGCPGQRGVKGSRGFPGEKGEVGEIGLDGLDGEDGDKGLPGSSGE<br>KGNPGRRGDKGPRGEKGERGDVGIRGDPGNPGQDSQERGPKGET<br>GDLGPMGVPGRDGVPGGPGETGKNGGFGRRGPPGAKGNKGGPG<br>QPGFEGEQGTRGAQGPAGPAGPPGLIGEQGISGPRGSGGAAGAPGE<br>RGRTGPLGRKGEPGEPGPKGGIGNRGPRGETGDDGRDGVGSEGRR<br>GKKGERGFPGYPGPKGNPGEPGLNGTTGPKGIRGRRGNSGPPGIVG<br>QKGDPGYPGPAGPKGNRGDSIDQCALIQSIKDKCPFHGPLECPVFP<br>TELAFALDTSEGVNQDTFGRMRDVVLSIVNDLTIAESNCPRGARV<br>AVVTYNNEVTTEIRFADSKRKSVLLDKIKNLQVALTSKQQSLETA<br>MSFVARNTFKRVRNGFLMRKVAVFFSNTPTRASPQLREAVLKLSD<br>AGITPLFLTRQEDRQLINALQINNTAVGHALVLPAGRDLTDFLENV<br>LTCHVCLDICNIDPSCGFGSWRPSFRDRRAAGSDVDIDMAFILDSA<br>ETTTLFQFNEMKKYIAYLVRQLDMSPDPKASQHFARVAVVQHAPS<br>ESVDNASMPPVKVEFSLTDYGSKEKLVDFLSRGMTQLQGTRALGS<br>AIEYTIENVFESAPNPRDLKIVVLMLTGEVPEQQLEEAQRVILQAKC<br>KGYFFVVLGIGRKVNIKEVYTFASEPNDVFFKLVDKSTELNEEPLM<br>RFGRLLPSFVSSENAFYLSPDIRKQCDWFQGDQPTKNLVKFGHKQ<br>VNVPNNVTSSPTSNPVTTTKPVITTKPVTITTKPVTITTKPVTIINQ<br>PSVKPAAAKPAPAKPVAAKPVATKMATVRPPAVVKPATAAKPVA<br>AKPAAVRPPAAAAAKPVATKPEVPRPQAAKPAATKPATTKPMVK<br>MSREVQVFEITENSAKLHWERAEPPGPYFYDLTVTSAHDQSLVLK<br>QNLTVTDRVIGGLLAGQTYHVAVVCYLRSQVRATYHGSFSTKKSQ<br>PPPPQPARSASSSTINLMVSTEPLALTETDICKLPKDEGTCRDFILKW<br>YYDPNTKSCARFWYGGCGGNENKFGSQKECEKVCAPVLAKPGVI<br>SVMGT |
| Collagen type VI, alpha 3<br>Variant 8<br>SEQ ID NO: 120 | MRKHRHLPLVAVFCLFLSGFPTTHAQQQADVKNGAAADIIFLVD<br>SSWTIGEEHFQLVREFLYDVVKSLAVGENDFHFALVQFNGNPHTE<br>FLLNTYRTKQEVLSHISNMSYIGGTNQTGKGLEYIMQSHLTKAAGS<br>RAGDGVPQVIVVLTDGHSKDGLALPSAELKSADVNVFAIGVEDAD<br>EGALKEIASEPLNMHMFNLENFTSLHDIVGNLVSCVHSSVSPERAG<br>DTETLKDITAQDSADIIFLIDGSNNTGSVNFAVILDFLVNLLEKLPIG<br>TQQIRVGVVQFSDEPRTMFSLDTYSTKAQVLGAVKALGFAGGELA<br>NIGLALDFVVENHFTRAGGSRVEEGVPQVLVLISAGPSSDEIRYGV<br>VALKQASVFSFGLGAQAASRAELQHRTDDNLVFTVPEFRSFGDLQ<br>EKLLPYIVGVAQRHWLKPPTIVTQVIEVNKRDIVFLVDGSSALGLA<br>NFNAIRDFIAKVIQRLEIGQDLIQVAVAQYADTVRPEFYFNTHIPTKR<br>EVITAVRKMKPLDGSALYTGSALDFVRNNLFTSSAGYRAAEGIPKL<br>LVLITGGKSLDEISQPAQELKRSSIMAFAIGNKGADQAELEEIAFDS<br>SLVFIPAEFRAAPLQGMLPGLLAPLRTLSGTPEESKRDILFLFDGSA<br>NLVGQFPVVRDFLYKIIDELNVKPEGTRIAVAQYSDDVKVESRFDE<br>HQSKPEILNLVKRMKI |
| Collagen type VI, alpha 3<br>Variant 9<br>SEQ ID NO: 121 | PIGTQQIRVGVVQFSDEPRTMFSLDTYSTKAQVLGAVKALGFAGG<br>ELANIGLALDFVVENHFTRAGGSRVEEGVPQVLVLISAGPSSDEIRY<br>GVVALKQASVFSFGLGAQAASRAELQHRTDDNLVFTVPEFRSFG<br>DLQEKLLPYIVGVAQRHWLKPPTIVTQEYGLNENW |

TABLE 1-continued

| Protein name/SEQ ID NO. | Amino acid sequence |
| --- | --- |
| Proteasome subunit beta type-5 Variant 2 SEQ ID NO: 122 | MALASVLERPLPVNQRGFFGLGGRADLLDLGPGSLSDGLSLAAPG WGVPEEPGIEMLHGTTTLAFKFRHGVIVAADSRATAGAYIASQTV KKVIEINPYLLGTMAGGAADCSFWERLLARQCRIYELRNKERISVA AASKLLANMVYQYKGMGLSMGTMICGWDKRGPVSEVLCLKPKS FGMYLFCGCAERIGNMARPLLRGQ |
| Proteasome subunit beta type-5 Variant 3 SEQ ID NO: 123 | MAGGAADCSFWERLLARQCRIYELRNKERISVAAASKLLANMVY QYKGMGLSMGTMICGWDKRGPGLYYVDSEGNRISGATFSVGSGS VYAYGVMDRGYSYDLEVEQAYDLARRAIYQATYRDAYSGGAVN LYHVREDGWIRVSSDNVADLHEKYSGSTP |
| Proteasome subunit beta type-5 Variant 4 SEQ ID NO: 124 | MALASVLERPLPVNQRGFFGLGGRADLLDLGPGSLSDGLSLAAPG WGVPEEPGIEMLHGTTTLAFKASTTWTVKGTGFQGPPSL |
| Proteasome subunit beta type-5 Variant 5 SEQ ID NO: 125 | XGIEMLHGTTTLAFKFRHGVIVAADSRATAGAYIASQTVKKVIEIN PYLLGTMAGGAADCSFWERLLARQCRIYELRNKERISVAAASKLL ANMVYQYKGMGLSMGTMICGWDKRGPG |
| Heterogeneous nuclear ribonucleoproteins A2/B1 Variant 2 SEQ ID NO: 126 | MEREKEQFRKLFIGGLSFETTEESLRNYYEQWGKLTDCVVMRDPA SKRSRGFGFVTFSSMAEVDAAMAARPHSIDGRVVEPKRAVAREES GKPGAHVTVKKLFVGGIKEDTEEHHLRDYFEEYGKIDTIEITTDRQS GKKRGFGFVTFDDHDPVDKIVLQKYHTINGIINAEVRKALSRQEM QEVQSSRSRGGGNFGFGDSRGGGGNFGPGPGSNFRGGSDGYGSGR GFGDGYNGYGGGPGGGNFGGSPGYGGGRGGYGGGGPGYGNQGG GYGGGYDNYGGGNYGSGNYNDFGNYNQQPSNYGPMKSGNFGGS RNMGGPYGGGNYGPGGSGGSGGYGGRSRY |
| Heterogeneous nuclear ribonucleoproteins A2/B1 Variant 3 SEQ ID NO: 127 | MEREKEQFRKLFIGGLSFETTEESLRNYYEQWGKLTDCVVMRDPA SKRSRGFGFVTFSSMAEVDAAMAARPHSIDGRVVEPKRAVAREES GKPGAHVTVKKLFVGGIKEDTEEHHLRDYFEEYGKIDTIEITTDRQS GKKRGFGFVTFDDHDPVDKIVLQKYHTINGIINAEVRKALSRQEM QEVQSSRSRGGGNFGFGDSRGGGGNFGPGPGSNFRGGSDGYGSGR GFGDGYNGYGGGPGGGNFGGSPGYGGGRGGYGGGGPGYGNQGG GYGGGYDNYGGGNYGSGNYNDFGNYNQQPSNYGPMKSGNFGGS RNMGGPYGGGNYGPGGSGGSGGYGGRSRY |
| Heterogeneous nuclear ribonucleoproteins A2/B1 Variant 4 SEQ ID NO: 128 | MEKTLETVPLERKKREKEQFRKLFIGGLSFETTEESLRNYYEQWGK LTDCVVMRDPASKRSRGFGFVTFSSMAEVDAAMAARPHSIDGRV VEPKRAVAREESGKPGAHVTVKKLFVGGIKEDTEEHHLRDYFEEY GKIDTIEITTDRQSGKKRGFGFVTFDDHDPVDKIVLQKYHTINGIINA EVRKALSRQEMQEDLEVAILEVAPVMEEEEEDMVVEDLDMATRV GATEVVMTTMEEEIMEVEITMILEITTSNLLTTVQ |
| Beta enolase Variant 2 SEQ ID NO: 129 | MAMQKIFAREILDSRGNPTVEVDLHTAKGRFRAAVPSGASTGIYE ALELRDGDKGRYLGKGVLKAVENINNTLGPALLQKKLSVVDQEK VDKFMIELDGTENKSKFGANAILGVSLAVCKAGAAEKGVPLYRIII ADLAGNPDLILPVPAFNVINGGSHAGNKLAMQEFMILPVGASSFKE AMRIGAEVYHHLKGVIKAKYGKDATNVGDEGGFAPNILENNEAL ELLKTAIQAAGYPDKVVIGMDVAASEFYRNGKYDLDFKSPDDPAR HITGEKLGELYKSFIKNYPVVSIEDPFDQDDWATWTSFLSGVNIQIV GDDLTVTNPKRIAQAVEKKACNCLLLKVNQIGSVTESIQACKLAQS NGWGVMVSHRSGETEDTFIADLVVGLCTGQIKTGAPCRSERLAKY NQLMRIEEALGDKAIFAGRKFRNPKAK |
| Beta enolase Variant 3 SEQ ID NO: 130 | MAMQKIFAREILDSRGNPTVEVDLHTAKGRFRAAVPSGASTGIYE ALELRDGDKGRYLGKGVLKAVENINNTLGPALLQKKLSVVDQEK VDKFMIELDGTENKSKFGANAILGVSLAVCKAGAAEKGVPLYRIII ADLAGNPDLILPVPAFNVINGGSHAGNKLAMQEFMILPVGASSFKE AMRIGAEVYHHLKGVIKAKYGKDATNVGDEGGFAPNILENNEAL ELLKTAIQAAGYPDKVVIGMDVAASEFYRNGKYDLDFKSPDDPAR HITGEKLGELYKSFIKNYPVVSIEDPFDQDDWATWTSFLSGVNIQIV GDDLTVTNPKRIAQAVEKKACNCLLLKVNQIGSVTESIQACKLAQS NGWGVMVSHRSGETEDTFIADLVVGLCTGQIKTGAPCRSERLAKY NQLMRIEEALGDKAIFAGRKFRNPKAK |
| Beta enolase Variant 4 SEQ ID NO: 131 | MAMQKIFAREILDSRGNPTVEVDLHTAKGRFRAAVPSGASTGIYE ALELRDGDKGRYLGKAKFGANAILGVSLAVCKAGAAEKGVPLYR HIADLAGNPDLILPVPAPNVINGGSHAGNKLAMQEFMILPVGASSF KEAMRIGAEVYHHLKGVIKAKYGKDATNVGDEGGFAPNILENNE ALELLKTAIQAAGYPDKVVIGMDVAASEFYRNGKYDLDFKSPDDP ARHITGEKLGELYKSFIKNYPVVSIEDPFDQDDWATWTSFLSGVNI QIVGDDLTVTNPKRIAQAVEKKACNCLLLKVNQIGSVTESIQACKL AQSNGWGVMVSHRSGETEDTFIADLVVGLCTGQIKTGAPCRSERL AKYNQLMRIEEALGDKAIFAGRKFRNPKAK |
| Beta enolase Variant 5 | MAMQKIFAREILDSRGNPTVEVDLHTAKGRFRAAVPSGASTGIYE ALELRDGDKGRYLGKGVLKAVENINNTLGPALLQKKLSVVDQEK |

TABLE 1-continued

| Protein name/SEQ ID NO. | Amino acid sequence |
|---|---|
| SEQ ID NO: 132 | VDKFMTELDGTENKSKFGANAILGVSLAVCKAGAAEKGVPLYRHI<br>ADLAGNPDLILPVPAPNVINGGSHAGNKLAMQEFMILPVGASSFKE<br>AMRIGAEVYHELKGVIKAKYGKDATNVGDEGG |
| Beta enolase<br>Variant 6<br>SEQ ID NO: 133 | MAMQKIFAREILDSRGNPTVEVDLHTAKGRFRAAVPSGASTGIYE<br>ALELRDGDKGRYLGKGVLKAVENINNTLGPALLQKKLSVVDQEK<br>VDKFMTELDGTENKSKFGANAILGVSLAVCKAGAAEKGVPLYRHI<br>ADLAGNPDLILPVPAPNVINGGSHAGNKLAMQEFMILPVGASSFKE<br>AMRIGAEVYHELKGVI |
| Beta enolase<br>Variant 7<br>SEQ ID NO: 134 | MAMQKIFAREILDSRGNPTVEVDLHTAKGRFRAAVPSGASTGIYE<br>ALELRDGDKGRYLGKGVLKAVENINNTLGPALLQKKLSVVDQEK<br>VDKFMTELDGTENKSKFGANAILGVSLAVCKAGAAEKGVPLYRHI<br>ADLAGNPDLILPVP |
| Beta enolase<br>Variant 8<br>SEQ ID NO: 135 | MAMQKIFAREILDSRGNPTVEVDLHTAKGRFRAAVPSGASTGIYE<br>ALELRDGDKGRYLGKGVLKAVENINNTLGPALLQKKLSVVDQEK<br>VDKFMTELDGTENKSKFGANAILGVSLAVCKAGAAEKGVPLYRHI<br>ADLAGNPDLILPVP |
| Beta enolase<br>Variant 9<br>SEQ ID NO: 136 | MAMQKIFAREILDSRGNPTVEVDLHTAKGRFRAAVPSGASTGIYE<br>ALELRDGDKGRYLGKGVLKAVENINNTLGPALLQKKLSVVDQEK<br>VDKFMTELDGTENKSKFGANAILGVSLAVCKAGAAEKGVPLYRHI<br>ADLAGNPDLILPVPAFNVIN |
| Beta enolase<br>Variant 10<br>SEQ ID NO: 137 | MAMQKIFAREILDSRGNPTVEVDLHTAK |
| Glutathione S-transferase P<br>Variant 2<br>SEQ ID NO: 138 | MPPYTVVYFPVRGRCAALRMLLADQGQSWKEEVVTVETWQEGS<br>LKASCLYGQLPKFQDGDLTLYQSNTILRHLGRTLGLYGKDQQEAA<br>LVDMVNDGVEDLRCKYISLIYTNYISFADYNLLDLLLIHEVLAPGC<br>LDAFPLLSAYVGRLSARPKLKAFLASPEYVNLPINGNGKQ |
| Glutathione S-transferase P<br>Variant 3<br>SEQ ID NO: 139 | EAGKDDYVKALPGQLKPFETLLSQNQGGKTFIVGDQVSIWPHAVP<br>SSPPSASRWTQVSPSLTTTCWTCC |
| Glutathione S-transferase Mu 3<br>Variant 2<br>SEQ ID NO: 140 | MSCESSMVLGYWDIRGLAHAIRLLLEFTDTSYEEKRYTCGEAPDY<br>DRSQWLDVKFKLDLDFPNLPYLLDGKNKITQSNAILRYIARKIINM<br>CGETEEEKIRVDBENQVMDFRTQLIRLCYSSDHEKLKPQYLEELPG<br>QLKQFSMFLGKFSWFAGEKLTFVDFLTYD |
| Glutathione S-transferase Mu 3<br>Variant 3<br>SEQ ID NO: 141 | MSCESSMVLGYWDIRGLAHAIRLLLEFTDTSYEEKRYTCGEAPDY<br>DRSQWLDVKFKLDLDFPNLPYLLDGKNKITQSNAILRYIARKIINM<br>CGETEEEKIRVDIIENQVMDFRTQLIRLCYSSDHEKLKPQYLEELPG<br>QLKQFSMFLGKFSWFAGEKLTFVDFLTYDILDQNRIFDPKCLDEFP<br>NLKAFMCRFGDVLHFLYKTLTAPLGPADP |
| Rho 23 GTPase-activating protein<br>Variant 2<br>SEQ ID NO: 142 | MNGVAFCLVGIPPRPEPRPPQLPLGPRDGCSPRRPFPWQGPRTLLL<br>YKSPQDGFGFTLRHFIVYPPESAVHCSLKEEENGGRGGGPSPRYRL<br>EPMDTIFVKNVKEDGPAHRAGLRTGDRLVKVNGESVIGKTYSQVI<br>ALIQNSDDTLELSIMPKDEDILQLAYSQDAYLKGNEPYSGEARSIPE<br>PPPICYPRKTYAPPARASTRATMVPEPTSALPSDPRSPAAWSDPGLR<br>VPPAARAHLDNSSLGMSQPRPSPGAFPHLSSEPRTPRAFPEPGSRVP<br>PSRLECQQALSHWLSNQVPRRAGERRCPAMAPRARSASQDRLEEV<br>AAPRPWPCSTSQDALSQLGQEGWHRARSDDYLSRATRSAEALGPG<br>ALVSPRFERCGWASQRSSARTPACPTRDLPGPQAPPPSGLQGLDDL<br>GYIGYRSYSPSFQRRTGLLHALSFRDSPFGGLPTFNLAQSPASFPPE<br>ASEPPRVVRPEPSTRALEPPAEDRGDEVVLRQKPPTGRKVQLTPAR<br>QMNLGFGDESPEPEASGRGERLGRKVAPLATTEDSLASIPFIDEPTS<br>PSIDLQAKHVPASAVVSSAMNSAPVLGTSPSSPTFTFTLGRHYSQD<br>CSSIKAGRRSSYLLAITTERSKSCDDGLNTFRDEGRVLRRLPNRIPS<br>LRMLRSFFTDGSLDSWGTSEDADAPSKRHSTSDLSDATFSDIRREG<br>WLYYKQILTKKGKKAGSGLRQWKRVYAALRARSLSLSKERREPG<br>PAAAGAAAAGAGEDEAAPVCIGSCLVDISYSETKRRHVFRLTTAD<br>FCEYLFQAEDRDDMLGWIRAIRENSRAEGEDPGCANQALISKKLN<br>DYRKVSHSSGPKADSSPKGSRGLGGLKSEFLKQSAARGLRTQDLP<br>AGSKDDSAAAPKTPWGINIIKKNKKAAPRAFGVRLEECQPATENQ<br>RVPLIVAACCRIVEARGLESTGIYRVPGNNAVVSSLQEQLNRGPGD<br>INLQDERWQDLNVISSLLKSFFRKLPEPLFTDDKYNDFIEANRIEDA<br>RERMRTLRKLIRDLPGHYYETLKFLVGHLKTIADHSEKNKMEPRN<br>LALVFGPTLVRTSEDNMTDMVTHMPDRYKIVETLIQHSDWFFSDE<br>EDKGERTPVGDKEPQAVPNIEYLLPNIGRTVPPGDPGSADLLEI |
| ARHGAP23<br>Variant 3<br>SEQ ID NO: 143 | MDTIFVKNVKEDGPAHRAGLRTGDRLVKVNGESVIGKTYSQVIAL<br>IQNSDDTLELSIMPKDEDILQLAYSQDAYLKGNEPYSGEARSIPEPP<br>PICYPRKTYA |

TABLE 1-continued

| Protein name/SEQ ID NO. | Amino acid sequence |
|---|---|
| ARHGAP23 Variant 4 SEQ ID NO: 144 | XFFSDEEDKGERTPVGDKEPQAVPNIEYLLPNIGRTVPPGDPGSDST TCSSAKSKVRMKAILKA |
| ARHGAP23 Variant 5 SEQ ID NO: 145 | XTFSDIRREGWLYYKQILTKKGKAEDRDDMLGWIRAIRENSRAEG EDPGCANQALISKKLNDYRKVSHSSGPKADSSPKGSRGLGGLKSEF LKQSAARGLRTQDLPAGSKDDSAAAPKTPWGINIIKKNKKAAPRA FGVRLEECQPATENQRVPLIVAACCRI |
| ARHGAP23 Variant 6 SEQ ID NO: 146 | IRDLPGHYYETLKFLVGHLKTIADHSEKNKMEPRNLALVFGPTLVR TSEDNMTDMVTHMPDRYKIVETLIQHSDWFFSDEEDKGERILPPV VQPSPRVRGPPRRSRTPGRCWRSPSSRPSTASARSGGRRGGWAA |
| Rho 32 or Rho GTPase-activating protein 32 (ARHGAP32) SEQ ID NO: 147 | METESESSTLGDDSVFWLESEVIIQVTDCEEEEREEKFRKMKSSVH SEEDDFVPELHRNVIIPRERPDWEETLSAMARGADVPEIPGDLTLK TCGSTASMKVKHVKKLPFTKGHFPKMAECAHFHYENVEFGSIQLS LSEEQNEVMKNGCESKELVYLVQIACQGKSWIVKRSYEDFRVLDK HLHLCIYDRRFSQLSELPRSDTLKDSPESVTQMLMAYLSRLSAIAG NKINCGPALTWMEIDNKGNHLLVHEESSINTPAVGAAHVIKRYTA RAPDELTLEVGDIVSVIDMPPKVLSTWWRGKHGFQVGLFPGHCVE LINQKVPQSVTNSVPKPVSKKHGKLITFLRTFMKSRPTKQKLKQRG ILKERVFGCDLGEHLLNSGFEVPQVLQSCTAHERYGIVDGIYRLSG VASNIQRLRHEFDSEHVPDLTKEPYVQDIHSVGSLCKLYFRELPNPL LTYQLYEKFSDAVSAATDEERLIKIHDVIQQLPPPHYRTLEFLMRHL SLLADYCSITNMHAKNLAIVWAPNLLRSKQIESACFSGTAAFMEVR IQSVVVEFILNHVDVLFSGRISMAMQEGAASLSRPKSLLVSSPSTKL LTLEEAQARTQAQVNSPIVTENKYIEVGEGPAALQGKFHTIIEFPLE RKRPQNKMKKSPVGSWRSFFNLGKSSSVSKRKLQRNESEPSEMKA MALKGGRAEGTLRSAKSEESLTSLHAVDGDSKLFRPRRPRSSSDAL SASFNGEMLGNRCNSYDNLPHDNESEEEGGLLHIPALMSPHSAED VDLSPPDIGVASLDFDPMSFQCSPPKAESECLESGASFLDSPGYSKD KPSANKKDAETGSSQCQTPGSTASSEPVSPLQEKLSPFFTLDLSPTE DKSSKPSSFTEKVVYAFSPKIGRKLSKSPSMSISEPISVTLPPRVSEVI GTVSNTTAQNASSSTWDKCVEERDATNRSPTQIVKMKTNETVAQE AYESEVQPLDQVAAEEVELPGKEDQSVSSSQSKAVASGQTQTGAV THDPPQDSVPVSSVSLIPPPPPPKNVARMLALALAESAQQASTQSL KRPGTSQAGYTNYGDIAVATTEDNLSSSYSAVALDKAYFQTDRPA EQFHLQNNAPGNCDHPLPETTATGDPIESNTTESGEQHHQVDLTG NQPHQAYLSGDPEKARITSVPLDSEKSDDHVSFPEDQSGKNSMPTV SFLDQDQSPPRFYSGDQPPSYLGASVDKLIIHPLEFADKSPTPPNLPS DKIYPPSGSPEENTSTATMTYMTTTPATAQMSTKEASWDVAEQPT TADFAAATLQRTHRTNRPLPPPPSQRSAEQPPVVGQVQAATNIGLN NSHKVQGVVPVPERPPEPRAMDDPASAFISDSGAAAAQCPMATAV QPGLPEKVRDGARVPLLHLRAESVPAIIPCGFPAPLPPTRMMESKM IAAIHSSSADATSSSNYHSFVTASSTSVDDALPLPLPVPQPKHASQK TVYSSFARPDVTTEPFGPDNCLHFNMTPNCQYRPQSVPPIIHNKLE QHQVYGARSEPPASMGLRYNTYVAPGRNASGHHSKPCSRVEYVS SLSSSVRNTCYPEDIPPYPTIRRVQSLHAPPSSMIRSVPISRTEVPPDD EPAYCPRPLYQYKPYQSSQARSDYHVTQLQPYFENGRVHYRYSPY SSSSSSYYSPDGALCDVDAYGTVQLRPLHRLPNRDFAFYNPRLQG KSLYSYAGLAPRPRANVTGYFSPNDIINVVSMPPAADVKHTYTSW DLEDMEKYRMQSIRRESRARQKVKGPVMSQYDNMTPAVQDDLG GIYVIHLRSKSDPGKTGLLSVAEGKESRHAAKAISPEGEDRFYRRH PEAEMDRAHHHGGHGSTQPEKPSLPQKQSSLRSRKLPDMGCSLPE HRAHQEASHRQFCESKNGPPYPQGAGQLDYGSKGIPDTSEPVSYH NSGVKYAASGQESLRLNHKEVRLSKEMERPWVRQPSAPEKHSRD CYKEEEHLTQSIVPPPKPERSHSLKLHHTQNVERDPSVLYQYQPHG KRQSSVTVVSQYDNLEDYHSLPQHQRGVFGGGGMGTYVPPGFPH PQSRTYATALGQGAFLPAELSLQIIPETQIHAE |

As used herein the terms "sequence identity" or "sequence homology," which can be used interchangeably, refer to an exact amino acid-to-amino acid correspondence of two polypeptide sequences. Typically, techniques for determining sequence identity include determining the amino acid sequence of a polypeptide, and comparing these sequences to a second amino acid sequence. Two or more sequences can be compared by determining their "percent identity," also referred to as "percent homology." The percent identity to a reference sequence, which may be a sequence within a longer molecule, may be calculated as the number of exact matches between two optimally aligned sequences divided by the length of the reference sequence and multiplied by 100. Percent identity may also be determined, for example, by comparing sequence information using the advanced BLAST computer program, including version 2.2.9, available from the National Institutes of Health. The BLAST program is based on the alignment method of Karlin and Altschul, Proc. Natl. Acad. Sci. USA 87:2264-2268 (1990) and as discussed in Altschul, et al., J. Mol. Biol. 215:403-410 (1990); Karlin and Altschul, Proc. Natl. Acad. Sci. USA 90:5873-5877 (1993); and Altschul et al., Nucleic Acids Res. 25:3389-3402 (1997). Briefly, the BLAST program defines identity as the number of identical aligned symbols (i.e., nucleotides or amino acids), divided by the total number of symbols in the shorter of the two sequences. The program may be used to determine percent identity over the entire length of the sequences being compared. Default parameters are provided to optimize searches with short query sequences, for example, with the blastp program. The program also allows use of an SEG filter to mask-off segments of the query sequences as determined by the SEG program of Wootton and Federhen, Computers and Chemistry 17: 149-163 (1993). Ranges of desired degrees of sequence identity are approximately 80% to 100% and integer values in between. Percent identities between a disclosed sequence and a claimed sequence can be at least about 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or more, or complete (100%) sequence identity. In general, an exact match indicates 100% identity over the length of the reference sequence. In some cases, reference to percent sequence identity refers to sequence identity as measured using BLAST (Basic Local Alignment Search Tool). In other cases, ClustalW can be used for multiple sequence alignment. Still other programs for comparing sequences and/or assessing sequence identity include the Needleman-Wunsch algorithm and the Smith-Waterman algorithm (see, e.g., the EMBOSS Water aligner. Optimal alignment may be assessed using any suitable parameters of a chosen algorithm, including default parameters.

In one aspect, the sequence identity is at least about 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% (complete) sequence identity (homology). In one aspect, the sequence identity is over a region of at least about 10, 50, 100, 150, 200, 250, 300, 350, 400, 450, 500, 550, 600, 650, 700, 750, 800, 850, 900, 950, 1000, 1100, 1200, 1300, 1400, 1500, 1600, 1700, 1800, 1900, 2000, 2100, 2200, 2300, 2400, 2500, 2600, 2700, 2800, 2900, 3000 or more amino acids, or the full length of a polypeptide.

As used herein, the term "fragment" refers at least 10 consecutive amino acids of a polypeptide that can be detected using methods known in the art. Fragment may refer to an "active" fragment which is a portion of the polypeptide required for polypeptide function. The fragment can be an "immunogenic" fragment which is a portion of the polypeptide which binds an antibody.

As used herein, a "sample" or "biological sample" is meant to refer to any "biological specimen" collected from a subject, and that is representative of the content or composition of the source of the sample, considered in its entirety. A sample can be collected and processed directly for analysis, or be stored under proper storage conditions to maintain sample quality until analyses are completed. Ideally, a stored sample remains equivalent to a freshly-collected specimen. The source of the sample can be an internal organ, vein, artery, or even a fluid. Non-limiting examples of sample include blood, plasma, urine, saliva, sweat, organ biopsy, cerebrospinal fluid (CSF), tear, vaginal fluid, feces, skin, and hair. In one aspect, the sample is selected from the group consisting of blood, plasma, urine, saliva, sweat, organ biopsy, cerebrospinal fluid (CSF), tear, vaginal fluid, feces, skin, and hair. In certain aspects the sample is a blood sample and the subject is human. Blood samples include whole blood, plasma and serum.

The at least one protein refers to one or more proteins. In an aspect, the at least one polypeptide comprises 1, 2, 3, 4, 5, 6, 7, 8, 9, 10, 11, 12, 13, 14, 15, 16, 17, 18, 19, 20 or more proteins. In one aspect the at least one protein is selected from the group consisting of Farnesyl pyrophosphate synthase, neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, Heat Shock Protein Cognate 71 kDa, Ankyrin-3, Rho 23 GTPase-activating protein, Cytoskeletal Keratin 78 type II, Alpha-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof. In another aspect, the at least one protein is selected from the group consisting of SEQ ID NO:1, SEQ ID NO:2, SEQ ID NO:3, SEQ ID NO:4, SEQ ID NO:5, SEQ ID NO:6, SEQ ID NO:7, SEQ ID NO:8, SEQ ID NO:9, SEQ ID NO:10, SEQ ID NO:11, SEQ ID NO:12, SEQ ID NO:13, SEQ ID NO:14, SEQ ID NO:15, SEQ ID NO:16, SEQ ID NO:17, SEQ ID NO:18, SEQ ID NO:19, SEQ ID NO:20, SEQ ID NO:21, SEQ ID NO:22, SEQ ID NO:23, SEQ ID NO:24, SEQ ID NO:25, SEQ ID NO:26, SEQ ID NO:27, SEQ ID NO:28, SEQ ID NO:29, SEQ ID NO:30, SEQ ID NO:31, SEQ ID NO:32, SEQ ID NO:33, SEQ ID NO:34, SEQ ID NO:35, SEQ ID NO:36, SEQ ID NO:37, SEQ ID NO:38, SEQ ID NO:39, SEQ ID NO:40, SEQ ID NO:41, SEQ ID NO:42, SEQ ID NO:43, SEQ ID NO:44, SEQ ID NO:45, SEQ ID NO:46, SEQ ID NO:47, SEQ ID NO:48, SEQ ID NO:49, SEQ ID NO:50, SEQ ID NO:51, SEQ ID NO:52, SEQ ID NO:53, SEQ ID NO:54, SEQ ID NO:55, SEQ ID NO:56, SEQ ID NO:57, SEQ ID NO:58, SEQ ID NO:59, SEQ ID NO:60, SEQ ID NO:61, SEQ ID NO:62, SEQ ID NO:63, SEQ ID NO:64, SEQ ID NO:65, SEQ ID NO:66, SEQ ID NO:67, SEQ ID NO:68, SEQ ID NO:69, SEQ ID NO:70, SEQ ID NO:71, SEQ ID NO:72, SEQ ID NO:73, SEQ ID NO:74, SEQ ID NO:75, SEQ ID NO:76, SEQ ID NO:77, SEQ ID NO:78, SEQ ID NO:79, SEQ ID NO:80, SEQ ID NO:81, SEQ ID NO:82, SEQ ID NO:83, SEQ ID NO:84, SEQ ID NO:85, SEQ ID NO:86, SEQ ID NO:87, SEQ ID NO:88, SEQ ID NO:89, SEQ ID NO:90, SEQ ID NO:91, SEQ ID NO:92, SEQ ID NO:93, SEQ ID NO:94, SEQ ID NO:95, SEQ ID NO:96, SEQ ID NO:97, SEQ ID NO:98, SEQ ID NO:99, SEQ ID NO:100, SEQ ID NO:101, SEQ ID NO:102, SEQ ID NO:103, SEQ ID NO:104, SEQ ID NO:105, SEQ ID NO:106, SEQ ID NO:107, SEQ ID NO:108, SEQ ID NO:109, SEQ ID NO:110, SEQ ID NO:111, SEQ ID NO:112, SEQ ID NO:113, SEQ ID NO:114, SEQ ID NO:115, SEQ ID NO:116, SEQ ID NO:117, SEQ ID NO:118, SEQ ID NO:119, SEQ ID NO:120, SEQ ID NO:121, SEQ ID NO:122, SEQ ID NO:123, SEQ ID NO:124, SEQ ID NO:125, SEQ ID NO:126, SEQ ID NO:127, SEQ ID NO:128, SEQ ID NO:129, SEQ ID NO:130, SEQ ID NO:131, SEQ ID NO:132, SEQ ID NO:133, SEQ ID NO:134, SEQ ID NO:135, SEQ ID NO:136, SEQ ID NO:137, SEQ ID NO:138, SEQ ID NO:139, SEQ ID NO:140, SEQ ID NO:141, SEQ ID NO:142, SEQ ID NO:143, SEQ ID NO:144, SEQ ID NO:145, SEQ ID NO:146, SEQ ID NO:147 or a fragment thereof.

In one aspect the at least one protein is selected from the group consisting of Farnesyl pyrophosphate synthase, neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, Heat Shock Protein Cognate 71 kDa, Ankyrin-3, Rho 23 GTPase-activating protein, Cytoskeletal Keratin 78 type II, Alpha-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a combination thereof. In another aspect, the at least one protein is selected from the group consisting of SEQ ID NO:1, SEQ ID NO:2, SEQ ID NO:3, SEQ ID NO:4, SEQ ID NO:5, SEQ ID NO:6, SEQ ID NO:7, SEQ ID NO:8, SEQ ID NO:9, SEQ ID NO:10, SEQ ID NO:11, SEQ ID NO:12, SEQ ID NO:13, SEQ ID NO:14, SEQ ID NO:15, SEQ ID NO:16, SEQ ID NO:17, SEQ ID NO:18, SEQ ID NO:19, SEQ ID NO:20, SEQ ID NO:21, SEQ ID NO:22, SEQ ID NO:23, SEQ ID NO:24, SEQ ID NO:25, SEQ ID NO:26, SEQ ID NO:27, SEQ ID NO:28, SEQ ID NO:29, SEQ ID NO:30, SEQ ID NO:31, SEQ ID NO:32, SEQ ID NO:33, SEQ ID NO:34, SEQ ID NO:35, SEQ ID NO:36, SEQ ID NO:37, SEQ ID NO:38, SEQ ID NO:39, SEQ ID NO:40, SEQ ID NO:41, SEQ ID NO:42, SEQ ID NO:43, SEQ ID NO:44, SEQ ID NO:45, SEQ ID NO:46, SEQ ID NO:47, SEQ ID NO:48, SEQ ID NO:49, SEQ ID NO:50, SEQ ID NO:51, SEQ ID NO:52, SEQ ID NO:53, SEQ ID NO:54, SEQ ID NO:55, SEQ ID NO:56, SEQ ID NO:57, SEQ ID NO:58, SEQ ID NO:59, SEQ ID NO:60, SEQ ID NO:61, SEQ ID NO:62, SEQ ID NO:63, SEQ ID NO:64, SEQ ID NO:65, SEQ ID NO:66, SEQ ID NO:67, SEQ ID NO:68, SEQ ID NO:69, SEQ ID NO:70, SEQ ID NO:71, SEQ ID NO:72, SEQ ID NO:73, SEQ ID NO:74, SEQ ID NO:75, SEQ ID NO:76, SEQ ID NO:77, SEQ ID NO:78, SEQ ID NO:79, SEQ ID NO:80, SEQ ID NO:81, SEQ ID NO:82, SEQ ID NO:83, SEQ ID NO:84, SEQ ID NO:85, SEQ ID NO:86, SEQ ID NO:87, SEQ ID NO:88, SEQ ID NO:89, SEQ ID NO:90, SEQ ID NO:91, SEQ ID NO:92, SEQ ID NO:93, SEQ ID NO:94, SEQ ID NO:95, SEQ ID NO:96, SEQ ID NO:97, SEQ ID NO:98, SEQ ID NO:99, SEQ ID NO:100, SEQ ID NO:101, SEQ ID NO:102, SEQ ID NO:103, SEQ ID NO:104, SEQ ID NO:105, SEQ ID NO:106, SEQ ID NO:107, SEQ ID NO:108, SEQ ID NO:109, SEQ ID NO:110, SEQ ID NO:111, SEQ ID NO:112, SEQ ID NO:113, SEQ ID NO:114, SEQ ID NO:115, SEQ ID NO:116, SEQ ID NO:117, SEQ ID NO:118, SEQ ID NO:119, SEQ ID NO:120, SEQ ID NO:121, SEQ ID NO:122, SEQ ID NO:123, SEQ ID NO:124, SEQ ID NO:125, SEQ ID NO:126, SEQ ID NO:127, SEQ ID NO:128, SEQ ID NO:129, SEQ ID NO:130, SEQ ID NO:131, SEQ ID NO:132, SEQ ID NO:133, SEQ ID NO:134, SEQ ID NO:135, SEQ ID NO:136, SEQ ID NO:137, SEQ ID NO:138, SEQ ID NO:139, SEQ ID NO:140, SEQ ID NO:141, SEQ ID NO:142, SEQ ID NO:143, SEQ ID NO:144, SEQ ID NO:145, SEQ ID NO:146, SEQ ID NO:147 or a combination thereof.

The biomarkers of the present invention may be used individually or in combinations for the diagnosis of cervical cancer. Any combination of the biomarkers listed above and in Table 1 can be used for the diagnosis of cervical cancers.

In another aspect, the at least one polypeptide comprises Farnesyl pyrophosphate synthase or fragment thereof and at least one polypeptide selected from neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, Heat shock protein cognate 71 kDa, Ankyrin-3, Rho 23 GTPase-activating protein, Cytoskeletal Keratin 78 type II, Alpha-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof. In an additional aspect, the at least one polypeptide comprises a polypeptide having at least about 70% sequence identity to a polypeptide having the amino acid sequence of SEQ ID NO:1 and at least one polypeptide selected from a polypeptide with at least about 70% sequence identity to a polypeptide having the amino acid sequence selected from SEQ ID NOs:2-20 or a fragment thereof.

In one aspect, the at least one polypeptide comprises Farnesyl pyrophosphate synthase and neurofibromin I; Farnesyl pyrophosphate synthase and Glyceraldehyde-3 phosphate dehydrogenase; Farnesyl pyrophosphate synthase and Protein 1 containing fibronectin domain type III; Farnesyl pyrophosphate synthase and Eukaryotic initiation factor 4A-I; Farnesyl pyrophosphate synthase and L-lactate dehydrogenase chain B; Farnesyl pyrophosphate synthase and Nuclear heterogeneous Ribonucleoprotein A1; Farnesyl pyrophosphate synthase and polycystic kidney disease protein 1-like 1; Farnesyl pyrophosphate synthase and heat shock protein Cognate 71 kDa; Farnesyl pyrophosphate synthase and Ankyrin-3; Farnesyl pyrophosphate synthase and Rho 23; Farnesyl pyrophosphate synthase and Rho 23-GTPase-activating protein; Farnesyl pyrophosphate synthase and Cytoskeletal Keratin 78 type II; Farnesyl pyrophosphate synthase and collagen chain (VI) Alpha-3; Farnesyl pyrophosphate synthase and Beta subunit of proteasome type-5; Farnesyl pyrophosphate synthase and Heterogeneous nuclear ribonucleoproteins A2/B1; Farnesyl pyrophosphate synthase and Histone H2B type 1-B; Farnesyl pyrophosphate synthase and homolog of DnaJ subfamily C member 13; Farnesyl pyrophosphate synthase and Beta enolase; Farnesyl pyrophosphate synthase and Glutathione S-transferase P; Farnesyl pyrophosphate synthase and Glutathione S-transferase Mu 3; or fragments thereof.

In another aspect, the at least one polypeptide comprises SEQ ID NO:1 and SEQ ID NO:2; SEQ ID NO:1 and SEQ ID NO:3; SEQ ID NO:1 and SEQ ID NO:4; SEQ ID NO:1 and SEQ ID NO:5; SEQ ID NO:1 and SEQ ID NO:6; SEQ ID NO:1 and SEQ ID NO:7; SEQ ID NO:1 and SEQ ID NO:8; SEQ ID NO:1 and SEQ ID NO:9; SEQ ID NO:1 and SEQ ID NO:10; SEQ ID NO:1 and SEQ ID NO:11; SEQ ID NO:1 and SEQ ID NO:12; SEQ ID NO:1 and SEQ ID NO:13; SEQ ID NO:1 and SEQ ID NO:14; SEQ ID NO:1 and SEQ ID NO:15; SEQ ID NO:1 and SEQ ID NO:16; SEQ ID NO:1 and SEQ ID NO:17; SEQ ID NO:1 and SEQ ID NO:18; SEQ ID NO:1 and SEQ ID NO:19; SEQ ID NO:1 and SEQ ID NO:20; or fragments thereof.

In one aspect, the at least one polypeptide comprises Farnesyl pyrophosphate synthase or a fragment thereof, neurofibromin or a fragment thereof, and at least one additional polypeptide selected from the group consisting of Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, Heat Shock Protein Cognate 71 kDa, Ankyrin-3, Rho 23 GTPase-activating protein, Cytoskeletal Keratin 78 type II, Alpha-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 and a fragment thereof.

In another aspect, the at least one polypeptide comprises Farnesyl pyrophosphate synthase or a fragment thereof, Glyceraldehyde-3 phosphate dehydrogenase or a fragment thereof, and at least one additional polypeptide selected from the group consisting of neurofibromin, Protein 1 containing fibronectin domain type III, Eukaryotic initiation factor 4A-I, L-lactate dehydrogenase chain B, Nuclear heterogeneous Ribonucleoprotein A1, polycystic kidney disease protein 1-like 1, heat shock protein Cognate 71 kDa, Ankyrin-3, Rho 23 GTPase-activating protein, Cytoskeletal Keratin 78 type II, collagen chain (VI) Alpha-3, Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 and a fragment thereof.

In one aspect, the at least one polypeptide comprises Farnesyl pyrophosphate synthase or a fragment thereof, Protein 1 containing fibronectin domain type III or a fragment thereof, and at least one additional polypeptide selected from the group consisting of neurofibromin, Glyceraldehyde-3 phosphate dehydrogenase, Eukaryotic initiation factor 4A-I, L-lactate dehydrogenase chain B, Nuclear heterogeneous Ribonucleoprotein A1, polycystic kidney disease protein 1-like 1, heat shock protein Cognate 71 kDa, Ankyrin-3, Rho 23 GTPase-activating protein, Cytoskeletal Keratin 78 type II, collagen chain (VI) Alpha-3, Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 and a fragment thereof.

In another aspect, the at least one polypeptide comprises Farnesyl pyrophosphate synthase or a fragment thereof, Eukaryotic initiation factor 4A-I or a fragment thereof, and at least one additional polypeptide selected from the group consisting of neurofibromin, Glyceraldehyde-3 phosphate dehydrogenase, Protein 1 containing fibronectin domain type III, L-lactate dehydrogenase chain B, Nuclear heterogeneous Ribonucleoprotein A1, polycystic kidney disease protein 1-like 1, heat shock protein Cognate 71 kDa, Ankyrin-3, Rho 23 GTPase-activating protein, Cytoskeletal Keratin 78 type II, collagen chain (VI) Alpha-3, Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, and Glutathione S-transferase Mu 3 and a fragment thereof.

In one aspect, the at least one polypeptide comprises Farnesyl pyrophosphate synthase or a fragment thereof, L-lactate dehydrogenase chain B or a fragment thereof, and at least one additional polypeptide selected from the group consisting of neurofibromin, Glyceraldehyde-3 phosphate dehydrogenase, Protein 1 containing fibronectin domain type III, Eukaryotic initiation factor 4A-I, Nuclear heterogeneous Ribonucleoprotein A1, polycystic kidney disease protein 1-like 1, heat shock protein Cognate 71 kDa, Ankyrin-3, Rho 23 GTPase-activating protein, Cytoskeletal Keratin 78 type II, collagen chain (VI) Alpha-3, Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 and a fragment thereof.

In another aspect, the at least one polypeptide comprises Farnesyl pyrophosphate synthase or a fragment thereof, Nuclear heterogeneous Ribonucleoprotein A1 or a fragment thereof, and at least one additional polypeptide selected from the group consisting of neurofibromin, Glyceraldehyde-3 phosphate dehydrogenase, Protein 1 containing fibronectin domain type III, Eukaryotic initiation factor 4A-I, L-lactate dehydrogenase chain B, polycystic kidney disease protein 1-like 1, heat shock protein Cognate 71 kDa, Ankyrin-3, Rho 23 GTPase-activating protein, Cytoskeletal Keratin 78 type II, collagen chain (VI) Alpha-3, Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 and a fragment thereof.

In one aspect, the at least one polypeptide comprises Farnesyl pyrophosphate synthase or a fragment thereof, polycystic kidney disease protein 1-like 1 or a fragment thereof, and at least one additional polypeptide selected from the group consisting of neurofibromin, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, heat shock protein Cognate 71 kDa, Ankyrin-3, Rho 23 GTPase-activating protein, Cytoskeletal Keratin 78 type II, collagen chain (VI) Alpha-3, Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 and a fragment thereof.

In another aspect, the at least one polypeptide comprises Farnesyl pyrophosphate synthase or a fragment thereof, heat shock protein Cognate 71 kDa or a fragment thereof, and at least one additional polypeptide selected from the group consisting of neurofibromin, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, polycystic kidney disease protein 1-like 1, Ankyrin-3, Rho 23 GTPase-activating protein, Cytoskeletal Keratin 78 type II, collagen chain (VI) Alpha-3, Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 and a fragment thereof.

In one aspect, the at least one polypeptide comprises Farnesyl pyrophosphate synthase or a fragment thereof, Ankyrin-3 or a fragment thereof, and at least one additional polypeptide selected from the group consisting of neurofibromin, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, polycystic kidney disease protein 1-like 1, heat shock protein Cognate 71 kDa, Rho 23 GTPase-activating protein, Cytoskeletal Keratin 78 type II, collagen chain (VI) Alpha-3, Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 and a fragment thereof.

In another aspect, the at least one polypeptide comprises Farnesyl pyrophosphate synthase or a fragment thereof, Rho 23 GTPase-activating protein or a fragment thereof, and at least one additional polypeptide selected from the group consisting of neurofibromin, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, polycystic kidney disease protein 1-like 1, heat shock protein Cognate 71 kDa, Ankyrin-3, Cytoskeletal Keratin 78 type II, collagen chain (VI) Alpha-3, Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 and a fragment thereof.

In one aspect, the at least one polypeptide comprises Farnesyl pyrophosphate synthase or a fragment thereof, Cytoskeletal Keratin 78 type II or a fragment thereof, and at least one additional polypeptide selected from the group consisting of neurofibromin, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, polycystic kidney disease protein 1-like 1, heat shock protein Cognate 71 kDa, Ankyrin-3, Rho 23 GTPase-activating protein, collagen chain (VI) Alpha-3, Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 and a fragment thereof.

In another aspect, the at least one polypeptide comprises Farnesyl pyrophosphate synthase or a fragment thereof, collagen chain (VI) Alpha-3 or a fragment thereof, and at least one additional polypeptide selected from the group consisting of neurofibromin, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, polycystic kidney disease protein 1-like 1, heat shock protein Cognate 71 kDa, Ankyrin-3, Rho 23 GTPase-activating protein, Cytoskeletal Keratin 78 type II, Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 and a fragment thereof.

In one aspect, the at least one polypeptide comprises Farnesyl pyrophosphate synthase or a fragment thereof, Beta subunit of proteasome type-5 or a fragment thereof, and at least one additional polypeptide selected from the group consisting of neurofibromin, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, polycystic kidney disease protein 1-like 1, heat shock protein Cognate 71 kDa, Ankyrin-3, Rho 23 GTPase-activating protein, Cytoskeletal Keratin 78 type II, collagen chain (VI) Alpha-3, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 and a fragment thereof.

In another aspect, the at least one polypeptide comprises Farnesyl pyrophosphate synthase or a fragment thereof, Heterogeneous nuclear ribonucleoproteins A2/B1 or a fragment thereof, and at least one additional polypeptide selected from the group consisting of neurofibromin, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, polycystic kidney disease protein 1-like 1, heat shock protein Cognate 71 kDa, Ankyrin-3, Rho 23 GTPase-activating protein, Cytoskeletal Keratin 78 type II, collagen chain (VI) Alpha-3, Beta subunit of proteasome type-5, Histone H2B type 1-B, homolog of DnaJ subfamily C member 13, Beta enolase, Glutathione S-transferase P, Glutathione S-transferase Mu 3 and a fragment thereof.

In one aspect, the at least one polypeptide comprises Farnesyl pyrophosphate synthase or a fragment thereof, Histone H2B type 1-B or a fragment thereof, and at least one additional polypeptide selected from the group consisting of neurofibromin, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, polycystic kidney disease protein 1-like 1, heat shock protein Cognate 71 kDa, Ankyrin-3, Rho 23 GTPase-activating protein, Cytoskeletal Keratin 78 type II, collagen chain (VI) Alpha-3, Beta subunit of proteasome type-5, Heterogeneous nuclear ribonucleoproteins A2/B1, homolog of DnaJ subfamily C member 13, Beta enolase, Glutathione S-transferase P, Glutathione S-transferase Mu 3 and a fragment thereof.

In another aspect, the at least one polypeptide comprises Farnesyl pyrophosphate synthase or a fragment thereof, homolog of DnaJ subfamily C member 13 or a fragment thereof, and at least one additional polypeptide selected from the group consisting of neurofibromin, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, polycystic kidney disease protein 1-like 1, heat shock protein Cognate 71 kDa, Ankyrin-3, Rho 23 GTPase-activating protein, Cytoskeletal Keratin 78 type II, collagen chain (VI) Alpha-3, Beta subunit of proteasome type-5, Heterogeneous nuclear ribonucleoproteins A2/B1, Histone H2B type 1-B, Beta enolase, Glutathione S-transferase P, Glutathione S-transferase Mu 3 and a fragment thereof.

In one aspect, the at least one polypeptide comprises Farnesyl pyrophosphate synthase or a fragment thereof, Beta enolase or a fragment thereof, and at least one additional polypeptide selected from the group consisting of neurofibromin, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, polycystic kidney disease protein 1-like 1, heat shock protein Cognate 71 kDa, Ankyrin-3, Rho 23 GTPase-activating protein, Cytoskeletal Keratin 78 type II, collagen chain (VI) Alpha-3, Beta subunit of proteasome type-5, Heterogeneous nuclear ribonucleoproteins A2/B1, Histone H2B type 1-B, homolog of DnaJ subfamily C member 13, Glutathione S-transferase P, Glutathione S-transferase Mu 3 and a fragment thereof.

In another aspect, the at least one polypeptide comprises Farnesyl pyrophosphate synthase or a fragment thereof, Glutathione S-transferase P or a fragment thereof, and at least one additional polypeptide selected from the group consisting of neurofibromin, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, polycystic kidney disease protein 1-like 1, heat shock protein Cognate 71 kDa, Ankyrin-3, Rho 23 GTPase-activating protein, Cytoskeletal Keratin 78 type II, collagen chain (VI) Alpha-3, Beta subunit of proteasome type-5, Heterogeneous nuclear ribonucleoproteins A2/B1, Histone H2B type 1-B, homolog of DnaJ subfamily C member 13, Beta enolase, Glutathione S-transferase Mu 3 and a fragment thereof.

In one aspect, the at least one polypeptide comprises Farnesyl pyrophosphate synthase or a fragment thereof, Glutathione S-transferase Mu 3 or a fragment thereof, and at least one additional polypeptide selected from the group consisting of neurofibromin, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, polycystic kidney disease protein 1-like 1, heat shock protein Cognate 71 kDa, Ankyrin-3, Rho 23 GTPase-activating protein, Cytoskeletal Keratin 78 type II, collagen chain (VI) Alpha-3, Beta subunit of proteasome type-5, Heterogeneous nuclear ribonucleoproteins A2/B1, Histone H2B type 1-B, homolog of DnaJ subfamily C member 13, Beta enolase, Glutathione S-transferase P and a fragment thereof.

In one aspect, the at least one polypeptide comprises a polypeptide with at least about 70% sequence identity to a polypeptide having the amino acid sequence of SEQ ID NO:1 or a fragment thereof, and a polypeptide with at least about 70% sequence identity to a polypeptide having the amino acid sequence of SEQ ID NO:2 or a fragment thereof, and at least one additional polypeptide having at least about 70% sequence identity to a polypeptide having an amino acid sequence selected from the group consisting of SEQ ID NOs:3-20 and a fragment thereof.

In another aspect, the at least one polypeptide comprises a polypeptide with at least about 70% sequence identity to a polypeptide having the amino acid sequence of SEQ ID NO:1 or a fragment thereof, and a polypeptide with at least about 70% sequence identity to a polypeptide having the amino acid sequence of SEQ ID NO:3 or a fragment thereof, and at least one additional polypeptide having at least about 70% sequence identity to a polypeptide an amino acid sequence selected from the group consisting of SEQ ID NOs:2 and 4-20 and a fragment thereof.

In one aspect, the at least one polypeptide comprises a polypeptide with at least about 70% sequence identity to a polypeptide having the amino acid sequence of SEQ ID NO:1 or a fragment thereof, and a polypeptide with at least about 70% sequence identity to a polypeptide having the amino acid sequence of SEQ ID NO:4 or a fragment thereof, and at least one additional polypeptide having at least about 70% sequence identity to a polypeptide an amino acid sequence selected from the group consisting of SEQ ID NOs:2-3 and 5-20 and a fragment thereof.

In another aspect, the at least one polypeptide comprises a polypeptide with at least about 70% sequence identity to a polypeptide having the amino acid sequence of SEQ ID NO:1 or a fragment thereof, and a polypeptide with at least about 70% sequence identity to a polypeptide having the amino acid sequence of SEQ ID NO:5 or a fragment thereof, and at least one additional polypeptide having at least about 70% sequence identity to a polypeptide an amino acid sequence selected from the group consisting of SEQ ID NOs:2-4 and 6-20 and a fragment thereof.

In one aspect, the at least one polypeptide comprises a polypeptide with at least about 70% sequence identity to a polypeptide having the amino acid sequence of SEQ ID NO:1 or a fragment thereof, and a polypeptide with at least about 70% sequence identity to a polypeptide having the amino acid sequence of SEQ ID NO:6 or a fragment thereof, and at least one additional polypeptide having at least about 70% sequence identity to a polypeptide an amino acid sequence selected from the group consisting of SEQ ID NOs:2-5 and 7-20 and a fragment thereof.

In another aspect, the at least one polypeptide comprises a polypeptide with at least about 70% sequence identity to a polypeptide having the amino acid sequence of SEQ ID NO:1 or a fragment thereof, and a polypeptide with at least about 70% sequence identity to a polypeptide having the amino acid sequence of SEQ ID NO:7 or a fragment thereof, and at least one additional polypeptide having at least about 70% sequence identity to a polypeptide an amino acid sequence selected from the group consisting of SEQ ID NOs:2-6 and 8-20 and a fragment thereof.

In one aspect, the at least one polypeptide comprises a polypeptide with at least about 70% sequence identity to a polypeptide having the amino acid sequence of SEQ ID NO:1 or a fragment thereof, and a polypeptide with at least about 70% sequence identity to a polypeptide having the amino acid sequence of SEQ ID NO:8 or a fragment thereof, and at least one additional polypeptide having at least about 70% sequence identity to a polypeptide an amino acid sequence selected from the group consisting of SEQ ID NOs:2-7 and 9-20 and a fragment thereof.

In another aspect, the at least one polypeptide comprises a polypeptide with at least about 70% sequence identity to a polypeptide having the amino acid sequence of SEQ ID NO:1 or a fragment thereof, and a polypeptide with at least about 70% sequence identity to a polypeptide having the amino acid sequence of SEQ ID NO:9 or a fragment thereof, and at least one additional polypeptide having at least about 70% sequence identity to a polypeptide an amino acid sequence selected from the group consisting of SEQ ID NOs:2-8 and 10-20 and a fragment thereof.

In one aspect, the at least one polypeptide comprises a polypeptide with at least about 70% sequence identity to a polypeptide having the amino acid sequence of SEQ ID NO:1 or a fragment thereof, and a polypeptide with at least about 70% sequence identity to a polypeptide having the amino acid sequence of SEQ ID NO:10 or a fragment thereof, and at least one additional polypeptide having at least about 70% sequence identity to a polypeptide an amino acid sequence selected from the group consisting of SEQ ID NOs:2-9 and 11-20 and a fragment thereof.

In another aspect, the at least one polypeptide comprises a polypeptide with at least about 70% sequence identity to a polypeptide having the amino acid sequence of SEQ ID NO:1 or a fragment thereof, and a polypeptide with at least about 70% sequence identity to a polypeptide having the amino acid sequence of SEQ ID NO:11 or a fragment thereof, and at least one additional polypeptide having at least about 70% sequence identity to a polypeptide an amino acid sequence selected from the group consisting of SEQ ID NOs:2-10 and 12-20 and a fragment thereof.

In one aspect, the at least one polypeptide comprises a polypeptide with at least about 70% sequence identity to a polypeptide having the amino acid sequence of SEQ ID NO:1 or a fragment thereof, and a polypeptide with at least about 70% sequence identity to a polypeptide having the amino acid sequence of SEQ ID NO:12 or a fragment thereof, and at least one additional polypeptide having at least about 70% sequence identity to a polypeptide an amino acid sequence selected from the group consisting of SEQ ID NOs:2-11 and 13-20 and a fragment thereof.

In another aspect, the at least one polypeptide comprises a polypeptide with at least about 70% sequence identity to a polypeptide having the amino acid sequence of SEQ ID NO:1 or a fragment thereof, and a polypeptide with at least about 70% sequence identity to a polypeptide having the amino acid sequence of SEQ ID NO:13 or a fragment thereof, and at least one additional polypeptide having at least about 70% sequence identity to a polypeptide an amino acid sequence selected from the group consisting of SEQ ID NOs:2-12 and 14-20 and a fragment thereof.

In one aspect, the at least one polypeptide comprises a polypeptide with at least about 70% sequence identity to a polypeptide having the amino acid sequence of SEQ ID NO:1 or a fragment thereof, and a polypeptide with at least about 70% sequence identity to a polypeptide having the amino acid sequence of SEQ ID NO:14 or a fragment thereof, and at least one additional polypeptide having at least about 70% sequence identity to a polypeptide an amino acid sequence selected from the group consisting of SEQ ID NOs:2-13 and 15-20 and a fragment thereof.

In another aspect, the at least one polypeptide comprises a polypeptide with at least about 70% sequence identity to a polypeptide having the amino acid sequence of SEQ ID NO:1 or a fragment thereof, and a polypeptide with at least about 70% sequence identity to a polypeptide having the amino acid sequence of SEQ ID NO:15 or a fragment thereof, and at least one additional polypeptide having at least about 70% sequence identity to a polypeptide an amino acid sequence selected from the group consisting of SEQ ID NOs:2-14 and 16-20 and a fragment thereof.

In one aspect, the at least one polypeptide comprises a polypeptide with at least about 70% sequence identity to a polypeptide having the amino acid sequence of SEQ ID NO:1 or a fragment thereof, and a polypeptide with at least about 70% sequence identity to a polypeptide having the amino acid sequence of SEQ ID NO:16 or a fragment thereof, and at least one additional polypeptide having at least about 70% sequence identity to a polypeptide an amino acid sequence selected from the group consisting of SEQ ID NOs:2-15 and 17-20 and a fragment thereof.

In another aspect, the at least one polypeptide comprises a polypeptide with at least about 70% sequence identity to a polypeptide having the amino acid sequence of SEQ ID NO:1 or a fragment thereof, and a polypeptide with at least about 70% sequence identity to a polypeptide having the amino acid sequence of SEQ ID NO:17 or a fragment thereof, and at least one additional polypeptide having at least about 70% sequence identity to a polypeptide an amino acid sequence selected from the group consisting of SEQ ID NOs:2-16 and 18-20 and a fragment thereof.

In one aspect, the at least one polypeptide comprises a polypeptide with at least about 70% sequence identity to a polypeptide having the amino acid sequence of SEQ ID NO:1 or a fragment thereof, and a polypeptide with at least about 70% sequence identity to a polypeptide having the amino acid sequence of SEQ ID NO:18 or a fragment thereof, and at least one additional polypeptide having at least about 70% sequence identity to a polypeptide an amino acid sequence selected from the group consisting of SEQ ID NOs:2-17 and 19-20 and a fragment thereof.

In another aspect, the at least one polypeptide comprises a polypeptide with at least about 70% sequence identity to a polypeptide having the amino acid sequence of SEQ ID NO:1 or a fragment thereof, and a polypeptide with at least about 70% sequence identity to a polypeptide having the amino acid sequence of SEQ ID NO:19 or a fragment thereof, and at least one additional polypeptide having at least about 70% sequence identity to a polypeptide an amino acid sequence selected from the group consisting of SEQ ID NOs:2-18 and 20 and a fragment thereof.

In one aspect, the at least one polypeptide comprises a polypeptide with at least about 70% sequence identity to a polypeptide having the amino acid sequence of SEQ ID NO:1 or a fragment thereof, and a polypeptide with at least about 70% sequence identity to a polypeptide having the amino acid sequence of SEQ ID NO:20 or a fragment thereof, and at least one additional polypeptide having at least about 70% sequence identity to a polypeptide an amino acid sequence selected from the group consisting of SEQ ID NOs:2-19 and a fragment thereof.

In a further aspect, the detecting is by protein microarray, fluorescence detection, flow cytometry, microfluidic device, lateral flow assay, vertical flow assay or immunoassay. In a specific aspect, the detecting is by lateral flow.

In one aspect, the method also includes administering a treatment to the subject. In an additional aspect, the treatment is surgery, radiation, chemotherapy, targeted therapy and/or immunotherapy.

The term "treatment" is used interchangeably herein with the term "therapeutic method" and refers to both 1) therapeutic treatments or measures that cure, slow down, lessen symptoms of, and/or halt progression of a diagnosed pathologic conditions or disorder, and 2) and prophylactic/preventative measures. Those in need of treatment may include individuals already having a particular medical disorder as well as those who may ultimately acquire the disorder (i.e., those needing preventive measures).

The terms "therapeutically effective amount", "effective dose," "therapeutically effective dose", "effective amount," or the like refer to that amount of the subject compound that will elicit the biological or medical response of a tissue, system, animal or human that is being sought by the researcher, veterinarian, medical doctor or other clinician.

The terms "administration of and or "administering" should be understood to mean providing a pharmaceutical composition in a therapeutically effective amount to the subject in need of treatment. Administration routes can be enteral, topical or parenteral. As such, administration routes include but are not limited to intracutaneous, subcutaneous, intravenous, intraperitoneal, intraarterial, intrathecal, intracapsular, intraorbital, intracardiac, intradermal, transdermal, transtracheal, subcuticular, intraarticulare, subcapsular, subarachnoid, intraspinal and intrasternal, oral, sublingual buccal, rectal, vaginal, nasal ocular administrations, as well infusion, inhalation, and nebulization. The phrases "parenteral administration" and "administered parenterally" as used herein means modes of administration other than enteral and topical administration. The pharmaceutical compositions can be administered in a variety of unit dosage forms depending upon the method of administration. Suitable unit dosage forms, include, but are not limited to powders, tablets, pills, capsules, lozenges, suppositories, patches, nasal sprays, injectables, implantable sustained-release formulations, lipid complexes, etc.

The biomarkers and polypeptides disclosed herein are useful for the diagnosis of cervical cancer. As used herein, the term "diagnosis" refers to any method of detecting or determining that a subject has cervical cancer.

In another embodiment, the present invention provides a method of diagnosing cervical cancer in a subject by detecting at least one polypeptide in a sample from a subject; wherein the at least one polypeptide is selected from Farnesyl pyrophosphate synthase, neurofibromin 1, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, Heat shock protein cognate protein 71 kDa, Ankyrin-3, Rho 23 GTPase-activating protein, Cytoskeletal Keratin 78 type II, Alpha-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof; or a polypeptide with at least about 70% sequence identity to a polypeptide having the amino acid sequence to a polypeptide having the amino acid sequence selected from SEQ ID NOs: 1-147 or a fragment thereof; and diagnosing cervical cancer based on the detection of at least one polypeptide. In one aspect, the at least one polypeptide is a polypeptide with at least about 70% sequence identity to a polypeptide having the amino acid sequence selected from SEQ ID NOs:1-20 or a fragment thereof.

In one aspect, the sample is blood, plasma, urine, saliva, sweat, organ biopsy, cerebrospinal fluid (CSF), tear, vaginal fluid, feces, skin, and hair. In certain aspects, the sample is a blood sample and the subject is human.

In an additional aspect, the at least one polypeptide is selected is Farnesyl pyrophosphate synthase or a fragment thereof and at least one polypeptide selected from neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, Cognate thermal shock protein 71 kDa, Ankyrin-3, Rho 23 GTPase-activating protein, Cytoskeletal Keratin 78 type II, Alpha-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof. In a further aspect, the at least one polypeptide is a polypeptide with at least about 70% sequence identity to a polypeptide having the amino acid sequence of SEQ ID NO:1 or a fragment thereof and at least one polypeptide with at least about 70% sequence identity to a polypeptide having an amino acid sequence selected from SEQ ID NOs:2-20 or a fragment there of.

In another aspect, the detecting is by protein microarray, fluorescence detection, flow cytometry, microfluidic device, lateral flow assay, vertical flow assay or immunoassay. In a specific aspect, the detecting is by lateral flow. In one aspect, the method also includes administering a treatment to the subject. In certain aspects, the treatment is surgery, radiation, chemotherapy, targeted therapy and/or immunotherapy.

In some embodiments, diagnosing, predicting, and/or monitoring the status or outcome of a cancer may comprise determining a therapeutic regimen. Determining a therapeutic regimen may comprise administering an anti-cancer therapeutic. Alternatively, determining the treatment for the cancer may comprise modifying a therapeutic regimen. Modifying a therapeutic regimen may comprise increasing, decreasing, or terminating a therapeutic regimen.

Treatment options for cervical cancer include surgery, radiation, chemotherapy, targeted therapy, and immunotherapy.

Surgical Treatment for cervical cancer depends on the type and stage of cervical cancer. For precancerous lesion surgical interventions include ablation and excision surgery. Surgical intervention for advanced cervical cancer include hysterectomy (simple or radical) and Trachelectomy.

Radiation is used to treat cervical cancer and to treat cervical cancer recurrence. There are two types of radiation typically used for treating cervical cancer, external beam radiation and brachytherapy. External beam radiation therapy (EBRT) aims x-rays at the cancer from a machine outside the body. Treatment is much like getting a regular x-ray, but the radiation dose is stronger. When EBRT is used as the main treatment for cervical cancer, it is usually combined with chemotherapy. Brachytherapy, or internal radiation therapy, puts a source of radiation in or near the cancer. Brachytherapy is mainly used in addition to EBRT as a part of the main treatment for cervical cancer.

Chemotherapy is also used to treat cervical cancer, wither alone or in combination with another method. Chemotherapy may include cisplatin, carboplatin, paclitaxel (Taxol®), topotecan, docetaxel (Taxotere®), ifosfamide (Ifex®), 5-fluorouracil (5-FU), irinotecan (Camptosar®), gemcitabine (Gemzar®) and mitomycin. Targeted therapy for the treatment of cervical cancer includes bevacizumab. Immunotherapy for the treatment of cervical cancer includes pembrolizumab (PD-1 inhibitor).

In an additional embodiment, the present invention provides a method of treating cervical cancer in a subject in need thereof, the method is detecting at least one polypeptide in a sample from a subject; wherein the at least one polypeptide is selected from Farnesyl pyrophosphate synthase, neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, Heat shock protein cognate 71 kDa, Ankyrin-3, Rho 23 GTPase-activating protein, Cytoskeletal Keratin 78 type II, Alpha-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof; or a polypeptide with at least about 70% sequence identity to a polypeptide having the amino acid sequence selected from the group consisting of SEQ ID NOs: 1-147 or a fragment thereof; diagnosing cervical cancer based on the detection of the at least one polypeptide; and administering a treatment to the subject. In one aspect, the sample is a blood sample. In one aspect, the at least one polypeptide is a polypeptide with at least about 70% sequence identity to a polypeptide having the amino acid sequence selected from SEQ ID NOs:1-20 or a fragment thereof.

In an additional aspect, the at least one polypeptide is Farnesyl pyrophosphate synthase and at least one polypeptide selected from neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, Heat shock protein cognate 71 kDa, Ankyrin-3, Rho 23 GTPase-activating protein, Cytoskeletal Keratin 78 type II, Alpha-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof. In a further embodiment, the at least one polypeptides is a polypeptide with at least about 70% sequence identity to a polypeptide having the amino acid sequence of SEQ ID NO:1 or a fragment thereof and at least one polypeptide with at least about 70% sequence identity to a polypeptide with an amino acid sequence selected from SEQ ID NOs:2-20 or a fragment thereof.

In another aspect, the detecting is by protein microarray, fluorescence detection, flow cytometry, microfluidic device, lateral flow assay or immunoassay. In a specific aspect, the detecting is by lateral flow assay. In an additional aspect, the treatment is selected from the group consisting of surgery, radiation, chemotherapy, targeted therapy and immunotherapy. In a further aspect, the chemotherapy is cisplatin, carboplatin, paclitaxel, topotecan, docetaxel, ifosfamide, 5-fluorouracil, irinotecan, gemcitabine or mitomycin. In certain aspects, the targeted therapy is bevacizumab and the immunotherapy is pembrolizumab.

The biomarkers of the present invention can be used to predict response to treatment for cervical cancer.

In a further embodiment, the present invention provides methods of predicting a response to treatment for a subject having cervical cancer by detecting at least one polypeptide in a sample from a subject; wherein the at least one polypeptide is selected from Farnesyl pyrophosphate synthase, neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, heat shock protein cognate 71 kDa, Ankyrin-3, Rho 23 GTPase-activating protein, Cytoskeletal Keratin 78 type II, Alpha-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof; or a polypeptide with at least about 70% sequence identity to a polypeptide having amino acid sequence selected from SEQ ID NOs: 1-147 or a fragment thereof; and predicting a response to treatment based on the detection of the at least one polypeptide. In one aspect, the at least one polypeptide is a polypeptide with at least about 70% sequence identity to a polypeptide having the amino acid sequence selected from SEQ ID NOs:1-20 or a fragment thereof.

In one aspect, the at least one polypeptide is Farnesyl pyrophosphate synthase or a fragment thereof and at least one polypeptide selected from neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, Heat shock protein cognate 71 kDa, Ankyrin-3, Rho 23 GTPase-activating protein, Cytoskeletal Keratin 78 type II, Alpha-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof. In another aspect, the at least one polypeptide is a polypeptide with at least about 70% sequence identity to a polypeptide having the amino acid sequence of SEQ ID NO:1 or a fragment thereof and at least one polypeptide with at least about 70% sequence identity to a polypeptide having the amino acid sequence selected from SEQ ID NOs:2-20 or a fragment thereof.

In an additional aspect, the detecting is by protein microarray, fluorescence detection, flow cytometry, microfluidic device, lateral flow assay, vertical flow or immunoassay. In a further aspect, the detecting is by lateral flow assay. In certain aspects, the treatment is surgery, radiation, chemotherapy, targeted therapy and immunotherapy.

The biomarkers of the present application are useful for determining the stage of cervical cancer. Cervical cancer can be classified on different scales. The Papanicolau system classifies the lesions in degrees of severity, from grade I that corresponds to normal cytology, to grade V that corresponds to invasive squamous cancer of the cervix. The Richart classification system classifies the results of a cytology into: Negative, Reactive or not classifiable squamous atypical, HPV infection, Cervical intraepithelial neoplasia (CIN) grades I, II and III, carcinoma in situ and invasive squamous cancer of the cervix. Finally, the Bethesda nomenclature classifies the results of a cytology as: Negative, ASCUS-ASCH, low-grade intraepithelial lesions, high-grade intraepithelial lesions and invasive squamous cancer of the cervix.

The FIGO (International Federation of Gynecology and Obstetrics) staging system is used most often for cancers of the female reproductive organs, including cervical cancer. For cervical cancer, the clinical stage is used and is based on the results of the doctor's physical exam, biopsies, imaging tests, and a few other tests that are done in some cases, such as cystoscopy and proctoscopy.

TABLE 2

| FIGO Stage | | Stage description |
|---|---|---|
| I | IA | The cancer cells have grown from the surface of the cervix into deeper tissues of the cervix. Cancer has not spread to nearby lymph nodes. Cancer has not spread to distant sites. It has not spread to distant sites. |
| | IA1 | The area of cancer can only be seen with a microscope and is less than 3 mm (about ⅛-inch) deep. It has not spread to nearby lymph nodes. It has not spread to distant sites. |
| | IA2 | The area of cancer can only be seen with a microscope and is between 3 mm and 5 mm (about ⅕-inch) deep. It not has not spread to nearby lymph nodes. It has not spread to distant sites. |
| | 1B | This includes stage I cancer that has spread deeper than 5 mm (about ⅕ inch) but is still limited to the cervix. It has not spread to nearby lymph nodes. It has not spread to distant sites. |
| | 1B1 | The cancer is deeper than 5 mm (about ⅕-inch) but not more than 2 cm (about ⅘-inch) in size. It has not spread to nearby lymph nodes. It has not spread to distant sites. |
| | 1132 | The cancer is at least 2 cm in size but not larger than 4 cm. It has not spread to nearby lymph nodes. It has not spread to distant sites. |
| | 1B3 | The cancer is at least 4 cm in size and limited to the cervix. It has not spread to nearby lymph nodes. It has not spread to distant sites. |
| 11 | | The cancer has grown beyond the cervix and uterus, but hasn't spread to the walls of the pelvis or the lower part of the vagina. It has not spread to nearby lymph nodes. It has not spread to distant sites. |
| | 11A | The cancer has grown beyond the cervix and uterus but has not spread into the tissues next to the cervix (called the parametria). It has not spread to nearby lymph nodes. It has not spread to distant sites. |
| | HAI. | The cancer is not larger than 4 cm (about 1⅗ inches). It not has not spread to nearby lymph nodes. It has not spread to distant sites. |
| | 11A2 | The cancer is 4 cm or larger. It has not spread to nearby lymph nodes. It has not spread to distant sites. |
| | BB | The cancer has grown beyond the cervix and uterus and has spread into the tissues next to the cervix (the parametria). It has not spread to nearby lymph nodes. It has not spread to distant sites. |
| 111 | | The cancer has spread to the lower part of the vagina or the walls of the pelvis. The cancer may be blocking the ureters (tubes that carry urine from the kidneys to the bladder). It might or might not have not spread to nearby lymph nodes. It has not spread to distant sites. |

TABLE 2-continued

| FIGO Stage | Stage description |
|---|---|
| DIA | The cancer has spread to the lower part of the vagina but not the walls of the pelvis.<br>It has not spread to nearby lymph nodes.<br>It has not spread to distant sites. |
| 111B | The cancer has grown into the walls of the pelvis and/or is blocking one or both ureters causing kidney problems (called hydronephrosis).<br>It has not spread to nearby lymph nodes.<br>It has not spread to distant sites. |
| BIC | The cancer can be any size.<br>Imaging tests or a biopsy show the cancer has spread to nearby pelvic lymph nodes (BIC1) or para-aortic lymph nodes (BIC2).<br>It has not spread to distant sites. |
| IV | The cancer has grown into the bladder or rectum or to far away organs like the lungs or bones. |
| WA | The cancer has spread to the bladder or rectum or it is growing out of the pelvis. |
| IVB | The cancer has spread to distant organs outside the pelvic area, such as distant lymph nodes, lungs or bones. |

In another embodiment, the present invention provides methods for determining the stage of cervical cancer in a subject in need thereof by detecting at least one polypeptide in a sample from the subject; wherein the at least one polypeptide is selected from Farnesyl pyrophosphate synthase, neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, heat shock protein cognate 71 kDa, Ankyrin-3, Rho 23 GTPase-activating protein, Cytoskeletal Keratin 78 type II, Alpha-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof; or a polypeptide with at least about 70% sequence identity to a polypeptide having the amino acid sequence selected from SEQ ID NOs: 1-147 or a fragment thereof; and determining the stage of cervical cancer in the subject based on the detection of the at least one polypeptide. In one aspect, the at least one polypeptide is a polypeptide having the amino acid sequence selected from SEQ ID NOs:1-20 or a fragment thereof.

In one aspect, the at least one polypeptide is Farnesyl pyrophosphate synthase or a fragment thereof and at least one polypeptide selected from neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, Heat shock protein cognate 71 kDa, Ankyrin-3, Rho 23 GTPase-activating protein, Cytoskeletal Keratin 78 type II, Alpha-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof. In another aspect, the at least one polypeptide is a polypeptide with at least about 70% sequence identity to a polypeptide having the amino acid sequence of SEQ ID NO:1 or a fragment thereof and at least one polypeptide with at least about 70% sequence identity to a polypeptide having the amino acid sequence selected from SEQ ID NOs:2-20 or a fragment thereof.

In an additional aspect, the detecting is by protein microarray, fluorescence detection, flow cytometry, microfluidic device, lateral flow assay, vertical flow assay or immunoassay. In a specific aspect, the detecting is by lateral flow assay. In a further aspect, the method also includes administering a treatment to the subject. In certain aspects, the treatment is surgery, radiation, chemotherapy, targeted therapy or immunotherapy. In one aspect, the cervical cancer is stage I, stage II, stage III or stage IV.

In one embodiment, the present invention provides a kit with a sample collection unit; a lateral flow device; and instructions for using the lateral flow device.

Sample collection device is any device that can be used to collect a sample. The sample blood, plasma, urine, saliva, sweat, organ biopsy, cerebrospinal fluid (CSF), tear, vaginal fluid, feces, skin, and hair.

A lateral flow device is a simple to use diagnostic device used to confirm the presence or absence of a target analyte, such as pathogens or biomarkers in a sample. The most commonly known type of lateral flow rapid test strip is the pregnancy test.

Typically lateral flow assays use a device comprises several pads (made of a series of capillary beds, capable of transporting a fluid): a sample pad to receive the liquid sample; a conjugate pad, including reactive molecules used to visualize positive control, a positive line and a test line.

For the detection of a target protein, the conjugate pad includes antibodies specific for the target protein conjugated to a detectable tag; a positive line (positive control) is generated comprising fixed anti-anti-target protein antibodies (for example anti IgG antibodies), and a test line was generated comprising fixed anti-target protein antibodies. When the sample pad is contacted with a sample containing the target protein, the target protein reacts with the anti-target protein antibodies conjugated to a detectable tag in the conjugate pad. As the liquid flows to the test and positive lines, the target protein present in the sample, conjugated with the labeled antibodies reacted with the fixed anti-target protein antibodies on the test line, and anti-target protein antibodies conjugated to the detectable tag but not conjugated to the target protein reacts with the fixed anti-Ig antibodies on the positive line. Both reactions generate a positive reading on the test line, and on the positive line.

In one aspect, the lateral flow device detects at least one polypeptide selected from Farnesyl pyrophosphate synthase, neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, heat shock protein cognate 71 kDa, Ankyrin-3, Rho 23 GTPase-activating protein, Cytoskeletal Keratin 78 type II, Alpha-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof; or a polypeptide with at least about 70% sequence identity to a polypeptide having the amino acid sequence selected from SEQ ID NOs: 1-147 or a fragment thereof. In one aspect, the at least one polypeptide is a polypeptide with at least about 70% sequence identity to a polypeptide having the amino acid sequence selected from SEQ ID NOs:1-20 or a fragment thereof.

In an additional aspect, the at least one polypeptide is Farnesyl pyrophosphate synthase or a fragment thereof and at least one polypeptide selected from neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, heat shock protein cognate 71 kDa, Ankyrin-3, Rho 23 GTPase-activating protein, Cytoskeletal Keratin 78 type II, Alph-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof. In a further aspect, the at least one polypeptide with at least about 70% sequence identity to a polypeptide having the amino acid sequence of SEQ ID NO:1 or a fragment thereof and at least one polypeptide selected from a polypeptide with at least about 70% sequence identity to a polypeptide having the amino acid sequence selected from SEQ ID NO:2-20 or a fragment thereof.

In another aspect, the lateral flow device detects the at least one polypeptide by an immunoassay. In one aspect, the sample collection unit collects a blood sample.

In an additional embodiment, the present invention provides a use of the detection of at least one polypeptide for the diagnosis of cervical cancer in a subject in need thereof, wherein the at least one polypeptide is selected from Farnesyl pyrophosphate synthase, neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, heat shock protein cognate 71 kDa, Ankyrin-3, Rho 23 GTPase-activating protein, Cytoskeletal Keratin 78 type II, Alpha-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof; or a polypeptide with at least about 70% sequence identity to a polypeptide having the amino acid sequence selected from SEQ ID NOs: 1-147 or a fragment thereof. In one aspect, the at least one polypeptide is a polypeptide with at least about 70% sequence identity to a polypeptide having the amino acid sequence selected from SEQ ID NOs:1-20 or a fragment thereof.

In a further aspect, the at least one polypeptide is detected in a sample from the subject and the sample is a blood sample. In another aspect, the at least one polypeptide is Farnesyl pyrophosphate synthase or a fragment thereof and at least one polypeptide selected from neurofibromin I, Glyceraldehyde-3 phosphate dehydrogenase, Protein 1 containing fibronectin domain type III, Eukaryotic initiation factor 4A-I, L-lactate dehydrogenase chain B, Nuclear heterogeneous Ribonucleoprotein A1, 1-like protein 1 polycystic kidney disease, heat shock protein cognate 71 kDa, Ankyrin-3, Rho 23 GTPase-activating protein, Cytoskeletal Keratin 78 type II, Alph-3 collagen chain (VI), Beta subunit of proteasome type-5, Heterogeneous nuclear ribonucleoproteins A2/B1, Histone H2B type 1-B, homolog of DnaJ subfamily C member 13, Beta enolase, Glutathione S-transferase P, Glutathione S-transferase Mu 3 or a fragment thereof. In one aspect, the at least one polypeptide is a polypeptide with at least about 70% sequence identity to a polypeptide having the amino acid sequence of SEQ ID NO:1 or a fragment thereof and at least one polypeptide with at least about 70% sequence identity to a polypeptide having the amino acid sequence selected from SEQ ID NOs:2-20 or a fragment thereof.

In another aspect, the detecting is by protein microarray, fluorescence detection, flow cytometry, microfluidic device, lateral flow assay, vertical flow assay or immunoassay. In certain aspects, the detecting is by lateral flow assay.

The following examples are provided to further illustrate the embodiments of the present invention, but are not intended to limit the scope of the invention. While they are typical of those that might be used, other procedures, methodologies, or techniques known to those skilled in the art may alternatively be used.

EXAMPLES

Example 1

Secretome Analysis of Cervical Cancer Cell Lines

In order to identify cervical cancer biomarkers, a secretome analysis of cervical cancer cells was performed using cervical cancer cell line HeLa (cervical adenocarcinoma, positive for HPV18), SiHa cells (grade II, squamous cell cervical carcinoma, positive for HPV16), and C-33A (cervical carcinoma, negative for HPV) and the HaCaT cell line as a negative control. These lines were selected because they represent the most frequent histological types and viral genotypes in cervical intraepithelial lesions and in CC; and were either cultured (in vitro secretome), or inoculated into mice (ex vivo secretome).

Figure 2:
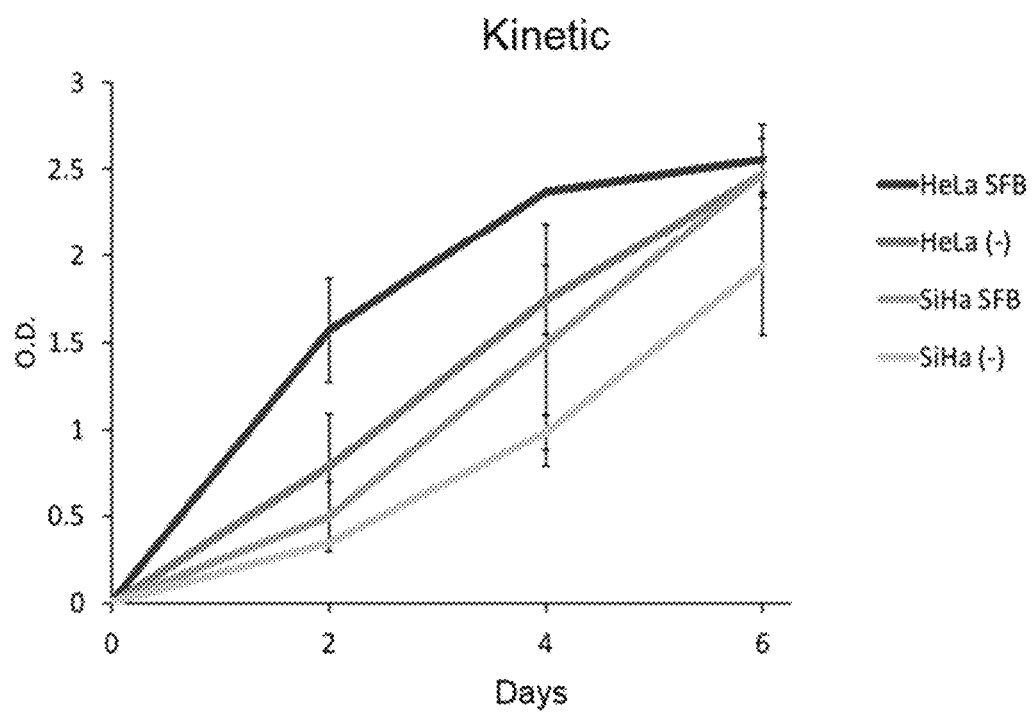
FIG. 2 is a graph showing the growth kinetics of cell lines with and without fetal bovine serum (FBS).

HeLa and SiHa cells were cultured in serum-free Advanced RPMI 1640 supplemented with 2 mM L-glutamine and Penicillin-Streptomycin at 1% v/v, at 37° C. and with 5% CO2 until a 70-80% confluence was reached. The cells were washed three times with sterile physiological solution (0.9% NaCl (w/v)). As illustrated in FIG. 2, there was no significant growth differences between the cells at day 6, when the cells reached 70% confluence.

For in vitro secretome analysis, the cells were then incubated in serum-free RPMI 1640 without phenol red for 20 hours, and the medium collected and centrifuged at 1,500 g for 5 minutes. The supernatant was passed through a 0.22 μm size PVDF membrane and stored at −70° C. until further use (see FIG. 1).

For the ex vivo secretome analysis, the secreted proteins were collected from tumors collected on female Nu/Nu mice (4-6 weeks) inoculated with 10' HeLa or SiHa cells. After 30, 45 and 50 days after inoculation, the tumors were collected (triplicate) and washed 3 times with 50 mL of physiological solution and then incubated for 20 hours with serum free RMPI medium without phenol red. The medium was removed and centrifuged at 1,500×g for 5 minutes, the supernatant was passed through a 0.22 μm pore size membrane PVDF membrane and stored at −70° C. until further use (see FIG. 1). The secreted proteins collected in vitro and ex vivo were lyophilized and resuspended in 1 mL of ultrapure water. Protein isolation was performed by phenol extraction.

Figures 3A, 3B:
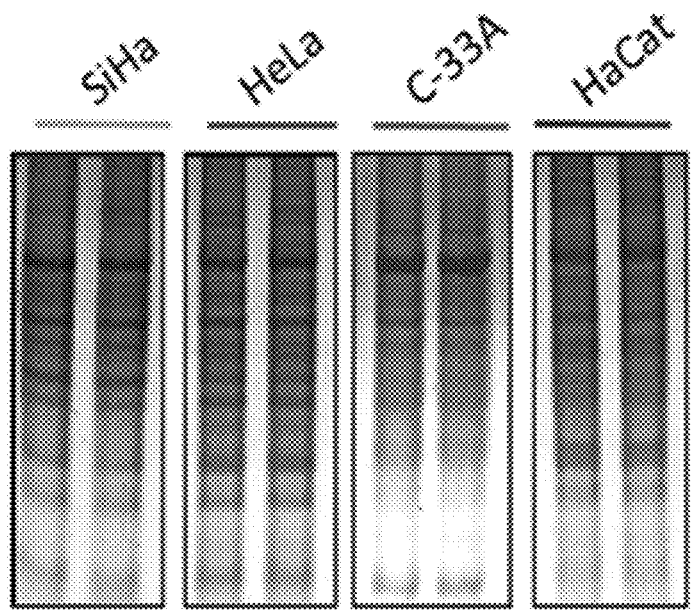
FIG. 3A show analysis of the cervical cancer line secretome and its negative control.
FIG. 3B illustrates the number of total protein in each cell line, the number of unique protein, and the protein shared between cell lines.

To identify the proteins secreted by the different cell lines, the proteins were separated by electrophoresis on an SDS-PAGE matrix and stained with bright Coomassie blue (see FIG. 3A). Each lane containing 30 μg protein was cut into 20 lines throughout the column, the proteins contained were extracted and digested with trypsin. The generated peptides were analyzed in a nano LC-MS/MS system. The identification of peptides and proteins was performed using the MASCOT search engine through the MASCOT Distiller interface. The databases consulted were Swiss-Prot and NCBI.

Figure 3C:
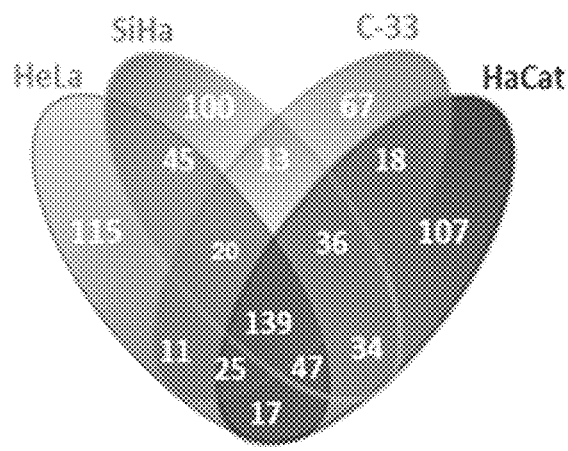
FIG. 3C is a graphical representation of the data presented in FIG. 3B.
Figure 4A:
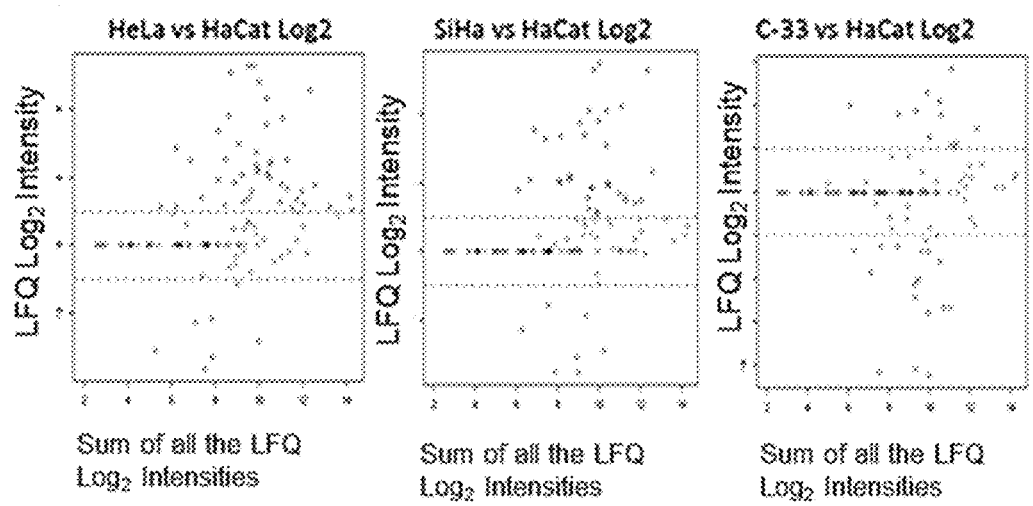
FIG. 4A shows a dotplot graph illustrating the label-free quantification (LFQ) of 200 CC cell line secretome proteins vs. their negative control.
Figure 4B:
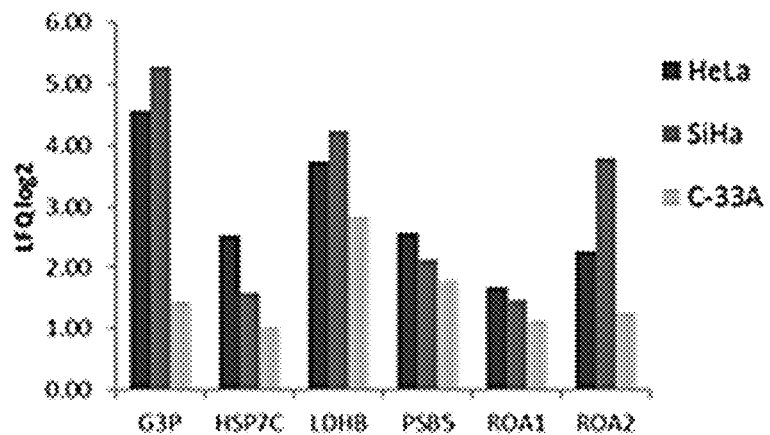
FIG. 4B is a graph bar representing the expression profile of proteins of interest.
Figure 4:
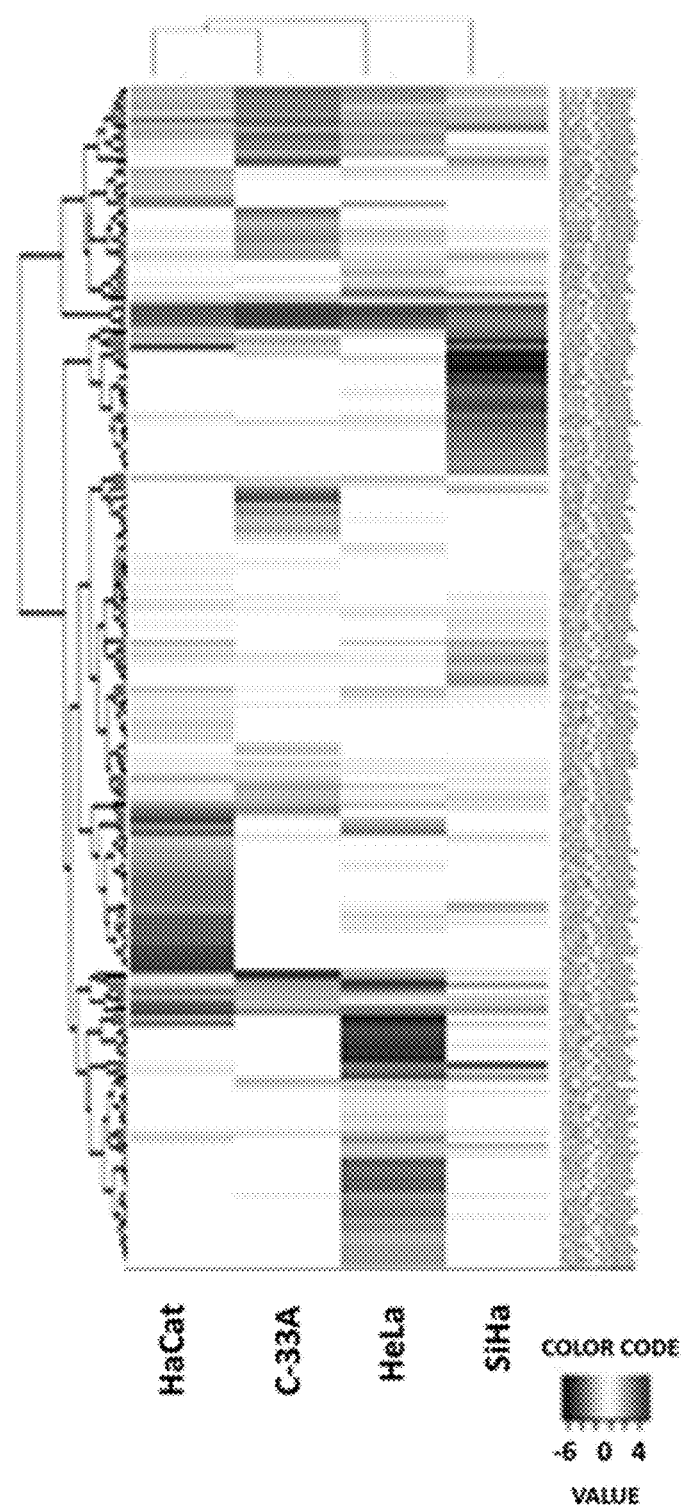
FIG. 4C is a heat map illustrating the label-free quantification (LFQ) of 200 CC cell line secretome proteins vs. their negative control.

1662 secretome proteins were identified (see FIG. 3B). As illustrated in the Venn diagram of FIG. 3C, showing the intersection between the shared proteins of the CC cell lines and their negative control, 20 proteins were shared in the 3 CC cell lines and absent in the negative control (see Table 3). These proteins were candidates for use in a rapid diagnostic test. In addition to the qualitative study, a quantitative analysis of 200 secreted proteins was performed using the label-free quantification (LFQ) technique. As shown in FIG. 4A, 92 proteins were found over-expressed in the 3 CC cell lines according to their Log 2 value (CC cell lines vs. HaCaT). For HeLa: 45 over-expressed proteins, SiHa: 35 over-expressed proteins, C-33A: 12 over-expressed proteins. As shown in FIG. 4B, 6 secreted proteins: Glyceraldehyde-3-phosphate dehydrogenase, cognate heat shock protein 71 kDa, L-lactate dehydrogenase chain B, beta subunit of proteasome type-5 and nuclear ribonucleoproteins heterogeneous A2/B1 were found over expressed in the 3 CC cell lines compared to its negative control. Further, and as shown in FIG. 4C (which represents the Heat map of proteins expressed in cell lines, where the complete linkage hierarchical grouping shows the values in Log 2 (protein expression/HSP71) on a color scale), the hierarchy analysis by cluster in the heat map revealed a similarity in protein expression between the HPV positive cell lines (SiHa and HeLa). These analyzes allowed obtaining a set of common over-expressed proteins for the HPV and CC lines.

TABLE 3

| Gene | Protein | Name |
| --- | --- | --- |
| NF1 | NF1_HUMAN | Neurofibromin |
| GAPDH | G3P_HUMAN | Glyceraldehyde-3 phosphate dehydrogenase |
| FNDC1 | FNDC1_HUMAN | Protein 1 containing fibronectin domain type III |
| EIF4A1 | IF4A1_HUMAN | Eukaryotic initiation factor 4A-I |
| LDHB | LDHB_HUMAN | L-lactate dehydrogenase chain B |
| HNRNPA1 | ROA1_HUMAN | Nuclear heterogeneous Ribonucleoprotein A1 |
| PKD1L1 | PK1L1_HUMAN | Polycystic kidney disease protein 1-like 1 |
| FDPS | FPPS_HUMAN | Farnesyl pyrophosphate synthase |
| HSPA8 | HSP7C_HUMAN | Heat Shock Protein Cognate 71 kDa |
| ANK3 | ANK3 HUMAN | Ankirin-3 |
| ARHGAP23 | ARHG23_HUMAN | Rho 23 GTPase-activating protein |
| KRT78 | K2C78_HUMAN | Cytoskeletal Keratin 78 type II |
| COL6A3 | CO6A3_HUMAN | Alpha-3 collagen chain (VI) |
| PSMB5 | PSB5_HUMAN | Beta subunit of proteasome type-5 |
| HNRNPA2B1 | ROA2_HUMAN | Heterogeneous nuclear ribonucleoproteins A2/B1 |
| HIST1H2BB | H2B1B_HUMAN | Histone H2B type 1-B |
| RME8 | DNAJC13 | homolog of DnaJ subfamily C member 13 |
| ENO3 | ENOB_HUMAN | Beta enolase |
| GSTP1 | GSTP1 HUMAN | Glutathione S-transferase P |
| GSTM3 | GSTM3 HUMAN | Glutathione S-transferase Mu 3 |

Example 2

Detection of Cervical Tumors

Figure 5A:
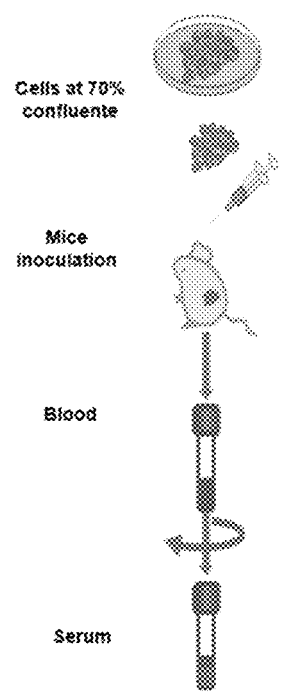
FIG. 5A illustrates the workflow to collect blood and serum samples.

To evaluate if the proteins identified in the in vitro secretome analysis could be used as biomarkers for the detection of cervical tumors, female mice were inoculated with DC cells to develop tumors, and secreted proteins were measured in the serum of the animals (see FIG. 5A).

A cohort of 9 mice was generated, with 3 different cell lines and their controls established at 3 different times of the PT (tumor progression). The mice were inoculated with 107 cells DC tumor cell lines (either HeLa or SiHa cells), and the sera were collected 30, 45 and 50 days post inoculation. Sera were subjected to a Western blot with 20 µg protein per sample. The tests were performed in triplicate and were presented as means (±standard deviation). A statistical Student's t-test was performed.

Figure 5B:
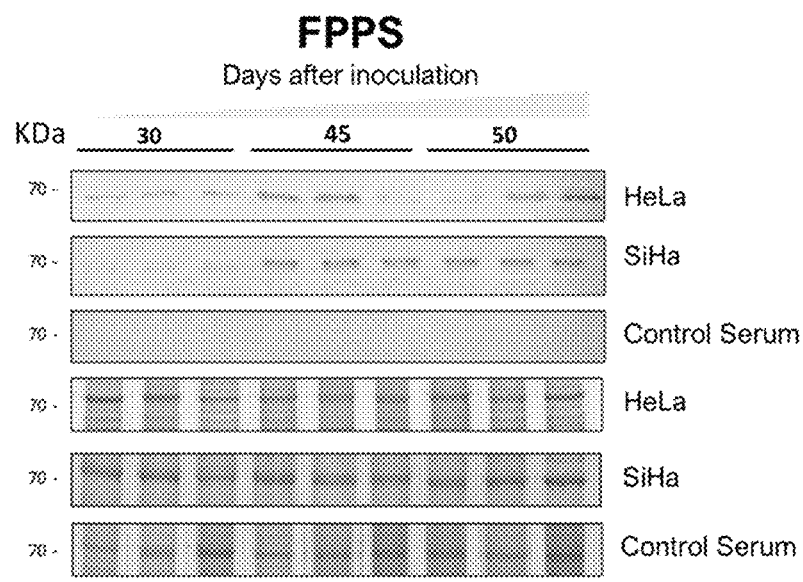
FIG. 5B illustrate the western blot analysis of FPS (farnesyl pyrophosphatase) in mouse sera.
Figure 5C:
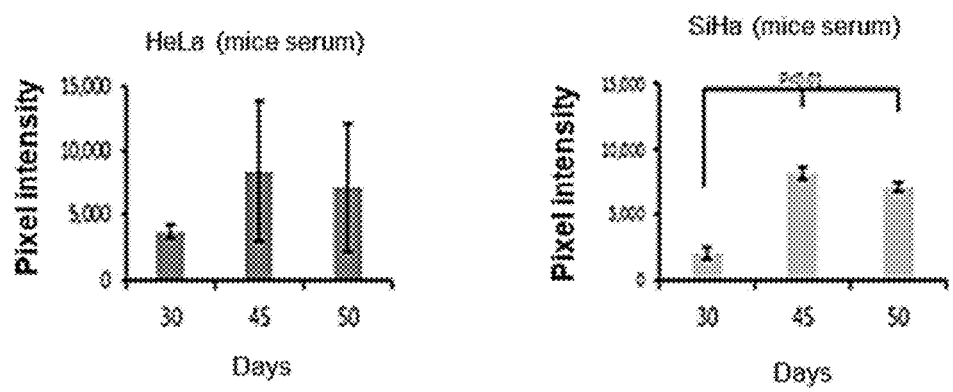
FIG. 5C illustrates the quantification of the data presented in FIG. 5B.

As illustrated in FIG. 5B, illustrating the example of the detection of one of the protein of the secretome identified in Example 1; it was found by Western blot that the farnesyl pyrophosphate synthase protein was detectable in the sera of the mice inoculated with HeLa and SiHa (sera from uninoculated mice were used as controls). The protein was found expressed in all sera of the tumor-bearing mice, an as detailed in FIG. 5C, the level of expression was found to increase levels over time in the sera of the mice inoculated with SiHa.

Figure 6A:
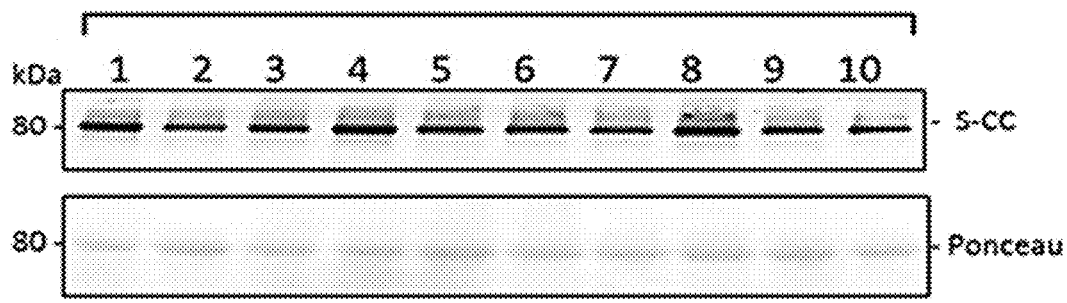
FIG. 6A illustrates the validation of the candidate protein Farnesyl pyrophosphate synthase in the sera of patients with CC.
Figure 6B:
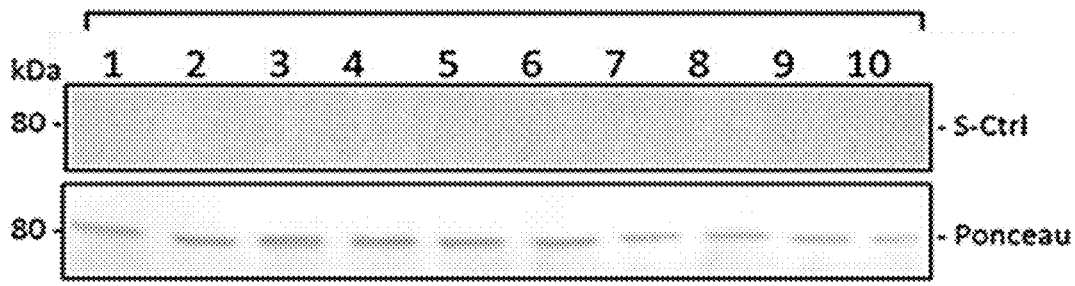
FIG. 6B illustrates the level of Farnesyl pyrophosphate synthase protein detected in the sera of control patients.
Figure 6C:
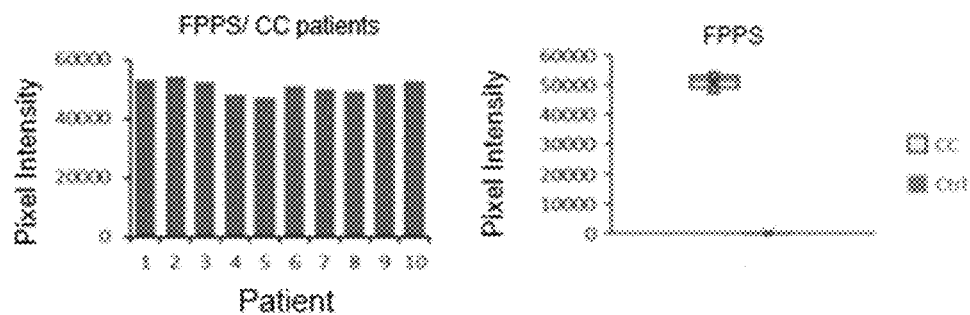
FIG. 6C illustrates the quantification of the data presented in FIGS. 6A and 6B.
Figure 7A:
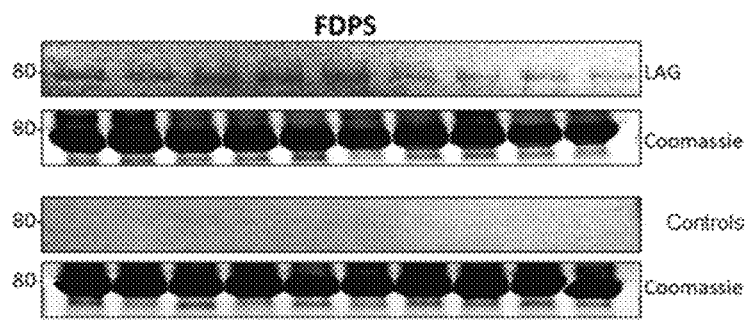
FIG. 7A illustrates the validation of the candidate protein Farnesyl pyrophosphate synthase in precancerous cervical lesions.
Figure 7B:
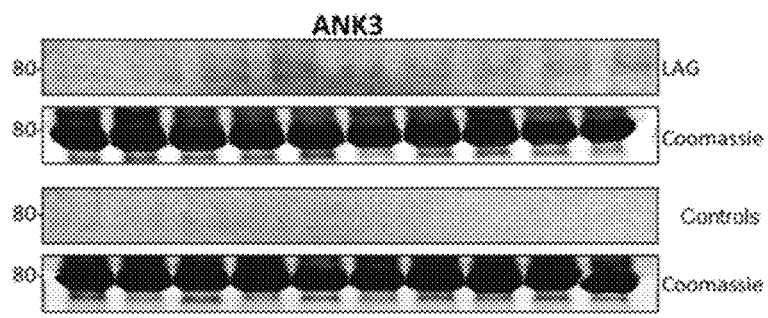
FIG. 7B illustrates the validation of the candidate protein Ankyrin-3 in precancerous cervical lesions.
Figure 7C:
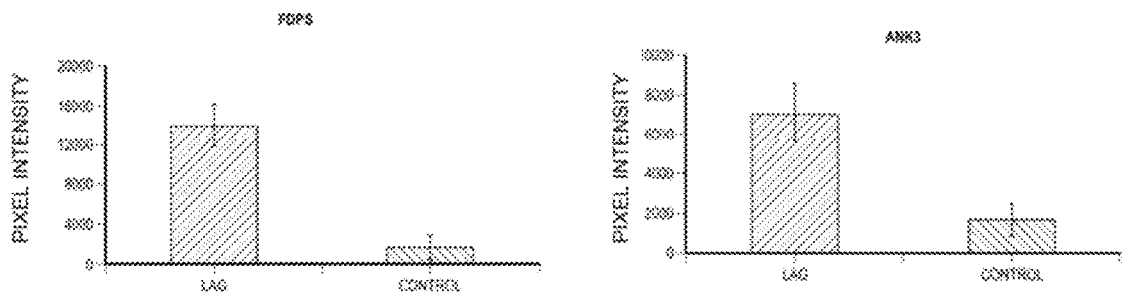
FIG. 7C illustrates the quantification of the data presented in FIGS. 7A and 7B.

The validation of the protein Farnesyl pyrophosphate synthase as a biomarker in sera was further performed in serum obtain from patients with CC:

The serum of 10 patients with CC and 10 negative controls for CC were tested, and the expression of Farnesyl pyrophosphate synthase was assessed by western blot. As illustrated in FIGS. 6A and 6B, all the patients analyzed presented Farnesyl pyrophosphate synthase expression, and no expression of Farnesyl pyrophosphate synthase was found in the sera of the controls. It was also observed that the level of expression was variable among patients (see FIG. 6C). As further illustrated in FIGS. 7A-7C, Ankyrin-3 was also demonstrated as a promising biomarker that can be used to detect cervical cancer in the serum of patient, by presenting with a significantly higher level of expression as compared to the serum of control patients. The proteome analysis of the secretome, identified 20 proteins present in CC cells and absent in negative control; and among the 6 overexpressed proteins Farnesyl pyrophosphate synthase and Ankyrin-3, used an a proof-of-principle were used to demonstrate that its level of expression (i.e., overexpression) could be analyzed in the serum of patient, showing that these proteins may be a useful promising candidate in the identification of this disease.

Example 3

Detection of Pre-Cancerous Cervical Lesions

To evaluate if the proteins identified in the in vitro secretome analysis could be used as biomarkers to detect pre-cancerous cervical lesions, the serum of patient presenting pre-cancerous cervical lesions were assessed for the detection of the biomarkers by western blot.

The serum of patients with pre-neoplasic lesions, with cervical cancer or with no lesions (control) were collected and analyzed for the expression of Ankyrin-3, Rho 23 GTPase-activating protein, Alpha-3 collagen chain (IV), Beta enolase, Farnesyl pyrophosphate synthase, Histone H2B type 1-BB, Heterogeneous nuclear ribonucleoproteins A2/B1, Heat shock protein cognate 71 kDa, Cytoskeletal Keratin 78 type II, Beta subunit of proteasome type-5 and homolog of DnaJ subfamily C member 13.

Figure 8A:
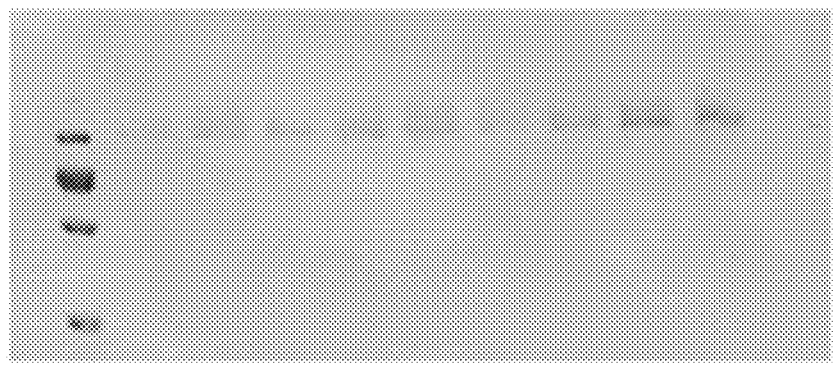
FIG. 8A illustrates the detection of Farnesyl pyrophosphate synthase by western blot in the sera of patients with pre-cancerous lesions LI.
Figure 8B:
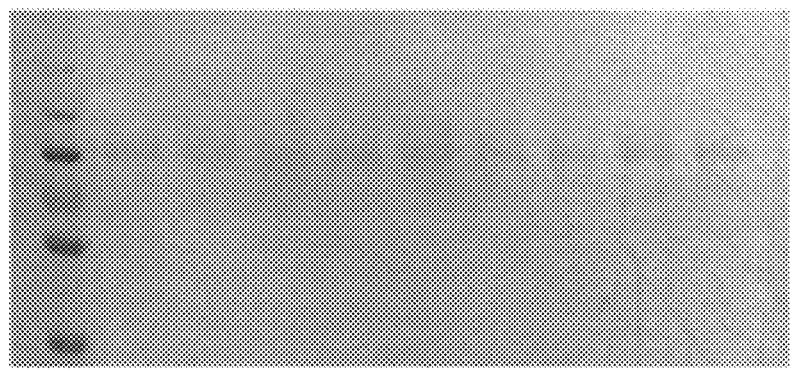
FIG. 8B illustrates the detection of Farnesyl pyrophosphate synthase by western blot in the sera of patients with pre-cancerous lesions L2.
Figure 8C:
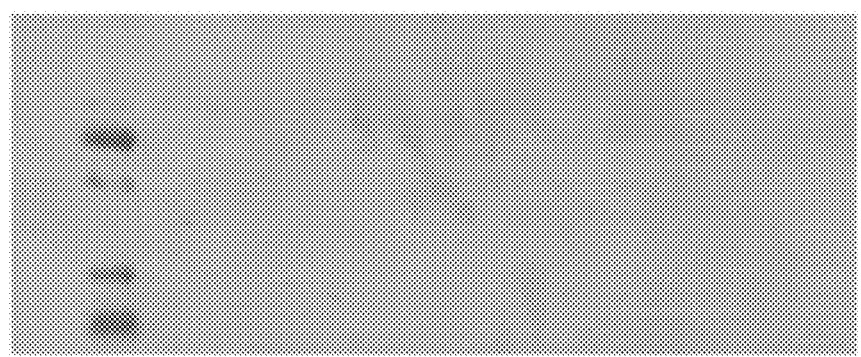
FIG. 8C illustrates the detection of Farnesyl pyrophosphate synthase by western blot in the sera of control patients.
Figure 8D:
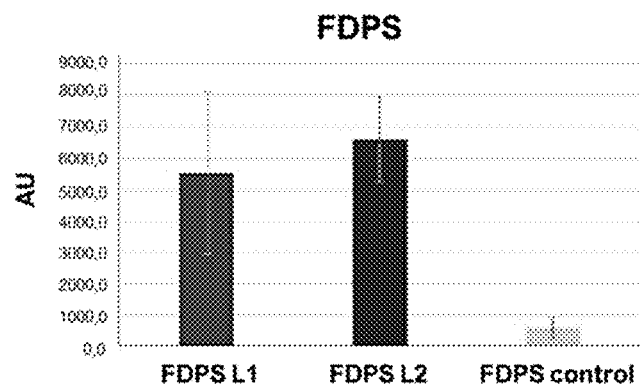
FIG. 8D illustrates the quantification of the data provided in FIG. 8A-8C.

As illustrated in FIGS. 8A-8C, it was demonstrated that Farnesyl pyrophosphate synthase was detectable in the serum of patient having pre-cancerous cervical lesions L1 and L2, as compared to control sera. Specifically, it was found that Farnesyl pyrophosphate synthase expression was 12-times higher in the serum of patient with pre-cancerous lesions as compared to control (see FIG. 8D), demonstrating that pre-cancerous lesions, as well as cancerous (see example 2) can be detected in the serum of patient, by detecting the expression of Farnesyl pyrophosphate synthase in the serum, which can be used as a biomarker for the detection of precancerous cervical lesions.

Figure 9A:
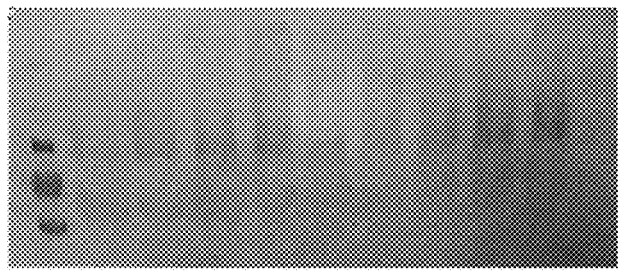
FIG. 9A illustrates the detection of Ankyrin-3 by western blot in the sera of patients with pre-cancerous lesions LI.
Figure 9B:
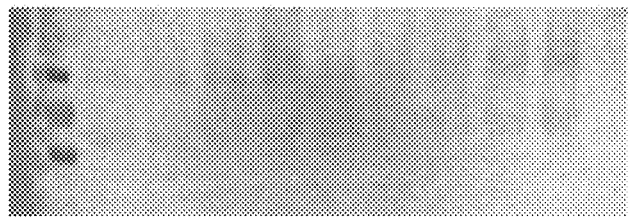
FIG. 9B illustrates the detection of Ankyrin-3 by western blot in the sera of patients with pre-cancerous lesions L2.
Figure 9C:
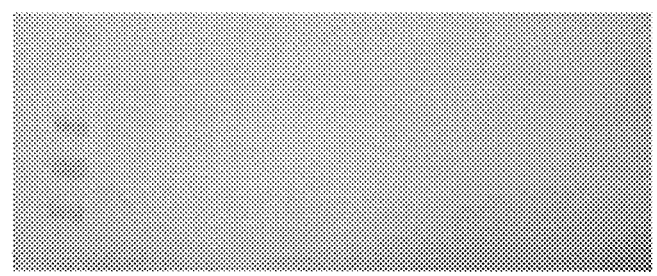
FIG. 9C illustrates the detection of Ankyrin-3 by western blot in the sera of control patients.
Figure 9D:
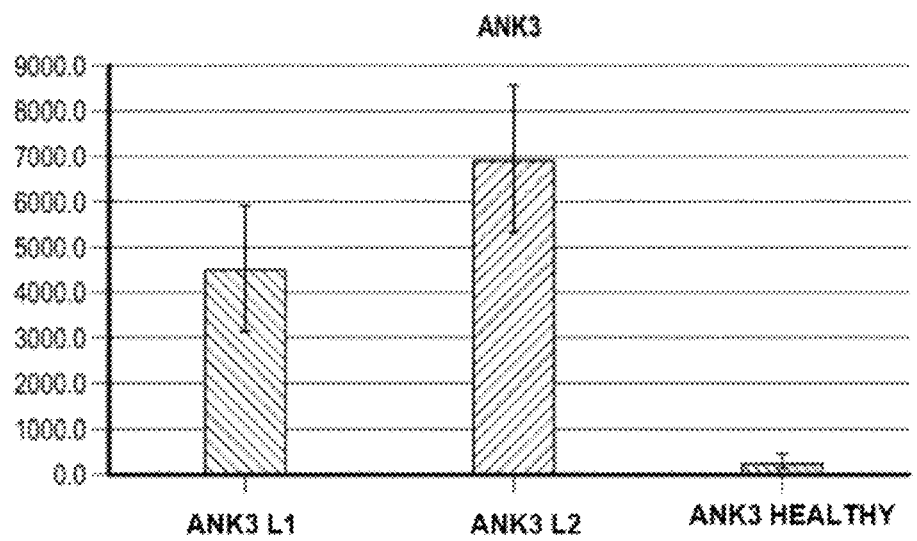
FIG. 9D illustrates the quantification of the data provided in FIG. 9A-9C.

As illustrated in FIGS. 9A-9C, it was demonstrated that Ankyrin-3 was detectable in the serum of patient having pre-cancerous cervical lesions L1 and L2, as compared to control sera. Specifically, it was found that Ankirin-3 expression was 10-times higher in the serum of patient with pre-cancerous lesions as compared to control (see FIG. 9D), demonstrating that pre-cancerous lesions, as well as cancerous (see example 2) can be detected in the serum of patient, by detecting the expression of Ankyrin-3 in the serum, which can be used as a biomarker for the detection of precancerous cervical lesions.

Similar results were obtained when the quantification of the proteins was intended by ELISA instead of by Western blot.

Example 4

Lateral Flow Assay for the Detection of Cervical Tumor and Precancerous Lesions

For lateral flow assay, strip containing dried spot antibodies for test lines and positive lines were prepared, and samples collected from patients were tested for the detection of Farnesyl pyrophosphate synthase.

Blood samples collected from patients were either directly diluted in Chase buffer at a ⅕ dilution rate (for serum sample), or further absorbed onto blood separator pad (for whole blood sample) prior to being diluted in Chase buffer. 70 ul of diluted sample were used for each test.

The strip was assembled by removing the membrane section of the protective cover and apply CN-95 membrane. Two pieces of protective cover were removed from sections above where the nitrocellulose was placed. A 21 mm wick pad was then applied by aligning the top of the wick pad with the top of the backing card edge, and the excess backing card below the membrane, was cut off, leaving just the membrane and wick pad. The strips were cut to 5.0 mm width using Kinematic Guillotine and package in pouch with desiccant.

The test and positive lines were then prepared on the strip by spot drying antibodies. 1.0 μL of test line antibody was applied around 9 mm from the bottom of the nitrocellulose on 20 precut test strips; and 1 μL of control line antibody was applied around 15 mm up from the bottom of the nitrocellulose on each pre-cut and spotted test strip. The strips were tapped down on piece of paper and place in 40 C oven for 1-hour. Once dried, the strips were packaged with desiccant. The antibodies were previously conjugated with gold (using colloidal gold) or biotinylated.

For the assay, each conjugate were diluted to 0.02% solids using 50 mM borate, 0.5% casein, 1% tween. 8 μL of conjugate were pipetted into glass tube, followed by 10 μL of serum. Half of the strip was place in glass tube, with bottom of nitro submerged in the testing solution to allow conjugate/serum solution to run up strip. 50 μL of 1×PBS, 1% tween20 were then added to glass tube to chase sample.

Using the FLI assay described herein, it was demonstrated that Farnesyl pyrophosphate synthase expression level could be determined a liquid sample collected from a patient, such as the serum, and that therefore pre-cancerous lesions of low and high grade, as well as cancerous cervical lesions could be detected using the device.

Although the invention has been described with reference to the above examples, it will be understood that modifications and variations are encompassed within the spirit and scope of the invention. Accordingly, the invention is limited only by the following claims.

What is claimed is:

1. A method comprising:
   a) detecting altered expression of at least one polypeptide in a sample from a subject; wherein the at least one polypeptide comprises:
   protein 1 containing fibronectin domain type III, L-lactate dehydrogenase chain B, 1-like protein 1 polycystic kidney disease, heat shock protein cognate 71 kDa, rho 23 GTPase-activating protein, cytoskeletal keratin 78 type II, alpha-3 collagen chain (VI), beta subunit of proteasome type-5, heterogeneous nuclear ribonucleoproteins A2/B1, histone H2B type 1-B, homolog of DnaJ subfamily c member 13, beta enolase and, glutathione S-transferase P; and
   b) diagnosing cervical cancer or a cervical lesion based on the detection of the altered expression of said at least one polypeptide; and
   c) administering a cervical cancer or cervical lesion treatment to the subject, wherein the treatment is selected from the group consisting of surgery, radiation, chemotherapy, targeted therapy and immunotherapy.

2. The method of claim 1, wherein the sample is of a human subject and selected from the group consisting of blood, plasma, urine, saliva, sweat, cerebrospinal fluid (CSF), tear, vaginal fluid, feces, skin, and hair.

3. The method of claim 1, wherein the detecting is by protein microarray, fluorescence detection, flow cytometry, microfluidic device, lateral flow assay, vertical flow or immunoassay.

4. The method of claim 1, wherein the cervical cancer treatment comprises the surgery, and the surgery comprises ablation and excision surgery of the cervical cancer.

5. The method of claim 1, wherein the cervical cancer treatment comprises the surgery, and the surgery comprises one of simple hysterectomy, radical hysterectomy, and trachelectomy.

6. The method of claim 1, wherein the cervical cancer treatment comprises the radiation, and the radiation is one or more of external beam radiation or brachytherapy targeted to in or near the cervical cancer.

7. The method of claim 1, wherein the cervical cancer treatment comprises the chemotherapy, and the chemotherapy comprises administering one selected from the group consisting of cisplatin, Carboplatin, Paclitaxel, Topotecan, docetaxel, ifosfamide, 5-fluorouracil, irinotecan, gemcitabine, and mitomycin.

8. The method of claim 1, wherein the cervical cancer treatment comprises the chemotherapy, and the chemotherapy comprises administering one selected from the group consisting of bevacizumab and pembrolizumab.

9. The method of claim 1, wherein the sample is of a human subject and selected from the group consisting of blood and plasma.

10. The method of claim 1, wherein the detecting at least one polypeptide in a sample from a subject comprises detecting histone H2B type 1-B.

11. The method of claim 1, wherein the detecting at least one polypeptide in a sample from a subject further comprises detecting at least one of farnesyl pyrophosphate synthase, neurofibromin I, glyceraldehyde-3 phosphate dehydrogenase, protein 1 containing fibronectin domain type III, eukaryotic initiation factor 4A-I, L-lactate dehydrogenase chain B, nuclear heterogeneous ribonucleoprotein A1, 1-like protein 1 polycystic kidney disease, heat shock protein cognate 71 kDa, ankyrin-3, rho 23 GTPase-activating protein, cytoskeletal keratin 78 type II, alpha-3 collagen chain (VI), beta subunit of proteasome type-5, heterogeneous nuclear ribonucleoproteins A2/B1, homolog of DnaJ subfamily C member 13, beta enolase, glutathione S-transferase P and glutathione S-transferase Mu 3.

12. The method of claim 1, wherein the detecting at least one polypeptide in a sample from a subject further comprises detecting farnesyl pyrophosphate synthase, neurofibromin I, glyceraldehyde-3 phosphate dehydrogenase, protein 1 containing fibronectin domain type III, eukaryotic initiation factor 4A-I, L-lactate dehydrogenase chain B, nuclear heterogeneous ribonucleoprotein A1, 1-like protein 1 polycystic kidney disease, heat shock protein cognate 71 kDa, ankyrin-3, rho 23 GTPase-activating protein, cytoskeletal keratin 78 type II, alpha-3 collagen chain (VI), beta subunit of proteasome type-5, heterogeneous nuclear ribonucleoproteins A2/B1, homolog of DnaJ subfamily C member 13, beta enolase, glutathione S-transferase P and glutathione S-transferase Mu 3.

13. The method of claim 3, wherein the lateral flow assay is carried out with a kit, which includes a lateral flow device, a sample collection unit and instructions for using the lateral flow device.

14. A method of diagnosing, predicting, and/or monitoring the status or outcome of cervical cancer or a cervical lesion in a subject comprising:
  a) detecting altered expression of at least one polypeptide in a sample from a subject; wherein the at least one polypeptide comprises:
  protein 1 containing fibronectin domain type III, L-lactate dehydrogenase chain B, 1-like protein 1 polycystic kidney disease, heat shock protein cognate protein 71 kDa, rho 23 GTPase-activating protein, cytoskeletal keratin 78 type II, alpha-3 collagen chain (VI), beta subunit of proteasome type-5, heterogeneous nuclear ribonucleoproteins A2/B1, histone H2B type 1-B, homolog of DnaJ subfamily c member 13, beta enolase and, glutathione S-transferase P; and
  b) one or more of diagnosing, predicting, or monitoring cervical cancer or a cervical lesion based on the detection of the altered expression of the at least one polypeptide, thereby diagnosing, predicting, and/or monitoring the status or outcome of cervical cancer.

15. The method of claim 14, wherein the sample is selected from the group consisting of blood, plasma, urine, saliva, sweat, organ biopsy, cerebrospinal fluid (CSF), tear, vaginal fluid, feces, skin, and hair.

16. The method of claim 14, wherein the detecting is by protein microarray, fluorescence detection, flow cytometry, microfluidic device, lateral flow assay, vertical flow assay or immunoassay.

17. The method of claim 14, further comprising administering a treatment to the subject.

18. The method of claim 14, wherein the detecting at least one polypeptide in a sample from a subject comprises detecting histone H2B type 1-B.

19. The method of claim 14, wherein the detecting at least one polypeptide in a sample from a subject further comprises detecting at least one of farnesyl pyrophosphate synthase, neurofibromin I, glyceraldehyde-3 phosphate dehydrogenase, protein 1 containing fibronectin domain type III, eukaryotic initiation factor 4A-I, L-lactate dehydrogenase chain B, nuclear heterogeneous ribonucleoprotein A1, 1-like protein 1 polycystic kidney disease, heat shock protein cognate 71 kDa, ankyrin-3, rho 23 GTPase-activating protein, cytoskeletal keratin 78 type II, alpha-3 collagen chain (VI), beta subunit of proteasome type-5, heterogeneous nuclear ribonucleoproteins A2/B1, homolog of DnaJ subfamily C member 13, beta enolase, glutathione S-transferase P and glutathione S-transferase Mu 3.

20. The method of claim 14, wherein the detecting at least one polypeptide in a sample from a subject further comprises detecting farnesyl pyrophosphate synthase, neurofibromin I, glyceraldehyde-3 phosphate dehydrogenase, protein 1 containing fibronectin domain type III, eukaryotic initiation factor 4A-I, L-lactate dehydrogenase chain B, nuclear heterogeneous ribonucleoprotein A1, 1-like protein 1 polycystic kidney disease, heat shock protein cognate 71 kDa, ankyrin-3, rho 23 GTPase-activating protein, cytoskeletal keratin 78 type II, alpha-3 collagen chain (VI), beta subunit of proteasome type-5, heterogeneous nuclear ribonucleoproteins A2/B1, homolog of DnaJ subfamily C member 13, beta enolase, glutathione S-transferase P and glutathione S-transferase Mu 3.

\* \* \* \* \*

SEQUENCE LISTING

```
Sequence total quantity: 147
SEQ ID NO: 1             moltype = AA  length = 419
FEATURE                  Location/Qualifiers
REGION                   1..419
                         note = misc_feature - Farnesyl pyrophosphate synthase (FDPS)
source                   1..419
                         mol_type = protein
                         organism = Homo sapiens
SEQUENCE: 1
MPLSRWLRSV GVFLLPAPYW APRERWLGSL RRPSLVHGYP VLAWHSARCW CQAWTEEPRA   60
LCSSLRMNGD QNSDVYAQEK QDFVQHFSQI VRVLTEDEMG HPEIGDAIAR LKEVLEYNAI  120
GGKYNRGLTV VVAFRELVEP RKQDADSLQR AWTVGWCVEL LQAFFLVADD IMDSSLTRRG  180
QICWYQKPGV GLDAINDANL LEACIYRLLK LYCREQPYYL NLIELFLQSS YQTEIGQTLD  240
LLTAPQGNVD LVRFTEKRYK SIVKYKTAFY SFYLPIAAAM YMAGIDGEKE HANAKKILLE  300
MGEFFQIQDD YLDLFGDPSV TGKIGTDIQD NKCSWLVVQC LQRATPEQYQ ILKENYGQKE  360
AEKVARVKAL YEELDLPAVF LQYEEDSYSH IMALIEQYAA PLPPAVFLGL ARKIYKRRK   419

SEQ ID NO: 2             moltype = AA  length = 2839
FEATURE                  Location/Qualifiers
REGION                   1..2839
                         note = misc_feature - Neurofibromin 1 (NF1)
source                   1..2839
                         mol_type = protein
                         organism = Homo sapiens
SEQUENCE: 2
MAAHRPVEWV QAVVSRFDEQ LPIKTGQQNT HTKVSTEHNK ECLINISKYK FSLVISGLTT   60
ILKNVNNMRI FGEAAEKNLY LSQLIILDTL EKCLAGQPKD TMRLDETMLV KQLLPEICHF  120
LHTCREGNQH AAELRNSASG VLFSLSCNNF NAVFSRISTR LQELTVCSED NVDVHDIELL  180
QYINVDCAKL KRLLKETAFK FKALKKVAQL AVINSLEKAF WNWVENYPDE FTKLYQIPQT  240
DMAECAEKLF DLVDGFAEST KRKAAVWPLQ IILLILCPEI IQDISKDVVD ENNMNKKLFL  300
DSLRKALAGH GGSRQLTESA AIACVKLCKA STYINWEDNS VIFLLVQSMV VDLKNLLFNP  360
SKPFSRGSQP ADVDLMIDCL VSCFRISPHN NQHFKICLAQ NSPSTFHYVL VNSLHRIITN  420
```

```
SALDWWPKID AVYCHSVELR NMFGETLHKA VQGCGAHPAI RMAPSLTFKE KVTSLKFKEK  480
PTDLETRSYK YLLLSMVKLI HADPKLLLCN PRKQGPETQG STAELITGLV QLVPQSHMPE  540
IAQEAMEALL VLHQLDSIDL WNPDAPVETF WEISSQMLFY ICKKLTSHQM LSSTEILKWL  600
REILICRNKF LLKNKQADRS SCHFLLFYGV GCDIPSSGNT SQMSMDHEEL LRTPGASLRK  660
GKGNSSMDSA AGCSGTPPIC RQAQTKLEVA LYMFLWNPDT EAVLVAMSCF RHLCEEADIR  720
CGVDEVSVHN LLPNYNTFME FASVSNMMST GRAALQKRVM ALLRRIEHPT AGNTEAWEDT  780
HAKWEQATKL ILNYPKAKME DGQAAESLHK TIVKRRMSHV SGGGSIDLSD TDSLQEWINM  840
TGFLCALGGV CLQQRSNSGL ATYSPPMGPV SERKGSMISV MSSEGNADTP VSKFMDRLLS  900
LMVCNHEKVG LQIRTNVKDL VGLELSPALY PMLFNKLKNT ISKFFDSQGQ VLLTDTNTQF  960
VEQTIAIMKN LLDNHTEGSS EHLGQASIET MMLNLVRYVR VLGNMVHAIQ IKTKLCQLVE  1020
VMMARRDDLS FCQEMKFRNK MVEYLTDWVM GTSNQAADDD VKCLTRDLDQ ASMEAVVSLL  1080
AGLPLQPEEG DGVELMEAKS QLFLKYFTLF MNLLNDCSEV EDESAQTGGR KRGMSRRLAS  1140
LRHCTVLAMS NLLNANVDSG LMHSIGLGYH KDLQTRATFM EVLTKILQQG TEFDTLAETV  1200
LADRFERLVE LVTMMGDQGE LPIAMALANV VPCSQWDELA RVLVTLFDSR HLLYQLLWNM  1260
FSKEVELADS MQTLFRGNSL ASKIMTFCFK VYGATYLQKL LDPLLRIVIT SSDWQHVSFE  1320
VDPTRLEPSE SLEENQRNLL QMTEKFFHAI ISSSSEFPPQ LRSVCHCLYQ ATCHSLLNKA  1380
TVKEKKENKK SVVSQRFPQN SIGAVGSAMF LRFINPAIVS PYEAGILDKK PPPRIERGLK  1440
LMSKILQSIA NHVLFTKEEH MRPFNDFVKS NFDAARRFFL DIASDCPTSD AVNHSLSFIS  1500
DGNVLALHRL LWNNQEKIGQ YLSSNRDHKA VGRRPFDKMA TLLAYLGPPE HKPVADTHWS  1560
SLNLTSSKFE EFMTRHQVHE KEEFKALKTL SIFYQAGTSK AGNPIFYYVA RRFKTGQING  1620
DLLIYHVLLT LKPYYAKPYE IVVDLTHTGP SNRFKTDFLS KWFVVFPGFA YDNVSAVYIY  1680
NCNSWVREYT KYHERLLTGL KGSKRLVFID CPGKLAEHIE HEQQKLPAAT LALEEDLKVF  1740
HNALKLAHKD TKVSIKVGST AVQVTSAERT KVLGQSVFLN DIYYASEIEE ICLVDENQFT  1800
LTIANQGTPL TFMHQECEAI VQSIIHIRTR WELSQPDSIP QHTKIRPKDV PGTLLNIALL  1860
NLGSSDPSLR SAAYNLLCAL TCTFNLKIEG QLLETSGLCI PANNTLFIVS ISKTLAANEP  1920
HLTLEFLEEC ISGFSKSSIE LKHLCLEYMT PWLSNLVRFC HNDDAKRQR VTAILDKLIT  1980
MTINEKQMYP SIQAKIWGSL GQITDLLDVV LDSFIKTSAT GGLGSIKAEV MADTAVALAS  2040
GNVKLVSSKV IGRMCKIIDK TCLSPTPTLE QHLMWDDIAI LARYMLMLSF NNSLDVAAHL  2100
PYLFHVVTFL VATGPLSLRA STHGLVINII HSLCTCSQLH FSEETKQVLR LSLTEFSLPK  2160
FYLLFGISKV KSAAVIAFRS SYRDRSFSPG SYERETFALT SEVTEALL EIMEACMRDI  2220
PTCKWLDQWT ELAQRFAFQY NPSLQPRALV VFGCISKRVS HGQIKQIIRI LSKALESCLK  2280
GPDTYNSQVL IEATVIALTK LQPLLNKDSP LHKALFWVAV AVLQLDEVNL YSAGTALLEQ  2340
NLHTLDSLRI FNDKSPEEVF MAIRNPLEWH CKQMDHFVGL NFNSNFNFAL VGHLLKGYRH  2400
PSPAIVARTV RILHTLLTLV NKHRNCDKFE VNTQSVAYLA ALLTVSEEVR SRCSLKHRKS  2460
LLLTDISMEN VPMDTYPIHH GDPSYRTLKE TQPWSSPKGS EGYLAATYPT VGQTSPRARK  2520
SMSLDMGQPS QANTKKLLGT RKSFDHLISD TKAPKRQEME SGITTPPKMR RVAETDYEME  2580
TQRISSSQQH PHLRKVSVSE SNVLLDEEVL TDPKIQALLL TVLATLVKYT TDEFDQRILY  2640
EYLAEASVVF PKVFPVVHNL LDSKINTLLS LCQDPNLLNP IHGIVQSVVY HEESPPQYQT  2700
SYLQSFGFNG LWRFAGPFSK QTQIPDYAEL IVKFLDALID TYLPGIDEET SEESLLTPTS  2760
PYPPALQSQL SITANLNLSN SMTSLATSQH SPGIDKENVE LSPTTGHCNS GRTRHGSASQ  2820
VQKQRSAGSF KRNSIKKIV                                            2839

SEQ ID NO: 3          moltype = AA   length = 335
FEATURE               Location/Qualifiers
REGION                1..335
                      note = misc_feature - Glyceraldehyde-3 phosphate
                      dehydrogenase (GAPDH)
source                1..335
                      mol_type = protein
                      organism = Homo sapiens
SEQUENCE: 3
MGKVKVGVNG FGRIGRLVTR AAFNSGKVDI VAINDPFIDL NYMVYMFQYD STHGKFHGTV   60
KAENGKLVIN GNPITIFQER DPSKIKWGDA GAEYVVESTG VFTTMEKAGA HLQGGAKRVI  120
ISAPSADAPM FVMGVNHEKY DNSLKIISNA SCTTNCLAPL AKVIHDNFGI VEGLMTTVHA  180
ITATQKTVDG PSGKLWRDGR GALQNIIPAS TGAAKAVGKV IPELNGKLTG MAFRVPTANV  240
SVVDLTCRLE KPAKYDDIKK VVKQASEGPL KGILGYTEHQ VVSSDFNSDT HSSTFDAGAG  300
IALNDHFVKL ISWYDNEFGY SNRVVDLMAH MASKE                            335

SEQ ID NO: 4          moltype = AA   length = 1894
FEATURE               Location/Qualifiers
REGION                1..1894
                      note = misc_feature - Protein 1 containing fibronectin
                      domain type III
REGION                1..1894
                      note = misc_feature - or Fibronectin Type III Domain
                      Containing protein 1 (FNDC1)
source                1..1894
                      mol_type = protein
                      organism = Homo sapiens
SEQUENCE: 4
MAPEAGATLR APRRLSWAAL LLLAALLPVA SSAAASVDHP LKPRHVKLLS TKMGLKVTWD   60
PPKDATSRPV EHYNIAYGKS LKSLKYIKVN AETYSFLIED VEPGVVYFVL LTAENHSGVS  120
RPVYRAESPP GGEWIEIDGF PIKGPGPFNE TVTEKEVPNK PLRVRVRSSD DRLSVAWKAP  180
RLSGAKSPRR SRGFLLGYGE SGRKMNYVPL TRDERTHEIK KLASESVYVV SLQSMNSQGR  240
SQPVYRAALT KRKISEEDEL DVPDDISVRV MSSQSLVLSW VDPVLEKQKK VVASRQYTVR  300
YREKGELARW DYKQIANRRV LIENLIPDTV YEFAVRISQG ERDGKWSTSV FQRTPESAPT  360
TAPENLNVWP VNGKPTVVAA SWDALPETEG KVKEYILSYA PALKPFGAKS LTYPGDTTSA  420
LVDGLQPGER YLFKIRATNR RGLGPHSKAF IVAMPTTSKA DVEQNTEDNG KPEKPEPSSP  480
SPRAPASSQH PSVPASPQGR NAKDLLLLDK NKILANGGAP RKPQLRAKKA EELDLQSTEI  540
```

```
TGEEELGSRE DSPMSPSDTQ DQKRTLRPPS RHGHSVVAPG RTAVRARMPA LPRREGVDKP    600
GFSLATQPRP GAPPSASASP AHHASTQGTS HRPSLPASLN DNDLVDSDED ERAVGSLHPK    660
GAFAQPRPAL SPSRQSPSSV LRDRSSVHPG AKPASPARRT PHSGAAEEDS SASAPPSRLS    720
PPHGGSSRLL PTQPHLSSPL SKGGKDGEDA PATNSNAPSR STMSSSVSSH LSSRTQVSEG    780
AEASDGESHG DGDREDGGRQ AEATAQTLRA RPASGHFHLL RHKPFAANGR SPSRFSIGRG    840
PRLQPSSSPQ STVPSRAHPR VPSHSDSHPK LSSGIHGDEE DEKPLPATVV NDHVPSSSRQ    900
PISRGWEDLR RSPQRGASLH RKEPIPENPK STGADTHPQG KYSSLASKAQ DVQQSTDADT    960
EGHSPKAQPG STDRHASPAR PPAARSQQHP SVPRRMTPGR APQQQPPPPV ATSQHHPGPQ   1020
SRDAGRSPSQ PRLSLTQAGR PRPTSQGRSH SSSDPYTASS RGMLPTALQN QDEDAQGSYD   1080
DDSTEVEAQD VRAPAHAARA KEAAASLPKH QQVESPTGAG AGGDHRSQRG HAASPARPSR   1140
PGGPQSRARV PSRAAPGKSE PPSKRPLSSK SQQSVSAEDD EEEDAGFFKG GKEDLLSSSV   1200
PKWPSSSTPR GGKDADGSLA KEEREPAIAL APRGGSLAPV KRPLPPPPGS SPRASHVPSR   1260
LPPRSAATVS PVAGTHPWPQ YTTRAPPGHF STTPMLSLRQ RMMHARFRNP LSRQPARPSY   1320
RQGYNGRPNV EGKVLPGSNG KPNGQRIING PQGTKWVVDL DRGLVLNAEG RYLQDSHGNP   1380
LRIKLGGDGR TIVDLEGTPV VSPDGLPLFG QGRHGTPLAN AQDKPILSLG GKPLVGLEVI   1440
KKTTHPPTTT MQPTTTTTPL PTTTTPRPTT ATTRRTTTTR RTTTRRPTTT VRTTTRTTTT   1500
TTPTPTTPIP TCPPGTLERH DDDGNLIMSS NGIPECYAEE DEFSGLETDT AVPTEEAYVI   1560
YDEDYEFETS RPPTTTEPST TATTPRVIPE EGAISSFPEE EFDLAGRKRF VAPYVTYLNK   1620
DPSAPCSLTD ALDHFQVDSL DEIIPNDLKK SDLPPQHAPR NITVVAVEGC HSFVIVDWDK   1680
ATPGDVVTGY LVYSASYEDF IRNKWSTQAS SVTHLPIENL KPNTRYYFKV QAQNPHGYGP   1740
ISPSVSFVTE SDNPLLVVRP PGGEPIWIPF AFKHDPSYTD CHGRQYVKRT WYRKFVGVVL   1800
CNSLRYKIYL SDNLKDTFYS IGDSWGRGED HCQFVDSHLD GRTGPQSYVE ALPTIQGYYR   1860
QYRQEPVRFG NIGFGTPYYY VGWYECGVSI PGKW                               1894

SEQ ID NO: 5             moltype = AA  length = 406
FEATURE                  Location/Qualifiers
REGION                   1..406
                         note = misc_feature - Eukaryotic initiation factor 4A-I
                           (EIF4A1)
source                   1..406
                         mol_type = protein
                         organism = Homo sapiens
SEQUENCE: 5
MSASQDSRSR DNGPDGMEPE GVIESNWNEI VDSFDDMNLS ESLLRGIYAY GFEKPSAIQQ    60
RAILPCIKGY DVIAQAQSGT GKTATFAISI LQQIELDLKA TQALVLAPTR ELAQQIQKVV   120
MALGDYMGAS CHACIGGTNV RAEVQKLQME APHIIVGTPG RVFDMLNRRY LSPKYIKMFV   180
LDEADEMLSR GFKDQIYDIF QKLNSNTQVV LLSATMPSDV LEVTKKFMRD PIRILVKKEE   240
LTLEGIRQFY INVEREEWKL DTLCDLYETL TITQAVIFIN TRRKVDWLTE KMHARDFTVS   300
AMHGDMDQKE RDVIMREFRS GSSRVLITTD LLARGIDVQQ VSLVINYDLP TNRENYIHRI   360
GRGGRFGRKG VAINMVTEED KRTLRDIETF YNTSIEEMPL NVADLI                  406

SEQ ID NO: 6             moltype = AA  length = 334
FEATURE                  Location/Qualifiers
REGION                   1..334
                         note = misc_feature - L-lactate dehydrogenase chain B (LDHB)
source                   1..334
                         mol_type = protein
                         organism = Homo sapiens
SEQUENCE: 6
MATLKEKLIA PVAEEEATVP NNKITVVGVG QVGMACAISI LGKSLADELA LVDVLEDKLK    60
GEMMDLQHGS LFLQTPKIVA DKDYSVTANS KIVVVTAGVR QQEGESRLNL VQRNVNVFKF   120
IIPQIVKYSP DCIIIVVSNP VDILTYVTWK LSGLPKHRVI GSGCNLDSAR FRYLMAEKLG   180
IHPSSCHGWI LGEHGDSSVA VWSGVNVAGV SLQELNPEMG TDNDSENWKE VHKMVVESAY   240
EVIKLKGYTN WAIGLSVADL IESMLKNLSR IHPVSTMVKG MYGIENEVFL SLPCILNARG   300
LTSVINQKLK DDEVAQLKKS ADTLWDIQKD LKDL                               334

SEQ ID NO: 7             moltype = AA  length = 372
FEATURE                  Location/Qualifiers
REGION                   1..372
                         note = misc_feature - Nuclear heterogeneous
                           Ribonucleoprotein A1 (HNRNPA1)
source                   1..372
                         mol_type = protein
                         organism = Homo sapiens
SEQUENCE: 7
MSKSESPKEP EQLRKLFIGG LSFETTDESL RSHFEQWGTL TDCVVMRDPN TKRSRGFGFV    60
TYATVEEVDA AMNARPHKVD GRVVEPKRAV SREDSQRPGA HLTVKKIFVG GIKEDTEEHH   120
LRDYFEQYGK IEVIEIMTDR GSGKKRGFAF VTFDDHDSVD KIVIQKYHTV NGHNCEVRKA   180
LSKQEMASAS SSQRGRSGSG NFGGGRGGGF GGNDNFGRGG NFSGRGGFGG SRGGGYGGS    240
GDGYNGFGND GGYGGGGPGY SGGSRGYGSG QGYGNQGSG YGGSGSYDSY NNGGGGGFGG    300
GSGSNFGGGG SYNDFGNYNN QSSNFGPMKG GNFGGRSSGP YGGGGQYFAK PRNQGGYGGS   360
SSSSSYGSGR RF                                                       372

SEQ ID NO: 8             moltype = AA  length = 2849
FEATURE                  Location/Qualifiers
REGION                   1..2849
                         note = misc_feature - Polycystic kidney disease protein
                           1-like 1 (PKD1L1)
source                   1..2849
```

```
                            mol_type = protein
                            organism = Homo sapiens
SEQUENCE: 8
MAEEAAQNIS  DDQERCLQAA  CCLSFGGELS  VSTDKSWGLH  LCSCSPPGGG  LWVEVYANHV    60
LLMSDGKCGC  PWCALNGKAE  DRESQSPSSS  ASRQKNIWKT  TSEAALSVVN  EKTQAVVNEK   120
TQAPLDCDNS  ADRIPHKPFI  IIARAWSSGG  PRFHHRRLCA  TGTADSTFSA  LLQLQGTTSA   180
AAPCSLKMEA  SCCVLRLLCC  AEDVATGLLP  GTVTMETPTK  VARPTQTSSQ  RVPLWPISHF   240
PTSPRSSHGL  PPGIPRTPSF  TASQSGSEIL  YPPTQHPPVA  ILARNSDNFM  NPVLNCSLEV   300
EARAPPNLGF  RVHMASGEAL  CLMMDFGDSS  GVEMRLHNMS  EAMAVTAYHQ  YSKGIFFHLL   360
HFQLDMSTYK  EAETQNTTLN  VYLCQSENSC  LEDSDPSNLG  YELISAFVTK  GVYMLKAVIY   420
NEFHGTEVEL  GPYYVEIGHE  AVSAFMNSSS  VHEDEVLVFA  DSQVNQKSTV  VIHHFPSIPS   480
YNVSFISQTQ  VGDSQAWHSM  TVWYKMQSVS  VYTNGTVFAT  DTDITFTAVT  KETIPLEFEW   540
YFGEDPPVRT  TSRSIKKRLS  IPQWYRVMVK  ASNRMSSVVS  EPHVIRVQKK  IVANRLTSPS   600
SALVNASVAF  ECWINFGTDV  AYLWDFGDGT  VSLGSSSSSH  VYSREGEFTV  EVLAFNNVSA   660
STLRQQLFIV  CEPCQPPLVK  NMGPGKVQIW  RSQPVRLGVT  FEAAVFCDIS  QGLSYTWNLM   720
DSEGLPVSLP  AAVDTHRQTL  ILPSHTLEYG  NYTALAKVQI  EGSVVYSNYC  VGLEVRAQAP   780
VSVISEGTHL  FFSRTTSSPI  VLRGTQSFDP  DDPGATLRYH  MECATAGSPA  HPCFDSSTAH   840
QLDAAAPTVS  FEAQWLSDSY  DQFLVMLRVS  SGGRNSSETR  VFLSPYPDSA  FRFVHISWVS   900
FKDTFVNWND  ELSLQAMCED  CSEIPNLSYS  WDLFLVNATE  KNRIEVPFCR  VVGLLGSLGL   960
GAISESSQLN  LLPTEPGTAD  PDATTTPFSR  EPSPVTLGQP  ATSAPRGTPT  EPMTGVYWIP  1020
PAGDSAVLGE  APEEGSLDLE  PGPQSKGSLM  TGRSERSQPT  HSPDPHLSDF  EAYYSDIQEA  1080
IPSGGRQPAK  DTSFPGSGPS  LSAEESPSDG  DNLVDPSLSA  GRAEPVLMID  WPKALLGRAV  1140
FQGYSSSGIT  EQTVTIKPYS  LSSGETYVLQ  VSVASKHGLL  GKAQLYLTVN  PAPRDMACQV  1200
QPHHGLEAHT  VFSVFCMSGK  PDFHYEFSYQ  IGNTSKHTLY  HGRDTQYYFV  LPAGEHLDNY  1260
KVMVSTEITD  GKGSKVQPCT  VVVTVLPRYH  GNDCLGEDLY  NSSLKNLSTL  QLMGSYTEIR  1320
NYITVITRIL  SRLSKEDKTA  SCNQWSRIQD  ALISSVCRLA  YHDQEEMIGS  VLMLRDLVSF  1380
SNKLGFMSAV  LILKYTRALL  AQGQFSGPFV  IDKGVRLELI  GLISRVWEVS  EQENSKEEVY  1440
RHEEGITVIS  DLLLGCLSLN  HVSTGQMEFR  TLLHYNLQSS  VQSLGSVQVH  LPGDLAGHSP  1500
AGAETQSPCY  ISQLILFKKN  PYPGSQAPGQ  IGGVVGLNLY  TCSSRRPINR  QWLRKPVMVE  1560
FGEEDGLDNR  RNKTTFVLLR  DKVNLHQFTE  LSENPQESLQ  IEIEFSKPVT  RAFPVMLLVR  1620
FSEKPTPSDF  LVKQIYFWDE  SIVQIYIPAA  SQKDASVGYL  SLLDADYDRK  PPNRYLAKAV  1680
NYTVHFQWIR  CLFWDKREWK  SERFSPQPGT  SPEKVNCSYH  RLAAFALLRR  KLKASFEVSD  1740
ISKLQSHPEN  LLPSIFIMGS  VILYGFLVAK  SRQVDHHEKK  KAGYIFLQEA  SLPGHQLYAV  1800
VIDTGFRAPA  RLTSKVYIVL  CGDNGLSETK  ELSCPEKPLF  ERNSRHTFIL  SAPAQLGLLR  1860
KIRLWHDSRG  PSPGWFISHV  MVKELHTGQG  WFFPAQCWLS  AGRHDGRVER  ELTCLQGGLG  1920
FRKLFYCKFT  EYLEDPHVWL  SVYSRPSSSR  YLHTPRLTVS  FSLLCVYACL  TALVAAGGQE  1980
QPHLDVSPTL  GSFRVGLLCT  LLASPGAQLL  SLLFRLSKEA  PGSARVEPHS  PLRGGAQTEA  2040
PHGPNSWGRI  PDAQEPRKQP  ASAILSGSGR  AQRKAASDNG  TACPAPKLQV  HGADHSRTSL  2100
MGKSHCCPPH  TQAPSSGLEG  LMPQWSRALQ  PWWSSAVWAI  CGTASLACSL  GTGFLAYRFG  2160
QEQCVQWLHL  LSLSVVCCIF  ITQPLMVCLM  ALGFAWKRRA  DNHFFTESLC  EATRDLLDSEL  2220
AERSWTRLPF  SSSCSIPDCA  GEVEKVLAAR  QQARHLRWAH  PPSKAQLRGT  RQRMRRESRT  2280
RAALRDISMD  ILMLLLLLCV  IYGRFSQDEY  SLNQAIRKEF  TRNARNCLGG  LRNIADWWDW  2340
SLTTLLDGLY  PGGTPSARVP  GAQPGALGGK  CYLIGSSVIR  QLKVFPRHLC  KPPRPFSALI  2400
EDSIPTCSPE  VGGPENPYLI  DPENQNVTLN  GPGGCGTRED  CVLSLGRTRT  EAHTALSRLR  2460
ASMWIDRSTR  AVSVHFTLYN  PPTQLFTSVS  LRVEILPTGS  LVPSSLVESF  SIFRSDSALQ  2520
YHLMLPQLVF  LALSLIHLCV  QLYRMMDKGV  LSYWRKPRNW  LELSVVGVSL  TYYAVSGHLV  2580
TLAGDVTNQF  HRGLCRAFMD  LTLMASWNQR  ARWLRGILLF  LFTLKCVYLP  GIQNTMASCS  2640
SMMRHSLPSI  FVAGLVGALM  LAALSHLHRF  LLSMWVLPPG  TFTDAFPGLL  FHFPRRSQKD  2700
CLLGLSKSDQ  RAMACYFGIL  LIVSATLCFG  MLRGFLMTLP  QKRKSFQSKS  FVRLKDVTAY  2760
MWEKVLTFLR  LETPKLEEAE  MVENHNYYLD  EFANLLDELL  MKINGLSDSL  QLPLLEKTSN  2820
NTGEARTEES  PLVDISSYQA  AEPADIKDF                                      2849

SEQ ID NO: 9              moltype = AA  length = 646
FEATURE                   Location/Qualifiers
REGION                    1..646
                          note = misc_feature - Cognate thermal shock protein 71 kDa
REGION                    1..646
                          note = misc_feature - or heat shock protein cognate 71 kDa
                          (HSPA8)
source                    1..646
                          mol_type = protein
                          organism = Homo sapiens
SEQUENCE: 9
MSKGPAVGID  LGTTYSCVGV  FQHGKVEIIA  NDQGNRTTPS  YVAFTDTERL  IGDAAKNQVA    60
MNPTNTVFDA  KRLIGRRFDD  AVVQSDMKHW  PFMVVNDAGR  PKVQVEYKGE  TKSFYPEEVS   120
SMVLTKMKEI  AEAYLGKTVT  NAVVTVPAYF  NDSQRQATKD  AGTIAGLNVL  RIINEPTAAA   180
IAYGLDKKVG  AERNVLIFDL  GGGTFDVSIL  TIEDGIFEVK  STAGDTHLGG  EDFDNRMVNH   240
FIAEFKRKHK  KDISENKRAV  RRLRTACERA  KRTLSSSTQA  SIEIDSLYEG  IDFYTSITRA   300
RFEELNADLF  RGTLDPVEKA  LRDAKLDKSQ  IHDIVLVGGS  TRIPKIQKLL  QDFFNGKELN   360
KSINPDEAVA  YGAAVQAAIL  SGDKSENVQD  LLLLDVTPLS  LGIETAGGVM  TVLIKRNTTI   420
PTKQTQTFTT  YSDNQPGVLI  QVYEGERAMT  KDNNLLGKFE  LTGIPPAPRG  VPQIEVTFDI   480
DANGILNVSA  VDKSTGKENK  ITITNDKGRL  SKEDIERMVQ  EAEKYKAEDE  KQRDKVSSKN   540
SLESYAFNMK  ATVEDEKLQG  KINDEDKQKI  LDKCNEIINW  LDKNQTAEKE  EFEHQQKELE   600
KVCNPIITKL  YQSAGGMPGG  MPGGFPGGGA  PPSGGASSGP  TIEEVD                  646

SEQ ID NO: 10             moltype = AA  length = 4377
FEATURE                   Location/Qualifiers
REGION                    1..4377
                          note = misc_feature - Anikirina-3
```

```
REGION              1..4377
                    note = misc_feature - or Ankyrin-3 (ANK3)
source              1..4377
                    mol_type = protein
                    organism = Homo sapiens
SEQUENCE: 10
MAHAASQLKK NRDLEINAEE EPEKKRKHRK RSRDRKKKSD ANASYLRAAR AGHLEKALDY   60
IKNGVDINIC NQNGLNALHL ASKEGHVEVV SELLQREANV DAATKKGNTA LHIASLAGQA  120
EVVKVLVTNG ANVNAQSQNG FTPLYMAAQE NHLEVVKFLL DNGASQSLAT EDGFTPLAVA  180
LQQGHDQVVS LLLENDTKGK VRLPALHIAA RKDDTKAAAL LLQNDNNADV ESKSGFTPLH  240
IAAHYGNINV ATLLLNRAAA VDFTARNDIT PLHVASKRGN ANMVKLLLDR GAKIDAKTRD  300
GLTPLHCGAR SGHEQVVEML LDRAAPILSK TKNGLSPLHM ATQGDHLNCV QLLLQHNVPV  360
DDVTNDYLTA LHVAAHCGHY KVAKVLLDKK ANPNAKALNG FTPLHIACKK NRIKVMELLL  420
KHGASIQAVT ESGLTPIHVA AFMGHVNIVS QLMHHGASPN TTNVRGETAL HMAARSGQAE  480
VVRYLVQDGA QVEAKAKDDQ TPLHISARLG KADIVQQLLQ QGASPNAATT SGYTPLHLSA  540
REGHEDVAAF LLDHGASLSI TTKKGFTPLH VAAKYGKLEV ANLLLQKSAS PDAAGKSGLT  600
PLHVAAHYDN QKVALLLLDQ GASPHAAAKN GYTPLHIAAK KNQMDIATTL LEYGADANAV  660
TRQGIASVHL AAQEGHVDMV SLLLGRNANV NLSNKSGLTP LHLAAQEDRV NVAEVLVNQG  720
AHVDAQTKMG YTPLHVGCHY GNIKIVNFLL QHSAKVNAKT KNGYTPLHQA AQQGHTHIIN  780
VLLQNNASPN ELTVNGNTAL GIARRLGYIS VVDTLKIVTE ETMTTTTVTE KHKMNVPETM  840
NEVLDMSDDE VRKANAPEML SDGEYISDVE EGEDAMTGDT DKYLGPQDLK ELGDDSLPAE  900
GYMGFSLGAR SASLRSFSSD RSYTLNRSSY ARDSMMIEEL LVPSKEQHLT FTREFDSDSL  960
RHYSWAADTL DNVNLVSSPI HSGFLVSFMV DARGGSMRGS RHHGMRIIIP PRKCTAPTRI 1020
TCRLVKRHKL ANPPPMVEGE GLASRLVEMG PAGAQFLGPV IVEIPHFGSM RGKERELIVL 1080
RSENGETWKE HQFDSKNEDL TELLNGMDEE LDSPEELGKK RICRIITKDF PQYFAVVSRI 1140
KQESNQIGPE GGILSSTTVP LVQASFPEGA LTKRIRVGLQ AQVPDEIVK ILGNKATFS  1200
PIVTVEPRRR KFHKPITMTI PVPPPSGEGV SNGYKGDTTP NLRLLCSITG GTSPAQWEDI 1260
TGTTPLTFIK DCVSFTTNVS ARFWLADCHQ VLETVGLATQ LYRELICVPY MAKFVVFAKM 1320
NDPVESSLRC FCMTDDKVDK TLEQQENFEE VARSKDIEVL EGKPIYVDCY GNLAPLTKGG 1380
QQLVFNFYSF KENRLPFSIK IRDTSQEPCG RLSFLKEPKT TKGLPQTAVC NLNITLPAHK 1440
KETESDQDDE IEKTDRRQSF ASLALRLKRYS YLTEPGMIER STGATRSLPT TYSYKPFFST 1500
RPYQSWTTAP ITVPGPAKSG FTSLSSSSSN TPSASPLKSI WSVSTPSPIK STLGASTTSS 1560
VKSISDVASP IRSFRTMSSP IKTVVSQSPY NIQVSSGTLA RAPAVTEATP LKGLASNSTF 1620
SSRTSPVTTA GSLLERSSIT MTPPASPKSN INMYSSSLPF KSIITSAAPL ISSPLKSVVS 1680
PVKSAVDVIS SAKITMASSL SSPVKQMPGH AEVALVNGSI SPLKYPSSST LINGCKATAT 1740
LQEKISSATN SVSSVVSAAT DTVEKVFSTT TAMPFSPLRS YVSAAPSAFQ SLRTPSASAL 1800
YTSLGSSISA TTSSVTSSII TVPVYSVVNV LPEPALKKLP DSNSFTKSAA ALLSPIKTLT 1860
TETHPQPHFS RTSSPVKSSL FLAPSALKLS TPSSLSSSQE ILKDVAEMKE DLMRMTAILQ 1920
TDVPEEKPFQ PELPKEGRID DEEPFKIVEK VKEDLVKVSE ILKKDVCVDN KGSPKSPKSD 1980
KGHSPEDDWI EFSSEEIREA RQQAASQSP SLPERVQVKA KAASEKDYNL TKVIDYLTND 2040
IGSSSLTNLK YKFEDAKKDG EERQKRVLKP AIALQEHKLK MPPASMRTST SEKELCKMAD 2100
SFFGTDTILE SPDDFSQHDQ DKSPLSDSGF ETRSEKTPSA PQSAESTGPK PLFHEVPIPP 2160
VITETRTEVV HVIRSYDPSA GDVPQTQPEE PVSPKPSPTF MELEPKPTTS SIKEKVKAFQ 2220
MKASSEEDDH NRVLSKGMRV KEETHITTTT RMVYHSPPGG EGASERIEET MSVHDIMKAF 2280
QSGRDPSKEL AGLFEHKSAV SPDVHKSAAE TSAQHAEKDN QMKPKLERII EVHIEKGNQA 2340
EPTEVIIRET KKHPEKEMYV YQKDLSRGDI NLKDFLPEKH DAFPCSEEQG QQEEEELTAE 2400
ESLPSYLESS RVNTPVSQEE DSRPSSAQLI SDDSYKTLKL LSQHSIEYHD DELSELRGES 2460
YRFAEKMLLS EKLDVSHSDT EESVTDHAGP PSSELQGSDK RSREKIATAP KKEILSKIYK 2520
DVSENGVGKV SKDEHFDKVT VLHYSGNVSS PKHAMWMRFT EDRLDRGREK LIYEDRVDRT 2580
VKEAEEKLTE VSQFFRDKTE KLNDELQSPE KKARPKNGKE YSSQSPTSSS PEKVLLTELL 2640
ASNDEVKAR QHGPDGQFP KAEEKAPSLP SSPEKMVLSQ QTEDSKSTVE AKGSISQKSA 2700
PDGPQSGFQL KQSKLSSIRL KFEQGTHAKS KDMSQEDRKS DGQSRIPVKK IQESKLPVYQ 2760
VFAREKQQKA IDLPDESVSV QKDFMVLKTK DEHAQSNEIV VNDSGSDNVK KQRTEMSSKA 2820
MPDSFSEQQA KDLACHITSD LATRGPWDKK VFRTWESSGA TNNKSQKEKL SHVLVHDVRE 2880
NHIGHPESKS VDQKNEFMSV TERERKLLTM GSLSEIKEMT VKSPSKKVLY REYVVKEGDH 2940
PGGLLDQPSR RSESSAVSHI PVRVADERRM LSSNIPDGFC EQSAFPKHEL SQKLSQSSMS 3000
KETVETQHFN SIEDEKVTYS EISKVSKHQS YVGLCPPLEE TETSPTKSPD SLEFSPGKES 3060
PSSDVFDHSP IDGLEKLAPL AQTEGGKEIK TLPVYVSFVQ VGKQYEKEIQ QGGVKKIISQ 3120
ECKTVQETRG TFYTTRQQKQ PPSPQGSPED DTLEQVSFLD SSGKSPLTPE TPSSEEVSYE 3180
FTSKTPDSLI AYIPGKPSPI PEVSEESEEE EQAKSTSLKQ TTVEETAVER EMPNDVSKDS 3240
NQRPKNNRVA YIEFPPPPPL DADQIESDKK HHYLPEKEVD MIEVNLQDEH DKYQLAEPVI 3300
RVQPPSPVPP GADVSDSSDD ESIYQPVPVK KYTFKLKEVD DEQKEKPKAS AEKASNQKEL 3360
ESNGSGKDNE FGLGLDSPQN EIAQNGNNDQ SITECSIATT AEFSHDTDAT EIDSLDGYDL 3420
QDEDDGLTES DSKLPIQAME IKKDIWNTEG ILKPADRSFS QSKLEVIEEE GKVGPDEDKP 3480
PSKSSSSEKT PDKTDQKSGA QFFTLEGRHP DRSVFPDTYF SYKVDEEFAT PFKTVATKGL 3540
DFDPWSNNRG DDEVFDSKSR EDETKPFGLA VEDRSPATTP DTTPARTPTD ESTPTSEPNP 3600
FPFHEGKMFE MTRSGAIDMS KRDFVEERLQ FFQIGEHTSE GKSGDQGEGD KSMVTATPQP 3660
QSGDTTVETN LERNVETPTV EPNPSIPTSG ECQEGTSSSG SLEKSAAATN TSKVDPKLRT 3720
PIKMGISAST MTMKKEGPGE ITDKIEAVMT SCQGLENETI TMISNTANSQ MGVRPHEKHD 3780
FQKDNFNNNN NLDSSTIQTD NIMSNIVLTE HSAPTCTTEK DNPVKVSSGK KTGVLQHCV  3840
RDKQKVLGEQ QKTKELIGIR QKSKLPIKAT SPKDTFPPNH MSNTKASKMK QVSQSEKTKA 3900
LTTSSCVDVK SRIPVKNTHR DNIIAVRKAC ATQKQGQPEK GKAKQLPSKL PVKVRSTCVT 3960
TTTTATTTT TTTTTTTSC TVKVRKSQLK EVCKHSIEYF KGISGETLKL VDRLSEEEKK 4020
MQSELSDEEE STSRNTSLSE TSRGGQPSVT TKSARDKKTE AAPLKSKSEK AGSEKRSSRR 4080
TGPQSPCERT DIRMAIVADH LGLSWTELAR ELNFSVDEIN QIRVENPNSL ISQSFMLLKK 4140
WVTRDGKNAT TDALTSVLTK INRIDIVTLL EGPIFDYGNI SGTRSFADEN NVFHDPVDGW 4200
QNETSSGNLE SCAQARRVTG GLLDRLDDSP DQCRDSITSY LKGEAGKFEA NGSHTEITPE 4260
AKTKSYFPES QNDVGKQSTK ETLKPKIHGS GHVEEPASPL AAYQKSLEET SKLIIEETKP 4320
CVPVSMKKMS RTSPADGKPR LSLHEEEGSS GSEQKQGEGF KVKTKKEIRH VEKKSHS    4377
```

```
SEQ ID NO: 11          moltype = AA  length = 1491
FEATURE                Location/Qualifiers
REGION                 1..1491
                       note = misc_feature - Rho 23
REGION                 1..1491
                       note = misc_feature - or Rho GTPase-activating protein 23
                       (ARHGAP23)
source                 1..1491
                       mol_type = protein
                       organism = Homo sapiens
SEQUENCE: 11
MNGVAFCLVG IPPRPEPRPP QLPLGPRDGC SPRRPFPWQG PRTLLLYKSP QDGFGFTLRH    60
FIVYPPESAV HCSLKEEENG GRGGGPSPRY RLEPMDTIFV KNVKEDGPAH RAGLRTGDRL   120
VKVNGESVIG KTYSQVIALI QNSDDTLELS IMPKDEDILQ LAYSQDAYLK GNEPYSGEAR   180
SIPEPPPICY PRKTYAPPAR ASTRATMVPE PTSALPSDPR SPAAWSDPGL RVPPAARAHL   240
DNSSLGMSQP RPSPGAFPHL SSEPRTPRAF PEPGSRVPPS RLECQQALSH WLSNQVPRRA   300
GERRCPAMAP RARSASQDRL EEVAAPRPWP CSTSQDALSQ LGQEGWHRAR SDDYLSRATR   360
SAEALGPGAL VSPRFERCGW ASQRSSARTP ACPTRDLPGP QAPPPSGLQG LDDLGYIGYR   420
SYSPSFQRRT GLLHALSFRD SPFGGLPTFN LAQSPASFPP EASEPPRVVR PEPSTRALEP   480
PAEDRGDEVV LRQKPPTGRK VQLTPARQMN LGFGDESPEP EASGRGERLG RKVAPLATTE   540
DSLASIPFID EPTSPSIDLQ AKHVPASAVV SSAMNSAPVL GTSPSSPTFT FTLGRHYSQD   600
CSSIKAGRRS SYLLAITTER SKSCDDGLNT FRDEGRVLRR LPNRIPSLRM LRSFFTDGSL   660
DSWGTSEDAD APSKRHSTSD LSDATFSDIR REGWLYYKQI LTKKGKKAGS GLRQWKRVYA   720
ALRARSLSLS KERREPGPAA AGAAAAGAGE DEAAPVCIGS CLVDISYSET KRRHVFRLTT   780
ADFCEYLFQA EDRDDMLGWI RAIRENSRAE GEDPGCANQA LISKKLNDYR KVSHSSGPKA   840
DSSPKGSRGL GGLKSEFLKQ SAARGLRTQD LPAGSKDDSA AAPKTPWGIN IIKKNKKAAP   900
RAFGVRLEEC QPATENQRVP LIVAACCRIV EARGLESTGI YRVPGNNAVV SSLQEQLNRG   960
PGDINLQDER WQDLNVISSL LKSFFRKLPE PLFTDDKYND FIEANRIEDA RERMRTLRKL  1020
IRDLPGHYYE TLKFLVGHLK TIADHSEKNK MEPRNLALVF GPTLVRTSED NMTDMVTHMP  1080
DRYKIVETLI QHSDWFFSDE EDKGERTPVG DKEPQAVPNI EYLLPNIGRT VPPGDPGSDS  1140
TTCSSAKSKG SWAPKKEPYA REMLAISFIS AVNRKRKKRR EARGLGSSTD DDSEQEAHKP  1200
GAGATAPGTQ ERPQGPLPGA VAPEAPGRLS PPAAPEERPA ADTRSIVSGY STLSTMDRSV  1260
CSGASGRRAG AGDEADDERS ELSHVETDTE GAAGAGPGRA LTRRPSFSSH HLMPCDTLAR  1320
RRLARGRPDG EGAGRGGPRA PEPPGSASSS SQESLRPPAA ALASRPSRME ALRLRLRGTA  1380
DDMLAVRLRR PLSPETRRRR SSWRRHTVVV QSPLTDLNFN EWKELGGGGP PEPAGARAHS  1440
DNKDSGLSSL ESTKARAPSS AASQPPAPGD TGSLQSQPPR RSAASRLHQC L           1491

SEQ ID NO: 12          moltype = AA  length = 520
FEATURE                Location/Qualifiers
REGION                 1..520
                       note = misc_feature - Cytoskeletal Keratin 78 type II
REGION                 1..520
                       note = misc_feature - or Keratin, type II cytoskeletal 78
                       (KRT78)
source                 1..520
                       mol_type = protein
                       organism = Homo sapiens
SEQUENCE: 12
MSLSPCRAQR GFSARSACSA RSRGRSRGGF SSRGGFSSRS LNSFGGCLEG SRGSTWGSGG    60
RLGVRFGEWS GGPGLSLCPP GGIQEVTINQ NLLTPLKIEI DPQFQVVRTQ ETQEIRTLNN   120
QFASFIDKVR FLEQQNKVLE TKWHLLQQQG LSGSQQGLEP VFEACLDQLR KQLEQLQGER   180
GALDAELKAC RDQEEEYKSK YEEEAHRRAT LENDFVVLKK DVDGVFLSKM ELEGKLEALR   240
EYLYFLKHLN EEELGQLQTQ ASDTVVLSM DNNRYLDFSS IITEVRARYE EIARSSKAEA   300
EALYQTKYQE LQVSAQLHGD RMQETKVQIS QLHQEIQRLQ SQTENLKKQN ASLQAAITDA   360
EQRGELALKD AQAKVDELEA ALRMAKQNLA RLLCEYQELT STKLSLDVEI ATYRRLLEGE   420
ECRMSGECTS QVTISSVGGS AVMSGGVGGG LGSTCGLGSG KGSPGSCCTS IVTGGSNIIL   480
GSGKDPVLDS CSVSGSSAGS SCHTILKKTV ESSLKTSITY                         520

SEQ ID NO: 13          moltype = AA  length = 3177
FEATURE                Location/Qualifiers
REGION                 1..3177
                       note = misc_feature - Alpha-3 collagen chain (VI)
REGION                 1..3177
                       note = misc_feature - or Collagen type VI, alpha 3 (COL6A3)
source                 1..3177
                       mol_type = protein
                       organism = Homo sapiens
SEQUENCE: 13
MRKHRHLPLV AVFCLFLSGF PTTHAQQQQA DVKNGAAADI IFLVDSSWTI GEEHFQLVRE    60
FLYDVVKSLA VGENDFHFAL VQFNGNPHTE FLLNTYRTKQ EVLSHISNMS YIGGTNQTGK   120
GLEYIMQSHL TKAAGSRAGD GVPQVIVVLT DGHSKDGLAL PSAELKSADV NVFAIGVEDA   180
DEGALKEIAS EPLNMHMFNL ENFTSLHDIV GNLVSCVHHS VSPERAGDTE TLKDITAQDS   240
ADIIFLIDGS NNTGSVNFAV ILDFLVNLLE KLPIGTQQIR VGVVQFSDEP RTMFSLDTYS   300
TKAQVLGAVK ALGFAGGELA NIGLALDFVV ENHFTRAGGS RVEEGVPQVL VLISAGPSSD   360
EIRYGVVALK QASVFSFGLG AQAASRAELQ HIATDDNLVF TVPEFRSFGD LQEKLLPYIV   420
GVAQRHIVLP PPTIVTQVIE VNKRDIVFLV DGSSALGLAN FNAIRDFIAK VIQRLEIGQD   480
LIQVAVAQYA DTVRPEFYFN THPTKREVIT AVRKMKPLDG SALYTGSALD FVRNNLFTSS   540
AGYRAAEGIP KLLVLITGGK SLDEISQPAQ ELKRSSIMAF AIGNKGADQA ELEEIAFDSS   600
```

```
LVFIPAEFRA APLQGMLPGL LAPLRTLSGT PEVHSNKRDI IFLLDGSANV GKTNFPYVRD    660
FVMNLVNSLD IGNDNIRVGL VQFSDTPVTE FSLNTYQTKS DILGHLRQLQ LQGGSGLNTG    720
SALSYVYANH FTEAGGSRIR EHVPQLLLLL TAGQSEDSYL QAANALTRAG ILTFCVGASQ    780
ANKAELEQIA FNPSLVYLMD DFSSLPALPQ QLIQPLTTYV SGGVEEVPLA QPESKRDILF    840
LFDGSANLVG QFPVVRDFLY KIIDELNVKP EGTRIAVAQY SDDVKVESRF DEHQSKPEIL    900
NLVKRMKIKT GKALNLGYAL DYAQRYIFVK SAGSRIEDGV LQFLVLLVAG RSSDRVDGPA    960
SNLKQSGVVP FIFQAKNADP AELEQIVLSP AFILAAESLP KIGDLHPQIV NLLKSVHNGA   1020
PAPVSGEKDV VFLLDGSEGV RSGFPLLKEF VQRVVESLDV GQDRVRVAVV QYSDRTRPEF   1080
YLNSYMNKQD VVNAVRQLTL LGGPTPNTGA ALEFVLRNIL VSSAGSRITE GVPQLLIVLT   1140
ADRSGDDVRN PSVVVKRGGA VPIGIGIGNA DITEMQTISF IPDFAVAIPT FRQLGTVQQV   1200
ISERVTQLTR EELSRLQPVL QPLPSPGVGG KRDVVFLIDG SQSAGPEFQY VRTLIERLVD   1260
YLDVGFDTTR VAVIQFSDDP KVEFLLNAHS SKDEVQNAVQ RLRPKGGRQI NVGNALEYVS   1320
RNIFKRPLGS RIEEGVPQFL VLISSGKSDD EVDDPAVELK QFGVAPFTIA RNADQEELVK   1380
ISLSPEYVFS VSTFRELPSL EQKLLTPITT LTSEQIQKLL ASTRYPPPAV ESDAADIVFL   1440
IDSSEGVRPD GFAHIRDFVS RIVRRLNIGP SKVRVGVVQF SNDVFPEFYL KTYRSQAPVL   1500
DAIRRLRLRG GSPLNTGKAL EFVARNLFVK SAGSRIEDGV PQHLVLVLGG KSQDDVSRFA   1560
QVIRSSGIVS LGVGDRNIDR TELQTITNDP RLVFTVREFR ELPNIEERIM NSFGPSAATP   1620
APPGVDTPPP SRPEKKKADI VFLLDGSINF RRDSFQEVLR FVSEIVDTVY EDGDSIQVGL   1680
VQYNSDPTDE FFLKDFSTKR QIIDAINKVV YKGGRHANTK VGLEHLRVNH FVPEAGSRLD   1740
QRVPQIAFVI TGGKSVEDAQ DVSLALTQRG VKVFAVGVRN IDSEEVGKIA SNSATAFRVG   1800
NVQELSELSE QVLETLHDAM HETLCPGVTD AAKACNLDVI LGFDGSRDQN VFVAQKGFES   1860
KVDAILNRIS QMHRVSCSGG RSPTVRVSVV ANTPSGPVEA FDFDEYQPEM LEKFRNMRSQ   1920
HPYVLTEDTL KVYLNKFRQS SPDSVKVVIH FTDGADGDLA DLHRASENLR QEGVRALILV   1980
GLERVVNLER LMHLEFGRGF MYDRPLRLNL LDLDYELAEQ LDNIAEKACC GVPCKCSGQR   2040
GDRGPIGSIG PKGIPEDGY RGYPDEGGP GERGPPGVNG TQGFQGCPGQ RGVKGSRGFP    2100
GEKGEVGEIG LDGLDGEDGD KGLPGSSGEK GNPGRRGDKG PRGEKGERGD VGIRGDPGNP   2160
GQDSQERGPK GETGDLGPMG VPGRDGVPGG PGETGKNGGF GRRGPPGAKG NKGGPGQPGF   2220
EGEQGTRGAQ GPAGPAGPPG LIGEQGISGP RGSSGGAAGAP GERGRTGPLG RKGEPGEPGP   2280
KGGIGNRGPR GETGDDGRDG VGSEGRRGKK GERGFPGYPG PKGNPGEPGL NGTTGPKGIR   2340
GRRGNSGPPG IVGQKGDPGY PGPAGPKGNR GDSIDQCALI QSIKDKCPCC YGPLECPVFP   2400
TELAFALDTS EGVNQDTFGR MRDVVLSIVN DLTIAESNCP RGARVAVVTY NNEVTTEIRF   2460
ADSKRKSVLL DKIKNLQVAL TSKQQSLETA MSFVARNTFK RVRNGFLMRK VAVFFSNTPT   2520
RASPQLREAV LKLSDAGITP LFLTRQEDRQ LINALQINNT AVGHALVLPA GRDLTDFLEN   2580
VLTCECNLDI CNIDPSCGFG SWRPSFRDRR AAGSDVDIDM AFILDSAETT TLFQFNEMKK   2640
YIAYLVRQLD MSPDPKASQH FARVAVVQHA PSESVDNASM PPVKVEFSLT DYGSKEKLVD   2700
FLSRGMTQLQ GTRALGSAIE YTIENVFESA PNPRDLKIVV LMLTGEVPEQ QLEEAQRVIL   2760
QAKCKGYFFV VLGIGRKVNI KEVYTFASEP NDVFFKLVDK STELNEEPLM RFGRLLPSFV   2820
SSENAFYLSP DIRKQCDWFQ GDQPTKNLVK FGHKQVNVPN NVYTSSPTSNP VTTTKPVTTT   2880
KPVTTTTKPV TTTTKPVTII NQPSVKPAAA KPAPAKPVAA KPVATKMATV RPPEVAVKPAT   2940
AAKPVAAKPA AVRPPAAAAA KPVATKPEVP RPQAAKPAAT KPATTKPMVK MSREVQVFEI   3000
TENSAKLHWE RAEPPGPYFY DLTVTSAHDQ SLVLKQNLTV TDRVIGGLLA GQTYHVAVVC   3060
YLRSQVRATY HGSFSTKKSQ PPPPQPARSA SSSTINLMVS TEPLALTETD ICKLPKDEGT   3120
CRDFILKWYY DPNTKSCARF WYGGCGGNEN KFGSQKECEK VCAPVLAKPG VISVMGT      3177

SEQ ID NO: 14           moltype = AA  length = 263
FEATURE                 Location/Qualifiers
REGION                  1..263
                        note = misc_feature - Beta subunit of proteasome type-5
REGION                  1..263
                        note = misc_feature - or Proteasome subunit beta type-5
                         (PSMB5)
source                  1..263
                        mol_type = protein
                        organism = Homo sapiens
SEQUENCE: 14
MALASVLERP LPVNQRGFFG LGGRADLLDL GPGSLSDGLS LAAPGWGVPE EPGIEMLHGT    60
TTLAFKFRHG VIVAADSRAT AGAYIASQTV KKVIEINPYL LGTMAGGAAD CSFWERLLAR   120
QCRIYELRNK ERISVAAASK LLANMVYQYK GMGLSMGTMI CGWDKRGPGL YYVDSEGNRI   180
SGATFSVGSG SVYAYGVMDR GYSYDLEVEQ AYDLARRAIY QATYRDAYSG GAVNLYHVRE   240
DGWIRVSSDN VADLHEKYSG STP                                          263

SEQ ID NO: 15           moltype = AA  length = 353
FEATURE                 Location/Qualifiers
REGION                  1..353
                        note = misc_feature - Heterogeneous nuclear
                         ribonucleoproteins A2/B1 (HNRNPA2B1)
source                  1..353
                        mol_type = protein
                        organism = Homo sapiens
SEQUENCE: 15
MEKTLETVPL ERKKREKEQF RKLFIGGLSF ETTEESLRNY YEQWGKLTDC VVMRDPASKR    60
SRGFGFVTFS SMAEVDAAMA ARPHSIDGRV VEPKRAVARE ESGKPGAHVT VKKLFVGGIK   120
EDTEEHHLRD YFEEYGKIDT IEIITDRQSG KKRGFGFVTF DDHDPVDKIV LQKYHTINGH   180
NAEVRKALSR QEMQEVQSSR SGRGGNFGFG DSRGGGGNFG PGPGSNFRGG SDGYGSGRGF   240
GDYNGYGGG PGGGNFGGSP GYGGGRGGYG GGGPGYGNQG GGYGGGYDNY GGNYGSGNY    300
NDFGNYNQQP SNYGPMKSGN FGGSRNMGGP YGGGNYGPGG SGGSGYGGR SRY            353

SEQ ID NO: 16           moltype = AA  length = 126
FEATURE                 Location/Qualifiers
```

```
                            -continued

REGION                  1..126
                        note = misc_feature - Histone H2B type 1-B (HIST1H2BB)
source                  1..126
                        mol_type = protein
                        organism = Homo sapiens
SEQUENCE: 16
MPEPSKSAPA PKKGSKKAIT KAQKKDGKKR KRSRKESYSI YVYKVLKQVH PDTGISSKAM  60
GIMNSFVNDI FERIAGEASR LAHYNKRSTI TSREIQTAVR LLLPGELAKH AVSEGTKAVT 120
KYTSSK                                                            126

SEQ ID NO: 17           moltype = AA  length = 2243
FEATURE                 Location/Qualifiers
REGION                  1..2243
                        note = misc_feature - homolog of DnaJ subfamily C member 13
REGION                  1..2243
                        note = misc_feature - or DnaJ homolog subfamily C member 13
                        (DNAJC13)
source                  1..2243
                        mol_type = protein
                        organism = Homo sapiens
SEQUENCE: 17
MNIIRENKDL ACFYTTKHSW RGKYKRVFSV GTHAITTYNP NTLEVTNQWP YGDICSISPV   60
GKGQGTEFNL TFRKGSGKKS ETLKFSTEHR TELLTEALRF RTDFSEGKIT GRRYNCYKHH  120
WSDSRKPVIL EVTPGGFDQI NPATNRVLCS YDYRNIEGFV DLSDYQGGFC ILYGGFSRLH  180
LFASEQREEI IKSAIDHAGN YIGISLRIRK EPLEFEQYLN LRFGKYSTDE SITSLAEFVV  240
QKISPRHSEP VKRVLALTET CLVERDPATY NIATLKPLGE VFALVCDSEN PQLFTIEFIK  300
GQVRKYSSTE RDSLLASLLD GVRASGNRDV CVKMTPTHKG QRWGLLSMPV DEEVESLHLR  360
FLATPPNGNF ADAVFRFNAN ISYSGVLHAV TQDGLFSENK EKLINNAITA LLSQEGDVVA  420
SNAELESQFQ AVRRLVASKA GFLAFTQLPK FRERLGVKVV KALKRSNNGI IHAAVDMLCA  480
LMCPMHDDYD LRQEQLNKAS LLSSKKFLEN LLEKFNSHVD HGTGALVISS LLDFLTFALC  540
APYSETTEGQ QFDMLLEMVA SNGRTLFKLF QHPSMAIIKG AGLVMKAIIE EGDKEIATKM  600
QELALSEGAL PRHLHTAMFT ISSDQRMLTN RQLSRHLVGL WTADNATATN LLKRILPPGL  660
LAYLESSDLV PEKDADRMHV RDNVKIAMDQ YGKFNKVPEW QRLAGKAAKE VEKFAKEKVD  720
LVLMHWRDRM GIAQKENINQ KPVVLRKRRQ RIKIEANWDL FYYRFGQDHA RSNLIWNFKT  780
REELKDTLES EMRAFNIDRE LGSANVISWN HHEFEVKYEC LAEEIKIGDY YLRLLLEEDE  840
NEESGSIKRS YEFFNELYHR FLLTPKVNMK CLCLQALAIV YGRCHEEIGP FTDTRYIIGM  900
LERCTDKLER DRLILFLNKL ILNKKNVKDL MDSNGIRILV DLLTLAHLHV SRATVPLQSN  960
VIEAAPDMKR ESEKEWYFGN ADKERSGPYG FHEMQELWTK GMLNAKTRCW AQGMDGWRPL 1020
QSIPQLKWCL LASGQAVLNE TDLATLILNM LITMCGYFPS RDQDNAIIRP LPKVKRLLSD 1080
STCLPHIIQL LLTFDPILVE KVAILLYHIM QDNPQLPRLY LSGVFFFIMM YTGSNVLPVA 1140
RFLKYTHTKQ AFKSEETKGQ DIFQRSILGH ILPEAMVCYL ENYEPEKFSE IFLGEFDTPE 1200
AIWSSEMRRL MIEKIAAHLA DFTPRLQSNT RALYQYCPIP IINYQPLENE LFCNIYYLKQ 1260
LCDTLRFPDW PIKDPVKLLK DTLDAWKKEV EKKPPMMSID DAYEVLNLPQ GQGPHDESKI 1320
RKAYFRLAQK YHPDKNPEGR DMFEKVNKAY EFLCTKSAKI VDGPDPENII LILKTQSILF 1380
NRHKEDLQPY KYAGYPMLIR TITMETSDDL LFSKESPLLP AATELAFHTV NCSALNAEEL 1440
RRENGLEVLQ EAFSRCVAVL TRASKPSDMS VQVCGYISKC YSVAAQFEEC REKITEMPSI 1500
IKDLCRVLYF GKSIPRVAAL GVECVSSFAV DFWLQTHLFQ AGILWYLLGF LFNYDYTLEE 1560
SGIQKSEETN QQEVANSLAK LSVHALSRLG GYLAEEQATP ENPTIRKSLA GMLTPYVARK 1620
LAVASVTEIL KMLNSNTESP YLIWNNSTRA ELLEFLESQQ ENMIKKGDCD KTYGSEFVYS 1680
DHAKELIVGE IFVRVYNEVP TFQLEVPKAF AASLLDYIGS QAQYLHTFMA ITHAAKVESE 1740
QHGDRLPRVE MALEALRNVI KYNPGSESEC IGHFKLIFSL LRVHGAGQVQ QLALEVVNIV 1800
TSNQDCVNNI AESMVLSSLL ALLHSLPSSR QLVLETLYAL TSSTKIIKEA MAKGALIYLL 1860
DMFCNSTHPQ VRAQTAELFA KMTADKLIGP KVRITLMKFL PSVFMDAMRD NPEAAVHIFE 1920
GTHENPELIW NDNSRDKVST TVREMMLEHF KNQQDNPEAN WKLPEDFAVV FGEAEGELAV 1980
GGVFLRIFIA QPAWVLRKPR EFLIALLEKL TELLEKNNPH LEGTLETLTMA TVCLFSAQPQ 2040
LADQVPPLGH LPKVIQAMNH RNNAIPKSAI RVIHALSENE LCVRAMASLE TIGPLMNGMK 2100
KRADTVGLAC EAINRMFQKE QSELVAQALK ADLVPYLLKL LEGIGLENLD SPAATKAQIV 2160
KALKAMTRSL QYGEQVNEIL CRSSVWSAFK DQKHDLFISE SQTAGYLTGP GVAGYLTAGT 2220
STSVMSNLPP PVDHEAGDLG YQT                                        2243

SEQ ID NO: 18           moltype = AA  length = 434
FEATURE                 Location/Qualifiers
REGION                  1..434
                        note = misc_feature - Beta enolase (ENO3)
source                  1..434
                        mol_type = protein
                        organism = Homo sapiens
SEQUENCE: 18
MAMQKIFARE ILDSRGNPTV EVDLHTAKGR FRAAVPSGAS TGIYEALELR DGDKGRYLGK  60
GVLKAVENIN NTLGPALLQK KLSVVDQEKV DKFMIELDGT ENKSKFGANA ILGVSLAVCK 120
AGAAEKGVPL YRHIADLAGN PDLILPVPAF NVINGGSHAG NKLAMQEFMI LPVGASSFKE 180
AMRIGAEVYH HLKGVIKAKY GKDATNVGDE GGFAPNILEN NEALELLKTA IQAAGYPDKV 240
VIGMDVAASE FYRNGKYDLD FKSPDDPARH ITGEKLGELY KSFIKNYPVV SIEDPFDQDD 300
WATWTSFLSG VNIQIVGDDL TVTNPKRIAQ AVEKKACNCL LLKVNQIGSV TESIQACKLA 360
QSNGWGVMVS HRSGETEDTF IADLVVGLCT GQIKTGAPCR SERLAKYNQL MRIEEALGDK 420
AIFAGRKFRN PKAK                                                   434

SEQ ID NO: 19           moltype = AA  length = 210
FEATURE                 Location/Qualifiers
```

```
REGION                    1..210
                          note = misc_feature - Glutathione S-transferase P (GSTP1)
source                    1..210
                          mol_type = protein
                          organism = Homo sapiens
SEQUENCE: 19
MPPYTVVYFP VRGRCAALRM LLADQGQSWK EEVVTVETWQ EGSLKASCLY GQLPKFQDGD    60
LTLYQSNTIL RHLGRTLGLY GKDQQEAALV DMVNDGVEDL RCKYISLIYT NYEAGKDDYV   120
KALPGQLKPF ETLLSQNQGG KTFIVGDQIS FADYNLLDLL LIHEVLAPGC LDAFPLLSAY   180
VGRLSARPKL KAFLASPEYV NLPINGNGKQ                                   210

SEQ ID NO: 20             moltype = AA  length = 225
FEATURE                   Location/Qualifiers
REGION                    1..225
                          note = misc_feature - Glutathione S-transferase Mu 3 (GSTM3)
source                    1..225
                          mol_type = protein
                          organism = Homo sapiens
SEQUENCE: 20
MSCESSMVLG YWDIRGLAHA IRLLLEFTDT SYEEKRYTCG EAPDYDRSQW LDVKFKLDLD    60
FPNLPYLLDG KNKITQSNAI LRYIARKHNM CGETEEEKIR VDIIENQVMD FRTQLIRLCY   120
SSDHEKLKPQ YLEELPGQLK QFSMFLGKFS WFAGEKLTFV DFLTYDILDQ NRIFDPKCLD   180
EFPNLKAFMC RFEALEKIAA YLQSDQFCKM PINNKMAQWG NKPVC                  225

SEQ ID NO: 21             moltype = AA  length = 419
FEATURE                   Location/Qualifiers
REGION                    1..419
                          note = misc_feature - Farnesyl pyrophosphate synthase
                                 Variant 2
source                    1..419
                          mol_type = protein
                          organism = Homo sapiens
SEQUENCE: 21
MPLSRWLRSV GVFLLPAPYW APRERWLGSL RRPSLVHGYP VLAWHSARCW CQAWTEEPRA    60
LCSSLRMNGD QNSDVYAQEK QDFVQHFSQI VRVLTEDEMG HPEIGDAIAR LKEVLEYNAI   120
GGKYNRGLTV VVAFRELVEP RKQDADSLQR AWTVGWCVEL LQAFFLVADD IMDSSLTRRG   180
QICWYQKPGV GLDAINDANL LEACIYRLLK LYCREQPYYL NLIELFLQSS YQTEIGQTLD   240
LLTAPQGNVD LVRFTEKRYK SIVKYKTAFY SFYLPIAAAM YMAGIDGEKE HANAKKILLE   300
MGEFFQIQDD YLDLFGDPSV TGKIGTDIQD NKCSWLVVQC LQRATPEQYQ ILKENYGQKE   360
AEKVARVKAL YEELDLPAVF LQYEEDSYSH IMALIEQYAA PLPPAVFLGL ARKIYKRRK    419

SEQ ID NO: 22             moltype = AA  length = 353
FEATURE                   Location/Qualifiers
REGION                    1..353
                          note = misc_feature - Farnesyl pyrophosphate synthase
                                 Variant 3
source                    1..353
                          mol_type = protein
                          organism = Homo sapiens
SEQUENCE: 22
MNGDQNSDVY AQEKQDFVQH FSQIVRVLTE DEMGHPEIGD AIARLKEVLE YNAIGGKYNR    60
GLTVVVAFRE LVEPRKQDAD SLQRAWTVGW CVELLQAFFL VADDIMDSSL TRRGQICWYQ   120
KPGVGLDAIN DANLLEACIY RLLKLYCREQ PYYLNLIELF LQSSYQTEIG QTLDLLTAPQ   180
GNVDLVRFTE KRYKSIVKYK TAFYSFYLPI AAAMYMAGID GEKEHANAKK ILLEMGEFFQ   240
IQDDYLDLFG DPSVTGKIGT DIQDNKCSWL VVQCLQRATP EQYQILKENY GQKEAEKVAR   300
VKALYEELDL PAVFLQYEED SYSHIMALIE QYAAPLPPAV FLGLARKIYK RRK          353

SEQ ID NO: 23             moltype = AA  length = 353
FEATURE                   Location/Qualifiers
source                    1..353
                          mol_type = protein
                          organism = Homo sapiens
SEQUENCE: 23
MNGDQNSDVY AQEKQDFVQH FSQIVRVLTE DEMGHPEIGD AIARLKEVLE YNAIGGKYNR    60
GLTVVVAFRE LVEPRKQDAD SLQRAWTVGW CVELLQAFFL VADDIMDSSL TRRGQICWYQ   120
KPGVGLDAIN DANLLEACIY RLLKLYCREQ PYYLNLIELF LQSSYQTEIG QTLDLLTAPQ   180
GNVDLVRFTE KRYKSIVKYK TAFYSFYLPI AAAMYMAGID GEKEHANAKK ILLEMGEFFQ   240
IQDDYLDLFG DPSVTGKIGT DIQDNKCSWL VVQCLQRATP EQYQILKENY GQKEAEKVAR   300
VKALYEELDL PAVFLQYEED SYSHIMALIE QYAAPLPPAV FLGLARKIYK RRK          353

SEQ ID NO: 24             moltype = AA  length = 248
FEATURE                   Location/Qualifiers
REGION                    1..248
                          note = misc_feature - Farnesyl pyrophosphate synthase
                                 Variant 5
source                    1..248
                          mol_type = protein
                          organism = Homo sapiens
SEQUENCE: 24
```

```
MDSSLTRRGQ ICWYQKPGVG LDAINDANLL EACIYRLLKL YCREQPYYLN LIELFLQSSY    60
QTEIGQTLDL LTAPQGNVDL VRFTEKRYKS IVKYKTAFYS FYLPIAAAMY MAGIDGEKEH   120
ANAKKILLEM GEFFQIQDDY LDLFGDPSVT GKIGTDIQDN KCSWLVVQCL QRATPEQYQI   180
LKENYGQKEA EKVARVKALY EELDPAVFL QYEEDSYSHI MALIEQYAAP LPPAVFLGLA    240
RKIYKRRK                                                            248

SEQ ID NO: 25          moltype = AA  length = 353
FEATURE                Location/Qualifiers
REGION                 1..353
                       note = misc_feature - Farnesyl pyrophosphate synthase
                        Variant 6
source                 1..353
                       mol_type = protein
                       organism = Homo sapiens
SEQUENCE: 25
MNGDQNSDVY AQEKQDFVQH FSQIVRVLTE DEMGHPEIGD AIARLKEVLE YNAIGGKYNR    60
GLTVVVAFRE LVEPRKQDAD SLQRAWTVGW CVELLQAFFL VADDIMDSSL TRRGQICWYQ   120
KPGVGLDAIN DANLLEACIY RLLKLYCREQ PYYLNLIELF LQSSYQTEIG QTLDLLTAPQ   180
GNVDLVRFTE KRYKSIVKYK TAFYSFYLPI AAAMYMAGID GEKEHANAKK ILLEMGEFFQ   240
IQDDYLDLFG DPSVTGKIGT DIQDNKCSWL VVQCLQRATP EQYQILKENY GQKEAEKVAR   300
VKALYEELDL PAVFLQYEED SYSHIMALIE QYAAPLPPAV FLGLARKIYK RRK          353

SEQ ID NO: 26          moltype = AA  length = 274
FEATURE                Location/Qualifiers
REGION                 1..274
                       note = misc_feature - Farnesyl pyrophosphate synthase
                        Variant 7
source                 1..274
                       mol_type = protein
                       organism = Homo sapiens
SEQUENCE: 26
MPLSRWLRSV GVFLLPAPYW APRERWLGSL RRPSLVHGYP VLAWHSARCW CQAWTEEPRA    60
LCSSLRMNGD QNSDVYAQEK QDFVQHFSQI VRVLTEDEMG HPEIGDAIAR LKEVLEYNAI   120
GGKYNRGLTV VVAFRELVEP RKQDADSLQR AWTVGWCVEL LQAFFLVADD IMDSSLTRRG   180
QICWYQKPGV GLDAINDANL LEACIYRLLK LYCREQPYYL NLIELFLQSS YQTEIGQTLD   240
LLTAPQGNVD LVRFTEKRYK SIVKYKTAFY SFYL                               274

SEQ ID NO: 27          moltype = AA  length = 174
FEATURE                Location/Qualifiers
REGION                 1..174
                       note = misc_feature - Farnesyl pyrophosphate synthase
                        Variant 8
source                 1..174
                       mol_type = protein
                       organism = Homo sapiens
SEQUENCE: 27
MPLSRWLRSV GVFLLPAPYW APRERWLGSL RRPSLVHGYP VLAWHSARCW CQAWTEEPRA    60
LCSSLRMNGD QNSDVYAQEK QDFVQHFSQI VRVLTEDEMG HPEIGDAIAR LKEVLEYNAI   120
GGKYNRGLTV VVAFRELVEP RKQDADSLQR AWTVGWCVEL LQAFFLVADD IMDS         174

SEQ ID NO: 28          moltype = AA  length = 2818
FEATURE                Location/Qualifiers
REGION                 1..2818
                       note = misc_feature - Neurofibromin 1 Variant 2
source                 1..2818
                       mol_type = protein
                       organism = Homo sapiens
SEQUENCE: 28
MAAHRPVEWV QAVVSRFDEQ LPIKTGQQNT HTKVSTEHNK ECLINISKYK FSLVISGLTT    60
ILKNVNNMRI FGEAAEKNLY LSQLIILDTL EKCLAGQPKD TMRLDETMLV KQLLPEICHF   120
LHTCREGNQH AAELRNSASG VLFSLSCNNF NAVFSRISTR LQELTVCSED NVDVHDIELL   180
QYINVDCAKL KRLLKETAFK FKALKKVAQL AVINSLEKAF WNWVENYPDE FTKLYQIPQT   240
DMAECAEKLF DLVDGFAEST KRKAAVWPLQ IILLILCPEI IQDISKDVVD ENNMNKKLFL   300
DSLRKALAGH GGSRQLTESA AIACVKLCKA STYINWEDNS VIFLLVQSMV VDLKNLLFNP   360
SKPFSRGSQP ADVDLMIDCL VSCFRISPHN NQHFKICLAQ NSPSTFHYVL VNSLHRIITN   420
SALDWWPKID AVYCHSVELR NMFGETLHKA VQGCGAHPAI RMAPSLTFKE KVTSLKFKEK   480
PTDLETRSYK YLLLSMVKLI HADPKLLLCN PRKQGPETQG STAELITGLV QLVPQSHMPE   540
IAQEAMEALL VLHQLSIDL WNPDAPVETF WEISSQMLFY ICKKLTSHQM LSSTEILKWL    600
REILICRNKF LLKNKQADRS SCHFLLFYGV GCDIPSSGNT SQMSMDHEEL LRTPGASLRK   660
GKGNSSMDSA AGCSGTPPIC RQAQTKLEVA LYMFLWNPDT EAVLVAMSCF RHLCEEADIR   720
CGVDEVSVHN LLPNYNTFME FASVSNMMST GRAALQKRVM ALLRRIEHPT AGNTEAWEDT   780
HAKWEQATKL ILNYPKAKME DGQAAESLHK TIVKRRMSHV SGGGSIDLSD TDSLQEWINM   840
TGFLCALGGV CLQQRSNSGL ATYSPPMGPV SERKGSMISV MSSEGNADTP VSKFMDRLLS   900
LMVCNHEKVG LQIRTNVKDL VGLELSPALY PMLFNKLKNT ISKFFDSQGQ VLLTDTNTQF   960
VEQTIAIMKN LLDNHTEGSS EHLGQASIET MMLNLVRYVR VLGNMVHAIQ IKTKLCQLVE  1020
VMMARRDDLS FCQEMKFRNK MVEYLTDWVM GTSNQAADDD VKCLTRDLDQ ASMEAVVSLL  1080
AGLPLQPEEG DGVELMEAKS QLFLKYFTLF MNLLNDCSEV EDESAQTGGR KRGMSRRLAS  1140
LRHCTVLAMS NLLNANVDSG LMHSIGLGYH KDLQTRATFM EVLTKILQQG TEFDTLAETV  1200
LADRFERLVE LVTMMGDQGE LPIAMALANV VPCSQWDELA RVLVTLFDSR HLLYQLLWNM  1260
```

```
FSKEVELADS MQTLFRGNSL ASKIMTFCFK VYGATYLQKL LDPLLRIVIT SSDWQHVSFE 1320
VDPTRLEPSE SLEENQRNLL QMTEKFFHAI ISSSSEFPPQ LRSVCHCLYQ VVSQRFPQNS 1380
IGAVGSAMFL RFINPAIVSP YEAGILDKKP PPRIERGLKL MSKILQSIAN HVLFTKEEHM 1440
RPFNDFVKSN FDAARRFFLD IASDCPTSDA VNHSLSFISD GNVLALHRLL WNNQEKIGQY 1500
LSSNRDHKAV GRRPFDKMAT LLAYLGPPEH KPVADTHWSS LNLTSSKFEE FMTRHQVHEK 1560
EEFKALKTLS IFYQAGTSKA GNPIFYYVAR RFKTGQINGD LLIYHVLLTL KPYYAKPYEI 1620
VVDLTHTGPS NRFKTDFLSK WFVVPPGFAY DNVSAVYIYN CNSWVREYTK YHERLLTGLK 1680
GSKRLVFIDC PGKLAEHIEH EQQKLPAATL ALEEDLKVFH NALKLAHKDT KVSIKVGSTA 1740
VQVTSAERTK VLGQSVFLND IYYASEIEEI CLVDENQFTL TIANQGTPLT FMHQECEAIV 1800
QSIIHIRTRW ELSQPDSIPQ HTKIRPKDVP GTLLNIALLN LGSSDPSLRS AAYNLLCALT 1860
CTFNLKIEGQ LLETSGLCIP ANNTLFIVSI SKTLAANEPH LTLEFLEECI SGFSKSSIEL 1920
KHLCLEYMTP WLSNLVRFCK HNDDAKRQRV TAILDKLITM TINEKQMYPS IQAKIWGSLG 1980
QITDLLDVVL DSFIKTSATG GLGSIKAEVM ADTAVALASG NVKLVSSKVI GRMCKIIDKT 2040
CLSPTPTLEQ HLMWDDIAIL ARYMLMLSFN NSLDVAAHLP YLFHVVTFLV ATGPLSLRAS 2100
THGLVINIIH SLCTCSQLHF SEETKQVLRL SLTEFSLPKF YLLFGISKVK SAAVIAFRSS 2160
YRDRSFSPGS YERETFALTS LETVTEALLE IMEACMRDIP TCKWLDQWTE LAQRFAFQYN 2220
PSLQPRALVV FGCISKRVSH GQIKQIIRIL SKALESCLKG PDTYNSQVLI EATVIALTKL 2280
QPLLNKDSPL HKALFWVAVA VLQLDEVNLY SAGTALLEQN LHTLDSLRIF NDKSPEEVFM 2340
AIRNPLEWHC KQMDHFVGLN FNSNFNFALV GHLLKGYRHP SPAIVARTVR ILHTLLTLVN 2400
KHRNCDKFEV NTQSVAYLAA LLTVSEEVRS RCSLKHRKSL LLTDISMENV PMDTYPIHHG 2460
DPSYRTLKET QPWSSPKGSE GYLAATYPTV GQTSPRARKS MSLDMGQPSQ ANTKKLLGTR 2520
KSFDHLISDT KAPKRQEMES GITTPPKMRR VAETDYEMET QRISSSQQHP HLRKVSVSES 2580
NVLLDEEVLT DPKIQALLLT VLATLVKYTT DEFDQRILYE YLAEASVFP KVFPVVHNLL 2640
DSKINTLLSL CQDPNLLNPI HGIVQSVVYH EESPPQYQTS YLQSFGFNGL WRFAGPFSKQ 2700
TQIPDYAELI VKFLDALIDT YLPGIDEETS EESLLTPTSP YPPALQSQLS ITANLNLSNS 2760
MTSLATSQHS PGIDKENVEL SPTTGHCNSG RTRHGSASQV QKQRSAGSFK RNSIKKIV 2818

SEQ ID NO: 29          moltype = AA   length = 593
FEATURE                Location/Qualifiers
REGION                 1..593
                       note = misc_feature - Neurofibromin 1 Variant 3
source                 1..593
                       mol_type = protein
                       organism = Homo sapiens
SEQUENCE: 29
MAAHRPVEWV QAVVSRFDEQ LPIKTGQQNT HTKVSTEHNK ECLINISKYK FSLVISGLTT 60
ILKNVNNMRI FGEAAEKNLY LSQLIILDTL EKCLAGQPKD TMRLDETMLV KQLLPEICHF 120
LHTCREGNQH AAELRNSASG VLFSLSCNNF NAVFSRISTR QLLTVCESD NVDVHDIELL 180
QYINVDCAKL KRLLKETAFK FKALKKVAQL AVINSLEKAF WNWVENYPDE FTKLYQIPQT 240
DMAECAEKLF DLVDGFAEST KRKAAVWPLQ IILLILCPEI IQDISKDVVD ENNMNKKLFL 300
DSLRKALAGH GGSRQLTESA AIACVKLCKA STYINWEDNS VIFLLVQSMV VDLKNLLFNP 360
SKPFSRGSQP ADVDLMIDCL VSCFRISPHN NQHFKICLAQ NSPSTFHYVL VNSLHRIITN 420
SALDWWPKID AVYCHSVELR NMFGETLHKA VQGCGAHPAI RMAPSLTFKE KVTSLKFKEK 480
PTDLETRSYK YLLLSMVKLI HADPKLLLCN PRKQGPETQG STAELITGLV QLVPQSHMPE 540
IAQEAMEALL VLHQLDSIDL WNPDAPVETF WEIRYMYFYF LNSTFKFYFV FLS 593

SEQ ID NO: 30          moltype = AA   length = 2502
FEATURE                Location/Qualifiers
REGION                 1..2502
                       note = misc_feature - Neurofibromin 1 Variant 4
source                 1..2502
                       mol_type = protein
                       organism = Homo sapiens
SEQUENCE: 30
NWEDNSVIFL LVQSMVVDLK NLLFNPSKPF SRGSQPADVD LMIDCLVSCF RISPHNNQHF 60
KICLAQNSPS TFHYVLVNSL HRIITNSALD WWPKIDAVYC HSVELRNMFG ETLHKAVQGC 120
GAHPAIRMAP SLTFKEKVTS LKFKEKPTDL ETRSYKYLLL SMVKLIHADP KLLLCNPRKQ 180
GPETQGSTAE LITGLVQLVP QSHMPEIAQE AMEALLVLHQ LDSIDLWNPD APVETFWEIS 240
SQMLFYICKK LTSHQMLSST EILKWLREIL ICRNKFLLKN KQADRSSCHE LLFYGVGCDI 300
PSSGNTSQMS MDHEELLRTP GASLRKGKGN SSMDSAAGCS GTPPICRQAQ TKLEVALYMF 360
LWNPDTEAVL VAMSCFRHLC EEADIRCGVD EVSVHNLLPN YNTFMEFASV SNMMSTGRAA 420
LQKRVMALLR RIEHPTAGNT EAWEDTHAKW EQATKLILNY PKAKMEDGQA AESLHKTIVK 480
RRMSHVSGGG SIDLSDTDSL QEWINMTGFL CALGGVCLQQ RSNSGLATYS PPMGPVSERK 540
GSMISVMSSE GNADTPVSKF MDRLLSLMVC NHEKVGLQIR TNVKDLVGLE LSPALYPMLF 600
NKLKNTISKF FDSQGQVLLT DTNTQFVEQT IAIMKNLLDN HTEGSSEHLG QASIETMMLN 660
LVRYVRVLGN MVHAIQIKTK LCQLVEVMMA RRDDLSFCQE MKFRNKMVEY LTDWVMGTSN 720
QAADDDVKCL TRDLDQASME AVVSLLAGLP LQPEEGDGVE LMEAKSQLFL KYFTLFMNLL 780
NDCSEVEDES AQTGGRKRGM SRRLASLRHC TVLAMSNLLN ANVDSGLMHS IGLGYHKDLQ 840
TRATFMEVLT KILQQGTEFD TLAETVLADR FERLVELVTM MGDQGELPIA MALANVVPCS 900
QWDELARVLV TLFDSRHLLY QLLWNMFSKE VELADSMQTL FRGNSLASKI MTFCFKVYGA 960
TYLQKLLDPL LRIVITSSDW QHVSFEVDPT RLEPSESLEE NQRNLLQMTE KFFHAIISSS 1020
SEFPPQLRSV CHCLYQVVSQ RFPQNSIGAV GSAMFLRFIN PAIVSPYEAG ILDKKPPPRI 1080
ERGLKLMSKI LQSIANHVLF TKEEHMRPFN DFVKSNFDAA CPTSDAVNHS 1140
LSFISDGNVL ALHRLLWNNQ EKIGQYLSSN RDHKAVGRRP FDKMATLLAY LGPPEHKPVA 1200
DTHWSSLNLT SSKFEEFMTR HQVHEKEEFK ALKTLSIFYQ AGTSKAGNPI FYYVARRFKT 1260
GQINGDLLIY HVLLTLKPYY AKPYEIVVDL THTGPSNRFK TDFLSKWFVV PPGFAYDNVS 1320
AVYIYNCNSW VREYTKYHER LLTGLKGSKR LVFIDCPGKL AEHIEHEQQK LPAATLALEE 1380
DLKVFHNALK LAHKDTKVSI KVGSTAVQVT SAERTKVLGQ SVFLNDIYYA SEIEEICLVD 1440
ENQFTLTIAN QGTPLTFMHQ ECEAIVQSII HIRTRWELSQ PDSIPQHTKI RPKDVPGTLL 1500
```

```
NIALLNLGSS DPSLRSAAYN LLCALTCTFN LKIEGQLLET SGLCIPANNT LFIVSISKTL  1560
AANEPHLTLE FLEECISGFS KSSIELKHLC LEYMTPWLSN LVRFCKHNDD AKRQRVTAIL  1620
DKLITMTINE KQMYPSIQAK IWGSLGQITD LLDVVLDSFI KTSATGGLGS IKAEVMADTA  1680
VALASGNVKL VSSKVIGRMC KIIDKTCLSP TPTLEQHLMW DDIAILARYM LMLSFNNSLD  1740
VAAHPYLFH VVTFLVATGP LSLRASTHGL VINIIHSLCT CSQLHFSEET KQVLRLSLTE  1800
FSLPKFYLLF GISKVKSAAV IAFRSSYRDR SFSPGSYERE TFALTSLETV TEALLEIMEA  1860
CMRDIPTCKW LDQWTELAQR FAFQYNPSLQ PRALVVFGCI SKRVSHGQIK QIIRILSKAL  1920
ESCLKGPDTY NSQVLIEATV IALTKLQPLL NKDSPLHKAL FWVAVAVLQL DEVNLYSAGT  1980
ALLEQNLHTL DSLRIFNDKS PEEVFMAIRN PLEWHCKQMD HFVGLNFNSN FNFALVGHLL  2040
KGYRHPSPAI VARTVRILHT LLTLVNKHRN CDKFEVNTQS VAYLAALLTV SEEVRSRCSL  2100
KHRKSLLLTD ISMENVPMDT YPIHHGDPSY RTLKETQPWS SPKGSEGYLA ATYPTVGQTS  2160
PRARKSMSLD MGQPSQANTK KLLGTRKSFD HLISDTKAPK RQEMESGITT PPKMRRVAET  2220
DYEMETQRIS SSQQHPHLRK VSVSESNVLL DEEVLTDPKI QALLLTVLAT LVKYTTDEFD  2280
QRILYEYLAE ASVVFPKVFP VVHNLLDSKI NTLLSLCQDP NLLNPIHGIV QSVVYHEESP  2340
PQYQTSYLQS FGFNGLWRFA GPFSKQTQIP DYAELIVKFL DALIDTYLPG IDEETSEESL  2400
LTPTSPYPPA LQSQLSITAN LNLSNSMTSL ATSQHSPASL PCSKSAVFMQ LFPHQGIDKE  2460
NVELSPTTGH CNSGRTRHGS ASQVQKQRSA GSFKRNSIKK IV                    2502

SEQ ID NO: 31         moltype = AA  length = 551
FEATURE               Location/Qualifiers
REGION                1..551
                      note = misc_feature - Neurofibromin 1 Variant 5
source                1..551
                      mol_type = protein
                      organism = Homo sapiens
SEQUENCE: 31
MAAHRPVEWV QAVVSRFDEQ LPIKTGQQNT HTKVSTEHNK ECLINISKYK FSLVISGLTT  60
ILKNVNNMRI FGEAAEKNLY LSQLIILDTL EKCLAGQPKD TMRLDETMLV KQLLPEICHF  120
LHTCREGNQH AAELRNSASG VLFSLSCNNF NAVFSRISTR LQELTVCSED NVDVHDIELL  180
QYINVDCAKL KRLLKETAFK FKALKKVAQL AVINSLEKAF WNWVENYPDE FTKLYQIPQT  240
DMAECAEKLF DLVDGFAEST KRKAAVWPLQ IILLILCPEI IQDISKDVVD ENNMNKKLFL  300
DSLRKALAGH GGSRQLTESA AIACVKLCKA STYINWEDNS VIFLLVQSMV VDLKNLLFNP  360
SKPFSRGSQP ADVDLMIDCL VSCFRISPHN NQHFKICLAQ NSPSTFHYVL VNSLHRIITN  420
SALDWWPKID AVYCHSVELR NMFGETLHKA VQGCGAHPAI RMAPSLTFKE KVTSLKFKEK  480
PTDLETRSYK YLLLSMVKLI HADPKLLLCN PRKQGPETQG STAELITGLV QLVPQSHMPE  540
IAQEAMEVRG K                                                      551

SEQ ID NO: 32         moltype = AA  length = 237
FEATURE               Location/Qualifiers
REGION                1..237
                      note = misc_feature - Neurofibromin 1 Variant 6
source                1..237
                      mol_type = protein
                      organism = Homo sapiens
SEQUENCE: 32
MHQECEAIVQ SIIHIRTRWE LSQPDSIPQH TKIRPKDVPG TLLNIALLNL GSSDPSLRSA  60
AYNLLCALTC TFNLKIEGQL LETSGLCIPA NNTLFIVSIS KTLAANEPHL TLEFLEECIS  120
GFSKSSIELK HLCLEYMTPW LSNLVRFCKH NDDAKRQVT AILDKLITMT INEKQMYPSI  180
QAKIWGSLGQ ITDLLDVVLD SFIKTSATGG LGSIKAEVMA DTAVALASGN VKLVSSK     237

SEQ ID NO: 33         moltype = AA  length = 233
FEATURE               Location/Qualifiers
REGION                1..233
                      note = misc_feature - Neurofibromin 1 Variant 6
source                1..233
                      mol_type = protein
                      organism = Homo sapiens
SEQUENCE: 33
MKRCWSNSCC QKSAIFFTPV VKETSMQLNF GILPLGFYFL SAATTSMQSL VAFLPETAFK  60
FKALKKVAQL AVINSLEKAF WNWVENYPDE FTKLYQIPQT DMAECAEKLF DLVDGFAEST  120
KRKAAVWPLQ IILLILCPEI IQDISKDVVD ENNMNKVRRA KLFPLYLDVK QFILLKVCIT  180
LGLLFKQSIS GNHLNDHFRF LCLMDLEETY SYIILFGRGK IIPGNEQRFK IIP         233

SEQ ID NO: 34         moltype = AA  length = 115
FEATURE               Location/Qualifiers
REGION                1..115
                      note = misc_feature - Neurofibromin 1 Variant 8
SITE                  1
                      note = misc_feature - Xaa can be any naturally occurring
                      amino acid
source                1..115
                      mol_type = protein
                      organism = Homo sapiens
SEQUENCE: 34
XIHGIVQSVV YHEESPPQYQ TSYLQSFGFN GLWRFAGPFS KQTQIPDYAE LIVKFLDALI  60
DTYLPGIDEE TSEESLLTPT SPYPPALQSQ LSITANLNLS NSMTSLATSQ HSPGQ       115

SEQ ID NO: 35         moltype = AA  length = 293
FEATURE               Location/Qualifiers
```

```
REGION                      1..293
                            note = misc_feature - Glyceraldehyde-3 phosphate
                            dehydrogenase Variant 2
source                      1..293
                            mol_type = protein
                            organism = Homo sapiens
SEQUENCE: 35
MVYMFQYDST HGKFHGTVKA ENGKLVINGN PITIFQERDP SKIKWGDAGA EYVVESTGVF  60
TTMEKAGAHL QGGAKRVIIS APSADAPMFV MGVNHEKYDN SLKIISNASC TTNCLAPLAK 120
VIHDNFGIVE GLMTTVHAIT ATQKTVDGPS GKLWRDGRGA LQNIIPASTG AAKAVGKVIP 180
ELNGKLTGMA FRVPTANVSV VDLTCRLEKP AKYDDIKKVV KQASEGPLKG ILGYTEHQVV 240
SSDFNSDTHS STFDAGAGIA LNDHFVKLIS WYDNEFGYSN RVVDLMAHMA SKE        293

SEQ ID NO: 36               moltype = AA   length = 335
FEATURE                     Location/Qualifiers
REGION                      1..335
                            note = misc_feature - Glyceraldehyde-3 phosphate
                            dehydrogenase Variant 3
source                      1..335
                            mol_type = protein
                            organism = Homo sapiens
SEQUENCE: 36
MGKVKVGVNG FGRIGRLVTR AAFNSGKVDI VAINDPFIDL NYMVYMFQYD STHGKFHGTV  60
KAENGKLVIN GNPITIFQER DPSKIKWGDA GAEYVVESTG VFTTMEKAGA HLQGGAKRVI 120
ISAPSADAPM FVMGVNHEKY DNSLKIISNA SCTTNCLAPL AKVIHDNFGI VEGLMTTVHA 180
ITATQKTVDG PSGKLWRDGR GALQNIIPAS TGAAKAVGKV IPELNGKLTG MAFRVPTANV 240
SVVDLTCRLE KPAKYDDIKK VVKQASEGPL KGILGYTEHQ VVSSDFNSDT HSSTFDAGAG 300
IALNDHFVKL ISWYDNEFGY SNRVVDLMAH MASKE                            335

SEQ ID NO: 37               moltype = AA   length = 335
FEATURE                     Location/Qualifiers
REGION                      1..335
                            note = misc_feature - Glyceraldehyde-3 phosphate
                            dehydrogenase Variant 4
source                      1..335
                            mol_type = protein
                            organism = Homo sapiens
SEQUENCE: 37
MGKVKVGVNG FGRIGRLVTR AAFNSGKVDI VAINDPFIDL NYMVYMFQYD STHGKFHGTV  60
KAENGKLVIN GNPITIFQER DPSKIKWGDA GAEYVVESTG VFTTMEKAGA HLQGGAKRVI 120
ISAPSADAPM FVMGVNHEKY DNSLKIISNA SCTTNCLAPL AKVIHDNFGI VEGLMTTVHA 180
ITATQKTVDG PSGKLWRDGR GALQNIIPAS TGAAKAVGKV IPELNGKLTG MAFRVPTANV 240
SVVDLTCRLE KPAKYDDIKK VVKQASEGPL KGILGYTEHQ VVSSDFNSDT HSSTFDAGAG 300
IALNDHFVKL ISWYDNEFGY SNRVVDLMAH MASKE                            335

SEQ ID NO: 38               moltype = AA   length = 260
FEATURE                     Location/Qualifiers
REGION                      1..260
                            note = misc_feature - Glyceraldehyde-3 phosphate
                            dehydrogenase Variant 5
source                      1..260
                            mol_type = protein
                            organism = Homo sapiens
SEQUENCE: 38
MEEMRDPSKI KWGDAGAEYV VESTGVFTTM EKAGAHLQGG AKRVIISAPS ADAPMFVMGV  60
NHEKYDNSLK IISNASCTTN CLAPLAKVIH DNFGIVEGLM TTVHAITATQ KTVDGPSGKL 120
WRDGRGALQN IIPASTGAAK AVGKVIPELN GKLTGMAFRV PTANVSVVDL TCRLEKPAKY 180
DDIKKVVKQA SEGPLKGILG YTEHQVVSSD FNSDTHSSTF DAGAGIALND HFVKLISWYD 240
NEFGYSNRVV DLMAHMASKE                                             260

SEQ ID NO: 39               moltype = AA   length = 293
FEATURE                     Location/Qualifiers
REGION                      1..293
                            note = misc_feature - Glyceraldehyde-3 phosphate
                            dehydrogenase Variant 6
source                      1..293
                            mol_type = protein
                            organism = Homo sapiens
SEQUENCE: 39
MVYMFQYDST HGKFHGTVKA ENGKLVINGN PITIFQERDP SKIKWGDAGA EYVVESTGVF  60
TTMEKAGAHL QGGAKRVIIS APSADAPMFV MGVNHEKYDN SLKIISNASC TTNCLAPLAK 120
VIHDNFGIVE GLMTTVHAIT ATQKTVDGPS GKLWRDGRGA LQNIIPASTG AAKAVGKVIP 180
ELNGKLTGMA FRVPTANVSV VDLTCRLEKP AKYDDIKKVV KQASEGPLKG ILGYTEHQVV 240
SSDFNSDTHS STFDAGAGIA LNDHFVKLIS WYDNEFGYSN RVVDLMAHMA SKE        293

SEQ ID NO: 40               moltype = AA   length = 1790
FEATURE                     Location/Qualifiers
REGION                      1..1790
                            note = misc_feature - Fibronectin Type III Domain
```

|  |  |  |
|---|---|---|
|  | | Containing protein 1 Variant 2 |
| SITE | | 1 |
|  | | note = misc_feature - Xaa can be any naturally occurring amino acid |
| source | | 1..1790 |
|  | | mol_type = protein |
|  | | organism = Homo sapiens |

SEQUENCE: 40

```
XPRHVKLLST KMGLKVTWDP PKDATSRPVE HYNIAYGKSL KSLKYIKVNA ETYSFLIEDV    60
EPGVVYFVLL TAENHSGVSR PVYRAESPPG GEWIEIDGFP IKGPGPFNET VTEKEVPNKP   120
LRVRVRSSDD RLSVAWKAPR LSGAKSPRRS RGFLLGYGES GRKMNYVPLT RDERTHEIKK   180
LASESVYVVS LQSMNSQGRS QPVYRAALTK RKISEEDELD VPDDISVRVM SSQSVLVSWV   240
DPVLEKQKKV VASRQYTVRY REKGELARWD YKQIANRRVL IENLIPDTVY EFAVRISQGE   300
RDGKWSTSVF QRTPESAPTT APENLNVWPV NGKPTVVAAS WDALPETEGK VKASKADVEQ   360
NTEDNGKPEK PEPSSPSPRA PASSQHPSVP ASPQGRNAKD LLLDLKNKIL ANGGAPRKPQ   420
LRAKKAEELD LQSTEITGEE ELGSREDSPM SPSDTQDQKR TLRPPSRHGH SVVAPGRTAV   480
RARMPALPRR EGVDKPGFSL ATQPRPGAPP SASASPAHHA STQGTSHRPS LPASLNDNDL   540
VDSDEDERAV GSLHPKGAFA QPRPALSPSR QSPSSVLRDR SSVHPGAKPA SPARRTPHSG   600
AAEEDSSASA PPSRLSPPHG GSSRLLPTQP HLSSPLSKGG KDGEDAPATN SNAPSRSTMS   660
SSVSSHLSSR TQVSEGAEAS DGESHGDGDR EDGGRQAEAT AQTLRARPAS GHFHLLRHKP   720
FAANGRSPSR FSIGRGPRLQ PSSSPQSTVP SRAHPRVPSH SDSHPKLSSG IHGDEEDEKP   780
LPATVVNDHV PSSSRQPISR GWEDLRRSPQ RGASLHRKEP IPENPKSTGA DTHPQGKYSS   840
LASKAQDVQQ STDADTEGHS PKAQPGSTDR HASPARPPAA RSQQHPSVPR RMTPGRAPQQ   900
QPPPPVATSQ HHPGPQSRDA GRSPQPRLS LTQAGRPRPT SQGRSHSSSD PYTASSRGML   960
PTALQNQDED AQGSYDDDST EVEAQDVRAP AHAARAKEAA ASLPKHQQVE SPTGAGAGGD  1020
HRSQRGHAAS PARPSRPGGP QSRARVPSRA APGKSEPPSK RPLSSKSQQS VSAEDDEEED  1080
AGFFKGGKED LLSSSVPKWP SSSTPRGGKD ADGSLAKEER EPAIALAPRG GSLAPVKRPL  1140
PPPPGSSPRA SHVPSRLPPR SAATVSPVAG THPWPQYTTR APPGHFSTTP MLSLRQRMMH  1200
ARFRNPLSRQ PARPSYRQGY NGRPNVEGKV LPGSNGKPNG QRIINGPQGT KWVVDLDRGL  1260
VLNAEGRYLQ DSHGNPLRIK LGGDGRTIVD LEGTPVVSPD GLPLFGQGRH GTPLANAQDK  1320
PILSLGGKPL VGLEVIKKTT HPPTTTMQPT TTTTPLPTTT TPRPTTATTR RTTTTRRTTT  1380
RRPTTTVRTT TRTTTTTTPT PTTPIPTCPP GTLERHDDDG NLIMSSNGIP ECYAEEDEFS  1440
GLETDTAVPT EEAYVIYDED YEFETSRPPT TTEPSTTATT PRVIPEEGAI SSFPEEEFDL  1500
AGRKRFVAPY VTYLNKDPSA PCSLTDALDH FQVDSLDEII PNDLKKSDLP PQHAPRNITV  1560
VAVEGCHSFV IVDWDKATPG DVVTGYLVYS ASYEDFIRNK WSTQASSVTH LPIENLKPNT  1620
RYYFKVQAQN PHGYGPISPS VSFVTESDNP LLVVRPPGGE PIWIPFAFKH DPSYTDCHGR  1680
QYVKRTWYRK FVGVVLCNSL RYKIYLSDNL KDTFYSIGDS WGRGEDHCQF VDSHLDGRTG  1740
PQSYVEALPT IQGYYRQYRQ EPVRFGNIGF GTPYYYVGWY ECGVSIPGKW             1790
```

|  |  |  |
|---|---|---|
| SEQ ID NO: 41 | | moltype = AA   length = 347 |
| FEATURE | | Location/Qualifiers |
| REGION | | 1..347 |
|  | | note = misc_feature - Eukaryotic initiation factor 4A-I Variant 2 |
| source | | 1..347 |
|  | | mol_type = protein |
|  | | organism = Homo sapiens |

SEQUENCE: 41

```
MSASQDSRSR DNGPDGMEPE GVIESNWNEI VDSFDDMNLS ESLLRGIYAY GFEKPSAIQQ    60
RAILPCIKGY DVIAQAQSGT GKTATFAISI LQQIELDLKA TQALVLAPTR ELAQQIQKVV   120
MALGDYMGAS CHACIGGTNV RAEVQKLQME APHIIVGTPG RVFDMLNRRY LSPKYIKMFV   180
LDEADEMLSR GFKDQIYDIF QKLNSNTQVV LLSATMPSDV LEVTKKFMRD PIRILVKKEE   240
LTLEGIRQFY INVEREEWKL DTLCDLYETL TITQAVIFIN TRRKVDWLTE KMHARDFTVS   300
AMHGDMDQKE RDVIMREFRS GSSRVLITTD LLGKLYPQNR SRWTVWP                 347
```

|  |  |  |
|---|---|---|
| SEQ ID NO: 42 | | moltype = AA   length = 341 |
| FEATURE | | Location/Qualifiers |
| REGION | | 1..341 |
|  | | note = misc_feature - Eukaryotic initiation factor 4A-I Variant 3 |
| source | | 1..341 |
|  | | mol_type = protein |
|  | | organism = Homo sapiens |

SEQUENCE: 42

```
MSASQDSRSR DNGPDGMEPE GVIESNWNEI VDSFDDMNLS ESLLRGIYAY GFEKPSAIQQ    60
RAILPCIKGY DVIAQAQSGT GKTATFAISI LQQIELDLKA TQALVLAPTR ELAQQIQKVV   120
MALGDYMGAS CHACIGGTNV RAEVQKLQME APHIIVGTPG RVFDMLNRRY LSPKYIKMFV   180
LDEADEMLSR GFKDQIYDIF QKLNSNTQVV LLSATMPSDV LEVTKKFMRD PIRILVKKEE   240
LTLEGIRQFY INVEREEWKL DTLCDLYETL TITQAVIFIN TRRKVDWLTE KMHARDFTVS   300
AMHGDMDQKE RDVIMREFRS GSSRVLITTD LLNRSRWTVW P                       341
```

|  |  |  |
|---|---|---|
| SEQ ID NO: 43 | | moltype = AA   length = 257 |
| FEATURE | | Location/Qualifiers |
| REGION | | 1..257 |
|  | | note = misc_feature - Eukaryotic initiation factor 4A-I Variant 4 |
| source | | 1..257 |
|  | | mol_type = protein |
|  | | organism = Homo sapiens |

```
SEQUENCE: 43
MEPEGVIESN WNEIVDSFDD MNLSESLLRG IYAYGFEKPS AIQQRAILPC IKGYDVIAQA    60
QSGTGKTATF AISILQQIEL DLKATQALVL APTRELAQQI QKVVMALGDY MGASCHACIG   120
GTNVRAEVQK LQMEAPHIIV GTPGRVFDML NRRYLSPKYI KMFVLDEADE MLSRGFKDQI   180
YDIFQKLNSN TQVVLLSATM PSDVLEVTKK FMRDPIRILV KKEELTLEGI RQFYINVERE   240
EWKLDTLCDL YETLTIT                                                 257

SEQ ID NO: 44           moltype = AA  length = 230
FEATURE                 Location/Qualifiers
REGION                  1..230
                        note = misc_feature - Eukaryotic initiation factor 4A-I
                          Variant 5
SITE                    1
                        note = misc_feature - Xaa can be any naturally occurring
                          amino acid
source                  1..230
                        mol_type = protein
                        organism = Homo sapiens
SEQUENCE: 44
XVVMALGDYM GASCHACIGG TNVRAEVQKL QMEAPHIIVG TPGRVFDMLN RRYLSPKYIK    60
MFVLDEADEM LSRGFKDQIY DIFQKLNSNT QVVLLSATMP SDVLEVTKKF MRDPIRILVK   120
KEELTLEGIR QFYINVEREE WKLDTLCDLY ETLTITQAVI FINTRRKVDW LTEKMHARDF   180
TVSAMHGDMD QKERDVIMRE FRSGSSRVLI TTDLLGKLYP QNRSRWTVWP             230

SEQ ID NO: 45           moltype = AA  length = 300
FEATURE                 Location/Qualifiers
REGION                  1..300
                        note = misc_feature - Eukaryotic initiation factor 4A-I
                          Variant 6
source                  1..300
                        mol_type = protein
                        organism = Homo sapiens
SEQUENCE: 45
MSASQDSRSR DNGPDGMEPE GVIESNWNEI VDSFDDMNLS ESLLRGIYAY GFEKPSAIQQ    60
RAILPCIKGY DVIAQAQSGT GKTATFAISI LQQIELDLKA TQALVLAPTR ELAQQKVVMA   120
LGDYMGASCH ACIGGTNVRA EVQKLQMEAP HIIVGTPGRV FDMLNRRYLS PKYIKMFVLD   180
EADEMLSRGF KDQIYDIFQK LNSNTQVVLL SATMPSDVLE VTKKFMRDPI RILVKKEELT   240
LEGIRQFYIN VEREEWKLDT LCDLYETLTI TQAVIFINTR KVDWLTEKM HARDFTVSAM   300

SEQ ID NO: 46           moltype = AA  length = 271
FEATURE                 Location/Qualifiers
REGION                  1..271
                        note = misc_feature - Eukaryotic initiation factor 4A-I
                          Variant 7
source                  1..271
                        mol_type = protein
                        organism = Homo sapiens
SEQUENCE: 46
MSASQDSRSR DNGPDGMEPE GVIESNWNEI VDSFDDMNLS ESLLRGIYAY GFEKPSAIQQ    60
RAILPCIKGY DVIAQAQSGT GKTATFAISI LQQIELDLKA TQALVLAPTR ELAQQIQKVV   120
MALGDYMGAS CHACIGGTNV RAEVQKLQME APHIIVGTPG RVFDMLNRRY LSPKYIKMFV   180
LDEADEMLSR GFKDQIYDIF QKLNSNTQEE LTLEGIRQFY INVEREEWKL DTLCDLYETL   240
TITQAVIFIN TRRKVDWLTE KMHARDFTVS A                                 271

SEQ ID NO: 47           moltype = AA  length = 85
FEATURE                 Location/Qualifiers
REGION                  1..85
                        note = misc_feature - Eukaryotic initiation factor 4A-I
                          Variant 7
source                  1..85
                        mol_type = protein
                        organism = Homo sapiens
SEQUENCE: 47
MEPEGVIESN WNEIVDSFDD MNLSESLLRG IYAYGFEKPS AIQQRAILPC IKGYDVIAQA    60
QSGTGKTATF AISILQQIEL DLKAT                                        85

SEQ ID NO: 48           moltype = AA  length = 214
FEATURE                 Location/Qualifiers
REGION                  1..214
                        note = misc_feature - Eukaryotic initiation factor 4A-I
                          Variant 9
SITE                    1
                        note = misc_feature - Xaa can be any naturally occurring
                          amino acid
source                  1..214
                        mol_type = protein
                        organism = Homo sapiens
SEQUENCE: 48
XAWAHCARGR HRPRPPTSGS RDNGPDGMEP EGVIESNWNE IVDSFDDMNL SESLLRGIYA    60
```

```
YGFEKPSAIQ QRAILPCIKG YDVIAQAQSG TGKTATFAIS ILQQIELDLK ATQALVLAPT      120
RELAQQIQKV VMALGDYMGA SCHACIGGTN VRAEVQKLQM EAPHIIVGTP GRVFDMLNRR      180
YLSPKYIKMF VLDEADEMLS RGFKDQIYDI FQKL                                  214

SEQ ID NO: 49               moltype = AA   length = 187
FEATURE                     Location/Qualifiers
REGION                      1..187
                            note = misc_feature - Eukaryotic initiation factor 4A-I
                             Variant 10
source                      1..187
                            mol_type = protein
                            organism = Homo sapiens
SEQUENCE: 49
MSASQDSRDN GPDGMEPEGV IESNWNEIVD SFDDMNLSES LLRGIYAYGF EKPSAIQQRA       60
ILPCIKGYDV IAQAQSGTGK TATFAISILQ QIELDLKATQ ALVLAPTREL AQQIQKVVMA      120
LGDYMGASCH ACIGGTNVRA EVQKLQMEAP HIIVGTPGRV FDMLNRRYLS PKYIKMFVLD      180
EADEMLS                                                                187

SEQ ID NO: 50               moltype = AA   length = 163
FEATURE                     Location/Qualifiers
REGION                      1..163
                            note = misc_feature - Eukaryotic initiation factor 4A-I
                             Variant 11
source                      1..163
                            mol_type = protein
                            organism = Homo sapiens
SEQUENCE: 50
MNLSESLLRG IYAYGFEKPS AIQQRAILPC IKGYDVIAQA QSGTGKTATF AISILQQIEL       60
DLKATQALVL APTRELAQQI QKVVMALGDY MGASCHACIG GTNVRAEVQK LQMEAPHIIV      120
GTPGRVFDML NRRYLSPKYI KMFVLDEADE MLSRGFKDQI YDI                        163

SEQ ID NO: 51               moltype = AA   length = 134
FEATURE                     Location/Qualifiers
REGION                      1..134
                            note = misc_feature - Eukaryotic initiation factor 4A-I
                             Variant 12
source                      1..134
                            mol_type = protein
                            organism = Homo sapiens
SEQUENCE: 51
MNLSESLLRG IYAYGFEKPS AIQQRAILPC IKGYDVIAQA QSGTGKTATF AISILQQIEL       60
DLKATQALVL APTRELAQQI QKVVMALGDY MGASCHACIG GTNVRAEVQK LQMEAPHIIV      120
GTPGRVFDML NRRY                                                        134

SEQ ID NO: 52               moltype = AA   length = 117
FEATURE                     Location/Qualifiers
REGION                      1..117
                            note = misc_feature - Eukaryotic initiation factor 4A-I
                             Variant 13
source                      1..117
                            mol_type = protein
                            organism = Homo sapiens
SEQUENCE: 52
MFVLDEADEM LSRGFKDQIY DIFQKLNSNT QVVLLSATMP SDVLEVTKKF MRDPIRILVK       60
KEELTLEGIR QFYINVEREE WKLDTLCDLY ETLTITQAVI FINTRRKVDW LTEKMHA         117

SEQ ID NO: 53               moltype = AA   length = 85
FEATURE                     Location/Qualifiers
REGION                      1..85
                            note = misc_feature - Eukaryotic initiation factor 4A-I
                             Variant 14
source                      1..85
                            mol_type = protein
                            organism = Homo sapiens
SEQUENCE: 53
MGRSTFLRGS RDNGPDGMEP EGVIESNWNE IVDSFDDMNL SESLLRGIYA YGFEKPSAIQ       60
QRAILPCIKG YDVIAQAQSG TGKTA                                             85

SEQ ID NO: 54               moltype = AA   length = 334
FEATURE                     Location/Qualifiers
REGION                      1..334
                            note = misc_feature - L-lactate dehydrogenase chain B
                             Variant 2
source                      1..334
                            mol_type = protein
                            organism = Homo sapiens
SEQUENCE: 54
MATLKEKLIA PVAEEEATVP NNKITVVGVG QVGMACAISI LGKSLADELA LVDVLEDKLK       60
GEMMDLQHGS LFLQTPKIVA DKDYSVTANS KIVVVTAGVR QQEGESRLNL VQRNVNVFKF     120
```

```
IIPQIVKYSP DCIIIVVSNP VDILTYVTWK LSGLPKHRVI GSGCNLDSAR FRYLMAEKLG    180
IHPSSCHGWI LGEHGDSSVA VWSGVNVAGV SLQELNPEMG TDNDSENWKE VHKMVVESAY    240
EVIKLKGYTN WAIGLSVADL IESMLKNLSR IHPVSTMVKG MYGIENEVFL SLPCILNARG    300
LTSVINQKLK DDEVAQLKKS ADTLWDIQKD LKDL                                334

SEQ ID NO: 55           moltype = AA   length = 341
FEATURE                 Location/Qualifiers
REGION                  1..341
                        note = misc_feature - L-lactate dehydrogenase chain B
                         Variant 3
SITE                    335
                        note = misc_feature - Xaa can be any naturally occurring
                         amino acid
source                  1..341
                        mol_type = protein
                        organism = Homo sapiens
SEQUENCE: 55
MATLKEKLIA PVAEEEATVP NNKITVVGVG QVGMACAISI LGKSLADELA LVDVLEDKLK    60
GEMMDLQHGS LFLQTPKIVA DKDYSVTANS KIVVVTAGVR QQEGESRLNL VQRNVNVFKF    120
IIPQIVKYSP DCIIIVVSNP VDILTYVTWK LSGLPKHRVI GSGCNLDSAR FRYLMAEKLG    180
IHPSSCHGWI LGEHGDSSVA VWSGVNVAGV SLQELNPEMG TDNDSENWKE VHKMVVESAY    240
EVIKLKGYTN WAIGLSVADL IESMLKNLSR IHPVSTMVKG MYGIENEVFL SLPCILNARG    300
LTSVINQKLK DDEVAQLKKS ADTLWDIQKD LKDLXLVSSR L                        341

SEQ ID NO: 56           moltype = AA   length = 232
FEATURE                 Location/Qualifiers
REGION                  1..232
                        note = misc_feature - L-lactate dehydrogenase chain B
                         Variant 4
source                  1..232
                        mol_type = protein
                        organism = Homo sapiens
SEQUENCE: 56
MATLKEKLIA PVAEEEATVP NNKITVVGVG QVGMACAISI LGKSLADELA LVDVLEDKLK    60
GEMMDLQHGS LFLQTPKIVA DKDYSVTANS KIVVVTAGVR QQEGESRLNL VQRNVNVFKF    120
IIPQIVKYSP DCIIIVVSNP VDILTYVTWK LSGLPKHRVI GSGCNLDSAR FRYLMAEKLG    180
IHPSSCHGWI LGEHGDSSVA VWSGVNVAGV SLQELNPEMG TDNDSENWKE VH            232

SEQ ID NO: 57           moltype = AA   length = 136
FEATURE                 Location/Qualifiers
REGION                  1..136
                        note = misc_feature - L-lactate dehydrogenase chain B
                         Variant 5
source                  1..136
                        mol_type = protein
                        organism = Homo sapiens
SEQUENCE: 57
MATLKEKLIA PVAEEEATVP NNKITVVGVG QVGMACAISI LGKSLADELA LVDVLEDKLK    60
GEMMDLQHGS LFLQTPKIVA DKDYSVTANS KIVVVTAGVR QQEGESRLNL VQRNVNVFKF    120
IIPQIVKYSP DCIIIV                                                    136

SEQ ID NO: 58           moltype = AA   length = 102
FEATURE                 Location/Qualifiers
REGION                  1..102
                        note = misc_feature - L-lactate dehydrogenase chain B
                         Variant 6
source                  1..102
                        mol_type = protein
                        organism = Homo sapiens
SEQUENCE: 58
MATLKEKLIA PVAEEEATVP NNKITVVGVG QVGMACAISI LGKSLADELA LVDVLEDKLK    60
GEMMDLQHGS LFLQTPKIVA DKDYSVTANS KIVVVTAGVR QQ                       102

SEQ ID NO: 59           moltype = AA   length = 320
FEATURE                 Location/Qualifiers
REGION                  1..320
                        note = misc_feature - Nuclear heterogeneous
                         Ribonucleoprotein A1 Variant
source                  1..320
                        mol_type = protein
                        organism = Homo sapiens
SEQUENCE: 59
MSKSESPKEP EQLRKLFIGG LSFETTDESL RSHFEQWGTL TDCVVMRDPN TKRSRGFGFV    60
TYATVEEVDA AMNARPHKVD GRVVEPKRAV SREDSQRPGA HLTVKKIFVG GIKEDTEEHH    120
LRDYFEQYGK IEVIEIMTDR GSGKKRGFAF VTFDDHDSVD KIVIQKYHTV NGHNCEVRKA    180
LSKQEMASAS SSQRGRSGSG NFGGGRGGGF GGNDNFGRGG NFSGRGGFGG SRGGGGYGGS    240
GDGYNGFGND GSNFGGGGSY NDFGNYNNQS SNFGPMKGGN FGGRSSGPYG GGGQYFAKPR    300
NQGGYGGSSS SSSYGSGRRF                                                320
```

```
SEQ ID NO: 60             moltype = AA   length = 267
FEATURE                   Location/Qualifiers
REGION                    1..267
                          note = misc_feature - Nuclear heterogeneous
                          Ribonucleoprotein A1 Variant 3
source                    1..267
                          mol_type = protein
                          organism = Homo sapiens
SEQUENCE: 60
MSKSESPKEP EQLRKLFIGG LSFETTDESL RSHFEQWGTL TDCVVMRDPN TKRSRGFGFV    60
TYATVEEVDA AMNARPHKVD GRVVEPKRAV SREDSQRPGA HLTVKKIFVG GIKEDTEEHH   120
LRDYFEQYGK IEVIEIMTDR GSGKKRGFAF VTFDDHDSVD KIVIQKYHTV NGHNCEVRKA   180
LSKQEMASAS SSQRGRSGSG NFGGGSYNDF GNYNNQSSNF GPMKGGNFGG RSSGPYGGGG   240
QYFAKPRNQG GYGGSSSSSS YGSGRRF                                      267

SEQ ID NO: 61             moltype = AA   length = 307
FEATURE                   Location/Qualifiers
REGION                    1..307
                          note = misc_feature - Nuclear heterogeneous
                          Ribonucleoprotein A1 Variant 4
source                    1..307
                          mol_type = protein
                          organism = Homo sapiens
SEQUENCE: 61
MSKSESPKEP EQLRKLFIGG LSFETTDESL RSHFEQWGTL TDCVVMRDPN TKRSRGFGFV    60
TYATVEEVDA AMNARPHKVD GRVVEPKRAV SREDSQRPGA HLTVKKIFVG GIKEDTEEHH   120
LRDYFEQYGK IEVIEIMTDR GSGKKRGFAF VTFDDHDSVD KIVIQKYHTV NGHNCEVRKA   180
LSKQEMASAS SSQRGRSGSG NFGGGRGGGF GGNDNFGRGG NFSGRGIGDG YNGFGNDGSN   240
FGGGGSYNDF GNYNNQSSNF GPMKGGNFGG RSSGPYGGGG QYFAKPRNQG GYGGSSSSSS   300
YGSGRRF                                                            307

SEQ ID NO: 62             moltype = AA   length = 191
FEATURE                   Location/Qualifiers
REGION                    1..191
                          note = misc_feature - Nuclear heterogeneous
                          Ribonucleoprotein A1 Variant 5
source                    1..191
                          mol_type = protein
                          organism = Homo sapiens
SEQUENCE: 62
KIEVIEIMTD RGSGKKRGFA FVTFDDHDSV DKIVIQKYHT VNGHNCEVRK ALSKQEMASA    60
SSSQRGRSGS GNFGGGRGGG FGGNDNFGRG GNFSGRGGFG GSRGGGGYGG SGDGYNGFGN   120
DGSNFGGGGS YNDFGNYNNQ SSNFGPMKGG NFGGRSSGPY GGGGQYFAKP RNQGGYGGSS   180
SSSSYGSGRR F                                                       191

SEQ ID NO: 63             moltype = AA   length = 231
FEATURE                   Location/Qualifiers
REGION                    1..231
                          note = misc_feature - Nuclear heterogeneous
                          Ribonucleoprotein A1 Variant 7
source                    1..231
                          mol_type = protein
                          organism = Homo sapiens
SEQUENCE: 63
MRDSLLVAKF LGTQDLCLFL NLALSPKEPE QLRKLFIGGL SFETTDESLR SHFEQWGTLT    60
DCVVMRDPNT KRSRGFGFVT YATVEEVDAA MNARPHKVDG RVVEPKRAVS REDSQRPGAH   120
LTVKKIFVGG IKEDTEEHHL RDYFEQYGKI EVIEIMTDRG SGKKRGFAFV TFDDHDSVDK   180
IVIQKYHTVN GHNCEVRKAL SKQEMASASS SQRGRSGSGN FGGGRGGGFG G           231

SEQ ID NO: 64             moltype = AA   length = 113
FEATURE                   Location/Qualifiers
REGION                    1..113
                          note = misc_feature - Nuclear heterogeneous
                          Ribonucleoprotein A1 Variant 7
source                    1..113
                          mol_type = protein
                          organism = Homo sapiens
SEQUENCE: 64
MRDPNTKRSR GFGFVTYATV EEVDAAMNAR PHKVDGRVVE PKRAVSREDS QRPGAHLTVK    60
KIFVGGIKED TEEHHLRDYF EQYGKIEVIE IMTDRGSGKK RGFAFVTFDD HDS          113

SEQ ID NO: 65             moltype = AA   length = 156
FEATURE                   Location/Qualifiers
REGION                    1..156
                          note = misc_feature - Nuclear heterogeneous
                          Ribonucleoprotein A1 Variant 8
source                    1..156
                          mol_type = protein
                          organism = Homo sapiens
```

```
SEQUENCE: 65
MSKSESPKEP EQLRKLFIGG LSFETTDESL RSHFEQWGTL TDCVVMRDPN TKRSRGFGFV    60
TYATVEEVDA AMNARPHKVD GRVVEPKRAV SREDSQRPGA HLTVKKIFVG GFGGSRGGGG   120
YGGSGDGYNG FGNDGSNFGG GGSYNDFGNY NNQSSN                            156

SEQ ID NO: 66           moltype = AA  length = 145
FEATURE                 Location/Qualifiers
REGION                  1..145
                        note = misc_feature - Nuclear heterogeneous
                         Ribonucleoprotein A1 Variant 9
source                  1..145
                        mol_type = protein
                        organism = Homo sapiens
SEQUENCE: 66
MSKSESPKEP EQLRKLFIGG LSFETTDESL RSHFEQWGTL TDCVDSQRPG AHLTVKKIFV    60
GGIKEDTEEH HLRDYFEQYG KIEVIEIMTD RGSGKKRGFA FVTFDDHDSV DKIVIQKYHT   120
VNGHNCEVRK ALSKQEMASA SSSQR                                       145

SEQ ID NO: 67           moltype = AA  length = 436
FEATURE                 Location/Qualifiers
REGION                  1..436
                        note = misc_feature - Polycystic kidney disease protein
                         1-like 1 Variant 2
SITE                    1
                        note = misc_feature - Xaa can be any naturally occurring
                         amino acid
source                  1..436
                        mol_type = protein
                        organism = Homo sapiens
SEQUENCE: 67
XSRLRASMWI DRSTRAVSVH FTLYNPPTQL FTSVSLRVEI LPTGSLVPSS LVESFSIFRS    60
DSALQYHLML PQLVFLALSL IHLCVQLYRM MDKGVLSYWR KPRNWLELSV VGVSLTYYAV   120
SGHLVTLAGD VTNQFHRGLC RAFMDLTLMA SWNQRARWLR GILLFLFTLK CVYLPGIQNT   180
MASCSSMMRH SLPSIFVAGL VGALMLAALS HLHRFLLSMW VLPPGTFTDA FPGLLPHFPR   240
RSQKDCLLGL SKSDQRAMAC YFGILLIVSA TLCFGMLRGF LMTLPQKRKS FQSKSFVRLK   300
DVTAYMWEKV LTFLRLETPK LEEAEMVENH NYYLDEFANL LDELLMKING LSDSLQLPLL   360
EKTSNNTGEA RTEESPLVDI SSYQAAESLT LVTQTEVQWH DLGSLQPPHP RFKQFSCLSL   420
PSSWDYRRVP LCLANF                                                 436

SEQ ID NO: 68           moltype = AA  length = 164
FEATURE                 Location/Qualifiers
REGION                  1..164
                        note = misc_feature - Polycystic kidney disease protein
                         1-like 1 Variant 3
SITE                    1
                        note = misc_feature - Xaa can be any naturally occurring
                         amino acid
source                  1..164
                        mol_type = protein
                        organism = Homo sapiens
SEQUENCE: 68
XVGGPENPYL IDPENQNVTL NGPGGCGTRE DCVLSLGRTR TEAHTALSRL RASMWIDRST    60
RAVSVHFTLY NPPTQLFTSV SLRVEILPTG SLVPSSLVES FSIFRSDSAL QYHLMLPQLV   120
FLALSLIHLC VQLYRMMDKG VLSYWRKPRN WLEVASLVSF SFEK                   164

SEQ ID NO: 69           moltype = AA  length = 646
FEATURE                 Location/Qualifiers
REGION                  1..646
                        note = misc_feature - Heat shock protein cognate 71 kDa
                         Variant 2
source                  1..646
                        mol_type = protein
                        organism = Homo sapiens
SEQUENCE: 69
MSKGPAVGID LGTTYSCVGV FQHGKVEIIA NDQGNRTTPS YVAFTDTERL IGDAAKNQVA    60
MNPTNTVFDA KRLIGRRFDD AVVQSDMKHW PFMVVNDAGR PKVQVEYKGE TKSFYPEEVS   120
SMVLTKMKEI AEAYLGKTVT NAVVTVPAYF NDSQRQATKD AGTIAGLNVL RIINEPTAAA   180
IAYGLDKKVG AERNVLIFDL GGGTFDVSIL TIEDGIFEVK STAGDTHLGG EDFDNRMVNH   240
FIAEFKRKHK KDISENKRAV RRLRTACERA KRTLSSSTQA SIEIDSLYEG IDFYTSITRA   300
RFEELNADLF RGTLDPVEKA LRDAKLDKSQ IHDIVLVGGS TRIPKIQKLL QDFFNGKELN   360
KSINPDEAVA YGAAVQAAIL SGDKSENVQD LLLLDVTPLS LGIETAGGVM TVLIKRNTTI   420
PTKQTQTFTT YSDNQPGVLI QVYEGERAMT KDNNLLGKFE LTGIPPAPRG VPQIEVTFDI   480
DANGILNVSA VDKSTGKENK ITITNDKGRL SKEDIERMVQ EAEKYKAEDE KQRDKVSSKN   540
SLESYAFNMK ATVEDEKLQG KINDEDKQKI LDKCNEIINW LDKNQTAEKE EFEHQQKELE   600
KVCNPIITKL YQSAGGMPGG MPGGFPGGGA PPSGGASSGP TIEEVD                 646

SEQ ID NO: 70           moltype = AA  length = 646
FEATURE                 Location/Qualifiers
REGION                  1..646
```

```
                        note = misc_feature - Heat shock protein cognate 71 kDa
                            Variant 3
    source              1..646
                        mol_type = protein
                        organism = Homo sapiens
SEQUENCE: 70
MSKGPAVGID LGTTYSCVGV FQHGKVEIIA NDQGNRTTPS YVAFTDTERL IGDAAKNQVA     60
MNPTNTVFDA KRLIGRRFDD AVVQSDMKHW PFMVVNDAGR PKVQVEYKGE TKSFYPEEVS    120
SMVLTKMKEI AEAYLGKTVT NAVVTVPAYF NDSQRQATKD AGTIAGLNVL RIINEPTAAA    180
IAYGLDKKVG AERNVLIFDL GGGTFDVSIL TIEDGIFEVK STAGDTHLGG EDFDNRMVNH    240
FIAEFKRKHK KDISENKRAV RRLRTACERA KRTLSSSTQA SIEIDSLYEG IDFYTSITRA    300
RFEELNADLF RGTLDPVEKA LRDAKLDKSQ IHDIVLVGGS TRIPKIQKLL QDFFNGKELN    360
KSINPDEAVA YGAAVQAAIL SGDKSENVQD LLLLDVTPLS LGIETAGGVM TVLIKRNTTI    420
PTKQTQTFTT YSDNQPGVLI QVYEGERAMT KDNNLLGKFE LTGIPPAPRG VPQIEVTFDI    480
DANGILNVSA VDKSTGKENK ITITNDKGRL SKEDIERMVQ EAEKYKAEDE KQRDKVSSKN    540
SLESYAFNMK ATVEDEKLQG KINDEDKQKI LDKCNEIINW LDKNQTAEKE EFEHQQKELE    600
KVCNPIITKL YQSAGGMPGG MPGGFPGGGA PPSGGASSGP TIEEVD                   646

SEQ ID NO: 71           moltype = AA  length = 493
FEATURE                 Location/Qualifiers
REGION                  1..493
                        note = misc_feature - Heat shock protein cognate 71 kDa
                            Variant 4
    source              1..493
                        mol_type = protein
                        organism = Homo sapiens
SEQUENCE: 71
MSKGPAVGID LGTTYSCVGV FQHGKVEIIA NDQGNRTTPS YVAFTDTERL IGDAAKNQVA     60
MNPTNTVFDA KRLIGRRFDD AVVQSDMKHW PFMVVNDAGR PKVQVEYKGE TKSFYPEEVS    120
SMVLTKMKEI AEAYLGKTVT NAVVTVPAYF NDSQRQATKD AGTIAGLNVL RIINEPTAAA    180
IAYGLDKKVG AERNVLIFDL GGGTFDVSIL TIEDGIFEVK STAGDTHLGG EDFDNRMVNH    240
FIAEFKRKHK KDISENKRAV RRLRTACERA KRTLSSSTQA SIEIDSLYEG IDFYTSITRA    300
RFEELNADLF RGTLDPVEKA LRDAKLDKSQ IHDIVLVGGS TRIPKIQKLL QDFFNGKELN    360
KSINPDEAVA YGAAVQAAIL SGDKSENVQD LLLLDVTPLS LGIETAGGVM TVLIKRNTTI    420
PTKQTQTFTT YSDNQPGVLI QVYEGERAMT KDNNLLGKFE LTGMPGGMPG GFPGGGAPPS    480
GGASSGPTIE EVD                                                      493

SEQ ID NO: 72           moltype = AA  length = 627
FEATURE                 Location/Qualifiers
REGION                  1..627
                        note = misc_feature - Heat shock protein cognate 71 kDa
                            Variant 5
    source              1..627
                        mol_type = protein
                        organism = Homo sapiens
SEQUENCE: 72
MSKGPAVGID LGTTYSCVGV FQHGKVEIIA NDQGNRTTPS YVAFTDTERL IGDAAKNQVA     60
MNPTNTVFDA KRLIGRRFDD AVVQSDMKHW PFMVVNDAGR PKVQVEYKGE TKSFYPEEVS    120
SMVLTKMKEI AEAYLGKATK DAGTIAGLNV LRIINEPTAA AIAYGLDKKV GAERNVLIFD    180
LGGGTFDVSI LTIEDGIFEV KSTAGDTHLG GEDFDNRMVN HFIAEFKRKH KKDISENKRA    240
VRRLRTACER AKRTLSSSTQ ASIEIDSLYE GIDFYTSITR ARFEELNADL FRGTLDPVEK    300
ALRDAKLDKS QIHDIVLVGG STRIPKIQKL LQDFFNGKEL NKSINPDEAV AYGAAVQAAI    360
LSGDKSENVQ DLLLLDVTPL SLGIETAGGV MTVLIKRNTT IPTKQTQTFT TYSDNQPGVL    420
IQVYEGERAM TKDNNLLGKF ELTGIPPAPR GVPQIEVTFD IDANGILNVS AVDKSTGKEN    480
KITITNDKGR LSKEDIERMV QEAEKYKAED EKQRDKVSSK NSLESYAFNM KATVEDEKLQ    540
GKINDEDKQK ILDKCNEIIN WLDKNQTAEK EEFEHQQKEL EKVCNPIITK LYQSAGGMPG    600
GMPGGFPGGG APPSGGASSG PTIEEVD                                       627

SEQ ID NO: 73           moltype = AA  length = 410
FEATURE                 Location/Qualifiers
REGION                  1..410
                        note = misc_feature - Heat shock protein cognate 71 kDa
                            Variant 6
    source              1..410
                        mol_type = protein
                        organism = Homo sapiens
SEQUENCE: 73
MVNHFIAEFK RKHKKDISEN KRAVRRLRTA CERAKRTLSS STQASIEIDS LYEGIDFYTS     60
ITRARFEELN ADLFRGTLDP VEKALRDAKL DKSQIHDIVL VGGSTRIPKI QKLLQDFFNG    120
KELNKSINPD EAVAYGAAVQ AAILSGDKSE NVQDLLLLDV TPLSLGIETA GGVMTVLIKR    180
NTTIPTKQTQ TFTTYSDNQP GVLIQVYEGE RAMTKDNNLL GKFELTGIPP APRGVPQIEV    240
TFDIDANGIL NVSAVDKSTG KENKITITND KGRLSKEDIE RMVQEAEKYK AEDEKQRDKV    300
SSKNSLESYA FNMKATVEDE KLQGKINDED KQKILDKCNE IINWLDKNQT AEKEEFEHQQ    360
KELEKVCNPI ITKLYQSAGG MPGGMPGGFP GGGAPPSGGA SSGPTIEEVD               410

SEQ ID NO: 74           moltype = AA  length = 500
FEATURE                 Location/Qualifiers
REGION                  1..500
                        note = misc_feature - Heat shock protein cognate 71 kDa
```

-continued

```
                        Variant 7
source                  1..500
                        mol_type = protein
                        organism = Homo sapiens
SEQUENCE: 74
MSKGPAVGID LGTTYSCVGV FQHGKVEIIA NDQGNRTTPS YVAFTDTERL IGDAAKNQVA    60
MNPTNTVFDA KRLIGRRFDD AVVQSDMKHW PFMVVNDAGR PKHKKDISEN KRAVRRLRTA   120
CERAKRTLSS STQASIEIDS LYEGIDFYTS ITRARFEELN ADLFRGTLDP VEKALRDAKL   180
DKSQIHDIVL VGGSTRIPKI QKLLQDFFNG KELNKSINPD EAVAYGAAVQ AAILSGDKSE   240
NVQDLLLLDV TPLSLGIETA GGVMTVLIKR NTTIPTKQTQ TFTTYSDNQP GVLIQVYEGE   300
RAMTKDNNLL GKFELTGIPP APRGVPQIEV TFDIDANGIL NVSAVDKSTG KENKITITND   360
KGRLSKEDIE RMVQEAEKYK AEDEKQRDKV SSKNSLESYA FNMKATVEDE KLQGKINDED   420
KQKILDKCNE IINWLDKNQT AEKEEFEHQQ KELEKVCNPI ITKLYQSAGG MPGGMPGGFP   480
GGGAPPSGGA SSGPTIEEVD                                              500

SEQ ID NO: 75           moltype = AA  length = 312
FEATURE                 Location/Qualifiers
REGION                  1..312
                        note = misc_feature - Heat shock protein cognate 71 kDa
                         Variant 8
source                  1..312
                        mol_type = protein
                        organism = Homo sapiens
SEQUENCE: 75
MNPTNTVFDA KRLIGRRFDD AVVQSDMKHW PFMVVNDAGR PKVQVEYKGE TKSFYPEEVS    60
SMVLTKMKEI AEAYLGKTVT NAVVTVPAYF NDSQRQATKD AGTIAGLNVL RIIINEPTAAA  120
IAYGLDKKVG AERNVLIFDL GGGTFDVSIL TIEDGIFEVK STAGDTHLGG EDFDNRMVNH   180
FIAEFKRKHK KDISENKRAV RRLRTACERA KRTLSSSTQA SIEIDSLYEG IDFYTSITRA   240
RFEELNADLF RGTLDPVEKA LRDAKLDKSQ IHDIVLVGGS TRIPKIQKLL QDFFNGKELN   300
KSINPDEAVA YG                                                      312

SEQ ID NO: 76           moltype = AA  length = 187
FEATURE                 Location/Qualifiers
REGION                  1..187
                        note = misc_feature - Heat shock protein cognate 71 kDa
                         Variant 9
source                  1..187
                        mol_type = protein
                        organism = Homo sapiens
SEQUENCE: 76
MSKGPAVGID LGTTYSCVGV FQHGKVEIIA NDQGNRTTPS YVAFTDTERL IGDAAKNQVA    60
MNPTNTVFDA KRLIGRRFDD AVVQSDMKHW PFMVVNDAGR PKVQVEYKGE TKSFYPEEVS   120
SMVLTKMKEI AEAYLGKTVT NAVVTVPAYF NDSQRQATKD AGTIAGLNVL RIIINEPTAAA  180
IAYGLDK                                                            187

SEQ ID NO: 77           moltype = AA  length = 223
FEATURE                 Location/Qualifiers
REGION                  1..223
                        note = misc_feature - Heat shock protein cognate 71 kDa
                         Variant 10
source                  1..223
                        mol_type = protein
                        organism = Homo sapiens
SEQUENCE: 77
MTVLIKRNTT IPTKQTQTFT TYSDNQPGVL IQVYEGERAM TKDNNLLGKF ELTGIPPAPR    60
GVPQIEVTFD IDANGILNVS AVDKSTGKEN KITITNDKGR LSKEDIERMV QEAEKYKAED   120
EKQRDKVSSK NSLESYAFNM KATVEDEKLQ GKINDEDKQK ILDKCNEIIN WLDKNQTAEK   180
EEFEHQQKEL EKVCNPIITK LYQSAGGMPG GMPGGFPGGG APP                     223

SEQ ID NO: 78           moltype = AA  length = 150
FEATURE                 Location/Qualifiers
REGION                  1..150
                        note = misc_feature - Heat shock protein cognate 71 kDa
                         Variant 11
source                  1..150
                        mol_type = protein
                        organism = Homo sapiens
SEQUENCE: 78
MTKDNNLLGK FELTGIPPAP RGVPQIEVTF DIDANGILNV SAVDKSTGKE NKITITNDKG    60
RLSKEDIERM VQEAEKYKAE DEKQRDKVSS KNSLESYAFN MKATVEDEKL QGKINDEDKQ   120
KILDKCNEII NWLDKNQTAE KEEFEHQQKE                                    150

SEQ ID NO: 79           moltype = AA  length = 171
FEATURE                 Location/Qualifiers
REGION                  1..171
                        note = misc_feature - Heat shock protein cognate 71 kDa
                         Variant 12
source                  1..171
                        mol_type = protein
```

```
                              organism = Homo sapiens
SEQUENCE: 79
MSKGPAVGID LGTTYSCVGV FQHGKVEIIA NDQGNRTTPS YVAFTDTERL IGDAAKNQVA    60
MNPTNTVFDA KRLIGRRFDD AVVQSDMKHW PFMVVNDAGR PKVQVEYKGE TKSFYPEEVS   120
SMVLTKMKEI AEAYLGKTVT NAVVTVPAYF NDSQRQATKD AGTIAGLNVL R            171

SEQ ID NO: 80             moltype = AA  length = 132
FEATURE                   Location/Qualifiers
REGION                    1..132
                          note = misc_feature - Heat shock protein cognate 71 kDa
                           Variant 13
source                    1..132
                          mol_type = protein
                          organism = Homo sapiens
SEQUENCE: 80
MSKGPAVGID LGTTYSCVGV FQHGKVEIIA NDQGNRTTPS YVAFTDTERL IGDAAKNQVA    60
MNPTNTVFDA KRLIGRRFDD AVVQSDMKHW PFMVVNDAGR PKVQVEYKGE TKSFYPEEVS   120
SMVLTKMKEI AE                                                      132

SEQ ID NO: 81             moltype = AA  length = 183
FEATURE                   Location/Qualifiers
REGION                    1..183
                          note = misc_feature - Heat shock protein cognate 71 kDa
                           Variant 14
source                    1..183
                          mol_type = protein
                          organism = Homo sapiens
SEQUENCE: 81
MSKGPAVGID LGTTYSCVGV FQHGKVEIIA NDQGNRTTPS YVAFTDTERL IGDAAKNQVA    60
MNPTNTVFDA KRLIGRRFDD AVVQSDMKHW PFMVVNDAGR PKVQVEYKGE TKSFYPEEVS   120
SMVLTKMKEI AEAYLGKTVT NAVVTVPAYF NDSQRQATKD AGTIAGLNVL RIINEPTAAA   180
IAY                                                                183

SEQ ID NO: 82             moltype = AA  length = 168
FEATURE                   Location/Qualifiers
REGION                    1..168
                          note = misc_feature - Heat shock protein cognate 71 kDa
                           Variant 15
source                    1..168
                          mol_type = protein
                          organism = Homo sapiens
SEQUENCE: 82
MSKGPAVGID LGTTYSCVGV FQHGKVEIIA NDQGNRTTPS YVAFTDTERL IGDAAKNQVA    60
MNPTNTVFET KSFYPEEVSS MVLTKMKEIA EAYLGKTVTN AVVTVPAYFN DSQRQATKDA   120
GTIAGLNVLR IINEPTAAAI AYGLDKKVGA ERNVLIFDLG GGTFDVSI                168

SEQ ID NO: 83             moltype = AA  length = 178
FEATURE                   Location/Qualifiers
REGION                    1..178
                          note = misc_feature - Heat shock protein cognate 71 kDa
                           Variant 16
source                    1..178
                          mol_type = protein
                          organism = Homo sapiens
SEQUENCE: 83
MSKGPAVGID LGTTYSCVGV FQHGKVEIIA NDQGNRTTPS YVAFTDTERL IGDAAKNQVA    60
MNPTNTVFDA KRLIGRRFDD AVVQSDMKHW PFMVVNDAGR PKVQVEYKGE TKSFYPEEVS   120
SMVLTKMKEI AEAYLGKTVT NAVVTVPAYF NDSQRQATKD AGTIAGLNVL RIINEPTA     178

SEQ ID NO: 84             moltype = AA  length = 137
FEATURE                   Location/Qualifiers
REGION                    1..137
                          note = misc_feature - Heat shock protein cognate 71 kDa
                           Variant 17
source                    1..137
                          mol_type = protein
                          organism = Homo sapiens
SEQUENCE: 84
MSKGPAVGID LGTTYSCVGV FQHGKVEIIA NDQGNRTTPS YVAFTDTERL IGDAAKNQVA    60
MNPTNTVFDA KRLIGRRFDD AVVQSDMKHW PFMVVNDAGR PKVQVEYKGE TKSFYPEEVS   120
SMVLTKMKEI AEAYLGK                                                 137

SEQ ID NO: 85             moltype = AA  length = 1861
FEATURE                   Location/Qualifiers
REGION                    1..1861
                          note = misc_feature - Ankyrin-3 Variant 2
source                    1..1861
                          mol_type = protein
                          organism = Homo sapiens
```

```
SEQUENCE: 85
MASSASSSPA GTEDSAPAQG GFGSDYSRSS RKSDANASYL RAARAGHLEK ALDYIKNGVD    60
INICNQNGLN ALHLASKEGH VEVVSELLQR EANVDAATKK GNTALHIASL AGQAEVVKVL   120
VTNGANVNAQ SQNGFTPLYM AAQENHLEVV KFLLDNGASQ SLATEDGFTP LAVALQQGHD   180
QVVSLLLEND TKGKVRLPAL HIAARKDDTK AAALLLQNDN NADVESKSGF TPLHIAAHYG   240
NINVATLLLN RAAAVDFTAR NDITPLHVAS KRGNANMVKL LLDRGAKIDA KTRDGLTPLH   300
CGARSGHEQV VEMLLDRAAP ILSKTKNGLS PLHMATQGDH LNCVQLLLQH NVPVDDVTND   360
YLTALHVAAH CGHYKVAKVL LDKKANPNAK ALNGFTPLHI ACKKNRIKVM ELLLKHGASI   420
QAVTESGLTP IHVAAFMGHV NIVSQLMHHG ASPNTTNVRG ETALHMAARS GQAEVVRYLV   480
QDGAQVEAKA KDDQTPLHIS ARLGKADIVQ QLLQQGASPN AATTSGYTPL HLSAREGHED   540
VAAFLLDHGA SLSITTKKGF TPLHVAAKYG KLEVANLLLQ KSASPDAAGK SGLTPLHVAA   600
HYDNQKVALL LLDQGASPHA AAKNGYTPLH IAAKKNQMDI ATTLLEYGAD ANAVTRQGIA   660
SVHLAAQEGH VDMVSLLLGR NANVNLSNKS GLTPLHLAAQ EDRVNVAEVL VNQGAHVDAQ   720
TKMGYTPLHV GCHYGNIKIV NFLLQHSAKV NAKTKNGYTP LHQAAQQGHT HIINVLLQNN   780
ASPNELTVNG NTALGIARRL GYISVVDTLK IVTEETMTTT TVTEKHKMNV PETMNEVLDM   840
SDDEVRKANA PEMLSDGEYI SDVEEGEDAM TGDTDKYLGP QDLKELGDDS LPAEGYMGFS   900
LGARSASLRS FSSDRSYTLN RSSYARDSMM IEELLVPSKE QHLTFTREFD SDSLRHYSWA   960
ADTLDNVNLV SSPIHSGFLV SFMVDARGGS MRGSRHHGMR IIIPPRKCTA PTRITCRLVK  1020
RHKLANPPPM VEGEGLASRL VEMGPAGAQF LGPVIVEIPH FGSMRGKERE LIVLRSENGE  1080
TWKEHQFDSK NEDLTELLNG MDEELDSPEE LGKKRICRII TKDFPQYFAV VSRIKQESNQ  1140
IGPEGGILSS TTVPLVQASF PEGALTKRIR VGLQAQPVPD EIVKKILGNK ATFSPIVTVE  1200
PRRRKFHKPI TMTIPVPPPS GEGVSNGYKG DTTPNLRLLC SITGGTSPAQ WEDITGTTPL  1260
TFIKDCVSFT TNVSARFWLA DCHQVLETVG LATQLYRELI CVPYMAKFVV FAKMNDPVES  1320
SLRCFCMTDD KVDKTLEQQE NFEEVARSKD IEVLEGKPIY VDCYGNLAPL TKGGQQLVFN  1380
FYSFKENRLP FSIKIRDTSQ EPCGRLSFLK EPKTTKGLPQ TAVCNLNITL PAHKKIEKTD  1440
RRQSFASLAL RKRYSYLTEP GMSPQSPCER TDIRMAIVAD HLGLSWTELA RELNFSVDEI  1500
NQIRVENPNS LISQSFMLLK KWVTRDGKNA TTDALTSVLT KINRIDIVTL LEGPIFDYGN  1560
ISGTRSFADE NNVFHDPVDG YPSLQVELET PTGLHYTPPT PFQQDDYFSD ISSIESPLRT  1620
PSRLSDGLVP SQGNIEHSAD GPPVVTAEDA SLEDSKLEDS VPLTEMPEAV DVDESQLENV  1680
CLSWQNETSS GNLESCAQAR RVTGGLLDRL DDSPDQCRDS ITSYLKGEAG KPEANGSHTE  1740
ITPEAKTKSY FPESQNDVGK QSTKETLKPK IHGSGHVEEP ASPLAAYQKS LEETSKLIIE  1800
ETKPCVPVSM KKMSRTSPAD GKPRLSLHEE EGSSGSEQKQ GEGFKVKTKK EIRHVEKKSH  1860
S                                                                 1861

SEQ ID NO: 86           moltype = AA  length = 1868
FEATURE                 Location/Qualifiers
REGION                  1..1868
                        note = misc_feature - Ankyrin-3 Variant 3
source                  1..1868
                        mol_type = protein
                        organism = Homo sapiens
SEQUENCE: 86
MSEEPKEKNA KPAHRKRKGK SKSDANASYLR AARAGHLEKA LDYIKNGVDI NICNQNGLNA    60
LHLASKEGHV EVVSELLQRE ANVDAATKKG NTALHIASLA GQAEVVKVLV TNGANVNAQS   120
QNGFTPLYMA AQENHLEVVK FLLDNGASQS LATEDGFTPL AVALQQGHDQ VVSLLLENDT   180
KGKVRLPALH IAARKDDTKA AALLLQNDNN ADVESKSGFT PLHIAAHYGN INVATLLLNR   240
AAAVDFTARN DITPLHVASK RGNANMVKLL LDRGAKIDAK TRDGLTPLHC GARSGHEQVV   300
EMLLDRAAPI LSKTKNGLSP LHMATQGDHL NCVQLLLQHN VPVDDVTNDY LTALHVAAHC   360
GHYKVAKVLL DKKANPNAKA LNGFTPLHIA CKKNRIKVME LLLKHGASIQ AVTESGLTPI   420
HVAAFMGHVN IVSQLMHHGA SPNTTNVRGE TALHMAARSG QAEVVRYLVQ DGAQVEAKAK   480
DDQTPLHISA RLGKADIVQQ LLQQGASPNA ATTSGYTPLH LSAREGHEDV AAFLLDHGAS   540
LSITTKKGFT PLHVAAKYGK LEVANLLLQK SASPDAAGKS GLTPLHVAAH YDNQKVALLL   600
LDQGASPHAA AKNGYTPLHI AAKKNQMDIA TTLLEYGADA NAVTRQGIAS VHLAAQEGHV   660
DMVSLLLGRN ANVNLSNKSG LTPLHLAAQE DRVNVAEVLV NQGAHVDAQT KMGYTPLHVG   720
CHYGNIKIVN FLLQHSAKVN AKTKNGYTPL HQAAQQGHTH IINVLLQNNA SPNELTVNGN   780
TALGIARRLG YISVVDTLKI VTEETMTTTT VTEKHKMNVP ETMNEVLDMS DDEVRKANAP   840
EMLSDGEYIS DVEEGNRCTW YKIPKVQEFT VKSEDAMTGD TDKYLGPQDL KELGDDSLPA   900
EGYMGFSLGA RSASLRSFSS DRSYTLNRSS YARDSMMIEE LLVPSKEQHL TFTREFDSDS   960
LRHYSWAADT LDNVNLVSSP IHSGFLVSFM VDARGGSMRG SRHHGMRIII PPRKCTAPTR  1020
ITCRLVKRHK LANPPPMVEG EGLASRLVEM GPAGAQFLGP VIVEIPHFGS MRGKERELIV  1080
LRSENGETWK EHQFDSKNED LTELLNGMDE ELDSPEELGK KRICRIITKD FPQYFAVVSR  1140
IKQESNQIGP EGGILSSTTV PLVQASFPEG ALTKRIRVGL QAQPVPDEIV KKILGNKATF  1200
SPIVTVEPRR RKFHKPITMT IPVPPPSGEG VSNGYKGDTT PNLRLLCSIT GGTSPAQWED  1260
ITGTTPLTFI KDCVSFTTNV SARFWLADCH QVLETVGLAT QLYRELICVP YMAKFVVFAK  1320
MNDPVESSLR CFCMTDDKVD KTLEQQENFE EVARSKDIEV LEGKPIYVDC YGNLAPLTKG  1380
GQQLVFNFYS FKENRLPFSI KIRDTSQEPC GRLSFLKEPK TTKGLPQTAV CNLNITLPAH  1440
KKIEKTDRRQ SFASLALRKR YSYLTEPGMS PQSPCERTDI RMAIVADHLG LSWTELAREL  1500
NFSVDEINQI RVENPNSLIS QSFMLLKKWV TRDGKNATTD ALTSVLTKIN RIDIVTLLEG  1560
PIFDYGNISG TRSFADENNV FHDPVDGYPS LQVELETPTG LHYTPPTPFQ QDDYFSDISS  1620
IESPLRTPSR LSDGLVPSQG NIEHSADGPP VVTAEDASLE DSKLEDSVPL TEMPEAVDVD  1680
ESQLENVCLS WQNETSSGNL ESCAQARRVT GGLLDRLDDS PDQCRDSITS YLKGEAGKFE  1740
ANGSHTEITP EAKTKSYFPE SQNDVGKQST KETLKPKIHG SGHVEEPASP LAAYQKSLEE  1800
TSKLIIEETK PCVPVSMKKM SRTSPADGKP RLSLHEEEGS SGSEQKQGEG FKVKTKKEIR  1860
HVEKKSHS                                                          1868

SEQ ID NO: 87           moltype = AA  length = 1001
FEATURE                 Location/Qualifiers
REGION                  1..1001
                        note = misc_feature - Ankyrin-3 Variant 4
```

```
source                  1..1001
                        mol_type = protein
                        organism = Homo sapiens
SEQUENCE: 87
MALPQSEDAM TGDTDKYLGP QDLKELGDDS LPAEGYMGFS LGARSASLRS FSSDRSYTLN    60
RSSYARDSMM IEELLVPSKE QHLTFTREFD SDSLRHYSWA ADTLDNVNLV SSPIHSGFLV   120
SFMVDARGGS MRGSRHHGMR IIIPPRKCTA PTRITCRLVK RHKLANPPPM VEGEGLASRL   180
VEMGPAGAQF LGPVIVEIPH FGSMRGKERE LIVLRSENGE TWKEHQFDSK NEDLTELLNG   240
MDEELDSPEE LGKKRICRII TKDFPQYFAV VSRIKQESNQ IGPEGGILSS TTVPLVQASF   300
PEGALTKRIR VGLQAQPVPD EIVKKILGNK ATFSPIVTVE PRRRKFHKPI TMTIPVPPPS   360
GEGVSNGYKG DTTPNLRLLC SITGGTSPAQ WEDITGTTPL TFIKDCVSFT TNVSARFWLA   420
DCHQVLETVG LATQLYRELI CVPYMAKFVV FAKMNDPVES SLRCFCMTDD KVDKTLEQQE   480
NFEEVARSKD IEVLEGKPIY VDCYGNLAPL TKGGQQLVFN FYSFKENRLP FSIKIRDTSQ   540
EPCGRLSFLK EPKTTKGLPQ TAVCNLNITL PAHKKIEKTD RRQSFASLAL RKRYSYLTEP   600
GMSPQSPCER TDIRMAIVAD HLGLSWTELA RELNFSVDEI NQIRVENPNS LISQSFMLLK   660
KWVTRDGKNA TTDALTSVLT KINRIDIVTL LEGPIFDYGN ISGTRSFADE NNVFHDPVDG   720
YPSLQVELET PTGLHYTPPT PFQQDDYFSD ISSIESPLRT PSRLSDGLVP SQGNIEHSAD   780
GPPVVTAEDA SLEDSKLEDS VPLTEMPEAV DVDESQLENV CLSWQNETSS GNLESCAQAR   840
RVTGGLLDRL DDSPDQCRDS ITSYLKGEAG KFEANGSHTE ITPEAKTKSY FPESQNDVGK   900
QSTKETLKPK IHGSGHVEEP ASPLAAYQKS LEETSKLIIE ETKPCVPVSM KKMSRTSPAD   960
GKPRLSLHEE EGSSGSEQKQ GEGFKVKTKK EIRHVEKKSH S                     1001

SEQ ID NO: 88           moltype = AA  length = 1643
FEATURE                 Location/Qualifiers
REGION                  1..1643
                        note = misc_feature - Ankyrin-3 Variant 5
SITE                    1
                        note = misc_feature - Xaa can be any naturally occurring
                         amino acid
source                  1..1643
                        mol_type = protein
                        organism = Homo sapiens
SEQUENCE: 88
XFLVSFMVDA RGGSMRGSRH HGMRIIIPPR KCTAPTRITC RLVKRHKLAN PPPMVEGEGL    60
ASRLVEMGPA GAQFLGPVIV EIPHFGSMRG KERELIVLRS ENGETWKEHQ FDSKNEDLTE   120
LLNGMDEELD SPEELGKKRI CRIITKDFPQ YFAVVSRIKQ ESNQIGPEGG ILSSTTVPLV   180
QASFPEGALT KRIRVGLQAQ PVPDEIVKKI LGNKATFSPI VTVEPRRRKF HKPITMTIPV   240
PPPSGEGVSN GYKGDTTPNL RLLCSITGGT SPAQWEDITT TPLTFIKDC VSFTTNVSAR   300
FWLADCHQVL ETVGLATQLY RELICVPYMA KFVVFAKMND PVESSLRCFC MTDDKVDKTL   360
EQQENFEEVA RSKDIEVLEG KPIYVDCYGN LAPLTKGGQQ LVFNFYSFKE NRLPFSIKIR   420
DTSQEPCGRL SFLKEPKTTK GLPQTAVCNL NITLPAHKKI EKTDRRQSFA SLALRKRYSY   480
LTEPGMKTVE RSTGATRSLP TTYSYKPFFS TRPYQSWTTA PITVPGPAKS GFTSLSSSSS   540
NTPSASPLKS IWSVSTPSPI KSTLGASTTS SVKSISDVAS PIRSFRTMSS PIKTVVSQSP   600
YNIQVSSGTL ARAPAVTEAT PLKGLASNST FSSRTSPVTT AGSLLERSSI TMTPPPASPKS   660
NINMYSSSLP FKSIITSAAP LISSPLKSVV SPVKSAVDVI SSAKITMASS LSSPVKQMPG   720
HAEVALVNGS ISPLKYPSSS TLINGCKATA TLQEKISSAT NSVSSVVSAA TDTVEKVFST   780
TTAMPFSPLR SYVSAAPSAF QSLRTPSASA LYTSLGSSIS ATTSSVTSSI ITVPVYSVVN   840
VLPEPALKKL PDSNSFTKSA AALLSPIKTL TTETHPQPHF SRTSSPVKSS LFLAPSALKL   900
STPSSLSSSQ EILKDVAEMK EDLMRMTAIL QTDVPEEKPF QPELPKEGRI DDEEPFKIVE   960
KVKEDLVKVS EILKKDVCVD NKGSPKSPKS DKGHSPEDDW IEFSSEEIRE ARQQAAASQS  1020
PSLPERVQVK AKAASEKDYN LTKVIDYLTN DIGSSSLTNL KYKFEDAKKD GEERQKRVLK  1080
PAIALQEHKL KMPPASMRTS TSEKELCKMA DSFFGTDTIL ESPDDFSQHD QDKSPLSDSG  1140
FETRSEKTPS APQSAESTGP KPLFHEVPIP PVITETRTEV VHVIRSYDPS AGDVPQTQPE  1200
EPVSPKPSPT FMELEPKPTT SSIKEKVKAF QMKASSEEDD HNRVLSKGMR VKEETHITTT  1260
TRMVYHSPPG GEGASERIEE TMSVHDIMKA FQSGRDPSKE LAGLFEHKSA VSPDVHKSAA  1320
ETSAQHAEKD NQMKPKLERI IEVHIEKGPQ SPCERTDIRM AIVADHLGLS WTELARELNF  1380
SVDEINQIRV ENPNSLISQS FMLLKKWVTR DGKNATTDAL TSVLTKINRI DIVTLLEGPI  1440
FDYGNISGTR SFADENNVFH DPVDGWQNET SSGNLESCAQ ARRVTGGLLD RLDDSPDQCR  1500
DSITSYLKGE AGKFEANGSH TEITPEAKTK SYFPESQNDV GKQSTKETLK PKIHGSGHVE  1560
EPASPLAAYQ KSLEETSKLI IEETKPCVPV SMKKMSRTSP ADGKPRLSLH EEEGSSGSEQ  1620
KQGEGFKVKT KKEIRHVEKK SHS                                         1643

SEQ ID NO: 89           moltype = AA  length = 973
FEATURE                 Location/Qualifiers
REGION                  1..973
                        note = misc_feature - Ankyrin-3 Variant 6
SITE                    1
                        note = misc_feature - Xaa can be any naturally occurring
                         amino acid
source                  1..973
                        mol_type = protein
                        organism = Homo sapiens
SEQUENCE: 89
XPVIVEIPHF GSMRGKEREL IVLRSENGET WKEHQFDSKN EDLTELLNGM DEELDSPEEL    60
GKKRICRIIT KDFPQYFAVV SRIKQESNQI GPEGGILSST TVPLVQASFP EGALTKRIRV   120
GLQAQPVPDE IVKKILGNKA TFSPIVTVEP RRRKFHKPIT MTIPVPPPSG EGVSNGYKGD   180
TTPNLRLLCS ITGGTSPAQW EDITGTTPLT FIKDCVSFTT NVSARFWLAD CHQVLETVGL   240
ATQLYRELIC VPYMAKFVVF AKMNDPVESS LRCFCMTDDK VDKTLEQQEN FEEVARSKDI   300
EVLEGKPIYV DCYGNLAPLT KGGQQLVFNF YSFKENRLPF SIKIRDTSQE PCGRLSFLKE   360
```

```
PKTTKGLPQT AVCNLNITLP AHKKETESDQ DDEIEKTDRR QSFASLALRP QSPCERTDIR    420
MAIVADHLGL SWTELARELN FSVDEINQIR VENPNSLISQ SFMLLKKWVT RDGKNATTDA    480
LTSVLTKINR IDIVTLLEGP IFDYGNISGT RSFADENNVF HDPVDGYPSL QVELETPTGL    540
HYTPPTPFQQ DDYFSDISSI ESPLRTPSRL SDGLVPSQGN IEHSADGPPV VTAEDASLED    600
SKLEDSVPLT EMPEAVDVDE SQLENVCLSE YPQYLGNLAG SPKDVKPAEP RKLGVSSEQQ    660
EKGKSGPDEE MMEEKLKSLF EDIQLEEGVE SEEMTEEKVQ AILKRVQQAE LEMSSITGWQ    720
NETSSGNLES CAQARRVTGG LLDRLDDSPD QCRDSITSYL KGEAGKFEAN GSHTEITPEA    780
KTKSYFPESQ NDVGKQSTKE TLKPKIHGSG HVEEPASPLA AYQKSLEETS KLIIEETKPC    840
VPVSMKKMSR TSPADGKPRL SLHEEEGSSG SEQKDLKDSE SDSSSEEERR VTTRVIRRRL    900
IIKGEEAKNI PGESVTEEQF TDEEGNLITR KITRKVLRRI VIPQERKRDD VQGEGFKVKT    960
KKEIRHVEKK SHS                                                      973

SEQ ID NO: 90             moltype = AA  length = 459
FEATURE                   Location/Qualifiers
REGION                    1..459
                          note = misc_feature - Ankyrin-3 Variant 7
source                    1..459
                          mol_type = protein
                          organism = Homo sapiens
SEQUENCE: 90
PKTTKGLPQT AVCNLNITLP AHKKETESDQ DDEIEKTDRR QSFASLALRK RYSYLTEPGM     60
SPQSPCERTD IRMAIVADHL GLSWTELARE LNFSVDEINQ IRVENPNSLI SQSFMLLKKW    120
VTRDGKNATT DALTSVLTKI NRIDIVTLLE GPIFDYGNIS GTRSFADENN VFHDPVDGYP    180
SLQVELETPT GLHYTPPTPF QQDDYFSDIS SIESPLRTPS RLSDGLVPSQ GNIEHSADGP    240
PVVTAEDASL EDSKLEDSVP LTEMPEAVDV DESQLENVCL SWQNETSSGN LESCAQARRV    300
TGGLLDRLDD SPDQCRDSIT SYLKGEAGKF EANGSHTEIT PEAKTKSYFP ESQNDVGKQS    360
TKETLKPKIH GSGHVEEPAS PLAAYQKSLE ETSKLIIEET KPCVPVSMKK MSRTSPADGK    420
PRLSLHEEEG SSGSEQKQGE GFKVKTKKEI RHVEKKSHS                           459

SEQ ID NO: 91             moltype = AA  length = 96
FEATURE                   Location/Qualifiers
REGION                    1..96
                          note = misc_feature - Ankyrin-3 Variant 8
SITE                      1
                          note = misc_feature - Xaa can be any naturally occurring
                           amino acid
source                    1..96
                          mol_type = protein
                          organism = Homo sapiens
SEQUENCE: 91
XLARELNFSV DEINQIRVEN PNSLISQSFM LLKKWVTRDG KNATTDALTS VLTKINRIDI     60
VTLLEGPIFD YGNISGTRSF ADENNVFHDP VDGNRI                               96

SEQ ID NO: 92             moltype = AA  length = 322
FEATURE                   Location/Qualifiers
REGION                    1..322
                          note = misc_feature - Ankyrin-3 Variant 9
SITE                      1
                          note = misc_feature - Xaa can be any naturally occurring
                           amino acid
source                    1..322
                          mol_type = protein
                          organism = Homo sapiens
SEQUENCE: 92
XGPDEDKPPS KSSSSEKTPD KTDQKSGAQF FTLEGRHPDR SVFPDTYFSY KVDEEFATPF     60
KTVATKGLDF DPWSNNRGDD EVFDSKSRED ETKPFGLAVE DRSPATTPDT TPARTPTDES    120
TPTSEPNPFP FHEGKMFEMT RSGAIDMSKR DFVEERLQFF QIGPQSPCER TDIRMAIVAD    180
HLGLSWTELA RELNFSVDEI NQIRVENPNS LISQSFMLLK KWVTRDGKNA TTDALTSVLT    240
KINRIDIVTL LEGPIFDYGN ISGTRSFADE NNVFHDPVDG WQNETSSGNL ESCAQARRVT    300
GGLLDRLDDS PDQCRDSITS YL                                            322

SEQ ID NO: 93             moltype = AA  length = 273
FEATURE                   Location/Qualifiers
source                    1..273
                          mol_type = protein
                          organism = Homo sapiens
SEQUENCE: 93
MAVEEGESFP EQSDANASYL RAARAGHLEK ALDYIKNGVD INICNQNGLN ALHLASKEGH     60
VEVVSELLQR EANVDAATKK GNTALHIASL AGQAEVVKVL VTNGANVNAQ SQNGFTPLYM    120
AAQENHLEVV KFLLDNGASQ SLATEDGFTP LAVALQQGHD QVVSLLLEND TKGKVRLPAL    180
HIAARKDDTK AAALLLQNDN NADVESKSGF TPLHIAAHYG NINVATLLLN RAAAVDFTAR    240
NDITPLHVAS KRGNANMVKL LLDRGAKIDA KTR                                 273

SEQ ID NO: 94             moltype = AA  length = 273
FEATURE                   Location/Qualifiers
REGION                    1..273
                          note = misc_feature - Ankyrin-3 Variant 11
source                    1..273
                          mol_type = protein
```

```
                        organism = Homo sapiens
SEQUENCE: 94
MAVEEGESFP EQSDANASYL RAARAGHLEK ALDYIKNGVD INICNQNGLN ALHLASKEGH    60
VEVVSELLQR EANVDAATKK GNTALHIASL AGQAEVVKVL VTNGANVNAQ SQNGFTPLYM   120
AAQENHLEVV KFLLDNGASQ SLATEDGFTP LAVALQQGHD QVVSLLLEND TKGKVRLPAL   180
HIAARKDDTK AAALLLQNDN NADVESKSGF TPLHIAAHYG NINVATLLLN RAAAVDFTAR   240
NDITPLHVAS KRGNANMVKL LLDRGAKIDA KTR                                273

SEQ ID NO: 95           moltype = AA  length = 241
FEATURE                 Location/Qualifiers
REGION                  1..241
                        note = misc_feature - Ankyrin-3 Variant 12
SITE                    1
                        note = misc_feature - Xaa can be any naturally occurring
                         amino acid
source                  1..241
                        mol_type = protein
                        organism = Homo sapiens
SEQUENCE: 95
XTVATKGLDF DPWSNNRGDD EVFDSKSRED ETKPFGLAVE DRSPATTPDT TPARTPTDES    60
TPTSEPNPFP FHEGKMFEMT RSGAIDMSKR DFVEERLQFF QIGPQSPCER TDIRMAIVAD   120
HLGLSWTELA RELNFSVDEI NQIRVENPNS LISQSFMLLK KWVTRDGKNA TTDALTSVLT   180
KINRIDIVTL LEGPIFDYGN ISGTRSFADE NNVFHDPVDG YPSLQVELET PTGLHYTPPT   240
P                                                                   241

SEQ ID NO: 96           moltype = AA  length = 178
FEATURE                 Location/Qualifiers
REGION                  1..178
                        note = misc_feature - Ankyrin-3 Variant 13
SITE                    1
                        note = misc_feature - Xaa can be any naturally occurring
                         amino acid
source                  1..178
                        mol_type = protein
                        organism = Homo sapiens
SEQUENCE: 96
XWQNETSSGN LESCAQARRV TGGLLDRLDD SPDQCRDSIT SYLKGEAGKF EANGSHTEIT    60
PEAKTKSYFP ESQNDVGKQS TKETLKPKIH GSGHVEEPAS PLAAYQKSLE ETSKLIIEET   120
KPCVPVSMKK MSRTSPADGK PRLSLHEEEG SSGSEQKGEG FKVKTKKEIR HVEKKSHS     178

SEQ ID NO: 97           moltype = AA  length = 86
FEATURE                 Location/Qualifiers
REGION                  1..86
                        note = misc_feature - Ankyrin-3 Variant 14
source                  1..86
                        mol_type = protein
                        organism = Homo sapiens
SEQUENCE: 97
MNVPETMNEV LDMSDDEGNR CTWYKIPKVQ EFTVKSEDAM TGDTDKYLGP QDLKELGDDS    60
LPAEGYMGFS LGARSARYFV VAVFHS                                         86

SEQ ID NO: 98           moltype = AA  length = 195
FEATURE                 Location/Qualifiers
REGION                  1..195
                        note = misc_feature - Ankyrin-3 Variant 15
source                  1..195
                        mol_type = protein
                        organism = Homo sapiens
SEQUENCE: 98
MTGDTDKYLG PQDLKELGDD SLPAEGYMGF SLGARSASLR SFSSDRSYTL NRSSYARDSM    60
MIEELLVPSK EQHLTFTREF DSDSLRHYSW AADTLDNVNL VSSPIHSGFL VSFMVDARGG   120
SMRGSRHHGM RIIIPPRKCT APTRITCRLV KRHKLANPPP MVEGEGLASR LVEMGPAGAQ   180
FLGPVIVEIP HFGSM                                                    195

SEQ ID NO: 99           moltype = AA  length = 166
FEATURE                 Location/Qualifiers
REGION                  1..166
                        note = misc_feature - Ankyrin-3 Variant 15
source                  1..166
                        mol_type = protein
                        organism = Homo sapiens
SEQUENCE: 99
SPDQCRDSIT SYLKGEAGKF EANGSHTEIT PEAKTKSYFP ESQNDVGKQS TKETLKPKIH    60
GSGHVEEPAS PLAAYQKSLE ETSKLIIEET KPCVPVSMKK MSRTSPADGK PRLSLHEEEG   120
SSGSEQKVKS PGAAPTRMTA CCYKQGEGFK VKTKKEIRHV EKKSHS                  166

SEQ ID NO: 100          moltype = AA  length = 217
FEATURE                 Location/Qualifiers
REGION                  1..217
```

```
                         note = misc_feature - Ankyrin-3 Variant 17
SITE                     1
                         note = misc_feature - Xaa can be any naturally occurring
                           amino acid
source                   1..217
                         mol_type = protein
                         organism = Homo sapiens
SEQUENCE: 100
XLARELNFSV DEINQIRVEN PNSLISQSFM LLKKWVTRDG KNATTDALTS VLTKINRIDI    60
VTLLEGPIFD YGNISGTRSF ADENNVFHDP VDVSPNVLSS IGYPSLQVEL ETPTGLHYTP   120
PTPFQQDDYF SDISSIESPL RTPSRLSDGL VPSQGNIEHS ADGPPVVTAE DASLEDSKLE   180
DSVPLTEMPE AVDVDESQLE NVCLSWQNET SSGNLES                            217

SEQ ID NO: 101           moltype = AA    length = 201
FEATURE                  Location/Qualifiers
REGION                   1..201
                         note = misc_feature - Ankyrin-3 Variant 18
SITE                     1
                         note = misc_feature - Xaa can be any naturally occurring
                           amino acid
source                   1..201
                         mol_type = protein
                         organism = Homo sapiens
SEQUENCE: 101
XEDAMTGDTD KYLGPQDLKE LGDDSLPAEG YMGFSLGARS ASPKISLRSF SSDRSYTLNR    60
SSYARDSMMI EELLVPSKEQ HLTFTREFDS DSLRHYSWAA DTLDNVNLVS SPIHSGYSSP   120
LPQYDSRFLV SFMVDARGGS MRGSRHHGMR IIIPPRKCTA PTRITCRLVK RHKLANPPPM   180
VEGEGLASRL VEMGPAGAQF L                                             201

SEQ ID NO: 102           moltype = AA    length = 196
FEATURE                  Location/Qualifiers
REGION                   1..196
                         note = misc_feature - Ankyrin-3 Variant 19
SITE                     1
                         note = misc_feature - Xaa can be any naturally occurring
                           amino acid
source                   1..196
                         mol_type = protein
                         organism = Homo sapiens
SEQUENCE: 102
XSSPIHSGFL VSFMVDARGG SMRGSRHHGM RIIIPPRKCT APTRITCRLV KRHKLANPPP    60
MVEGEGLASR LVEMGPAGAQ FLGKLHLPTN PPPVNEGESL VSRILQLGPQ GTKFIGPVIV   120
EIPHFGSMRG KERELIVLRS ENGETWKEHQ FDSKNEDLTE LLNGMDEELD SPEELGKKRI   180
CRIITKDFPQ YFAVVS                                                   196

SEQ ID NO: 103           moltype = AA    length = 72
FEATURE                  Location/Qualifiers
REGION                   1..72
                         note = misc_feature - Ankyrin-3 Variant 20
source                   1..72
                         mol_type = protein
                         organism = Homo sapiens
SEQUENCE: 103
MTGDTDKYLG PQDLKELGDD SLPAEGYMGF SLGARSASLR SFSSDRSYTL NRSSYARDSM    60
MIEELLVPSK EQ                                                        72

SEQ ID NO: 104           moltype = AA    length = 187
FEATURE                  Location/Qualifiers
REGION                   1..187
                         note = misc_feature - Ankyrin-3 Variant 21
SITE                     1
                         note = misc_feature - Xaa can be any naturally occurring
                           amino acid
source                   1..187
                         mol_type = protein
                         organism = Homo sapiens
SEQUENCE: 104
XIEKTDRRQS FASLALRKRY SYLTEPGMSP QSPCERTDIR MAIVADHLGL SWTELARELN    60
FSVDEINQIR VENPNSLISQ SFMLLKKWVT RDGKNATTDA LTSVLTKINR IDIVTLLEGP   120
IFDYGNISGT RSFADENNVF HDPVDDGPPV VTAEDASLED SKLEDSVPLT EMPEAVDVDE   180
SQLENVC                                                             187

SEQ ID NO: 105           moltype = AA    length = 175
FEATURE                  Location/Qualifiers
REGION                   1..175
                         note = misc_feature - Ankyrin-3ariant 22
SITE                     1
                         note = misc_feature - Xaa can be any naturally occurring
                           amino acid
```

```
source                  1..175
                        mol_type = protein
                        organism = Homo sapiens
SEQUENCE: 105
XSPLAAYQKS LEETSKLIIE ETKPCVPVSM KKMSRTSPAD GKPRLSLHEE EGSSGSEQKV    60
KSPGAAPTRM TACCYKDLKD SESDSSSEEE RRVTTRVIRR RLIIKGEEAK NIPGESVTEE   120
QFTDEEGNLI TRKITRKVLR RIVIPQERKR DDVQGEGFKV KTKKEIRHVE KKSHS        175

SEQ ID NO: 106          moltype = AA   length = 159
FEATURE                 Location/Qualifiers
REGION                  1..159
                        note = misc_feature - Ankyrin-3 Variant 23
source                  1..159
                        mol_type = protein
                        organism = Homo sapiens
SEQUENCE: 106
MTGDTDKYLG PQDLKELGDD SLPAEGYMGF SLGARSASLR SFSSDRSYTL NRSSYARDSM    60
MIEELLVPSK EQHLTFTREF DSDSLRHYSW AADTLDNVNL VSSPIHSGFL VSFMVDARGG   120
SMRGSRHHGM RIIIPPRKCT APTRITCRLV KRHKLANPP                          159

SEQ ID NO: 107          moltype = AA   length = 63
FEATURE                 Location/Qualifiers
REGION                  1..63
                        note = misc_feature - Ankyrin-3 Variant 24
source                  1..63
                        mol_type = protein
                        organism = Homo sapiens
SEQUENCE: 107
MTGDTDKYLG PQDLKELGDD SLPAEGYMGF SLGARSASHA ASTVAKELTD KTGRTNLSHI    60
FQN                                                                  63

SEQ ID NO: 108          moltype = AA   length = 1738
FEATURE                 Location/Qualifiers
REGION                  1..1738
                        note = misc_feature - Rho GTPase-activating protein 32
                         Variant 2
source                  1..1738
                        mol_type = protein
                        organism = Homo sapiens
SEQUENCE: 108
MKSRPTKQKL KQRGILKERV FGCDLGEHLL NSGFEVPQVL QSCTAFIERY GIVDGIYRLS    60
GVASNIQRLR HEFDSEHVPD LTKEPYVQDI HSVGSLCKLY FRELPNPLLT YQLYEKFSDA   120
VSAATDEERL IKIHDVIQQL PPPHYRTLEF LMRHLSLLAD YCSITNMHAK NLAIVWAPNL   180
LRSKQIESAC FSGTAAFMEV RIQSVVVEFI LNHVDVLFSG RISMAMQEGA ASLSRPKSLL   240
VSSPSTKLLT LEEAQARTQA QVNSPIVTEN KYIEVGEGPA ALQGKFHTII EFPLERKRPQ   300
NKMKKSPVGS WRSFFNLGKS SSVSKRKLQR NESEPSEMKA MALKGGRAEG TLRSAKSEES   360
LTSLHAVDGD SKLFRPRRPR SSSDALSASF NGEMLGNRCN SYDNLPHDNE SEEEGGLLHI   420
PALMSPHSAE DVDLSPPDIG VASLDFDPMS FQCSPPKAES ECLESGASFL DSPGYSKDKP   480
SANKKDAETG SSQCQTPGST ASSEPVSPLQ EKLSPFFTLD LSPTEDKSSK PSSFTEKVVY   540
AFSPKIGRKL SKSPSMSISE PISVTLPPRV SEVIGTVSNT TAQNASSSTW DKCVEERDAT   600
NRSPTQIVKM KTNETVAQEA YESEVQPLDQ VAAEEVELPG KEDQSVSSSQ SKAVASGQTQ   660
TGAVTHDPPQ DSVPVSSVSL IPPPPPPKNV ARMLALALAE SAQQASTQSL KRPGTSQAGY   720
TNYGDIAVAT TEDNLSSSYS AVALDKAYFQ TDRPAEQPHL QNNAPGNCDH PLPETTATGD   780
PTHSNTTESG EQHHQVDLTG NQPHQAYLSG DPEKARITSV PLDSEKSDDH VSFPEDQSGK   840
NSMPTVSFLD QDQSPPRFYS GDQPPSYLGA SVDKLHHPLE FADKSPTPPN LPSDKIYPPS   900
GSPEENTSTA TMTYMTTTPA TAQMSTKEAS WDVAEQPTTA DFAAATLQRT HRTNRPLPPP   960
PSQRSAEQPP VVGQVQAATN IGLNNSHKVQ GVVPVPERPP EPRAMDDPAS AFISDSGAAA  1020
AQCPMATAVQ PGLPEKVRDG ARVPLLHLRA ESVPAHCGF PAPLPPTRMM ESKMIAAIHS  1080
SSADATSSSN YHSFVTASST SVDDALPLPL PVPQPKHASQ KTVYSSFARP DVTTEPFGPD  1140
NCLHFNMTPN CQYRPQSVPP HHNKLEQHQV YGARSEPPAS MGLRYNTYVA PGRNASGHHS  1200
KPCSRVEYVS SLSSSVRNTC YPEDIPPYPT IRRVQSLHAP PSSMIRSVPI SRTEVPPDDE  1260
PAYCPRPLYQ YKPYQSSQAR SDYHVTQLQP YFENGRVHYR YSPYSSSSSS YYSPDGALCD  1320
VDAYGTVQLR PLHRLPNRDF AFYNPRLQGK SLYSYAGLAP RPRANVTGYF SPNDHNVVSM  1380
PPAADVKHTY TSWDLEDMEK YRMQSIRRES RARQKVKGPV MSQYDNMTPA VQDDLGGIYV  1440
IHLRSKSDPG KTGLLSVAEG KESRHAAKAI SPEGEDRFYR RHPEAEMDRA HHHGHGSTQ  1500
PEKPSLPQKQ SSLRSRKLPD MGCSLPEHRA HQEASHRQFC ESKNGPPYPQ GAGQLDYGSK  1560
GIPDTSEPVS YHNSGVKYAA SGQESLRLNH KEVRLSKEME RPWVRQPSAP EKHSRDCYKE  1620
EEHLTQSIVP PPKPERSHSL KLHHTQNVER DPSVLYQYQP HGKRQSSVTV VSQYDNLEDY  1680
HSLPQHQRGV FGGGGMGTYV PPGFPHPQSR TYATALGQGA FLPAELSLQH PETQIHAE    1738

SEQ ID NO: 109          moltype = AA   length = 1738
FEATURE                 Location/Qualifiers
REGION                  1..1738
                        note = misc_feature - Rho GTPase-activating protein 32
                         Variant 3
source                  1..1738
                        mol_type = protein
                        organism = Homo sapiens
SEQUENCE: 109
```

```
MKSRPTKQKL KQRGILKERV FGCDLGEHLL NSGFEVPQVL QSCTAFIERY GIVDGIYRLS    60
GVASNIQRLR HEFDSEHVPD LTKEPYVQDI HSVGSLCKLY FRELPNPLLT YQLYEKFSDA   120
VSAATDEERL IKIHDVIQQL PPPHYRTLEF LMRHLSLLAD YCSITNMHAK NLAIVWAPNL   180
LRSKQIESAC FSGTAAFMEV RIQSVVVEFI LNHVDVLFSG RISMAMQEGA ASLSRPKSLL   240
VSSPSTKLLT LEEAQARTQA QVNSPIVTEN KYIEVGEGPA ALQGKFHTII EFPLERKRPQ   300
NKMKKSPVGS WRSFFNLGKS SSVSKRKLQR NESEPSEMKA MALKGGRAEG TLRSAKSEES   360
LTSLHAVDGD SKLFRPRRPR SSSDALSASF NGEMLGNRCN SYDNLPHDNE SEEEGGLLHI   420
PALMSPHSAE DVDLSPPDIG VASLDFDPMS FQCSPPKAES ECLESGASFL DSPGYSKDKP   480
SANKKDAETG SSQCQTPGST ASSEPVSPLQ EKLSPFFTLD LSPTEDKSSK PSSFTEKVVY   540
AFSPKIGRKL SKSPSMSISE PISVTLPPRV SEVIGTVSNT TAQNASSSTW DKCVEERDAT   600
NRSPTQIVKM KTNETVAQEA YESEVQPLDQ VAAEEVELPG KEDQSVSSSQ SKAVASGQTQ   660
TGAVTHDPPQ DSVPVSSVSL IPPPPPPKNV ARMLALALAE SAQQASTQSL KRPGTSQAGY   720
TNYGDIAVAT TEDNLSSSYS AVALDKAYFQ TDRPAEQPHL QNNAPGNCDH PLPETTATGD   780
PTHSNTTESG EQHHQVDLTG NQPHQAYLSG DPEKARITSV PLDSEKSDDH VSFPEDQSGK   840
NSMPTVSFLD QDQSPPRFYS GDQPPSYLGA SVDKLHHPLE FADKSPTPPN LPSDKIYPPS   900
GSPEENTSTA TMTYMTTTPA TAQMSTKEAS WDVAEQPTTA DFAAATLQRT HRTNRPLPPP   960
PSQRSAEQPP VVGQVQAATN IGLNNSHKVQ GVVPVPERPP EPRAMDDPAS AFISDSGAAA  1020
AQCPMATAVQ PGLPEKVRDG ARVPLLHLRA ESVPAHPCGF PAPLPPTRMM ESKMIAAIHS  1080
SSADATSSSN YHSFVTASST SVDDALPLPL PVPQPKHASQ KTVYSSFARP DVTTEPFGPD  1140
NCLHFNMTPN CQYRPQSVPP HHNKLEQHQV YGARSEPPAS MGLRYNTYVA PGRNASGHHS  1200
KPCSRVEYVS SLSSSVRNTC YPEDIPPYPT IRRVQSLHAP PSSMIRSVPI SRTEVPPDDE  1260
PAYCPRPLYQ YKPYQSSQAR SDYHVTQLQP YFENGRVHYR YSPYSSSSSS YYSPDGALCD  1320
VDAYGTVQLR PLHRLPNRDF AFYNPRLQGK SLYSYAGLAP RPRANVTGYF SPNDHNVVSM  1380
PPAADVKHTY TSWDLEDMEK YRMQSIRRES RARQKVKGPV MSQYDNMTPA VQDDLGGIYV  1440
IHLRSKSDPG KTGLLSVAEG KESRHAAKAI SPEGEDRFYR RHPEAEMDRA HHHGGHGSTQ  1500
PEKPSLPQKQ SSLRSRKLPD MGCSLPEHRA HQEASHRQFC ESKNGPPYPQ GAGQLDYGSK  1560
GIPDTSEPVS YHNSGVKYAA SGQESLRLNH KEVRLSKEME RPWVRQPSAP EKHSRDCYKE  1620
EEHLTQSIVP PPKPERSHSL KLHHTQNVER DPSVLYQYQP HGKRQSSVTV VSQYDNLEDY  1680
HSLPQHQRGV FGGGGMGTYV PPGFPHPQSR TYATALGQGA FLPAELSLQH PETQIHAE    1738

SEQ ID NO: 110          moltype = AA  length = 946
FEATURE                 Location/Qualifiers
REGION                  1..946
                        note = misc_feature - Rho GTPase-activating protein 32
                         Variant 4
source                  1..946
                        mol_type = protein
                        organism = Homo sapiens
SEQUENCE: 110
MARGADVPEI PGDLTLKTCG STASMKVKHV KKLPFTKGHF PKMAECAHFH YENVEFGSIQ    60
LSLSEEQNEV MKNGCESKEL VYLVQIACQG KSWIVKRSYE DFRVLDKHLH LCIYDRRFSQ   120
LSELPRSDTL KDSPESVTQM LMAYLSRLSA IAGNKINCGE ALTWMEIDNK GNHLLVHEES   180
SINTPAVGAA HVIKRYTARA PDELTLEVGD IVSVIDMPPK VLSTWWRGKH GFQVGLFPGH   240
CVELINQKVP QSVTNSVPKP VSKKHGKLIT FLRTFMKSRP TKQKLKQRGI LKERVFGCDL   300
GEHLLNSGFE VPQVLQSCTA FIERYGIVDG IYRLSGVASN IQRLRHEFDS EHVPDLTKEP   360
YVQDIHSVGS LCKLYFRELP NPLLTYQLYE KFSDAVSAAT DEERLIKIHD VIQQLPPPHY   420
RTLEFLMRHL SLLADYCSIT NMHAKNLAIV WAPNLLESAC FSGTA AFMEVRIQSV        480
VVEFILNHVD VLFSGRISMA MQEGAASLSR PKSLLVSSPS TKLLTLEEAQ ARTQAQVNSP   540
IVTENKYIEV GEGPAALQGK FHTIIEFPLE RKRPQNKMKK SPVGSWRSFF NLGKSSSVSK   600
RKLQRNESEP SEMKAMALKG GRAEGTLRSA KSEESLTSLH AVDGDSKLFR PRRPSSSDA    660
LSASFNGEML GNRCNSYDNL PHDNESEEG GLLHIPALMS PHSAEDVDLS PPDIGVAASLD   720
FDPMSFQCSP PKAESECLES GASFLDSPGY SKDKPSANKK DAETGSSQCQ TPGSTASSEP   780
VSPLQEKLSP FFTLDLSPTE DKSSKPSSFT EKVVYAFSPK IGRKLSKSPS MSISEPISVT   840
LPPRVSEVIG TVSNTTAQNA SSSTWDKCVE ERDATNRSPT QIVKMKTNET VAQEAYESEV   900
QPLDQVAAEE VELPGKEDQS VSSSQSKAVA SGQTQTGTVC FPPFFL                 946

SEQ ID NO: 111          moltype = AA  length = 178
FEATURE                 Location/Qualifiers
REGION                  1..178
                        note = misc_feature - Rho GTPase-activating protein 32
                         Variant 5
source                  1..178
                        mol_type = protein
                        organism = Homo sapiens
SEQUENCE: 111
MKSSVHSEED DFVPELHRNV HPRERPDWEE TLSAMARGAD VPEIPGDLTL KTCGSTASMK    60
VKHVKKSTTP GLMGCDNIHR LPFTKGHFPK MAECAHFHYE NVEFGSIQLS LSEEQNEVMK   120
NGCESKELVY LVQIACQGKS WIVKRSYEDF RVLDKHLHLC IYDRRFSQLS ELPRSDTL     178

SEQ ID NO: 112          moltype = AA  length = 410
FEATURE                 Location/Qualifiers
REGION                  1..410
                        note = misc_feature - Cytoskeletal Keratin 78 type II
                         Variant 2
source                  1..410
                        mol_type = protein
                        organism = Homo sapiens
SEQUENCE: 112
MEGHEASPAQ VGQGDRGKVR FLEQQNKVLE TKWHLLQQQG LSGSQQGLEP VFEACLDQLR    60
```

```
KQLEQLQGER GALDAELKAC RDQEEEYKSK YEEEAHRRAT LENDFVVLKK DVDGVFLSKM    120
ELEGKLEALR EYLYFLKHLN EEELGQLQTQ ASDTSVVLSM DNNRYLDFSS IITEVRARYE    180
EIARSSKAEA EALYQTKYQE LQVSAQLHGD RMQETKVQIS QLHQEIQRLQ SQTENLKKQN    240
ASLQAAITDA EQRGELALKD AQAKVDELEA ALRMAKQNLA RLLCEYQELT STKLSLDVEI    300
ATYRRLLEGE ECRMSGECTS QVTISSVGGS AVMSGGVGGG LGSTCGLGSS KGSPGSCCTS    360
IVTGGSNIIL GSGKDPVLDS CSVSGSSAGS SCHTILKKTV ESSLKTSITY               410

SEQ ID NO: 113          moltype = AA  length = 41
FEATURE                 Location/Qualifiers
REGION                  1..41
                        note = misc_feature - Cytoskeletal Keratin 78 type II
                         Variant 3
SITE                    1
                        note = misc_feature - Xaa can be any naturally occurring
                         amino acid
source                  1..41
                        mol_type = protein
                        organism = Homo sapiens
SEQUENCE: 113
XDVEIATYRR LLEGEECSLG GRQRCHVWRS WWRLGEHLWT R                         41

SEQ ID NO: 114          moltype = AA  length = 2971
FEATURE                 Location/Qualifiers
REGION                  1..2971
                        note = misc_feature - Collagen type VI, alpha 3 Variant 2
source                  1..2971
                        mol_type = protein
                        organism = Homo sapiens
SEQUENCE: 114
MRKHRHLPLV AVFCLFLSGF PTTHAQQQQA AQDSADIIFL IDGSNNTGSV NFAVILDFLV     60
NLLEKLPIGT QQIRVGVVQF SDEPRTMFSL DTYSTKAQVL GAVKALGFAG GELANIGLAL    120
DFVVENHFTR AGGSRVEEGV PQVLVLISAG PSSDEIRYGV VALKQASVFS FGLGAQAASR    180
AELQHIATDD NLVFTVPEFR SFGDLQEKLL PYIVGVAQRH IVLKPPTIVT QVIEVNKRDI    240
VFLVDGSSAL GLANFNAIRD FIAKVIQRLE IGQDLIQVAV AQYADTVRPE FYFNTHPTKR    300
EVITAVRKMK PLDGSALYTG SALDFVRNNL FTSSAGYRAA EGIPKLLVLI TGGKSLDEIS    360
QPPAQELKRSS IMAFAIGNKG ADQAELEEIA FDSSLVFIPA EFRAAPLQGM LPGLLAPLRT   420
LSGTPEVHSN KRDIIFLLDG SANVGKTNFP YVRDFVMNLV NSLDIGNDNI RVGLVQFSDT    480
PVTEFSLNTY QTKSDILGHL RQLQLQGGSG LNTGSALSYV YANHFTEAGG SRIREHVPQL    540
LLLLTAGQSE DSYLQAANAL TRAGILTFCV GASQANKAEL EQIAFNPSLV YLMDDFSSLP    600
ALPQQLIQPL TTYVSGGVEE VPLAQPESKR DILFLFDGSA NLVGQFPVVR DFLYKIIDEL    660
NVKPEGTRIA VAQYSDDVKV ESRFDEHQSK PEILNLVKRM KIKTGKALNL GYALDYAQRY    720
IFVKSAGSRI EDGVLQFLVL LVAGRSSDRV DGPASNLKQS GVVPFIFQAK NADPAELEQI    780
VLSPAFILAA ESLPKIGDLH PQIVNLLKSV HNGAPAPVSG EKDVVFLLDG SEGVRSGFPL    840
LKEFVQRVVE SLDVGQDRVR VAVVQYSDRT RPEFYLNSYM NKQDVVNAVR QLTLLGGPTP    900
NTGAALEFVL RNILVSSAGS RITEGVPQLL IVLTADRSGD DVRNPSVVVK RGGAVPIGIG    960
IGNADITEMQ TISFIPDFAV AIPTFRQLGT VQQVISERVT QLTREELSRL QPVLQPLPSP   1020
GVGGKRDVVF LIDGSQSAGP EFQYVRTLIE RLVDYLDVGF DTTRVAVIQF SDDPKVEFLL   1080
NAHSSKDEVQ NAVQRLRPKG GRQINVGNAL EYVSRNIFKR PLGSRIEEGV PQFLVLISSG   1140
KSDDEVDDPA VELKQFGVAP FTIARNADQE ELVKISLSPE YVFSVSTFRE LPSLEQKLLT   1200
PITTLTSEQI QKLLASTRYP PPAVESDAAD IVFLIDSSEG VRPDGFAHIR DFVSRIVRRL   1260
NIGPSKVRVG VVQFSNDVFP EFYLKTYRSQ APVLDAIRRL RLRGGSPLNT GKALEFVARN   1320
LFVKSAGSRI EDGVPQHLVL VLGGKSQDDV SRFAQVIRSS GIVSLGVGDR NIDRTELQTI   1380
TNDPRLVFTV REFRELPNIE ERIMNSFGPS AATPAPPGVD TPPPSRPEKK KADIVFLLDG   1440
SINFRRDSFQ EVLRFVSEIV DTVYEDGDSI QVGLVQYNSD PTDEFFLKDF STKRQIIDAI   1500
NKVVYKGGRH ANTKVGLEHL RVNHFVPEAG SRLDQRVPQI AFVITGGKSV EDAQDVSLAL   1560
TQRGVKVFAV GVRNIDSEEV GKIASNSATA FRVGNVQELS ELSEQVLETL HDAMHETLCP   1620
GVTDAAKACN LDVILGFDGS RDQNVFVAQK GFESKVDAIL NRISQMHRVS CSGGRSPTVR   1680
VSVVANTPSG PVEAFDFDEY QPEMLEKFRN MRSQHPYVLT EDTLKVYLNK FRQSSPDSVK   1740
VVIHFTDGAD GDLADLHRAS ENLRQEGVRA LILVGLERVV NLERLMHLEF GRGFMYDRPL   1800
RLNLLDLDYE LAEQLDNIAE KACCGVPCKC SGQRGDRGPI GSIGPKGIPG EDGYRGYPGD   1860
EGGPGERGPP GVNGTQGFQG CPGQRGVKGS RGFPGEKGEV GEIGLDGLDG EDGDKGLPGS   1920
SGEKGNPGRR GDKGPRGEKG ERGDVGIRGD PGNPGQDSQE RGPKGETGDL GPMGVPGRDG   1980
VPGGPGETGK NGGFGRRGPP GAKGNKGGPG QPGFEGEGPT RGAQGPAGPA GPPGLIGEQG   2040
ISGPRGSGGA AGAPGERGRT GPLGRKGEPG EPGPKGGIGN RGPRGETGDD GRDGVGSEGR   2100
RGKKGERGFP GYPGPKGNPG EPGLNGTTGP KGIRGRRGNS GPPGIVGQKG DPGYPGPAGP   2160
KGNRGDSIDQ CALIQSIKDK CPCCYGPLEC PVFPTELAFA LDTSEGVNQD TFGRMRDVVL   2220
SIVNDLTIAE SNCPRGARVA VVTYNNEVTT EIRFADSKRK SVLLDKIKNL QVALTSKQQS   2280
LETAMSFVAR NTFKRVRNGF LMRKVAVFFS NTPTRASPQL REAVLKLSDA GITPLFLTRQ   2340
EDRQLINALQ INNTAVGHAL VLPAGRDLTD FLENVLTCHV CLDICNIDPS CGFGSWRPSF   2400
RDRRAAGSDV DIDMAFILDS AETTTLFQFN EMKKYIAYLV RQLDMSPDPK ASQHFARVAV   2460
VQHAPSESVD NASMPPVKVE FSLTDYGSKE KLVDFLSRGM TQLQGTRALG SAIEYTIENV   2520
FESAPNPRDL KIVVLMLTGE VPEQQLEEAQ RVILQAKCKG YFFVVLGIGR KVNIKEVYTF   2580
ASEPNDVFFK LVDKSTELNE EPLMRFGRLL PSFVSSENAF YLSPDIRKQC DWFQGDQPTK   2640
NLVKFGHKQV NVPNNVTSSP TSNPVTTTKP VTTTKPVTTT TKPVTTTTKP VTIINQPSVK   2700
PAAAKPAPAK PVAAKPVATK MATVRPPAV AKPATAAKPVA AKPAAVRPPA AAAAKPVATK    2760
PEVPRPQAAK PAATKPATTK PMVKMSREVQ VPFEITENSAK LHWERAEPPG PYFYDLTVTS   2820
AHDQSLVLKQ NLTVTDRVIG GLLAGQTYHV AVVCYLRSQV RATYHGSFST KKSQPPPPQP   2880
ARSASSSTIN LMVSTEPLAL TETDICKLPK DEGTCRDFIL KWYYDPNTKS CARFWYGGCG   2940
GNEKFGSQK ECEKVCAPVL AKPGVISVMG T                                   2971
```

```
SEQ ID NO: 115           moltype = AA  length = 2971
FEATURE                  Location/Qualifiers
REGION                   1..2971
                         note = misc_feature - Collagen type VI, alpha 3 Variant 3
source                   1..2971
                         mol_type = protein
                         organism = Homo sapiens
SEQUENCE: 115
MRKHRHLPLV AVFCLFLSGF PTTHAQQQQA AQDSADIIFL IDGSNNTGSV NFAVILDFLV   60
NLLEKLPIGT QQIRVGVVQF SDEPRTMFSL DTYSTKAQVL GAVKALGPAG GELANIGLAL  120
DFVVENHFTR AGGSRVEEGV PQVLVLISAG PSSDEIRYGV VALKQASVFS FGLGAQAASR  180
AELQHIATDD NLVFTVPEFR SFGDLQEKLL PYIVGVAQRH IVLKPPTIVT QVIEVNKRDI  240
VFLVDGSSAL GLANFNAIRD FIAKVIQRLE IGQDLIQVAV AQYADTVRPE FYFNTHPTKR  300
EVITAVRKMK PLDGSALYTG SALDFVRNNL FTSSAGYRAA EGIPKLLVLI TGGKSLDEIS  360
QPAQELKRSS IMAFAIGNKG ADQAELEEIA FDSSLVFIPA EFRAAPLQGM LPGLLAPLRT  420
LSGTPEVHSN KRDIIFLLDG SANVGKTNFP YVRDFVMNLV NSLDIGNDNI RVGLVQFSDT  480
PVTEFSLNTY QTKSDILGHL RQLQLQGGSG LNTGSALSYV YANHFTEAGG SRIREHVRPQL  540
LLLLTAGQSE DSYLQAANAL TRAGILTFCV GASQANKAEL EQIAFNPSLV YLMDDFSSLP  600
ALPQQLIQPL TTYVSGGVEE VPLAQPESKR DILFLFDGSA NLVGQFPVVR DFLYKIIDEL  660
NVKPEGTRIA VAQYSDDVKV ESRFDEHQSK PEILNLVKRM KIKTGKALNL GYALDYAQRY  720
IFVKSAGSRI EDGVLQFLVL LVAGRSSDRV DGPASNLKQS GVVPFIFQAK NADPAELEQI  780
VLSPAFILAA ESLPKIGDLH PQIVNLLKSV HNGAPAPVSG EKDVVFLLDG SEGVRSGFPL  840
LKEFVQRVVE SLDVGQDRVR VAVVQYSDRT RPEFYLNSYM NKQDVVNAVR QLTLLGGPTP  900
NTGAALEFVL RNILVSSAGS RITEGVPQLL IVLTADRSGD DVRNPSVVVK RGGAVPIGIG  960
IGNADITEMQ TISFIPDFAV AIPTFRQLGT VQQVISERVT QLTREELSRL QPVLQPLPSP 1020
GVGGKRDVVF LIDGSQSAGP EFQYVRTLIE RLVDYLDVGF DTTRVAVIQF SDDPKVEFLL 1080
NAHSSKDEVQ NAVQRLRPKG GRQINVGNAL EYVSRNIFKR PLGSRIEEGV PQFLVLISSG 1140
KSDDEVDDPA VELKQFGVAP FTIARNADQE ELVKISLSPE YVFSVSTFRE LPSLEQKLLT 1200
PITTLTSEQI QKLLASTRYP PPAVESDAAD IVFLIDSSEG VRPDGFAHIR DFVSRIVRRL 1260
NIGPSKVRVG VVQFSNDVFP EFYLKTYRSQ APVLDAIRRL RLRGGSPLNT GKALEFVARN 1320
LFVKSAGSRI EDGVPQHLVL VLGGKSQDDV SRFAQVIRSS GIVSLGVGDR NIDRTELQTI 1380
TNDPRLVFTV REFRELPNIE ERIMNSFGPS AATPAPPGVD TPPPSRPEKK KADIVFLLDG 1440
SINFRRDSFQ EVLRFVSEIV DTVYEDGDSI QVGLVQYNSD PTDEFFLKDF STKRQIIDAI 1500
NKVVYKGGRH ANTKVGLEHL RVNHFVPEAG SRLDQRVPQI AFVITGGKSV EDAQDVSLAL 1560
TQRGVKVFAV GVRNIDSEEV GKIASNSATA FRVGNVQELS ELSEQVLETL HDAMHETLCP 1620
GVTDAAKACN LDVILGFDGS RDQNVFVAQK GFESKVDAIL NRISQMHRVS CSGGRSPTVR 1680
VSVVANTPSG PVEAFDFDEY QPEMLEKFRN MRSQHPYVLT IDLKVYLNK FRQSSPDSVK 1740
VVIHFTDGAD GDLADLHRAS ENLRQEGVRA LILVGLERVV NLERLMHLEF GRGFMYDRPL 1800
RLNLLDLDYE LAEQLDNIAE KACCGVPCKC SGQRGDRGPI GSIGPKGIPG EDGYRGYPGD 1860
EGGPGERGPP GVNGTQGFQG CPGQRGVKGS RGFPGEKGEV GEIGLDGLDG EDGDKGLPGS 1920
SGEKGNPGRR GDKGPRGEKG ERGDVGIRGD PGNPGQDSQE RGPKGETGDL GPMGVPGRDG 1980
VPGGPGETGK NGGFGRRGPP GAKGNKGGPG QPGFEGEQGT RGAQGPAGPA GPPGLIGEQG 2040
ISGPRGSGGA AGAPGERGRT GPLGRKGEPG EPGKGGIGN RGPRGETGDD GRDGVGSEGR 2100
RGKKGERGFP GYPGPKGNPG EPGLNGTTGP KGIRGRRGNS GPPGIVGQKG DPGYPGPAGP 2160
KGNRGDSIDQ CALIQSIKDK CPCCYGPLEC PVFPTELAFA LDTSEGVNQD TFGRMRDVVL 2220
SIVNDLTIAE SNCPRGARVA VVTYNNEVTT EIRFADSKRK SVLLDKIKNL QVALTSKQQS 2280
LETAMSFVAR NTFKRVRNGF LMRKVAVFFS NTPTRASPQL REAVLKLSDA GITPLFLTRQ 2340
EDRQLINALQ INNTAVGHAL VLPAGRDLTD FLENVLTCHV CLDICNIDPS CGFGSWRPSF 2400
RDRRAAGSDV DIDMAFILDS AETTTLFQFN EMKKYIAYLV RQLDMSPDPK ASQHFARVAV 2460
VQHAPSESVD NASMPPVKVE FSLTDYGSKE KLVDFLSRGM TQLQGTRALG SAIEYTIENV 2520
FESAPNPRDL KIVVLMLTGE VPEQQLEEAQ RVILQAKCKG YFFVVLGIGR KVNIKEVYTF 2580
ASEPNDVFFK LVDKSTELNE EPLMRFGRLL PSFVSSENAF YLSPDIRKQC DWFQGDQPTK 2640
NLVKFGHKQV NVPNNVTSSP TSNPVTTTKP VTTTKPVTTT TKPVTTTTKP VTIINQPSVK 2700
PAAAKPAPAK PVAAKPVATK MATVRPPVAV KPATAAKPVA AKPAAVRPPA AAAAKPVATK 2760
PEVPRPQAAK PAATKPATTK PMVKMSREVQ VFEITENSAK LHWERAEPPG PYFYDLTVTS 2820
AHDQSLVLKQ NLTVTDRVIG GLLAGQTYHV AVVCYLRSQV RATYHGSFST KKSQPPPPQP 2880
ARSASSSTIN LMVSTEPLAL TETDICKLPK DEGTCRDFIL KWYYDPNTKS CARFWYGGCG 2940
GNENKFGSQK ECEKVCAPVL AKPGVISVMG T                                2971

SEQ ID NO: 116           moltype = AA  length = 2570
FEATURE                  Location/Qualifiers
REGION                   1..2570
                         note = misc_feature - Collagen type VI, alpha 3 Variant 4
source                   1..2570
                         mol_type = protein
                         organism = Homo sapiens
SEQUENCE: 116
MRKHRHLPLV AVFCLFLSGF PTTHAQQQQA VIEVNKRDIV FLVDGSSALG LANFNAIRDF   60
IAKVIQRLEI GQDLIQVAVA QYADTVRPEF YFNTHPTKRE VITAVRKMKP LDGSALYTGS  120
ALDFVRNNLF TSSAGYRAAE GIPKLLVLIT GGKSLDEISQ PAQELKRSSI MAFAIGNKGA  180
DQAELEEIAF DSSLVFIPAE FRAAPLQGML PGLLAPLRTL SGTPEEVSKRD ILFLFDGSAN  240
LVGQFPVVRD FLYKIIDELN VKPEGTRIAV AQYSDDVKSP SRFDEHQSKP EILNLVKRMK  300
IKTGKALNLG YALDYAQRYI FVKSAGSRIE DGVLQFLVLL VAGRSSDRVD GPASNLKQSG  360
VVPFIFQAKN ADPAELEQIV LSPAFILAAE SLPKIGDLHP QIVNLLKSVH NGAPAPVSGE  420
KDVVFLLDGS EGVRSGFPLL KEFVQRVVES LDVGQDRVRV AVVQYSDRTR PEFYLNSYMN  480
KQDVVNAVRQ LTLLGGPTPN TGAALEFVLR NILVSSAGSR ITEGVPQLLI VLTADRSGDD  540
VRNPSVVVKR GGAVPIGIGI GNADITEMQT ISFIPDFAVA IPTFRQLGTV QQVISERVTQ  600
LTREELSRLQ PVLQPLPSPG VGGKRDVVFL IDGSQSAGPE FQYVRTLIER LVDYLDVGFD  660
```

```
TTRVAVIQFS DDPKVEFLLN AHSSKDEVQN AVQRLRPKGG RQINVGNALE YVSRNIFKRP  720
LGSRIEEGVP QFLVLISSGK SDDEVDDPAV ELKQFGVAPF TIARNADQEE LVKISLSPEY  780
VFSVSTFREL PSLEQKLLTP ITTLTSEQIQ KLLASTRYPP PAVESDAADI VFLIDSSEGV  840
RPDGFAHIRD FVSRIVRRLN IGPSKVRVGV VQFSNDVFPE FYLKTYRSQA PVLDAIRRLR  900
LRGGSPLNTG KALEFVARNL FVKSAGSRIE DGVPQHLVLV LGGKSQDDVS RFAQVIRSSG  960
IVSLGVGDRN IDRTELQTIT NDPRLVFTVR EFRELPNIEE RIMNSFGPSA ATPAPPGVDT  1020
PPPSRPEKKK ADIVFLLDGS INFRRDSFQE VLRFVSEIVD TVYEDGDSIQ VGLVQYNSDP  1080
TDEFFLKDFS TKRQIIDAIN KVVYKGGRHA NTKVGLEHLR VNHFVPEAGS RLDQRVPQIA  1140
FVITGGKSVE DAQDVSLALT QRGVKVFAVG VRNIDSEEVG KIASNSATAF RVGNVQELSE  1200
LSEQVLETLH DAMHETLCPG VTDAAKACNL DVILGFDGSR DQNVFVAQKG FESKVDAILN  1260
RISQMHRVSC SGGRSPTVRV SVVANTPSGP VEAFDFDEYQ PEMLEKFRNM RSQHPVVLTE  1320
DTLKVYLNKF RQSSPDSVKV VIHFTDGADG DLADLHRASE NLRQEGVRAL ILVGLERVVN  1380
LERLMHLEFG RGFMYDRPLR LNLLDLDYEL AEQLDNIAEK ACCGVPCKCS GQRGDRGPIG  1440
SIGPKGIPGE DGYRGYPGDE GGPGERGPPG VNGTQGFQGC PGQRGVKGSR GFPGEKGEVG  1500
EIGLDGLDGE DGDKGLPGSS GEKGNPGRRG DKGPRGEKGE RGDVGIRGDP GNPGQDSQER  1560
GPKGETGDLG PMGVPGRDGV PGGPGETGKN GGFGRRGPPG AKGNKGGPGQ PGFGEGEQGTR  1620
GAQGPAGPAG PPGLIGEQGI SGPRGSGGAA GAPGERGRTG PLGRKGEPGE PGPKGGIGNR  1680
GPRGETGDDG RDGVGSEGRR GKKGERGFPG YPGPKGNPGE PGLNGTTGPK GIRGRRGNSG  1740
PPGIVGQKGD PGYPGPAGPK GNRGDSIDQC ALIQSIKDKC PCCYGPLECP VFPTELAFAL  1800
DTSEGVNQDT FGRMRDVVLS IVNDLTIAES NCPRGARVAV VTYNNEVTTE IRFADSKRKS  1860
VLLDKIKNLQ VALTSKQQSL ETAMSFVARN TFKRVRNGFL MRKVAVFFSN TPTRASPQLR  1920
EAVLKLSDAG ITPLFLTRQE DRQLINALQI NNTAVGHALV LPAGRDLTDF LENVLTCHVC  1980
LDICNIDPSC GFGSWRPSFR DRRAAGSDVD IDMAFILDSA ETTTLFQFNE MKKYIAYLVR  2040
QLDMSPDPKA SQHFARVAVV QHAPSESVDN ASMPPVKVEF SLTDYGSKEK LVDFLSRGMT  2100
QLQGTRALGS AIEYTIENVF ESAPNPRDLK IVVLMLTGEV PEQQLEEAQR VILQAKCKGY  2160
FFVVLGIGRK VNIKEVYTFA SEPNDVFFKL VDKSTELNEE PLMRFGRLLP SFVSSENAFY  2220
LSPDIRKQCD WFGDQPTKN LVKFGHKQVN VPNNVTSSPT SNPVTTTKPV TTTKPVTTTT  2280
KPVTTTTKPV TIINQPSVKP AAAKPAPAKP VAAKPVATKM ATVRPPVAVK PATAAKPVAA  2340
KPAAVRPPAA AAAKPVATKP EVPRPQAAKP AATKPATTKP MVKMSREVQV FEITENSAKL  2400
HWERAEPPGP YFYDLTVTSA HDQSLVLKQN LTVTDRVIGG LLAGQTYHVA VVCYLRSQVR  2460
ATYHGSFSTK KSQPPPPQPA RSASSSTINL MVSTEPLALT ETDICKLPKD EGTCRDFILK  2520
WYYDPNTKSC ARFWYGGCGG NENKFGSQKE CEKVCAPVLA KPGVISVMGT  2570

SEQ ID NO: 117          moltype = AA  length = 1237
FEATURE                 Location/Qualifiers
REGION                  1..1237
                        note = misc_feature - Collagen type VI, alpha 3 Variant 5
source                  1..1237
                        mol_type = protein
                        organism = Homo sapiens
SEQUENCE: 117
MRKHRHLPLV AVFCLFLSGF PTTHAQQQQA AQDSADIIFL IDGSNNTGSV NFAVILDFLV  60
NLLEKLPIGT QQIRVGVVQF SDEPRTMFSL DTYSTKAQVL GAVKALGFAG GELANIGLAL  120
DFVVENHFTR AGGSRVEEGV PQVLVLISAG PSSDEIRYGV VALKQASVFS FGLGAQAASR  180
AELQHIATDD NLVFTVPEFR SFGDLQEKLL PYIVGVAQRH IVLKPPTIVT QVIEVNKRDI  240
VFLVDGSSAL GLANFNAIRD FIAKVIQRLE IGQDLIQVAV AQYADTVRPE FYFNTHPTKR  300
EVITAVRKMK PLDGSALYTG SALDFVRNNL FTSSAGYRAA EGIPKLLVLI TGGKSLDEIS  360
QPAQELKRSS IMAFAIGNKG ADQAELEEIA FDSSLVFIPA EFRAAPLQGM LPGLLAPLRT  420
LSGTPEVHSN KRDIIFLLDG SANVGKTNFP YVRDFVMNLV NSLDIGNDNI RVGLVQFSDT  480
PVTEFSLNTY QTKSDILGHL RQLQLQGGSG LNTGSALSYV YANHFTEAGG SRIREHVPQL  540
LLLLTAGQSE DSYLQAANAL TRAGILTFCV GASQANKAEL EQIAFNPSLV YLMDDFSSLP  600
ALPQQLIQPL TTYVSGGVEE VPLAQPESKR DILFLFDGSA NLVGQFPVVR DFLYKIIDEL  660
NVKPEGTRIA VAQYSDDVKV ESRFDEHQSK PEILNLVKRM KIKTGKALNL GYALDYAQRY  720
IFVKSAGSRI EDGVLQFLVL LVAGRSSDRV DGPASNLKQS GVVPFIFQAK NADPAELEQI  780
VLSPAFILAA ESLPKIGDLH PQIVNLLKSV HNGAPAPVSG EGVVFLLDG SEGVRSGFPL  840
LKEFVQRVVE SLDVGQDRVR VAVVQYSDRT RPEFYLNSYM NKQDVVNAVR QLTLLGGPTP  900
NTGAALEFVL RNILVSSAGS RITEGVPQLL IVLTADRSGD DVRNPSVVVK RGGAVPIGIG  960
IGNADITEMQ TISFIPDFAV AIPTFRQLGT VQQVISERVT QLTREELSRL QPVLQPLPSP  1020
GVGGKRDVVF LIDGSQSAGP EFQYVRTLIE RLVDYLDVGF DTTRVAVIQF SDDPKVEFLL  1080
NAHSSKDEVQ NAVQRLRPKG GRQINVGNAL EYVSRNIFKR PLGSRIEEGV PQFLVLISSG  1140
KSDDEVDDPA VELKQFGVAP FTIARNADQE ELVKISLSPE YVFSVSTFRE LPSLEQKLLT  1200
PITTLTSEQI QKLLASTRYP PPGEMGASEV LLGAFSI                           1237

SEQ ID NO: 118          moltype = AA  length = 1036
FEATURE                 Location/Qualifiers
REGION                  1..1036
                        note = misc_feature - Collagen type VI, alpha 3 Variant 6
source                  1..1036
                        mol_type = protein
                        organism = Homo sapiens
SEQUENCE: 118
MRKHRHLPLV AVFCLFLSGF PTTHAQQQQA VIEVNKRDIV FLVDGSSALG LANFNAIRDF  60
IAKVIQRLEI GQDLIQVAVA QYADTVRPEF YFNTHPTKRE VITAVRKMKP LDGSALYTGS  120
ALDFVRNNLF TSSAGYRAAE GIPKLLVLIT GGKSLDEISQ PAQELKRSSI MAFAIGNKGA  180
DQAELEEIAF DSSLVFIPAE FRAAPLQGML PGLLAPLRTL SGTPEVHSNK RDIIFLLDGS  240
ANVGKTNFPY VRDFVMNLVN SLDIGNDNIR VGLVQFSDTP VTEFSLNTYQ TKSDILGHLR  300
QLQLQGGSGL NTGSALSYVY ANHFTEAGGS RIREHVPQLL LLLTAGQSED SYLQAANALT  360
RAGILTFCVG ASQANKAELE QIAFNPSLVY LMDDFSSLPA LPQQLIQPLT TYVSGGVEEV  420
PLAQPESKRD ILFLFDGSAN LVGQFPVVRD FLYKIIDELN VKPEGTRIAV AQYSDDVKVE  480
```

```
SRFDEHQSKP EILNLVKRMK IKTGKALNLG YALDYAQRYI FVKSAGSRIE DGVLQFLVLL   540
VAGRSSDRVD GPASNLKQSG VVPFIFQAKN ADPAELEQIV LSPAFILAAE SLPKIGDLHP   600
QIVNLLKSVH NGAPAPVSGE KDVVFLLDGS EGVRSGFPLL KEFVQRVVES LDVGQDRVRV   660
AVVQYSDRTR PEFYLNSYMN KQDVVNAVRQ LTLLGGPTPN TGAALEFVLR NILVSSAGSR   720
ITEGVPQLLI VLTADRSGDD VRNPSVVVKR GGAVPIGIGI GNADITEMQT ISFIPDFAVA   780
IPTFRQLGTV QQVISERVTQ LTREELSRLQ PVLQPLPSPG VGGKRDVVFL IDGSQSAGPE   840
FQYVRTLIER LVDYLDVGFD TTRVAVIQFS DDPKVEFLLN AHSSKDEVQN AVQRLRPKGG   900
RQINVGNALE YVSRNIFKRP LGSRIEEGVP QFLVLISSGK SDDEVDDPAV ELKQFGVAPF   960
TIARNADQEE LVKISLSPEY VFSVSTFREL PSLEQKLLTP ITTLTSEQIQ KLLASTRYPP  1020
PGEMGASEVL LGAFSI                                                 1036

SEQ ID NO: 119          moltype = AA  length = 2569
FEATURE                 Location/Qualifiers
REGION                  1..2569
                        note = misc_feature - Collagen type VI, alpha 3 Variant 7
source                  1..2569
                        mol_type = protein
                        organism = Homo sapiens
SEQUENCE: 119
MRKHRHLPLV AVFCLFLSGF PTTHAQQQQA VIEVNKRDIV FLVDGSSALG LANFNAIRDF    60
IAKVIQRLEI GQDLIQVAVA QYADTVRPEF YFNTHPTKRE VITAVRKMKP LDGSALYTGS   120
ALDFVRNNLF TSSAGYRAAE GIPKLLVLIT GGKSLDEISQ PAQELKRSSI MAFAIGNKGA   180
DQAELEEIAF DSSLVFIPAE FRAAPLQGML PGLLAPLRTL SGTPEESKRD ILFLFDGSAN   240
LVGQFPVVRD FLYKIIDELN VKPEGTRIAV AQYSDDVKVE SRFDEHQSKP EILNLVKRMK   300
IKTGKALNLG YALDYAQRYI FVKSAGSRIE DGVLQFLVLL VAGRSSDRVD GPASNLKQSG   360
VVPFIFQAKN ADPAELEQIV LSPAFILAAE SLPKIGDLHP QIVNLLKSVH NGAPAPVSGE   420
KDVVFLLDGS EGVRSGFPLL KEFVQRVVES LDVGQDRVRV AVVQYSDRTR PEFYLNSYMN   480
KQDVVNAVRQ LTLLGGPTPN TGAALEFVLR NILVSSAGSR ITEGVPQLLI VLTADRSGDD   540
VRNPSVVVKR GGAVPIGIGI GNADITEMQT ISFIPDFAVA IPTFRQLGTV QQVISERVTQ   600
LTREELSRLQ PVLQPLPSPG VGGKRDVVFL IDGSQSAGPE FQYVRTLIER LVDYLDVGFD   660
TTRVAVIQFS DDPKVEFLLN AHSSKDEVQN AVQRLRPKGG RQINVGNALE YVSRNIFKRP   720
LGSRIEEGVP QFLVLISSGK SDDEVDDPAV ELKQFGVAPF TIARNADQEE LVKISLSPEY   780
VFSVSTFREL PSLEQKLLTP ITTLTSEQIQ KLLASTRYPP PAVESDAADI VFLIDSSEGV   840
RPDGFAHIRD FVSRIVRRLN IGPSKVRVGV VQFSNDVFPE FYLKTYRSQA PVLDAIRRLR   900
LRGGSPLNTG KALEFVARNL FVKSAGSRIE DGVPQHLVLV LGGKSQDDVS RFAQVIRSSG   960
IVSLGVGDRN IDRTELQTIT NDPRLVFTVR EFRELPNIEE RIMNSFGPSA ATPAPPGVDT  1020
PPPSRPEKKK ADIVFLLDGS INFRRDSFQE VLRFVSEIVD TVYEDGDSIQ VGLVQYNSDP  1080
TDEFFLKDFS TKRQIIDAIN KVVYKGGRHA NTKVGLEHLR VNHFVPEAGS RLDQRVPQIA  1140
FVITGGKSVE DAQDVSLALT QRGVKVFAVG VRNIDSEEVG KIASNSATAF RVGNVQELSE  1200
LSEQVLETLH DAMHETLCPG VTDAAKACNL DVILGFDGSR DQNVFVAQKG FESKVDAILN  1260
RISQMHRVSC SGGRSPTVRV SVVANTPSGP VEAFDFDEYQ PEMLEKFRNM RSQHPYVLTE  1320
DTLKVYLNKF RQSSPDSVKV VIHFTDGADG DLADLHRASE NLRQEGVRAL ILVGLERVVN  1380
LERLMHLEFG RGFMYDRPLR LNLLDLDYEL AEQLDNIAEK ACCGVPCKCS GQRGDRGPIG  1440
SIGPKGIPGE DGYRGYPGDE GGPGERGPPG VNGTQGFQGC PGQRGVKGSR GFPGEKGEVG  1500
EIGLDGLDGE DGDKGLPGSS GEKGNPGRRG DKGPRGEKGE RGDVGIRGDP GNPGQDSQER  1560
GPKGETGDLG PMGVPGRDGV PGGPGETGKN GGFGRRGPPG AKGNKGGPGQ PGFEGEQGTR  1620
GAQGPAGPAG PPGLIGEQGI SGPRGSGGAA GAPGERGRTG PGLGRKGEPGE PGKGGIGNR  1680
GPRGETGDDG RDGVGSEGRR GKKGERGFPG YPGPKGNPGE PGLNGTTGPK GIRGRRGNSG  1740
PPGIVGQKGD PGYPGPAGPK GNRGDSIDQC ALIQSIKDKC PFHGPLECPV FPTELAFALD  1800
TSEGVNQDTF GRMRDVVLSI VNDLTIAESN CPRGARVAVV TYNNEVTTEI RFADSKRKSV  1860
LLDKIKNLQV ALTSKQQSLE TAMSFVARNT FKRVRNGFLM RKVAVFFSNT PTRASPQLRE  1920
AVLKLSDAGI TPLFLTRQED RQLINALQIN NTAVGHALVL PAGRDLTDFL ENVLTCHVCL  1980
DICNIDPSCG FGSWRPSFRD RRAAGSDVDI DMAFILDSAE TTTLFQFNEM KKYIAYLVRQ  2040
LDMSPDPKAS QHFARVAVVQ HAPSESVDNA SMPPVKVEFS LTDYGSKEKL VDFLSRGMTQ  2100
LQGTRALGSA IEYTIENVFE SAPNPRDLKI VVLMLTGEVY EQQLEEAQRV ILQAKCKGYF  2160
FVVLGIGRKV NIKEVYTFAS EPNDVFFKLV DKSTELNEEP LMRFGRLLPS FVSSENAFYL  2220
SPDIRKQCDW FQGDQPTKNL VKFGHKQVNV PNNVTSSPTS NPVTTTKPVT TTKPVTTTTK  2280
PVTTTTKPVT IINQPSVKPA AKPAPAKPV AAKPVATKMA TVRPPVAVKP ATAAKPVAAK  2340
PAAVRPPAAA AAKPVATKPE VPRPQAAKPA ATKPATTKPM VKMSREVQVF EITENSAKLH  2400
WERAEPPGPY FYDLTVTSAH DQSLVLKQNL TVTDRVIGGL LAGQTYHVAV VCYLRSQVRA  2460
TYHGSFSTKK SQPPPPQPAR SASSSTINLM VSTEPLALTE TDICKLPKDE GTCRDFILKW  2520
YYDPNTKSCA RFWYGGCGGN ENKFGSQKEC EKVCAPVLAK PGVISVMGT            2569

SEQ ID NO: 120          moltype = AA  length = 708
FEATURE                 Location/Qualifiers
REGION                  1..708
                        note = misc_feature - Collagen type VI, alpha 3 Variant 8
source                  1..708
                        mol_type = protein
                        organism = Homo sapiens
SEQUENCE: 120
MRKHRHLPLV AVFCLFLSGF PTTHAQQQQA DVKNGAAADI IFLVDSSWTI GEEHFQLVRE    60
FLYDVVKSLA VGENDPHFAL VQFNGNPHTE FLLNTYRTKQ EVLSHISNMS YIGGTNQTGK   120
GLEYIMQSHL TKAAGSRAGD GVPQVIVVLT DGHSKDGLAL PSAELKSADV NVFAIGVEDA   180
DEGALKEIAS EPLNMHMFNL ENFTSLHDIV GNLVSCVHSS VSPERAGDTE TLKDITAQDS   240
ADIIFLIDGS NNTGSVNFAV ILDFLVNLLE KLPIGTQQIR VGVVQFSDEP RTMFSLDTYS   300
TKAQVLGAVK ALGFAGGELA NIGLALDFVV ENHFTRAGGS RVEEGVPQVL VLISAGPSSD   360
EIRYGVVALK QASVFSFGLG AQAASRAELQ HIATDDNLVF TVPEFRSFGD LQEKLLPYIV   420
GVAQRHIVLK PPTIVTQVIE VNKRDIVFLV DGSSALGLAN FNAIRDFIAK VIQRLEIGQD   480
```

```
LIQVAVAQYA DTVRPEFYFN THPTKREVIT AVRKMKPLDG SALYTGSALD FVRNNLFTSS    540
AGYRAAEGIP KLLVLITGGK SLDEISQPAQ ELKRSSIMAF AIGNKGADQA ELEEIAFDSS    600
LVFIPAEFRA APLQGMLPGL LAPLRTLSGT PEESKRDILF LFDGSANLVG QFPVVRDFLY    660
KIIDELNVKP EGTRIAVAQY SDDVKVESRF DEHQSKPEIL NLVKRMKI                 708

SEQ ID NO: 121         moltype = AA   length = 173
FEATURE                Location/Qualifiers
REGION                 1..173
                       note = misc_feature - Collagen type VI, alpha 3 Variant 9
source                 1..173
                       mol_type = protein
                       organism = Homo sapiens
SEQUENCE: 121
PIGTQQIRVG VVQFSDEPRT MFSLDTYSTK AQVLGAVKAL GFAGGELANI GLALDFVVEN    60
HFTRAGGSRV EEGVPQVLVL ISAGPSSDEI RYGVVALKQA SVFSFGLGAQ AASRAELQHI    120
ATDDNLVFTV PEFRSFGDLQ EKLLPYIVGV AQRHIVLKPP TIVTQEYGLN ENW           173

SEQ ID NO: 122         moltype = AA   length = 203
FEATURE                Location/Qualifiers
REGION                 1..203
                       note = misc_feature - Proteasome subunit beta type-5
                        Variant 2
source                 1..203
                       mol_type = protein
                       organism = Homo sapiens
SEQUENCE: 122
MALASVLERP LPVNQRGFFG LGGRADLLDL GPGSLSDGLS LAAPGWGVPE EPGIEMLHGT    60
TTLAFKFRHG VIVAADSRAT AGAYIASQTV KKVIEINPYL LGTMAGGAAD CSFWERLLAR    120
QCRIYELRNK ERISVAAASK LLANMVYQYK GMGLSMGTMI CGWDKRGPVS EVLCLKPKSF    180
GMYLFCGCAE RIGNMARPLL RGQ                                           203

SEQ ID NO: 123         moltype = AA   length = 160
FEATURE                Location/Qualifiers
REGION                 1..160
                       note = misc_feature - Proteasome subunit beta type-5
                        Variant 3
source                 1..160
                       mol_type = protein
                       organism = Homo sapiens
SEQUENCE: 123
MAGGAADCSF WERLLARQCR IYELRNKERI SVAAASKLLA NMVYQYKGMG LSMGTMICGW    60
DKRGPGLYYV DSEGNRISGA TFSVGSGSVY AYGVMDRGYS YDLEVEQAYD LARRAIYQAT    120
YRDAYSGGAV NLYHVREDGW IRVSSDNVAD LHEKYSGSTP                          160

SEQ ID NO: 124         moltype = AA   length = 84
FEATURE                Location/Qualifiers
REGION                 1..84
                       note = misc_feature - Proteasome subunit beta type-5
                        Variant 4
source                 1..84
                       mol_type = protein
                       organism = Homo sapiens
SEQUENCE: 124
MALASVLERP LPVNQRGFFG LGGRADLLDL GPGSLSDGLS LAAPGWGVPE EPGIEMLHGT    60
TTLAFKASTT WTVKGTGFQG PPSL                                          84

SEQ ID NO: 125         moltype = AA   length = 118
FEATURE                Location/Qualifiers
REGION                 1..118
                       note = misc_feature - Proteasome subunit beta type-5
                        Variant 5
SITE                   1
                       note = misc_feature - Xaa can be any naturally occurring
                        amino acid
source                 1..118
                       mol_type = protein
                       organism = Homo sapiens
SEQUENCE: 125
XGIEMLHGTT TLAFKFRHGV IVAADSRATA GAYIASQTVK KVIEINPYLL GTMAGGAADC    60
SFWERLLARQ CRIYELRNKE RISVAAASKL LANMVYQYKG MGLSMGTMIC GWDKRGPG      118

SEQ ID NO: 126         moltype = AA   length = 341
FEATURE                Location/Qualifiers
REGION                 1..341
                       note = misc_feature - Heterogeneous nuclear
                        ribonucleoproteins A2/B1 Variant 2
source                 1..341
                       mol_type = protein
                       organism = Homo sapiens
```

```
SEQUENCE: 126
MEREKEQFRK LFIGGLSFET TEESLRNYYE QWGKLTDCVV MRDPASKRSR GFGFVTFSSM    60
AEVDAAMAAR PHSIDGRVVE PKRAVAREES GKPGAHVTVK KLFVGGIKED TEEHHLRDYF   120
EEYGKIDTIE IITDRQSGKK RGFGFVTFDD HDPVDKIVLQ KYHTINGHNA EVRKALSRQE   180
MQEVQSSRSG RGGNFGFGDS RGGGGNFGPG PGSNFRGGSD GYGSGRGFGD GYNGYGGGPG   240
GGNFGGSPGY GGGRGGYGGG GPGYGNQGGG YGGGYDNYGG GNYGSGNYND FGNYNQQPSN   300
YGPMKSGNFG GSRNMGGPYG GGNYGPGGSG GSGGYGGRSR Y                      341

SEQ ID NO: 127         moltype = AA   length = 341
FEATURE                Location/Qualifiers
REGION                 1..341
                       note = misc_feature - Heterogeneous nuclear
                        ribonucleoproteins A2/B1 Variant 3
source                 1..341
                       mol_type = protein
                       organism = Homo sapiens
SEQUENCE: 127
MEREKEQFRK LFIGGLSFET TEESLRNYYE QWGKLTDCVV MRDPASKRSR GFGFVTFSSM    60
AEVDAAMAAR PHSIDGRVVE PKRAVAREES GKPGAHVTVK KLFVGGIKED TEEHHLRDYF   120
EEYGKIDTIE IITDRQSGKK RGFGFVTFDD HDPVDKIVLQ KYHTINGHNA EVRKALSRQE   180
MQEVQSSRSG RGGNFGFGDS RGGGGNFGPG PGSNFRGGSD GYGSGRGFGD GYNGYGGGPG   240
GGNFGGSPGY GGGRGGYGGG GPGYGNQGGG YGGGYDNYGG GNYGSGNYND FGNYNQQPSN   300
YGPMKSGNFG GSRNMGGPYG GGNYGPGGSG GSGGYGGRSR Y                      341

SEQ ID NO: 128         moltype = AA   length = 261
FEATURE                Location/Qualifiers
REGION                 1..261
                       note = misc_feature - Heterogeneous nuclear
                        ribonucleoproteins A2/B1 Variant 4
source                 1..261
                       mol_type = protein
                       organism = Homo sapiens
SEQUENCE: 128
MEKTLETVPL ERKKREKEQF RKLFIGGLSF ETTEESLRNY YEQWGKLTDC VVMRDPASKR    60
SRGFGFVTFS SMAEVDAAMA ARPHSIDGRV VEPKRAVARE ESGKPGAHVT VKKLFVGGIK   120
EDTEEHHLRD YFEEYGKIDT IEIITDRQSG KKRGFGFVTF DDHDPVDKIV LQKYHTINGH   180
NAEVRKALSR QEMQEDLEVA ILEVAPVMEE EEEDMVVEDL DMATRVGATE VVMTMEEEI    240
MEVEITMILE IITSNLLTTV Q                                            261

SEQ ID NO: 129         moltype = AA   length = 434
FEATURE                Location/Qualifiers
REGION                 1..434
                       note = misc_feature - Beta enolaseVariant 2
source                 1..434
                       mol_type = protein
                       organism = Homo sapiens
SEQUENCE: 129
MAMQKIFARE ILDSRGNPTV EVDLHTAKGR FRAAVPSGAS TGIYEALELR DGDKGRYLGK    60
GVLKAVENIN NTLGPALLQK KLSVVDQEKV DKFMIELDGT ENKSKFGANA ILGVSLAVCK   120
AGAAEKGVPL YRHIADLAGN PDLILPVPAF NVINGGSHAG NKLAMQEFMI LPVGASSFKE   180
AMRIGAEVYH HLKGVIKAKY GKDATNVGDE GGFAPNILEN NEALELLKTA IQAAGYPDKV   240
VIGMDVAASE FYRNGKYDLD FKSPDDPARH ITGEKLGELY KSFIKNYPVV SIEDPFDQDD   300
WATWTSFLSG VNIQIVGDDL TVTNPKRIAQ AVEKKACNCL LLKVNQIGSV TESIQACKLA   360
QSNGWGVMVS HRSGETEDTF IADLVVGLCT GQIKTGAPCR SERLAKYNQL MRIEEALGDK   420
AIFAGRKFRN PKAK                                                    434

SEQ ID NO: 130         moltype = AA   length = 434
FEATURE                Location/Qualifiers
REGION                 1..434
                       note = misc_feature - Beta enolase Variant 3
source                 1..434
                       mol_type = protein
                       organism = Homo sapiens
SEQUENCE: 130
MAMQKIFARE ILDSRGNPTV EVDLHTAKGR FRAAVPSGAS TGIYEALELR DGDKGRYLGK    60
GVLKAVENIN NTLGPALLQK KLSVVDQEKV DKFMIELDGT ENKSKFGANA ILGVSLAVCK   120
AGAAEKGVPL YRHIADLAGN PDLILPVPAF NVINGGSHAG NKLAMQEFMI LPVGASSFKE   180
AMRIGAEVYH HLKGVIKAKY GKDATNVGDE GGFAPNILEN NEALELLKTA IQAAGYPDKV   240
VIGMDVAASE FYRNGKYDLD FKSPDDPARH ITGEKLGELY KSFIKNYPVV SIEDPFDQDD   300
WATWTSFLSG VNIQIVGDDL TVTNPKRIAQ AVEKKACNCL LLKVNQIGSV TESIQACKLA   360
QSNGWGVMVS HRSGETEDTF IADLVVGLCT GQIKTGAPCR SERLAKYNQL MRIEEALGDK   420
AIFAGRKFRN PKAK                                                    434

SEQ ID NO: 131         moltype = AA   length = 391
FEATURE                Location/Qualifiers
REGION                 1..391
                       note = misc_feature - Beta enolase Variant 3
source                 1..391
                       mol_type = protein
```

```
                    organism = Homo sapiens
SEQUENCE: 131
MAMQKIFARE ILDSRGNPTV EVDLHTAKGR FRAAVPSGAS TGIYEALELR DGDKGRYLGK    60
AKFGANAILG VSLAVCKAGA AEKGVPLYRH IADLAGNPDL ILPVPAFNVI NGGSHAGNKL   120
AMQEFMILPV GASSFKEAMR IGAEVYHHLK GVIKAKYGKD ATNVGDEGGF APNILENNEA   180
LELLKTAIQA AGYPDKVVIG MDVAASEFYR NGKYDLDFKS PDDPARHITG EKLGELYKSF   240
IKNYPVVSIE DPFDQDDWAT WTSFLSGVNI QIVGDDLTVT NPKRIAQAVE KKACNCLLLK   300
VNQIGSVTES IQACKLAQSN GWGVMVSHRS GETEDTFIAD LVVGLCTGQI KTGAPCRSER   360
LAKYNQLMRI EEALGDKAIF AGRKFRNPKA K                                  391

SEQ ID NO: 132          moltype = AA  length = 212
FEATURE                 Location/Qualifiers
REGION                  1..212
                        note = misc_feature - Beta enolase Variant 5
source                  1..212
                        mol_type = protein
                        organism = Homo sapiens
SEQUENCE: 132
MAMQKIFARE ILDSRGNPTV EVDLHTAKGR FRAAVPSGAS TGIYEALELR DGDKGRYLGK    60
GVLKAVENIN NTLGPALLQK KLSVVDQEKV DKFMIELDGT ENKSKFGANA ILGVSLAVCK   120
AGAAEKGVPL YRHIADLAGN PDLILPVPAF NVINGGSHAG NKLAMQEFMI LPVGASSFKE   180
AMRIGAEVYH HLKGVIKAKY GKDATNVGDE GG                                 212

SEQ ID NO: 133          moltype = AA  length = 196
FEATURE                 Location/Qualifiers
REGION                  1..196
                        note = misc_feature - Beta enolase Variant 6
source                  1..196
                        mol_type = protein
                        organism = Homo sapiens
SEQUENCE: 133
MAMQKIFARE ILDSRGNPTV EVDLHTAKGR FRAAVPSGAS TGIYEALELR DGDKGRYLGK    60
GVLKAVENIN NTLGPALLQK KLSVVDQEKV DKFMIELDGT ENKSKFGANA ILGVSLAVCK   120
AGAAEKGVPL YRHIADLAGN PDLILPVPAF NVINGGSHAG NKLAMQEFMI LPVGASSFKE   180
AMRIGAEVYH HLKGVI                                                   196

SEQ ID NO: 134          moltype = AA  length = 148
FEATURE                 Location/Qualifiers
REGION                  1..148
                        note = misc_feature - Beta enolase Variant 7
source                  1..148
                        mol_type = protein
                        organism = Homo sapiens
SEQUENCE: 134
MAMQKIFARE ILDSRGNPTV EVDLHTAKGR FRAAVPSGAS TGIYEALELR DGDKGRYLGK    60
GVLKAVENIN NTLGPALLQK KLSVVDQEKV DKFMIELDGT ENKSKFGANA ILGVSLAVCK   120
AGAAEKGVPL YRHIADLAGN PDLILPVP                                      148

SEQ ID NO: 135          moltype = AA  length = 148
FEATURE                 Location/Qualifiers
REGION                  1..148
                        note = misc_feature - Beta enolase Variant 8
source                  1..148
                        mol_type = protein
                        organism = Homo sapiens
SEQUENCE: 135
MAMQKIFARE ILDSRGNPTV EVDLHTAKGR FRAAVPSGAS TGIYEALELR DGDKGRYLGK    60
GVLKAVENIN NTLGPALLQK KLSVVDQEKV DKFMIELDGT ENKSKFGANA ILGVSLAVCK   120
AGAAEKGVPL YRHIADLAGN PDLILPVP                                      148

SEQ ID NO: 136          moltype = AA  length = 154
FEATURE                 Location/Qualifiers
REGION                  1..154
                        note = misc_feature - Beta enolase Variant 9
source                  1..154
                        mol_type = protein
                        organism = Homo sapiens
SEQUENCE: 136
MAMQKIFARE ILDSRGNPTV EVDLHTAKGR FRAAVPSGAS TGIYEALELR DGDKGRYLGK    60
GVLKAVENIN NTLGPALLQK KLSVVDQEKV DKFMIELDGT ENKSKFGANA ILGVSLAVCK   120
AGAAEKGVPL YRHIADLAGN PDLILPVPAF NVIN                               154

SEQ ID NO: 137          moltype = AA  length = 28
FEATURE                 Location/Qualifiers
REGION                  1..28
                        note = misc_feature - Beta enolase Variant 10
source                  1..28
                        mol_type = protein
                        organism = Homo sapiens
```

```
SEQUENCE: 137
MAMQKIFARE ILDSRGNPTV EVDLHTAK                                          28

SEQ ID NO: 138            moltype = AA   length = 174
FEATURE                   Location/Qualifiers
REGION                    1..174
                          note = misc_feature - Glutathione S-transferase P Variant 2
source                    1..174
                          mol_type = protein
                          organism = Homo sapiens
SEQUENCE: 138
MPPYTVVYFP VRGRCAALRM LLADQGQSWK EEVVTVETWQ EGSLKASCLY GQLPKFQDGD       60
LTLYQSNTIL RHLGRTLGLY GKDQQEAALV DMVNDGVEDL RCKYISLIYT NYISFADYNL      120
LDLLLIHEVL APGCLDAFPL LSAYVGRLSA RPKLKAFLAS PEYVNLPING NGKQ            174

SEQ ID NO: 139            moltype = AA   length = 69
FEATURE                   Location/Qualifiers
REGION                    1..69
                          note = misc_feature - Glutathione S-transferase P Variant 3
source                    1..69
                          mol_type = protein
                          organism = Homo sapiens
SEQUENCE: 139
EAGKDDYVKA LPGQLKPFET LLSQNQGGKT FIVGDQVSIW PHAVPSSPPS ASRWTQVSPS       60
LTTTCWTCC                                                               69

SEQ ID NO: 140            moltype = AA   length = 166
FEATURE                   Location/Qualifiers
REGION                    1..166
                          note = misc_feature - Glutathione S-transferase Mu 3
                           Variant 2
source                    1..166
                          mol_type = protein
                          organism = Homo sapiens
SEQUENCE: 140
MSCESSMVLG YWDIRGLAHA IRLLLEFTDT SYEEKRYTCG EAPDYDRSQW LDVKFKLDLD       60
FPNLPYLLDG KNKITQSNAI LRYIARKHNM CGETEEEKIR VDIIENQVMD FRTQLIRLCY      120
SSDHEKLKPQ YLEELPGQLK QFSMFLGKFS WFAGEKLTFV DFLTYD                    166

SEQ ID NO: 141            moltype = AA   length = 212
FEATURE                   Location/Qualifiers
REGION                    1..212
                          note = misc_feature - Glutathione S-transferase Mu 3
                           Variant 3
source                    1..212
                          mol_type = protein
                          organism = Homo sapiens
SEQUENCE: 141
MSCESSMVLG YWDIRGLAHA IRLLLEFTDT SYEEKRYTCG EAPDYDRSQW LDVKFKLDLD       60
FPNLPYLLDG KNKITQSNAI LRYIARKHNM CGETEEEKIR VDIIENQVMD FRTQLIRLCY      120
SSDHEKLKPQ YLEELPGQLK QFSMFLGKFS WFAGEKLTFV DFLTYDILDQ NRIFDPKCLD      180
EFPNLKAFMC RFGDVLHFLY KTLTAPLGPA DP                                    212

SEQ ID NO: 142            moltype = AA   length = 1144
FEATURE                   Location/Qualifiers
REGION                    1..1144
                          note = misc_feature - ARHGAP23 Variant 2
source                    1..1144
                          mol_type = protein
                          organism = Homo sapiens
SEQUENCE: 142
MNGVAFCLVG IPPRPEPRPP QLPLGPRDGC SPRRPFPWQG PRTLLLYKSP QDGFGFTLRH       60
FIVYPPESAV HCSLKEEENG GRGGGPSPRY RLEPMDTIFV KNVKEDGPAH RAGLRTGDRL      120
VKVNGESVIG KTYSQVIALI QNSDDTLELS IMPKDEDILQ LAYSQDAYLK GNEPYSGEAR      180
SIPEPPPICY PRKTYAPPAR ASTRATMVPE PTSALPSDPR SPAAWSDPGL RVPPAARAHL      240
DNSSLGMSQP RPSPGAFPHL SSEPRTPRAF PEPGSRVPPS RLECQQALSH WLSNQVPRRA      300
GERRCPAMAP RARSASQDRL EEVAAPRPWP CSTSQDALSQ LGQEGWHRAR SDDYLSRATR      360
SAEALGPGAL VSPRFERCGW ASQRSSARTP ACPTRDLPGP QAPPPSGLQG LDDLGYIGYR      420
SYSPSFQRRT GLLHALSFRD SPFGGLPTFN LAQSPASFPP EASEPPRVVR PEPSTRALEP      480
PAEDRGDEVV LRQKPPTGRK VQLTPARQMN LGFGDESPEP EASGRGERLG RKVAPLATTE      540
DSLASIPFID EPTSPSIDLQ AKHVPASAVV SSAMNSAPVL GTSPSSPTFT FTLGRHYSQD      600
CSSIKAGRRS SYLLAITTER SKSCDDGLNT FRDEGRVLRR LPNRIPSLRM LRSFFTDGSL      660
DSWGTSEDAD APSKRHSTSD LSDATFSDIR REGWLYYKQI LTKKGKKAGS GLRQWKRVYA      720
ALRARSLSLS KERREPGPAA AGAAAAGAGE DEAAPVCIGS CLVDISYSET KRRHVFRLTT      780
ADFCEYLFQA EDRDDMLGWI RAIRENSRAE GEDPGCANQA LISKKLNDYR KVSHSSGPKA      840
DSSPKGSRGL GGLKSEFLKQ SAARGLRTQD LPAGSKDDSA AAPKTPWGIN IIKKNKKAAP      900
RAFGVRLEEC QPATENQRVP LIVAACCRIV EARGLESTGI YRVPGNNAVV SSLQEQLNRG      960
PGDINLQDER WQDLNVISSL LKSFFRKLPE PLFTDDKYND FIEANRIEDA RERMRTLRKL     1020
IRDLPGHYYE TLKFLVGHLK TIADHSEKNK MEPRNLALVF GPTLVRTSED NMTDMVTHMP     1080
```

```
DRYKIVETLI QHSDWFFSDE EDKGERTPVG DKEPQAVPNI EYLLPNIGRT VPPGDPGSAD    1140
LLEI                                                                1144

SEQ ID NO: 143           moltype = AA  length = 102
FEATURE                  Location/Qualifiers
REGION                   1..102
                         note = misc_feature - ARHGAP23 Variant 3
source                   1..102
                         mol_type = protein
                         organism = Homo sapiens
SEQUENCE: 143
MDTIFVKNVK EDGPAHRAGL RTGDRLVKVN GESVIGKTYS QVIALIQNSD DTLELSIMPK    60
DEDILQLAYS QDAYLKGNEP YSGEARSIPE PPPICYPRKT YA                       102

SEQ ID NO: 144           moltype = AA  length = 64
FEATURE                  Location/Qualifiers
REGION                   1..64
                         note = misc_feature - ARHGAP23 Variant 4
SITE                     1
                         note = misc_feature - Xaa can be any naturally occurring
                          amino acid
source                   1..64
                         mol_type = protein
                         organism = Homo sapiens
SEQUENCE: 144
XFFSDEEDKG ERTPVGDKEP QAVPNIEYLL PNIGRTVPPG DPGSDSTTCS SAKSKVRMKA    60
ILKA                                                                 64

SEQ ID NO: 145           moltype = AA  length = 163
FEATURE                  Location/Qualifiers
REGION                   1..163
                         note = misc_feature - ARHGAP23 Variant 5
SITE                     1
                         note = misc_feature - Xaa can be any naturally occurring
                          amino acid
source                   1..163
                         mol_type = protein
                         organism = Homo sapiens
SEQUENCE: 145
XTFSDIRREG WLYYKQILTK KGKAEDRDDM LGWIRAIREN SRAEGEDPGC ANQALISKKL    60
NDYRKVSHSS GPKADSSPKG SRGLGGLKSE FLKQSAARGL RTQDLPAGSK DDSAAAPKTP    120
WGINIIKKNK KAAPRAFGVR LEECQPATEN QRVPLIVAAC CRI                      163

SEQ ID NO: 146           moltype = AA  length = 135
FEATURE                  Location/Qualifiers
REGION                   1..135
                         note = misc_feature - ARHGAP23 Variant 6
source                   1..135
                         mol_type = protein
                         organism = Homo sapiens
SEQUENCE: 146
IRDLPGHYYE TLKFLVGHLK TIADHSEKNK MEPRNLALVF GPTLVRTSED NMTDMVTHMP    60
DRYKIVETLI QHSDWFFSDE EDKGERILPP VVQPSPRVRG PPRRSRTPGR CWRSPSSRPS    120
TASARSGGRR GGWAA                                                     135

SEQ ID NO: 147           moltype = AA  length = 2087
FEATURE                  Location/Qualifiers
REGION                   1..2087
                         note = misc_feature - Rho 32
REGION                   1..2087
                         note = misc_feature - or Rho GTPase-activating protein 32
                          (ARHGAP32)
source                   1..2087
                         mol_type = protein
                         organism = Homo sapiens
SEQUENCE: 147
METESESSTL GDDSVFWLES EVIIQVTDCE EEEREEKFRK MKSSVHSEED DFVPELHRNV    60
HPRERPDWEE TLSAMARGAD VPEIPGDLTL KTCGSTASMK VKHVKKLPFT KGHFPKMAEC    120
AHFHYENVEF GSIQLSLSEE QNEVMKNGCE SKELVYLVQI ACQGKSWIVK RSYEDFRVLD    180
KHLHLCIYDR RFSQLSELPR SDTLKDSPES VTQMLMAYLS RLSAIAGNKI NCGPALTWME    240
IDNKGNHLLV HEESSINTPA VGAAHVIKRY TARAPDELTL EVGDIVSVID MPPKVLSTWW    300
RGKHGFQVGL FPGHCVELIN QKVPQSVTNS VPKPVSKKHG KLITFLRTFM KSRPTKQKLK    360
QRGILKERVF GCDLGEHLLN SGFEVPQVLQ SCTAFIERYG IVDGIYRLSG VASNIQRLRH    420
EFDSEHVPDL TKEPYVQDIH SVGSLCKLYF RELPNPLLTY QLYEKFSDAV SAATDEERLI    480
KIHDVIQQLP PPHYRTLEFL MRHLSLLADY CSITNMHAKN LAIVWAPNLL RSKQIESACF    540
SGTAAFMEVR IQSVVEFIL NHVDVLFSGR ISMAMQEGAA SLSRPKSLLV SSPSTKLLTL     600
EEAQARTQAQ VNSPIVTENK YIEVGEGPAA LQGKFHTIIE FPLERKRPQN KMKKSPVGSW    660
RSFFNLGKSS SVSKRKLQRN ESEPSEMKAM ALKGGRAEGT LRSAKSEESL TSLHAVDGDS    720
KLFRPRRPRS SSDALSASFN GEMLGNRCNS YDNLPHDNES EEEGGLLHIP ALMSPHSAED    780
```

```
VDLSPPDIGV ASLDFDPMSF QCSPPKAESE CLESGASFLD SPGYSKDKPS ANKKDAETGS  840
SQCQTPGSTA SSEPVSPLQE KLSPFFTLDL SPTEDKSSKP SSFTEKVVYA FSPKIGRKLS  900
KSPSMSISEP ISVTLPPRVS EVIGTVSNTT AQNASSSTWD KCVEERDATN RSPTQIVKMK  960
TNETVAQEAY ESEVQPLDQV AAEEVELPGK EDQSVSSSQS KAVASGQTQT GAVTHDPPQD 1020
SVPVSSVSLI PPPPPPKNVA RMLALALAES AQQASTQSLK RPGTSQAGYT NYGDIAVATT 1080
EDNLSSSYSA VALDKAYFQT DRPAEQFHLQ NNAPGNCDHP LPETTATGDP THSNTTESGE 1140
QHHQVDLTGN QPHQAYLSGD PEKARITSVP LDSEKSDDHV SFPEDQSGKN SMPTVSFLDQ 1200
DQSPPRFYSG DQPPSYLGAS VDKLHHPLEF ADKSPTPPNL PSDKIYPPSG SPEENTSTAT 1260
MTYMTTTPAT AQMSTKEASW DVAEQPTTAD FAAATLQRTH RTNRPLPPPP SQRSAEQPPV 1320
VGQVQAATNI GLNNSHKVQG VVPVPERPPE PRAMDDPASA FISDSGAAAA QCPMATAVQP 1380
GLPEKVRDGA RVPLLHLRAE SVPAHPCGFP APLPPTRMME SKMIAAIHSS SADATSSSNY 1440
HSFVTASSTS VDDALPLPLP VPQPKHASQK TVYSSFARPD VTTEPFGPDN CLHFNMTPNC 1500
QYRPQSVPPH HNKLEQHQVY GARSEPPASM GLRYNTYVAP GRNASGHHSK PCSRVEYVSS 1560
LSSSVRNTCY PEDIPPYPTI RRVQSLHAPP SSMIRSVPIS RTEVPPDDEP AYCPRPLYQY 1620
KPYQSSQARS DYHVTQLQPY FENGRVHYRY SPYSSSSSSY YSPDGALCDV DAYGTVQLRP 1680
LHRLPNRDFA FYNPRLQGKS LYSYAGLAPR PRANVTGYFS PNDHNVVSMP PAADVKHTYT 1740
SWDLEDMEKY RMQSIRRESR ARQKVKGPVM SQYDNMTPAV QDDLGGIYVI HLRSKSDPGK 1800
TGLLSVAEGK ESRHAAKAIS PEGEDRFYRR HPEAEMDRAH HHGGHGSTQP EKPSLPQKQS 1860
SLRSRKLPDM GCSLPEHRAH QEASHRQFCE SKNGPPYPQG AGQLDYGSKG IPDTSEPVSY 1920
HNSGVKYAAS GQESLRLNHK EVRLSKEMER PWVRQPSAPE KHSRDCYKEE EHLTQSIVPP 1980
PKPERSHSLK LHHTQNVERD PSVLYQYQPH GKRQSSVTVV SQYDNLEDYH SLPQHQRGVF 2040
GGGGMGTYVP PGFPHPQSRT YATALGQGAF LPAELSLQHP ETQIHAE              2087
```